(12) United States Patent
Shimodaira et al.

(10) Patent No.: US 10,864,636 B2
(45) Date of Patent: Dec. 15, 2020

(54) ROBOT SETTING APPARATUS, ROBOT SETTING METHOD, ROBOT SETTING PROGRAM, COMPUTER READABLE RECORDING MEDIUM, AND APPARATUS STORING PROGRAM

(71) Applicant: Keyence Corporation, Osaka (JP)

(72) Inventors: Masato Shimodaira, Osaka (JP); Naoki Takayama, Osaka (JP); Ippei Yamauchi, Osaka (JP)

(73) Assignee: KEYENCE CORPORATION, Osaka (JP)

( * ) Notice: Subject to any disclaimer, the term of this patent is extended or adjusted under 35 U.S.C. 154(b) by 320 days.

(21) Appl. No.: 15/911,336

(22) Filed: Mar. 5, 2018

(65) Prior Publication Data

US 2018/0250822 A1    Sep. 6, 2018

(30) Foreign Application Priority Data

Mar. 3, 2017    (JP) .................................. 2017-040975

(51) Int. Cl.
*B25J 9/16*    (2006.01)
(52) U.S. Cl.
CPC ........... *B25J 9/1671* (2013.01); *B25J 9/1669* (2013.01); *B25J 9/1697* (2013.01);
(Continued)
(58) Field of Classification Search
CPC ...... B25J 9/1671; B25J 9/1669; B25J 9/1697; B25J 3/04; B25J 9/1689; B25J 9/1694;
(Continued)

(56) References Cited

U.S. PATENT DOCUMENTS

| 7,177,459 | B1* | 2/2007 | Watanabe | .............. | B25J 9/1697 |
| | | | | | 382/151 |
| 9,227,323 | B1* | 1/2016 | Konolige | .................. | G06T 7/60 |

(Continued)

FOREIGN PATENT DOCUMENTS

| JP | 3196205 A | 8/1991 |
| JP | 2000222599 A | 8/2000 |

(Continued)

OTHER PUBLICATIONS

U.S. Appl. No. 15/893,736, filed Feb. 12, 2018 (254 pages).

(Continued)

*Primary Examiner* — Harry Y Oh
*Assistant Examiner* — George Sun
(74) *Attorney, Agent, or Firm* — Kilyk & Bowersox, P.L.L.C.

(57) ABSTRACT

A robot setting apparatus includes a positioning unit that adjusts a position and an attitude of a workpiece model, and a grip position specifying unit that specifies a grip position at which the workpiece model is gripped by an end effector for at least one fundamental direction image in a state of displaying at least three height images in which the workpiece model positioned by the positioning unit on the virtual three-dimensional space is viewed from respective axis directions of three axes orthogonal to each other on the display unit as fundamental direction images.

13 Claims, 127 Drawing Sheets

(52) U.S. Cl.
CPC .............. *G05B 2219/23007* (2013.01); *G05B 2219/45063* (2013.01); *Y10S 901/31* (2013.01); *Y10S 901/47* (2013.01)

(58) Field of Classification Search
CPC ...... B25J 9/1633; B25J 9/1602; B25J 9/1687; B25J 15/02; G05B 2219/45063; G05B 15/02; G05B 2219/40032; G05B 2219/37553; G05B 2219/37555; G05B 2219/37567; G05B 2219/40053; G05B 19/41845; Y10S 901/31; Y10S 901/47; Y10S 901/08; Y10S 901/45; G06F 11/00; G06F 9/00; Y02P 90/265
See application file for complete search history.

(56) References Cited

U.S. PATENT DOCUMENTS

| | | | | |
|---|---|---|---|---|
| 9,529,945 | B2* | 12/2016 | Atohira | B25J 9/1687 |
| 9,990,685 | B2* | 6/2018 | Melikian | H04N 5/23229 |
| 10,456,918 | B2* | 10/2019 | Watanabe | G06T 7/344 |
| 10,532,461 | B2* | 1/2020 | Kobayashi | B25J 9/1633 |
| 2007/0213874 | A1* | 9/2007 | Oumi | B25J 9/1697 |
| | | | | 700/245 |
| 2008/0082213 | A1* | 4/2008 | Ban | G06T 7/73 |
| | | | | 700/260 |
| 2008/0301072 | A1* | 12/2008 | Nagatsuka | B25J 9/1671 |
| | | | | 706/12 |
| 2011/0122228 | A1* | 5/2011 | Fujieda | G01B 11/03 |
| | | | | 348/46 |
| 2012/0229620 | A1* | 9/2012 | Ikeda | B25J 9/1692 |
| | | | | 348/94 |
| 2014/0039679 | A1* | 2/2014 | Ando | B25J 9/1697 |
| | | | | 700/259 |
| 2014/0161344 | A1* | 6/2014 | Rodriges | G06T 7/74 |
| | | | | 382/152 |
| 2014/0163737 | A1* | 6/2014 | Nagata | B25J 9/1697 |
| | | | | 700/259 |
| 2015/0003678 | A1* | 1/2015 | Watanabe | B25J 9/1697 |
| | | | | 382/103 |
| 2015/0073596 | A1* | 3/2015 | Fudaba | B25J 9/1689 |
| | | | | 700/259 |
| 2016/0075031 | A1* | 3/2016 | Gotou | B25J 9/1697 |
| | | | | 700/259 |
| 2016/0199981 | A1* | 7/2016 | Atohira | B25J 9/1682 |
| | | | | 700/248 |
| 2017/0021502 | A1* | 1/2017 | Nusser | B25J 9/1697 |
| 2017/0106540 | A1* | 4/2017 | Watanabe | B25J 9/1697 |
| 2017/0121113 | A1* | 5/2017 | Wagner | G06K 7/10693 |
| 2017/0270631 | A1* | 9/2017 | Melikian | B25J 9/1687 |
| 2018/0038805 | A1* | 2/2018 | Heikkila | G06T 7/74 |
| 2018/0056523 | A1* | 3/2018 | Aiso | B25J 9/1697 |

FOREIGN PATENT DOCUMENTS

| | | |
|---|---|---|
| JP | 3782679 B2 | 6/2006 |
| JP | 4962123 B2 | 6/2012 |

OTHER PUBLICATIONS

U.S. Appl. No. 15/893,741, filed Feb. 12, 2018 (257 pages).
U.S. Appl. No. 15/893,852, filed Feb. 12, 2018 (255 pages).
U.S. Appl. No. 15/911,359, filed Mar. 5, 2018 (434 pages).
U.S. Appl. No. 15/895,263, filed Feb. 13, 2018 (77 pages).
U.S. Appl. No. 15/895,467, filed Feb. 13, 2018 (171 pages).

\* cited by examiner

FIG. 50A
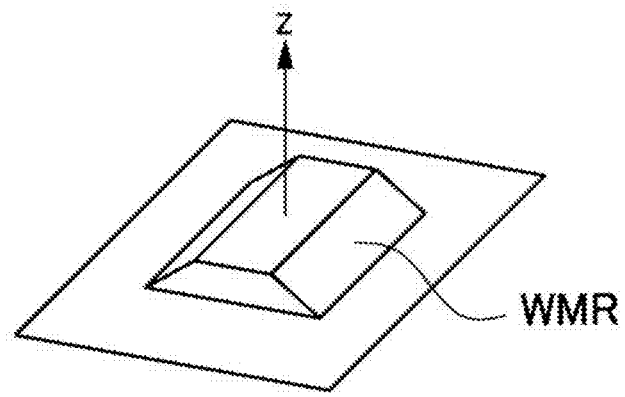
FIG. 50B
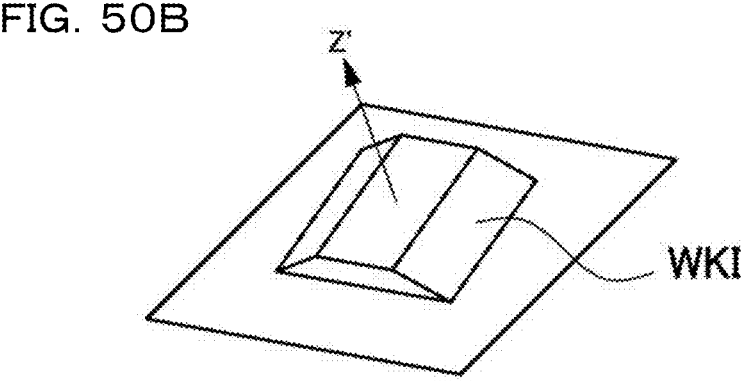
FIG. 50C
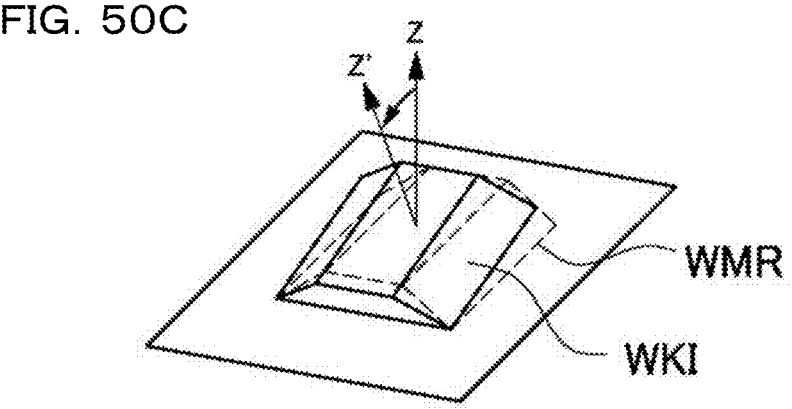

FIG. 51A
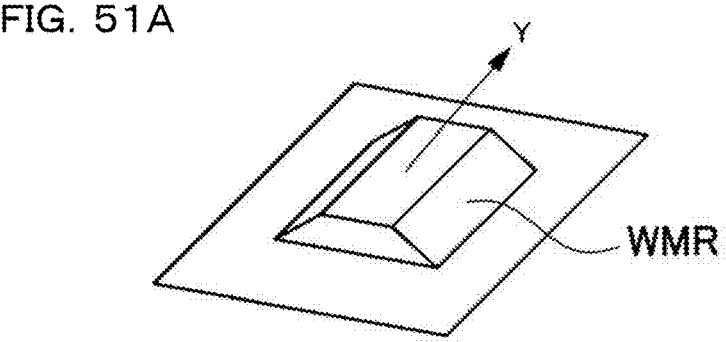
FIG. 51B
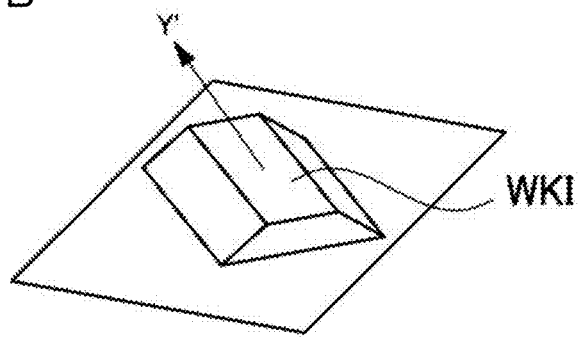
FIG. 51C
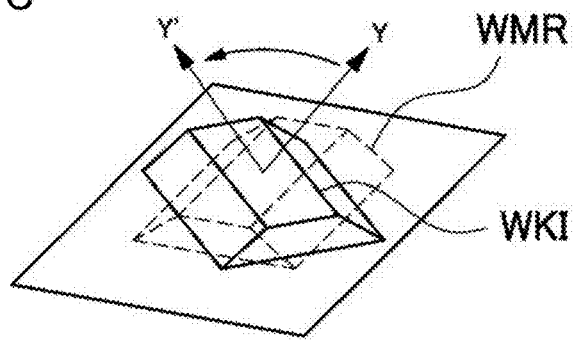
FIG. 52
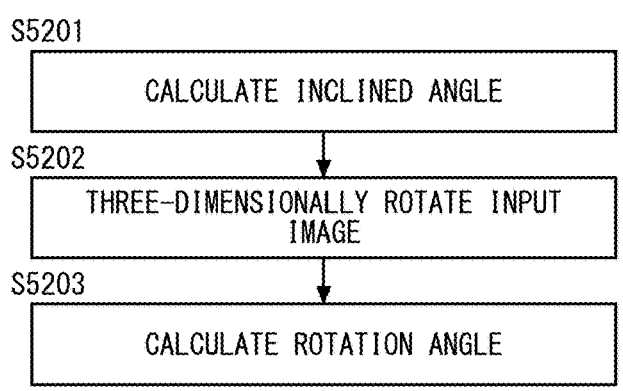

FIG. 53A
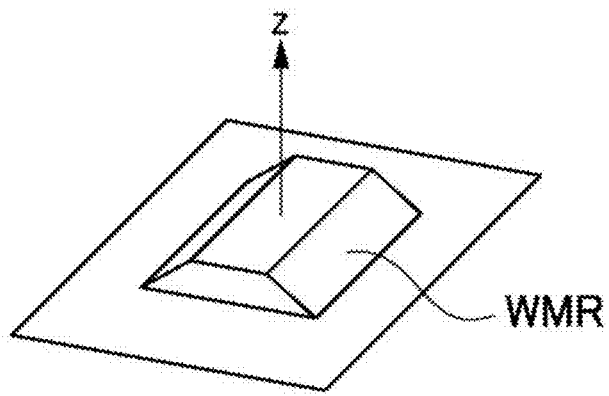
FIG. 53B
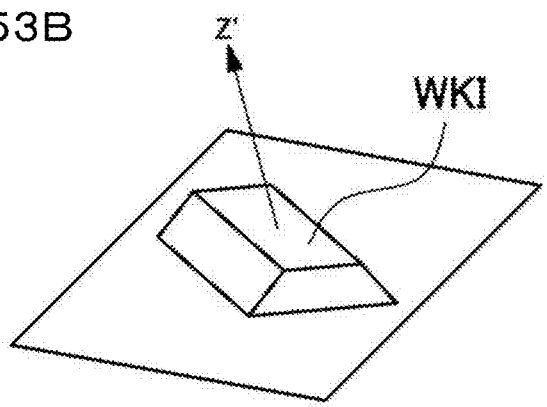
FIG. 53C
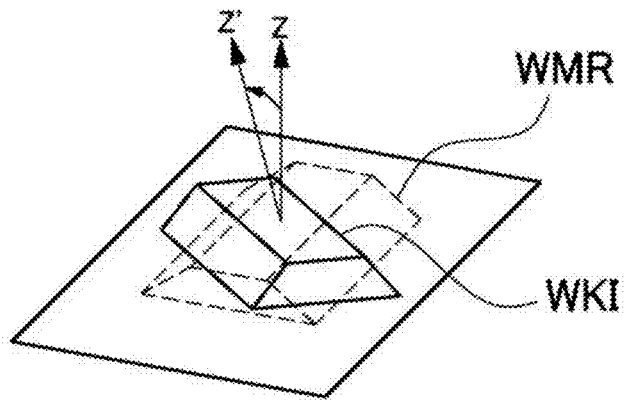

FIG. 54A
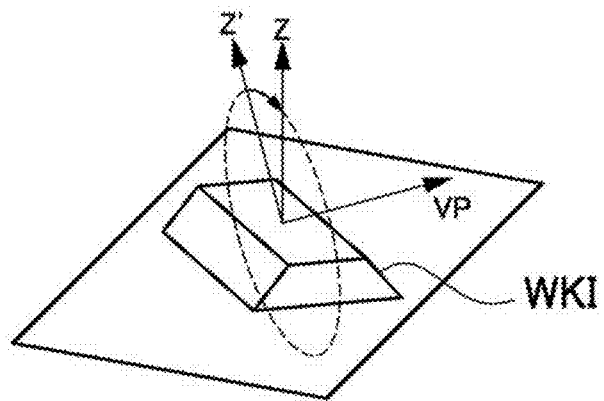
FIG. 54B
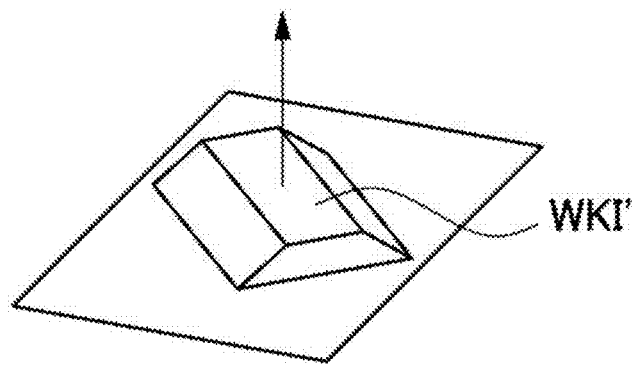

FIG. 55A
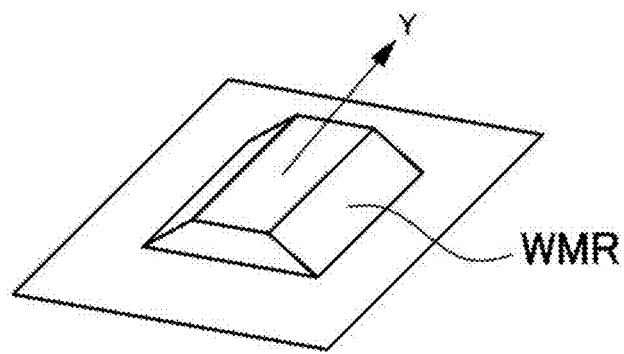
FIG. 55B
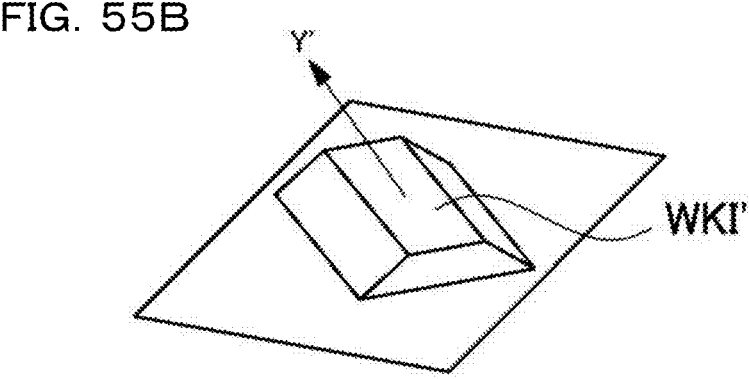
FIG. 55C
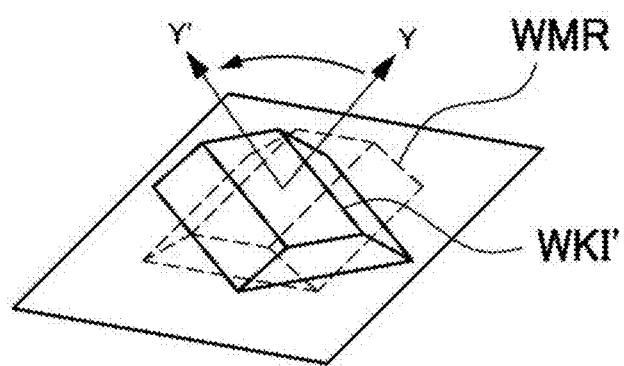

2. DESIGNATION OF ROTATION SYMMETRY

| A | B | C |
| --- | --- | --- |
| ROTATION SYMMETRY: NO ▼ | ROTATION SYMMETRY: NO ▼ | ROTATION SYMMETRY: NO ▼ |
| D | E | F |
| ROTATION SYMMETRY: NO ▼ | ROTATION SYMMETRY: NO ▼ | ROTATION SYMMETRY: NO ▼ |

2 IN CASE WHERE WORKPIECE MODEL TO BE REGISTERED HAS ROTATION SYMMETRY, DESIGNATE CORRESPONDING WORKPIECE MODEL.

REFER TO "ROTATION SYMMETRY SETTING METHOD" ON LOWER SIDE REGARDING DETAILS OF ROTATION SYMMETRY.

ROTATION SYMMETRY SETTING METHOD [?]

[CANCEL] [BACK] [NEXT] [REGISTRATION]

//(1)

ROBOT SETTING APPARATUS, ROBOT SETTING METHOD, ROBOT SETTING PROGRAM, COMPUTER READABLE RECORDING MEDIUM, AND APPARATUS STORING PROGRAM

CROSS-REFERENCE TO RELATED APPLICATIONS

The present application claims foreign priority based on Japanese Patent Application No. 2017-040975, filed Mar. 3, 2017, the contents of which is incorporated herein by reference.

BACKGROUND OF THE INVENTION

1. Field of the Invention

The present invention relates to a robot setting apparatus, a robot setting method, a robot setting program, a computer readable recording medium, and an apparatus storing the program, and particularly to a robot setting apparatus, a robot setting method, a robot setting program, a computer readable recording medium, and an apparatus storing the program, for controlling a robot in which a three-dimensional shape of each of a plurality of workpieces which are picking targets stacked in a work space is measured with a sensor unit, and a bin picking operation of sequentially gripping and taking out the workpieces with an end effector provided at the tip of an arm portion of the robot is performed.

2. Description of Related Art

A robot device has been developed which has a manipulator combined with a robot vision, can image a target workpiece with the robot vision such that height information is acquired, can grip (pick) the workpiece at an appropriate position, and can place the workpiece at a desired position. By using such a robot device, an operation called bin picking is performed in which a plurality of workpieces put in a returnable box are imaged with a camera or a sensor unit forming the robot vision such that attitudes thereof are recognized and thus an appropriate grip position is recognized, then the arm of the robot is moved to the grip position, and a workpiece is gripped by the end effector such as a hand portion provided at the tip of the arm, and is placed at a determined position outside the returnable box.

In the bin picking using such a robot vision, a positional relationship between a workpiece and the robot of when the workpiece is caught is registered as a grip position, a grip position of the robot for a workpiece detected with the robot vision is calculated, and the robot is moved to the calculated position such that the workpiece is picked.

Here, as a method of registering a grip position of a workpiece in an end effector, there is a method of registering a grip position by actually operating a robot, or a method of registering a grip position by moving an end effector model on a virtual space expressed by three-dimensional CAD data.

However, in the method of registering a grip position by actually operating a robot, there is a problem in that registration work is required to be performed by actually moving a robot, so that time is taken, and a large-scale verification environment is necessary or time is required for a cycle of trial and error.

On the other hand, in the method of registering a grip position by operating a robot model on a virtual space built by using three-dimensional CAD data, a grip position can be registered without an actual robot device. However, in this method, a three-dimensional attitude of an end effector model is required to be accurately aligned with a three-dimensional attitude of a workpiece model, and thus there is a defect that setting such as positioning of three-dimensional coordinates is difficult. This method requires three-dimensional CAD data of a workpiece and an end effector, and thus there is a problem in that setting cannot be performed in a state in which three-dimensional CAD data is not available.

Examples of the related art include Japanese Patents 3782679 and 4962123.

SUMMARY OF THE INVENTION

The present invention has been made in light of the circumstances, and an object thereof is to provide a robot setting apparatus, a robot setting method, a robot setting program, a computer readable recording medium, and an apparatus storing the program, capable of easily registering a grip position of a workpiece in an end effector when a robot device is set.

According to a first aspect of the present invention, there is provided a robot setting apparatus controlling an operation of a robot performing a bin picking operation of sequentially taking out a plurality of workpieces stacked in a work space with an end effector provided at a tip of an arm portion of the robot, the robot setting apparatus including a workpiece model registration unit that registers a workpiece model indicating a three-dimensional shape of a workpiece; a display unit that displays a workpiece model registered by the workpiece model registration unit; a positioning unit that locates a position and an attitude of the workpiece model on a virtual three-dimensional space displayed on the display unit; and a grip position specifying unit that displays at least three height images in which a workpiece model positioned by the positioning unit is viewed from respective axis directions of three axes orthogonal to each other on the virtual three-dimensional space on the display unit as fundamental direction images, and specifies a grip position at which a workpiece model indicated by at least one of the displayed fundamental direction images is gripped by an end effector for the fundamental direction image. With this configuration, each attitude of a workpiece model is displayed as three or more fundamental direction images having different viewpoints, and a user can perform a grip position setting work on any fundamental direction image for which a grip position is easily set and can thus easily perform work, troublesome in the related art, of setting a grip position at which a workpiece is gripped by an end effector for a three-dimensional workpiece.

According to the robot setting apparatus related to a second aspect, in addition to the configuration, the display unit may include a six-drawing display region in which a fundamental direction image of a workpiece model is displayed as six drawings of the workpiece model. With this configuration, each attitude of a workpiece model is displayed as six drawings, and a user can perform a grip position setting work on any fundamental direction image for which a grip position is easily set and can thus easily perform grip position setting work which is troublesome in the related art.

According to the robot setting apparatus related to a third aspect, in addition to any one of the configurations, the workpiece model may be three-dimensional CAD data. With this configuration, a workpiece model is expressed by three-dimensional CAD data having three-dimensional shape information, and thus a shape of a workpiece can be accurately reproduced without acquiring data by actually imaging the workpiece.

According to the robot setting apparatus related to a fourth aspect, in addition to any one of the configurations, the robot setting apparatus may further include a fundamental direction image selection unit that selects any of a plurality of fundamental direction images having a viewing way which is different from a viewing way of other fundamental direction images with respect to at least three fundamental direction images displayed on the display unit. With this configuration, for example, one of fundamental direction images including a top face and a bottom face of a cylindrical workpiece having the same appearance is deleted, and thus setting work can be further simplified by excluding display of an unnecessary fundamental direction image.

According to the robot setting apparatus related to a fifth aspect, in addition to any one of the configurations, the fundamental direction image selection unit may allow a user to manually select a fundamental direction image in a state in which at least three fundamental direction images are displayed on the display unit.

According to the robot setting apparatus related to a sixth aspect, in addition to any one of the configurations, in a case where there are fundamental direction images having the same viewing way, the fundamental direction image selection unit may delete any of the fundamental direction images. With this configuration, for example, in a case of a workpiece of which opposing faces have the same shape like a cuboid, only a fundamental direction image viewed from any one face may be used. Therefore, it is possible to obtain an advantage that a fundamental direction image including the same shape can be excluded, and thus a processing load in a three-dimensional search can be reduced.

According to the robot setting apparatus related to a seventh aspect, in addition to any one of the configurations, the robot setting apparatus may further include a search model registration unit that registers any one of the fundamental direction images as a search model for performing a three-dimensional search for specifying a position and an attitude of each workpiece on a plurality of workpiece groups loaded in bulk. With this configuration, a search model used to perform a three-dimensional search is registered in common to a fundamental direction image for designating a grip position of a workpiece model, and thus a user can achieve labor-saving for setting work. A grip position of a workpiece is also registered for each fundamental direction image used to search for a workpiece which can be gripped during an actual operation. Therefore, it is possible to prevent a fundamental direction image in which there is no grip position from being wastefully searched, and, conversely, it can be examined whether or not grip is possible at a grip position set in a searched fundamental direction image. Consequently, it is possible to perform a process with high efficiency.

According to the robot setting apparatus related to an eighth aspect, in addition to any one of the configurations, the search model registration unit may register any one of fundamental direction images selected by the fundamental direction image selection unit as a search model for performing a three-dimensional search. With this configuration, a fundamental direction image which is selected in advance by the fundamental direction image selection unit is further selected as a search model, and thus a search model selection candidate can be more carefully selected such that selection of a necessary search model can be more smoothly performed.

According to the robot setting apparatus related to a ninth aspect, in addition to any one of the configurations, the grip position specifying unit may specify a grip position at which a workpiece model is gripped by an end effector for a fundamental direction image registered as a search model by the search model registration unit. With this configuration, since a search model and a workpiece model for which a grip position is specified are used in common, a user can collectively perform setting for the workpiece model, and thus it is possible to obtain an advantage that the setting can be easily understood.

According to the robot setting apparatus related to a tenth aspect, in addition to any one of the configurations, the grip position specifying unit may display, as an initial value, a state in which an end effector model is disposed to be directed downward, and a workpiece model is disposed under the end effector model, in a state in which the end effector model virtually expressing a three-dimensional shape of an end effector and formed of three-dimensional CAD data is three-dimensionally displayed on a virtual three-dimensional space in the display unit. With this configuration, when a grip position is registered for a workpiece model, an end effector model gripping the workpiece model is disposed over the workpiece model. Therefore, the end effector model is moved downward in this state, and thus a user can easily intuitively recognize an operation of the end effector model gripping the workpiece model, and can thus smoothly perform position registration work.

According to the robot setting apparatus related to an eleventh aspect, in addition to any one of the configurations, the workpiece model may be actually measured data acquired by imaging a workpiece in a sensor unit which is disposed over the work space so as to measure a three-dimensional shape of the workpiece. With this configuration, a workpiece can be expressed without preparing three-dimensional CAD data of a workpiece model.

According to the robot setting apparatus related to a twelfth aspect, in addition to any one of the configurations, the robot setting apparatus may further include a search model registration unit that registers any one of the fundamental direction images as a search model for performing a three-dimensional search for specifying a position and an attitude of each workpiece on a plurality of workpiece groups loaded in bulk. With this configuration, a search model used to perform a three-dimensional search is registered in common to a fundamental direction image for designating a grip position of a workpiece model, and thus a user can achieve labor-saving for setting work. A grip position of a workpiece is also registered for each fundamental direction image used to search for a workpiece which can be gripped during an actual operation. Therefore, it is possible to prevent a fundamental direction image in which there is no grip position from being wastefully searched, and, conversely, it can be examined whether or not grip is possible at a grip position set in a searched fundamental direction image. Consequently, it is possible to perform a process with high efficiency.

According to the robot setting apparatus related to a thirteenth aspect, in addition to any one of the configurations, the grip position specifying unit may specify a grip position at which a workpiece model is gripped by an end effector for a fundamental direction image registered as a search model by the search model registration unit. With this configuration, since a search model and a workpiece model for which a grip position is specified are used in common, a user can collectively perform setting for the workpiece model, and thus it is possible to obtain an advantage that the setting can be easily understood.

According to a fourteenth aspect, there is provided a robot setting method of controlling an operation of a robot performing a bin picking operation of sequentially taking out a plurality of workpieces stacked in a work space with an end effector provided at a tip of an arm portion of the robot, the robot setting method including a step of inputting a workpiece model indicating a three-dimensional shape of a workpiece; a step of displaying the input workpiece model on a display unit, and locating a position and an attitude of the workpiece model on a virtual three-dimensional space displayed on the display unit; and a step of displaying at least three height images in which a workpiece model positioned by the positioning unit is viewed from respective axis directions of three axes orthogonal to each other on the virtual three-dimensional space on the display unit as fundamental direction images, and specifying a grip position at which a workpiece model indicated by at least one of the displayed fundamental direction images is gripped by an end effector for the fundamental direction image. Consequently, each attitude of a workpiece model is displayed as three or more fundamental direction images having different viewpoints, and a user can perform a grip position setting work on any fundamental direction image for which a grip position is easily set and can thus easily perform work, troublesome in the related art, of setting a grip position at which a workpiece is gripped by an end effector for a three-dimensional workpiece.

According to a fifteenth aspect, there is provided a robot setting program for controlling an operation of a robot performing a bin picking operation of sequentially taking out a plurality of workpieces stacked in a work space with an end effector provided at a tip of an arm portion of the robot, the robot setting program causing a computer to execute a function of inputting a workpiece model indicating a three-dimensional shape of a workpiece; a function of displaying the input workpiece model on a display unit, and locating a position and an attitude of the workpiece model on a virtual three-dimensional space displayed on the display unit; and a function of displaying at least three height images in which a workpiece model positioned by the positioning unit is viewed from respective axis directions of three axes orthogonal to each other on the virtual three-dimensional space on the display unit as fundamental direction images, and specifying a grip position at which a workpiece model indicated by at least one of the displayed fundamental direction images is gripped by an end effector for the fundamental direction image. Consequently, each attitude of a workpiece model is displayed as three or more fundamental direction images having different viewpoints, and a user can perform a grip position setting work on any fundamental direction image for which a grip position is easily set and can thus easily perform work, troublesome in the related art, of setting a grip position at which a workpiece is gripped by an end effector for a three-dimensional workpiece.

According to a sixteenth aspect, there is provided a computer readable recording medium recording the program or an apparatus storing the program. The recording medium includes a magnetic disk, an optical disc, a magnetoptical disc, and a semiconductor memory, such as a CD-ROM, a CD-R, a CD-RW or a flexible disk, a magnetic tape, an MO, a DVD-ROM, a DVD-RAM, a DVD-R, DVD+R, a DVD-RW, a DVD+RW, a Blu-ray, and an HD DVD (AOD), and other media which can store programs. The program may be stored in the recording medium so as to be distributed, and may also be downloaded via a network line such as the Internet so as to be distributed. The apparatus storing the program includes a general purpose or dedicated apparatus in which the program is installed to be executable in the form of software or firmware. Each process or function included in the program may be executed by computer executable program software, and a process in each unit may be realized by hardware such as a predetermined gate array (an FPGA or an ASIC), or in a form in which program software is mixed with a partial hardware module realizing a partial element of hardware.

BRIEF DESCRIPTION OF THE DRAWINGS

FIG. 50A is an image diagram illustrating an attitude of a workpiece during registration;

FIG. 50B is an image diagram illustrating an attitude of an input image;

FIG. 50C is an image diagram illustrating an inclined angle;

FIG. 51A is an image diagram illustrating an attitude of a workpiece during registration;

FIG. 51B is an image diagram illustrating an attitude of an input image;

FIG. 51C is an image diagram illustrating a rotation angle;

FIG. 52 is a flowchart illustrating procedures of obtaining an inclined angle and a rotation angle on the basis of a three-dimensional attitude;

FIG. 53A is an image diagram illustrating an attitude of a workpiece when a search model is registered;

FIG. 53B is an image diagram illustrating an attitude of an input image;

FIG. 53C is an image diagram illustrating a state in which an inclined angle is obtained;

FIG. 54A is an image diagram illustrating a state in which a rotational axis is displayed in the search model in FIG. 53C;

FIG. 54B is an image diagram illustrating a state in which a Z' axis in FIG. 54A is three-dimensionally rotated to match a Z axis;

FIG. 55A is an image diagram illustrating an attitude of a workpiece during registration;

FIG. 55B is an image diagram illustrating a state in which an inclination in FIG. 54B is removed;

FIG. 55C is an image diagram illustrating a state in which a rotation angle when viewed from a Z vertical direction in FIG. 55B is obtained as a rotation angle;

FIG. 73E is a height image in which the workpiece in FIG. 72 is viewed from a positive direction side of a Y axis;

FIG. 83C is an image diagram illustrating a state in which a grip attitude is registered in a fundamental direction image in FIG. 73C;

FIG. 83D is an image diagram illustrating a state in which a grip attitude is registered in a fundamental direction image in FIG. 73D;

FIG. 83E is an image diagram illustrating a state in which a grip attitude is registered in a fundamental direction image in FIG. 73E;

FIG. 83F is an image diagram illustrating a state in which a grip attitude is registered in a fundamental direction image in FIG. 73F;

FIG. 84 is an image diagram illustrating a workpiece selection screen;

FIG. 85 is an image diagram illustrating a grip solution candidate display screen in which a grip attitude is selected;

FIG. 86 is an image diagram illustrating a grip solution candidate display screen in which a grip attitude is selected;

FIG. 87 is a flowchart illustrating procedures in which a three-dimensional search and grip propriety determination are performed during an actual operation according to Embodiment 8;

FIG. 88 is a block diagram illustrating a robot system according to Embodiment 9;

FIG. 89 is an image diagram illustrating a function selection screen;

FIG. 90 is an image diagram illustrating a search model registration method selection screen;

FIG. 91 is an image diagram illustrating an actually measured data imaging screen;

Figure 92:
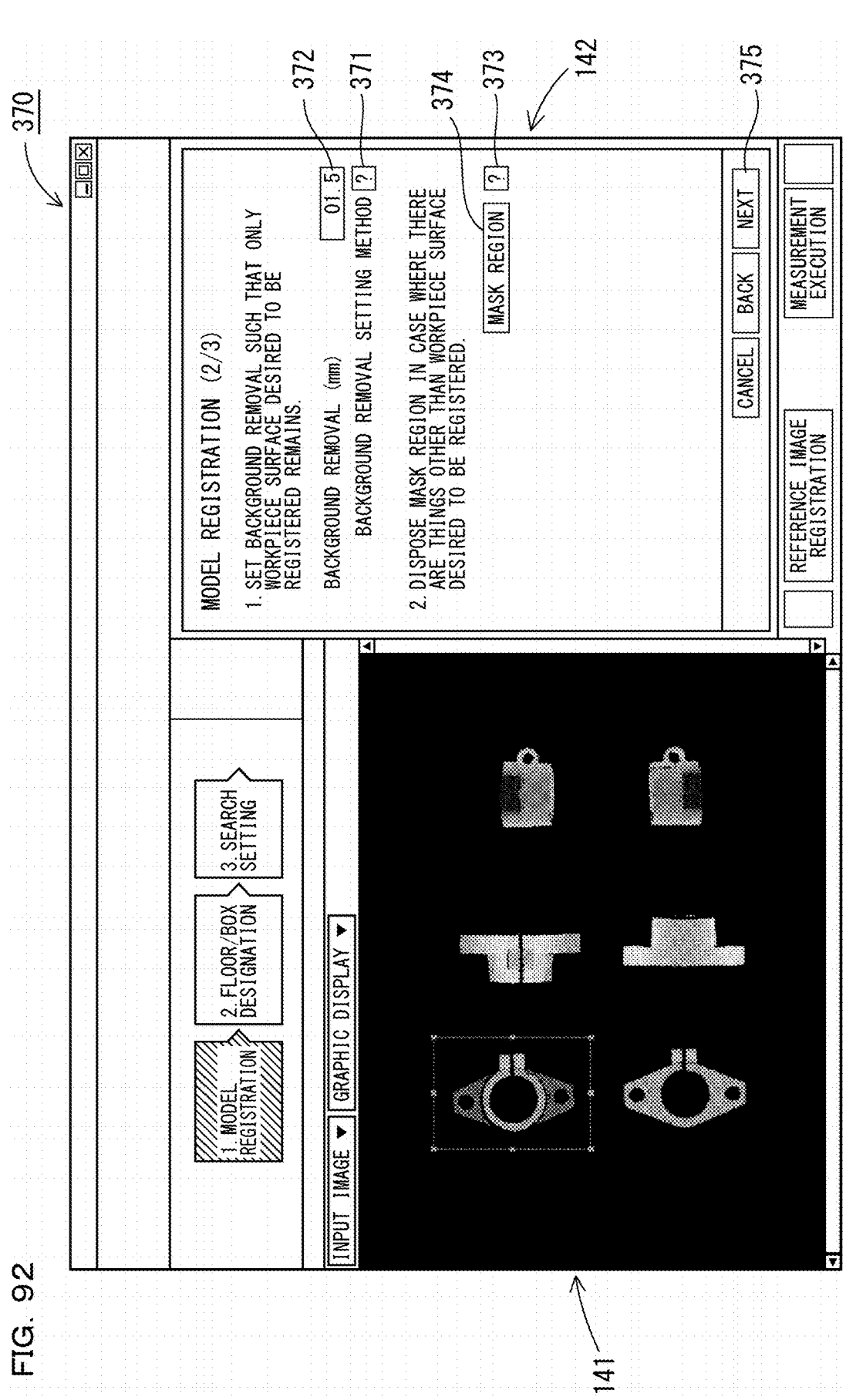
Figure 93:
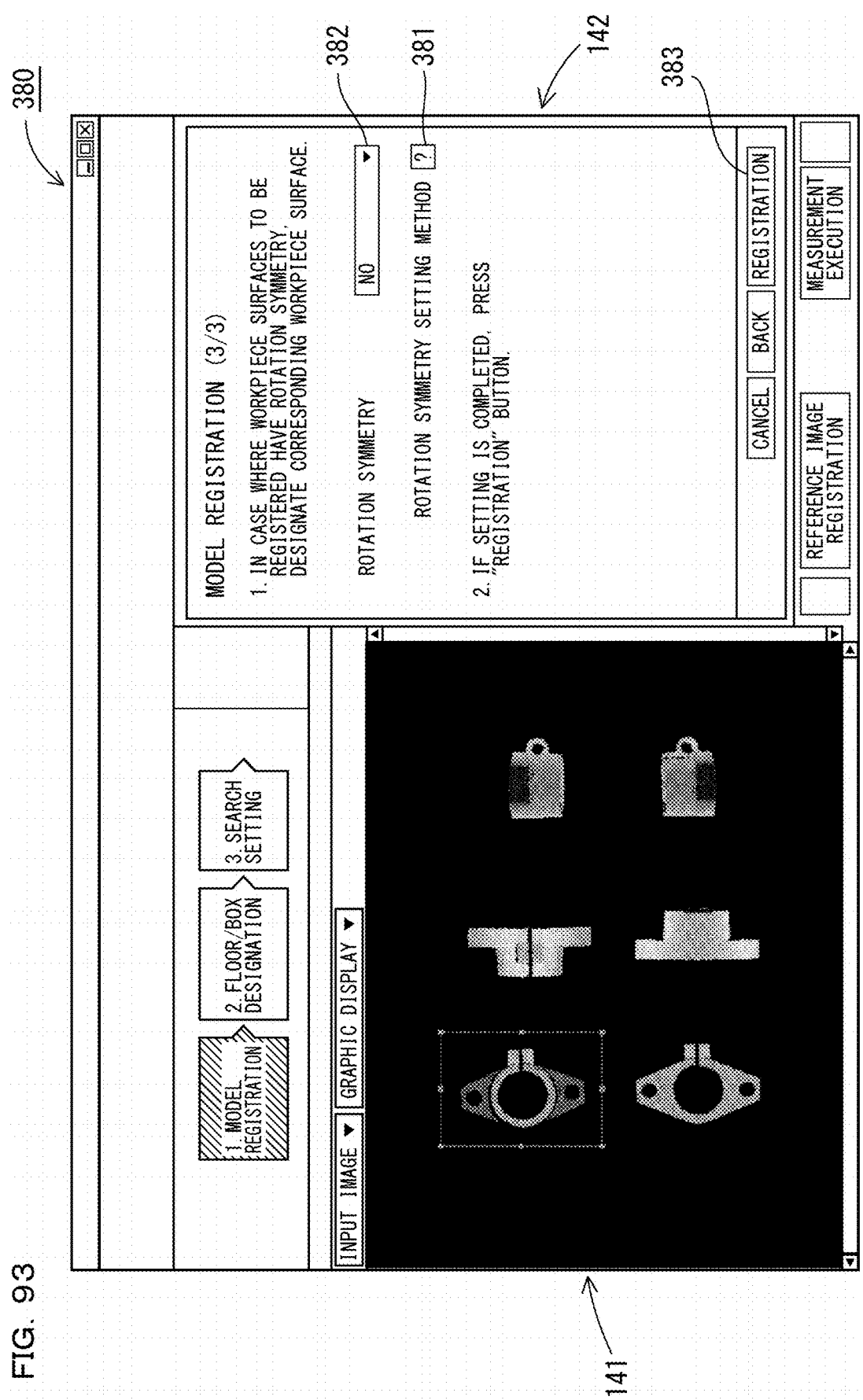
Figure 94:
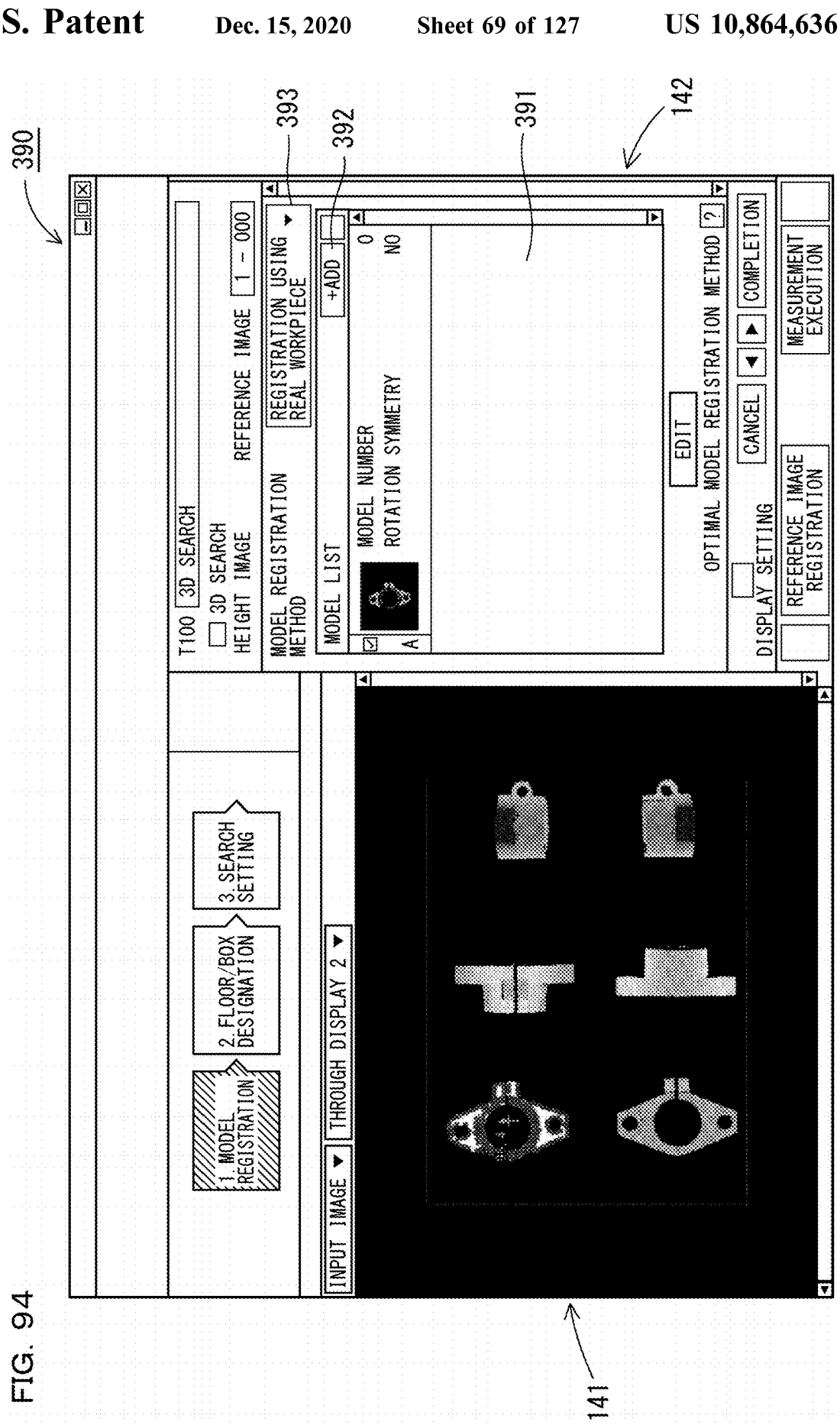
Figure 95:
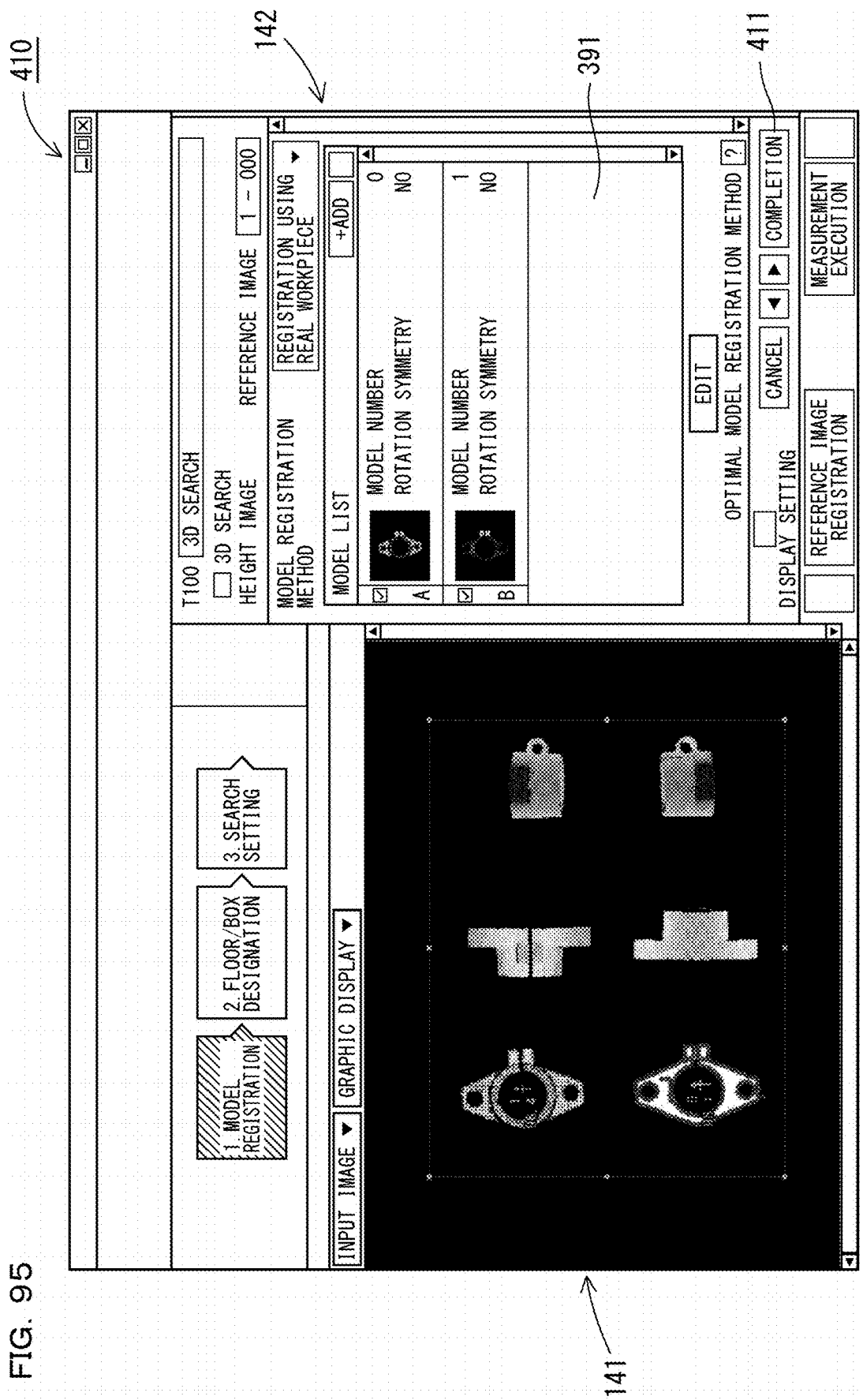
Figure 96:
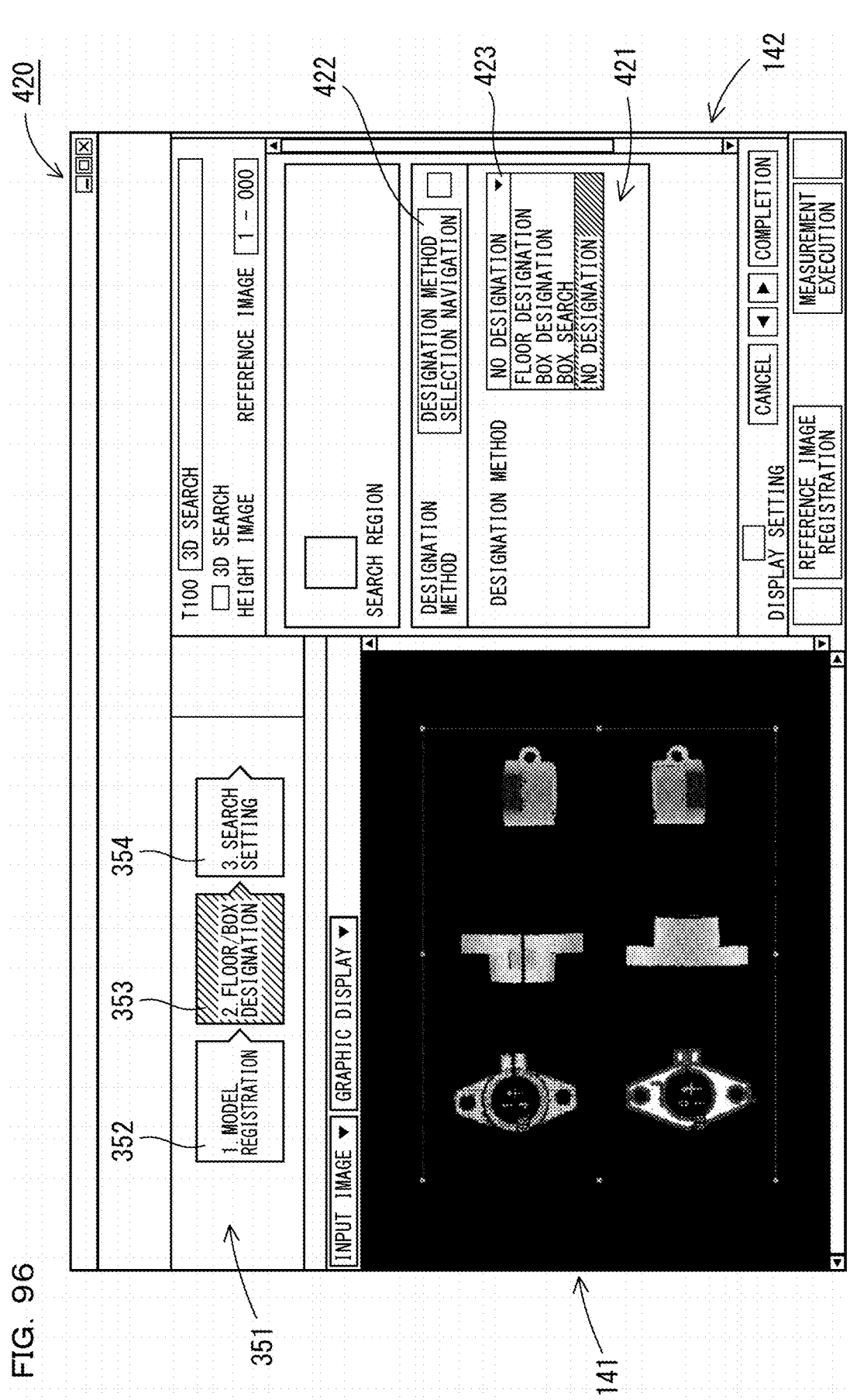
Figure 97:
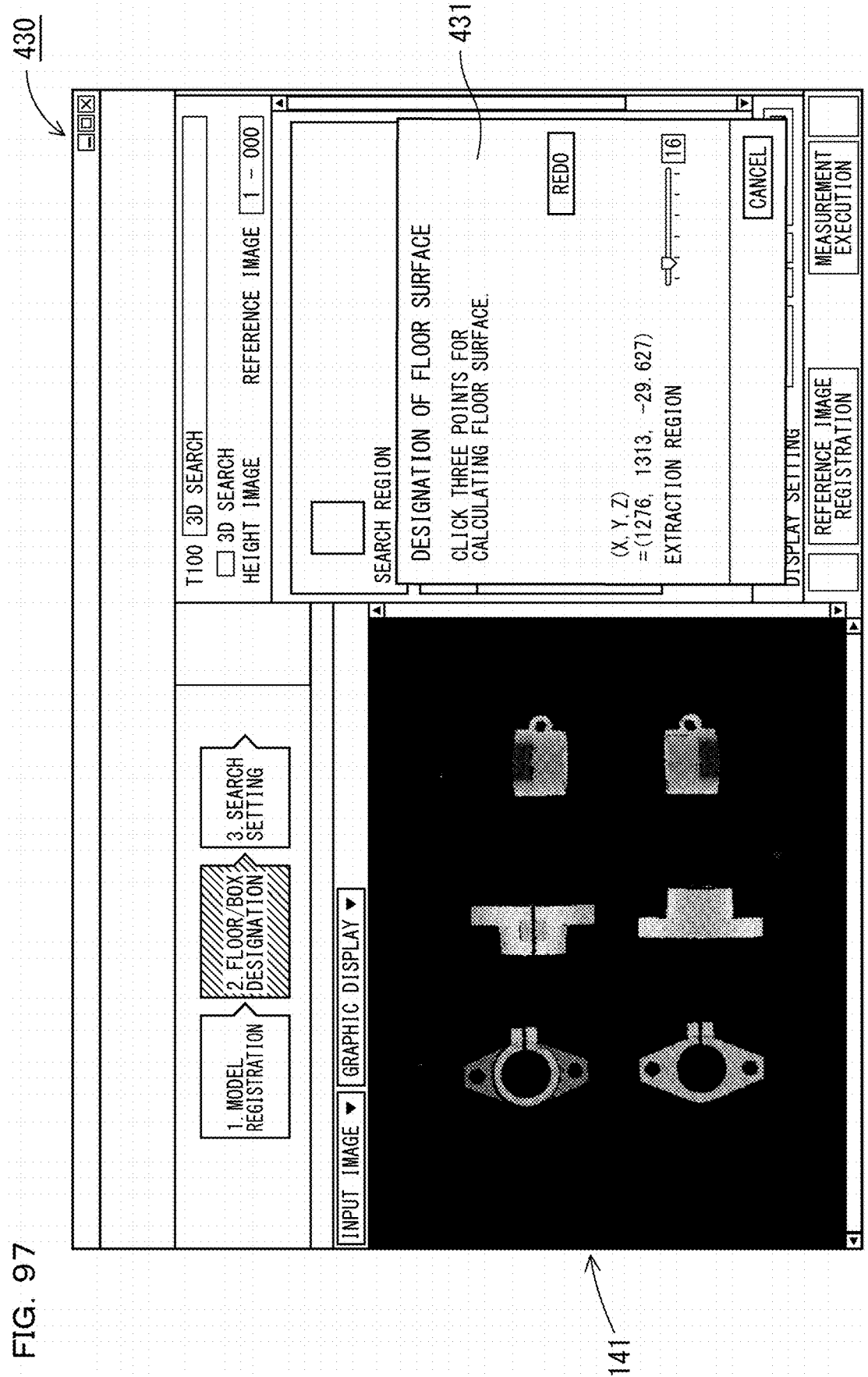
Figure 98:
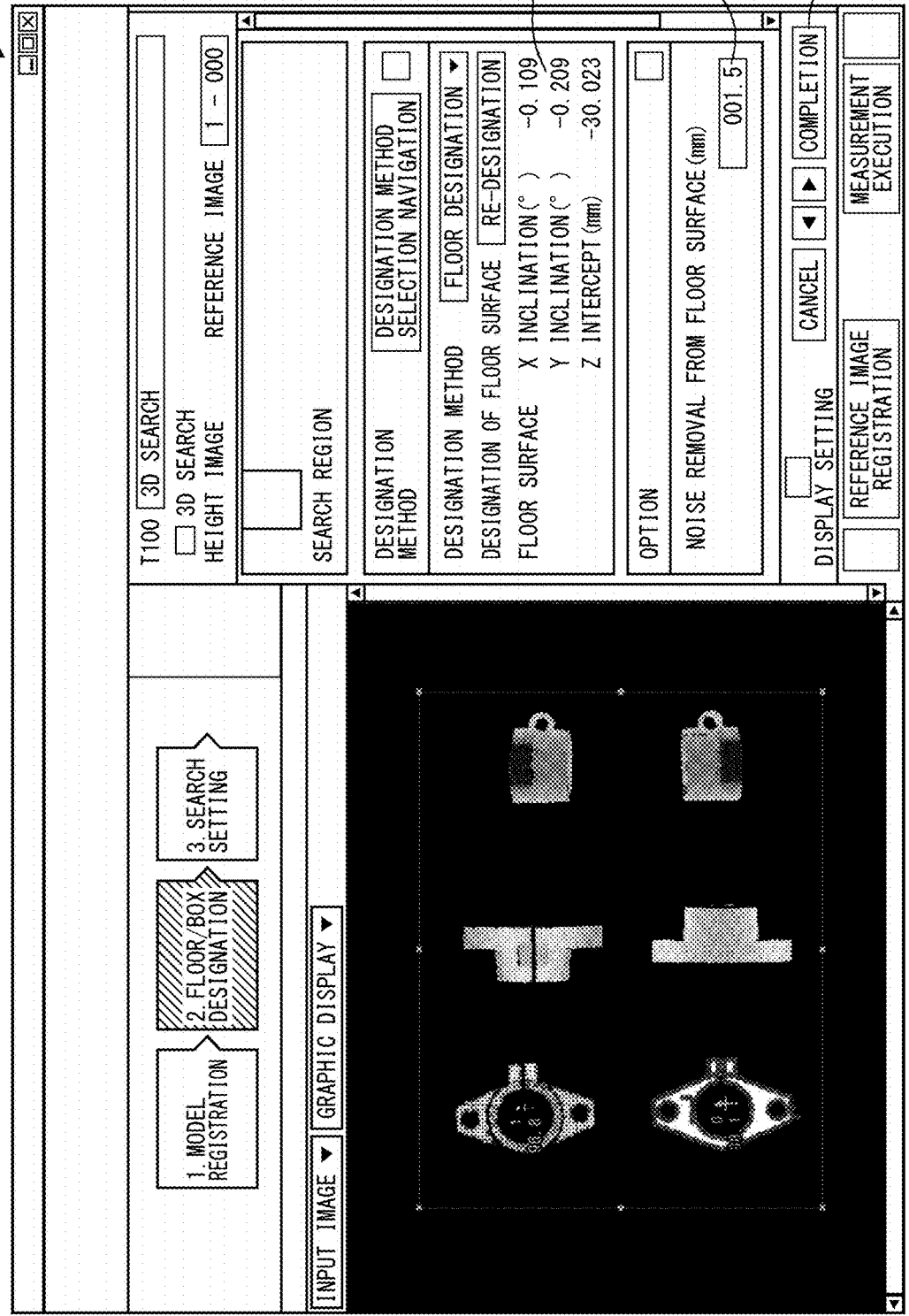
Figure 99:
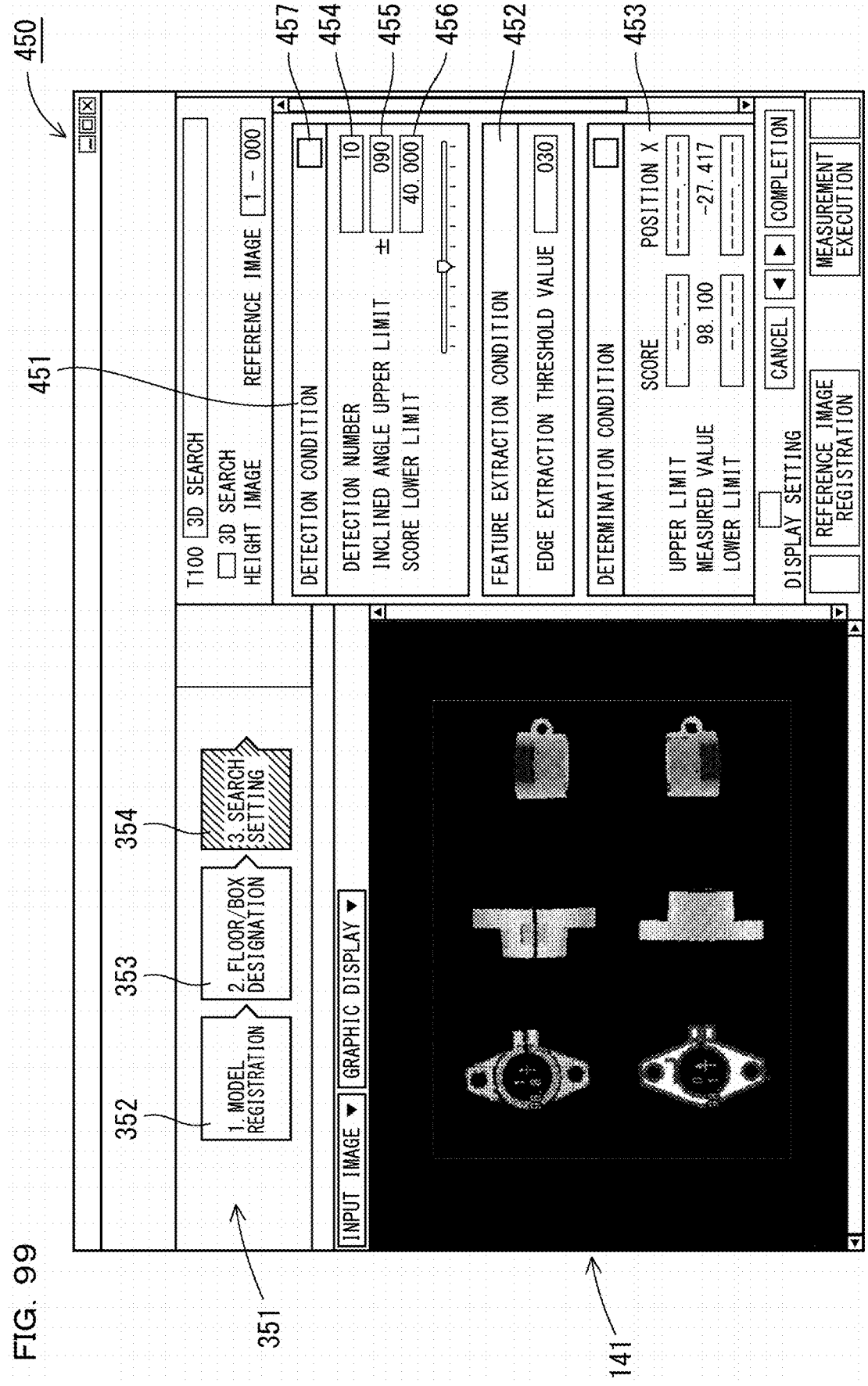
Figure 100:
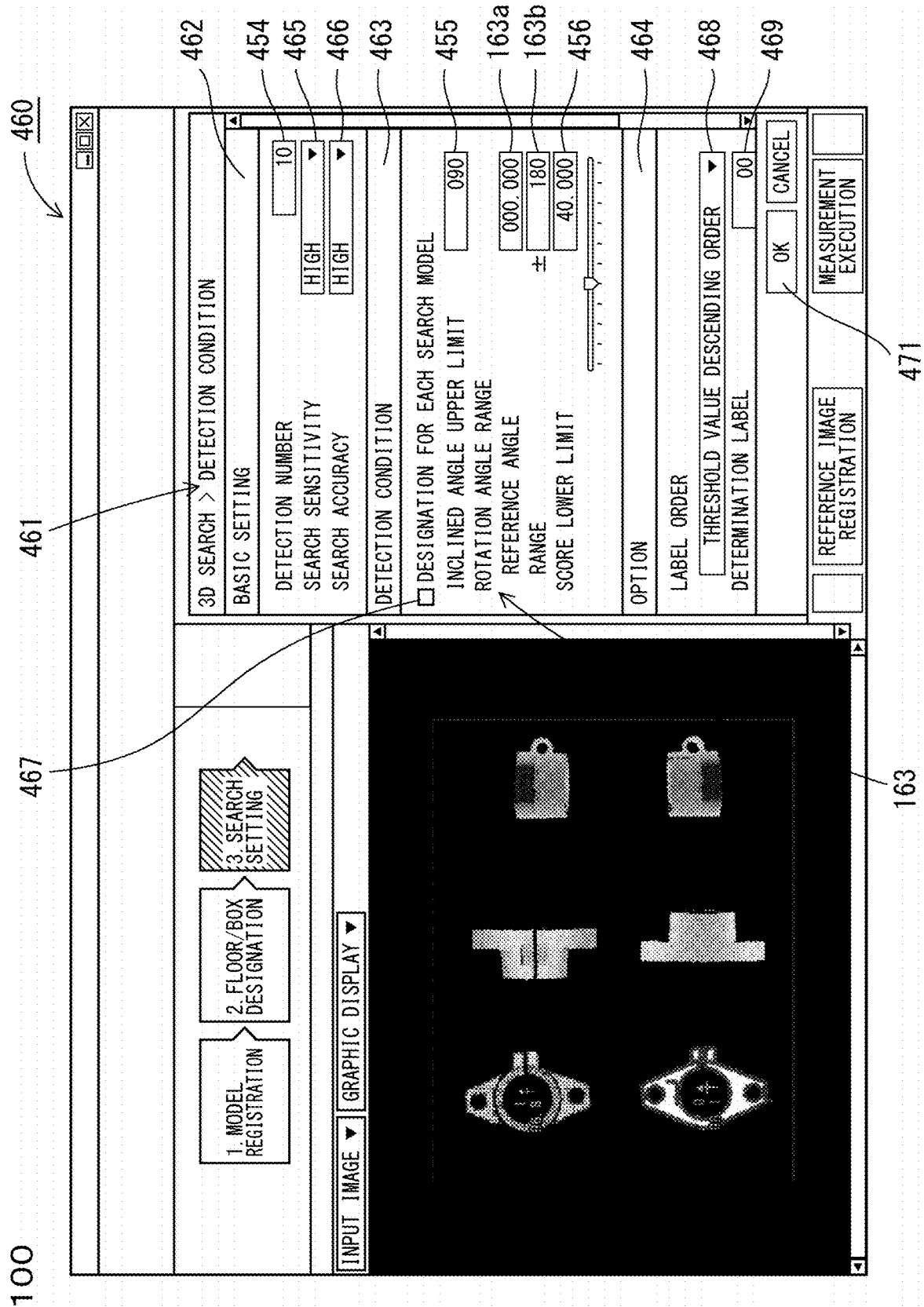
Figure 101:
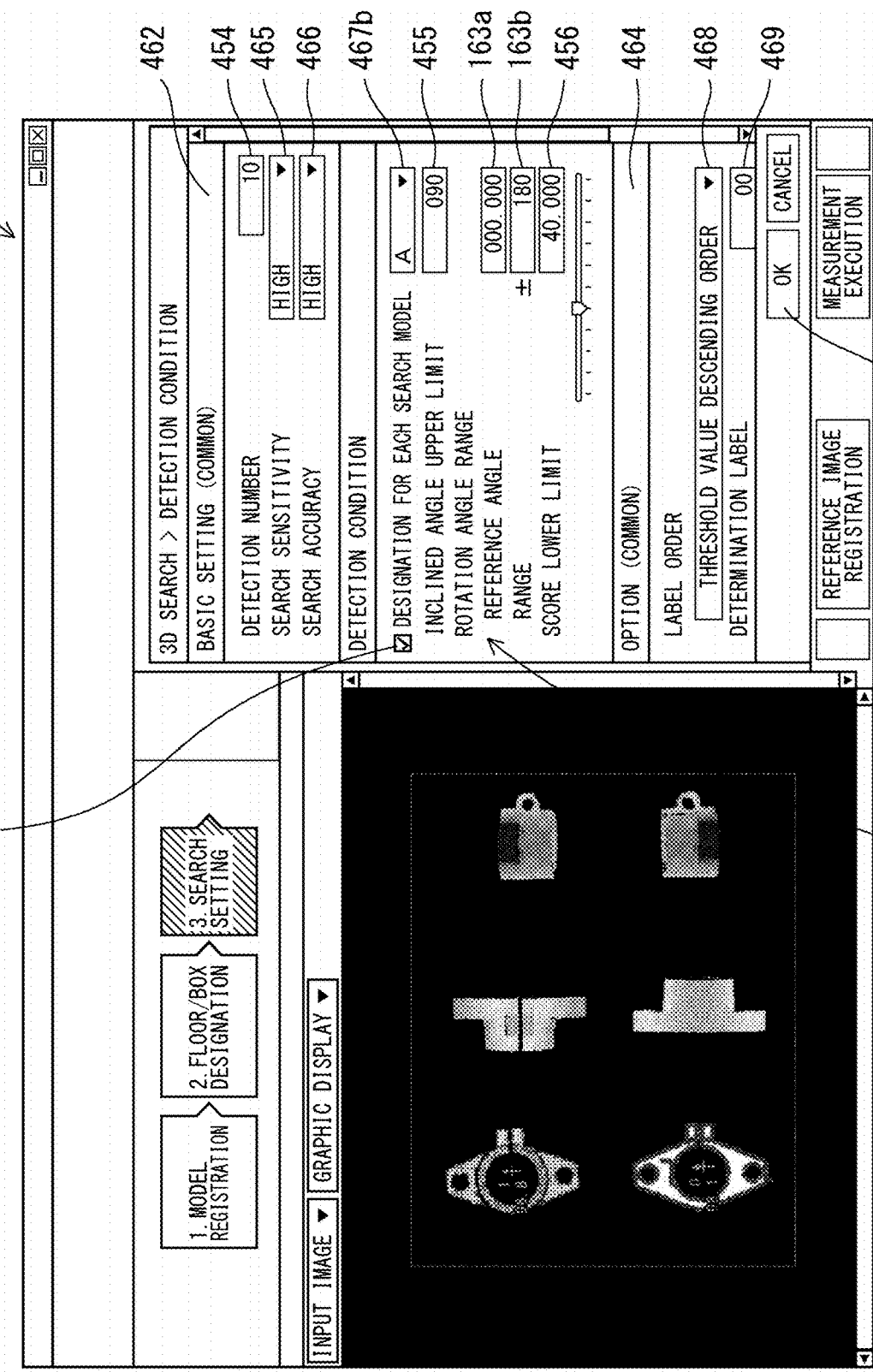
Figure 102:
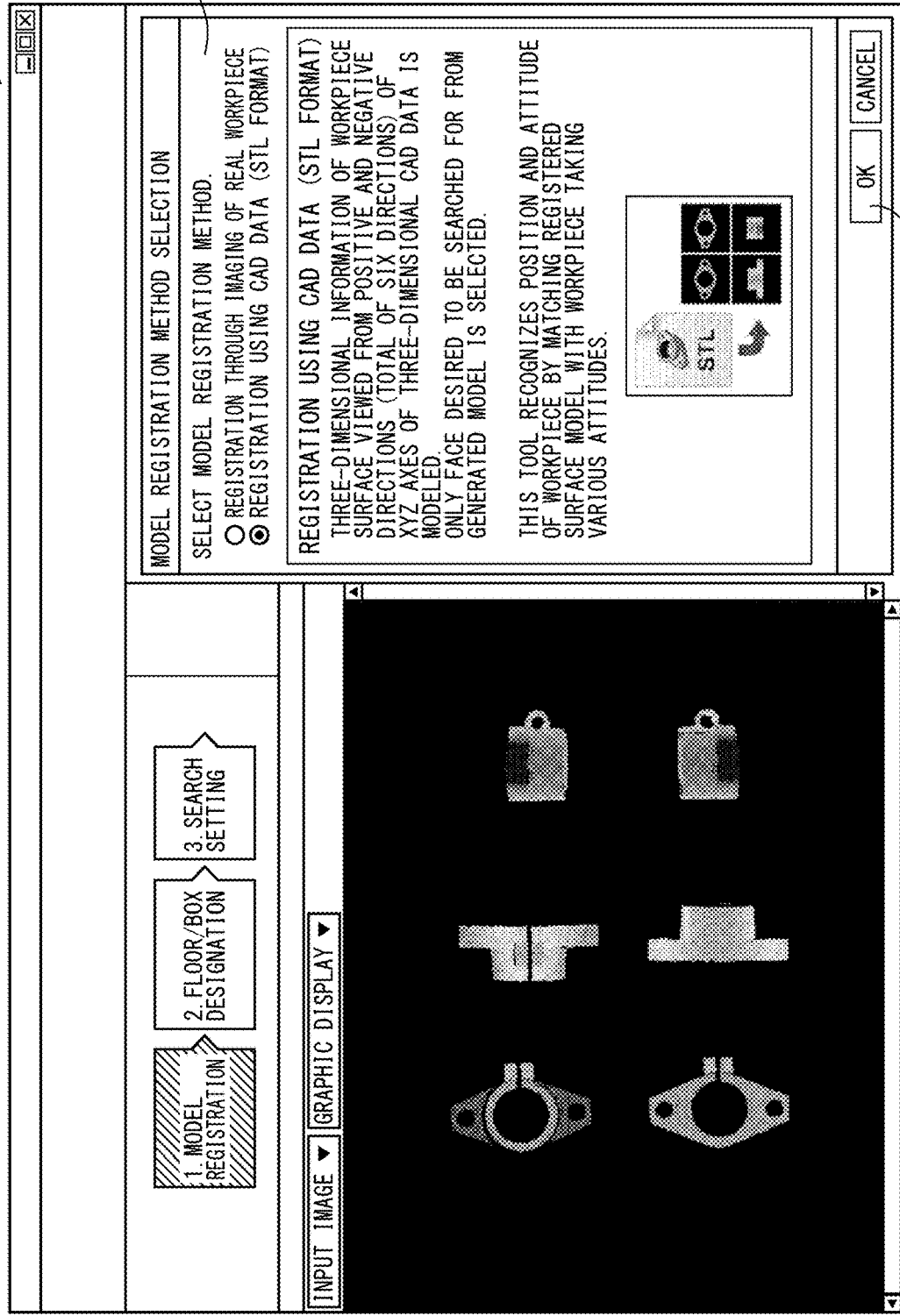
Figure 103:
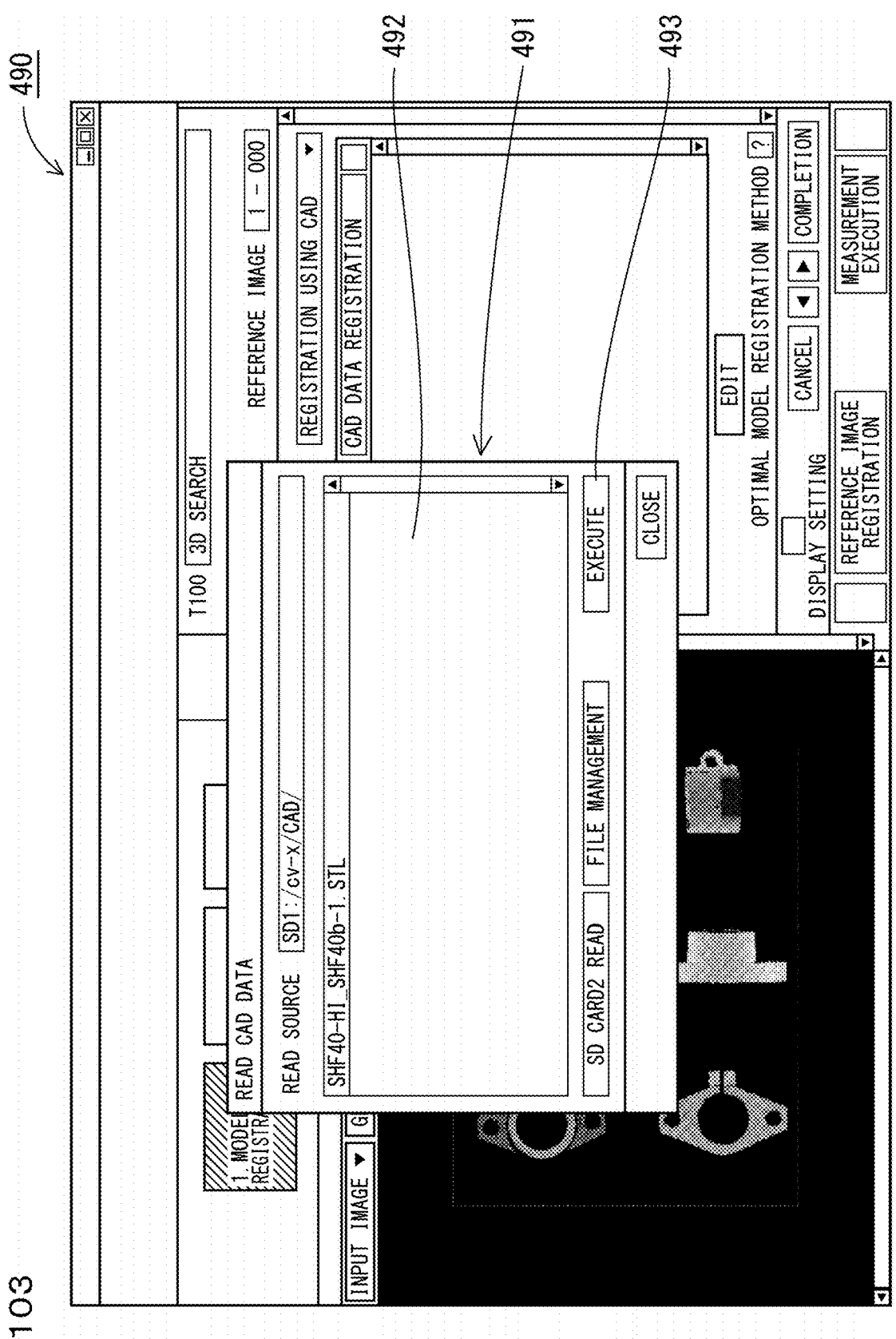
Figure 104:
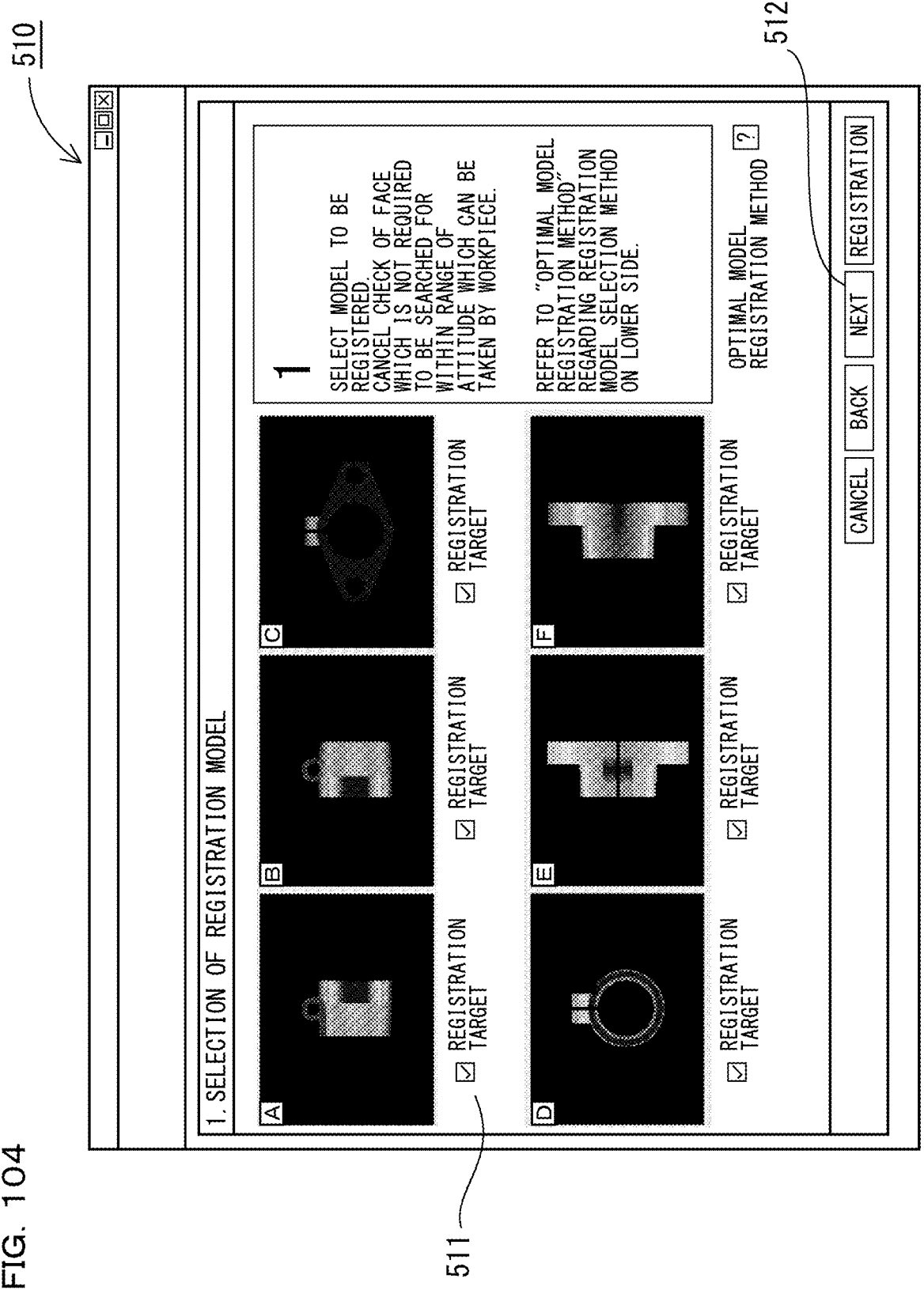
Figure 106:
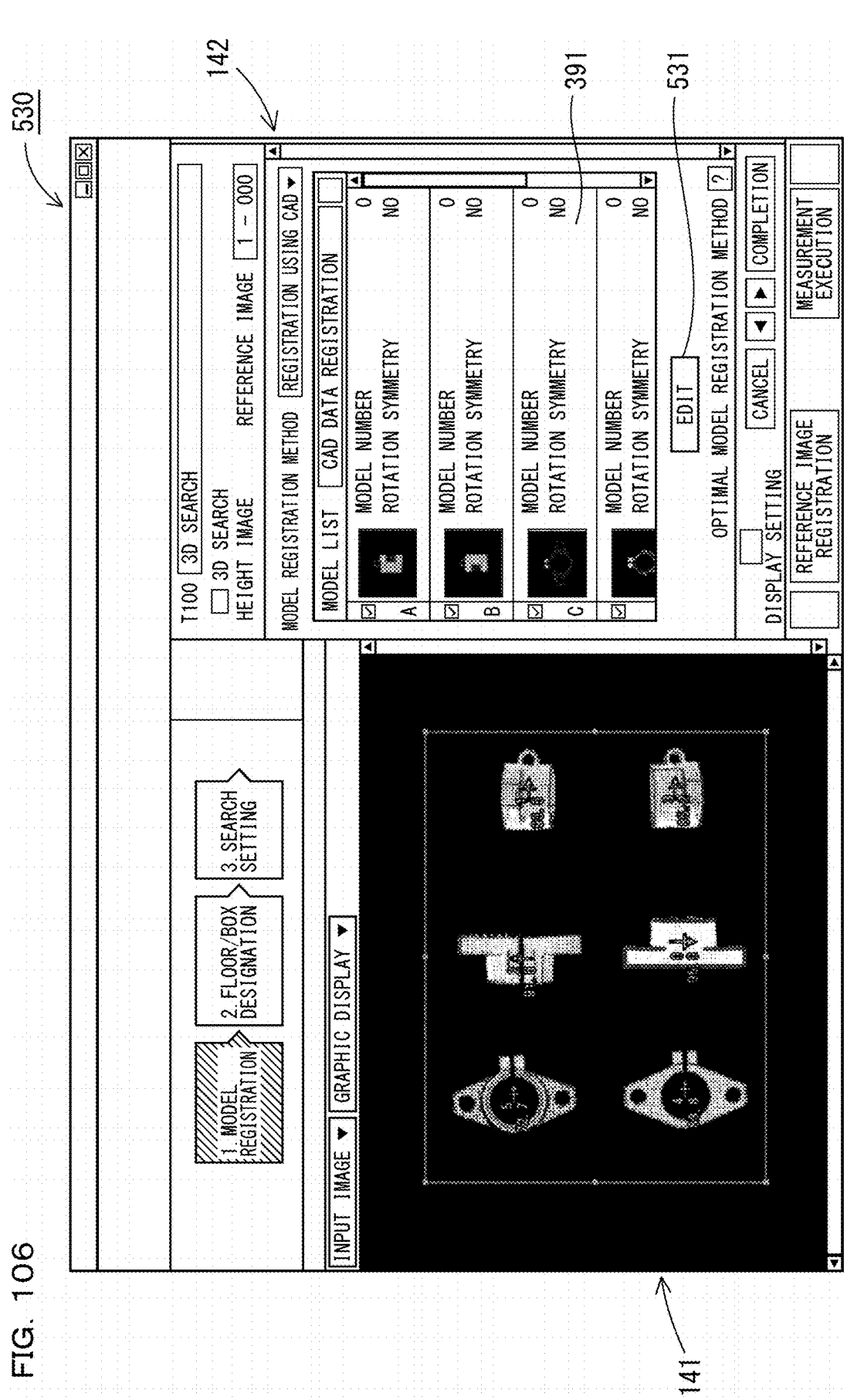
Figure 107:
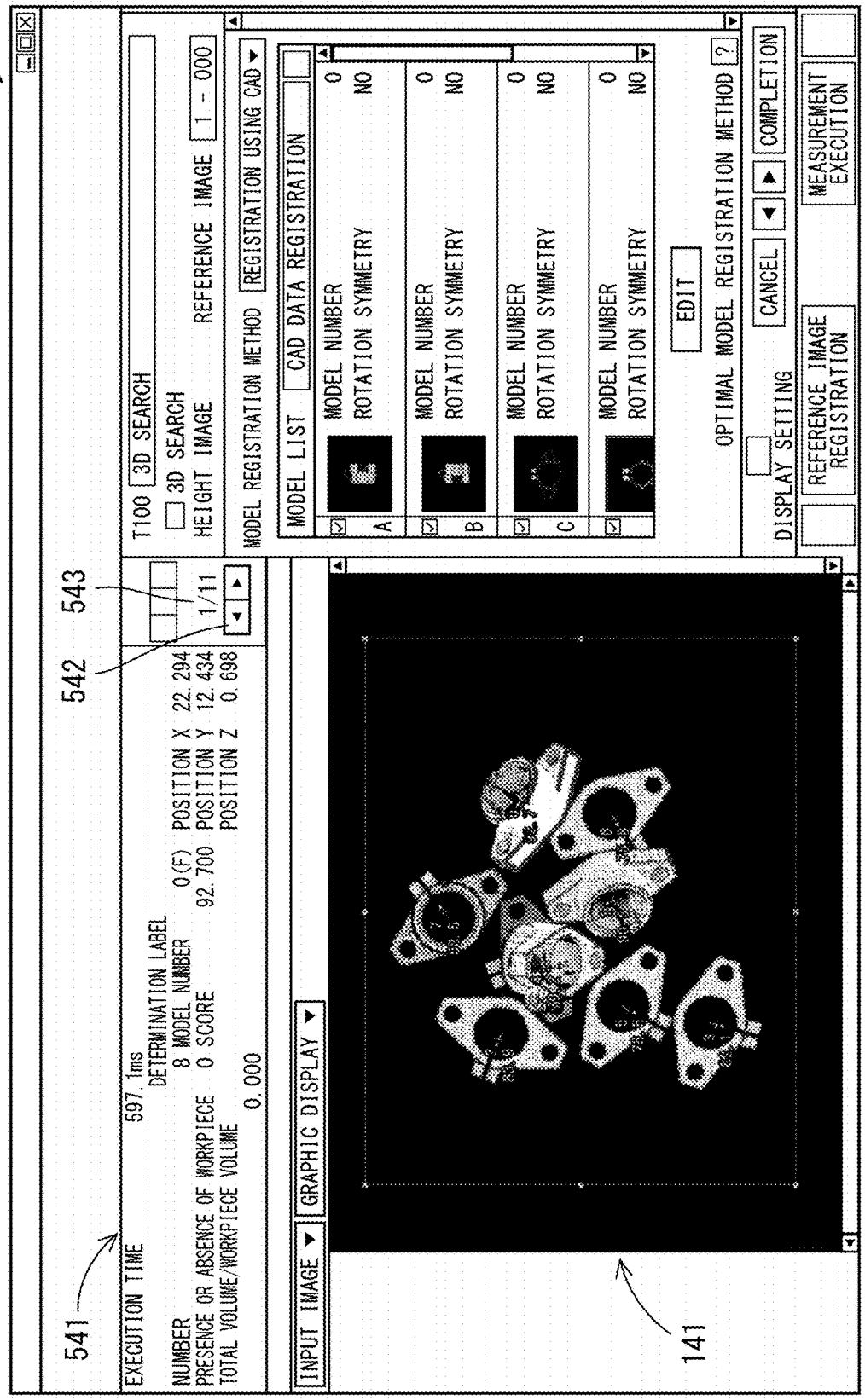
Figure 108:
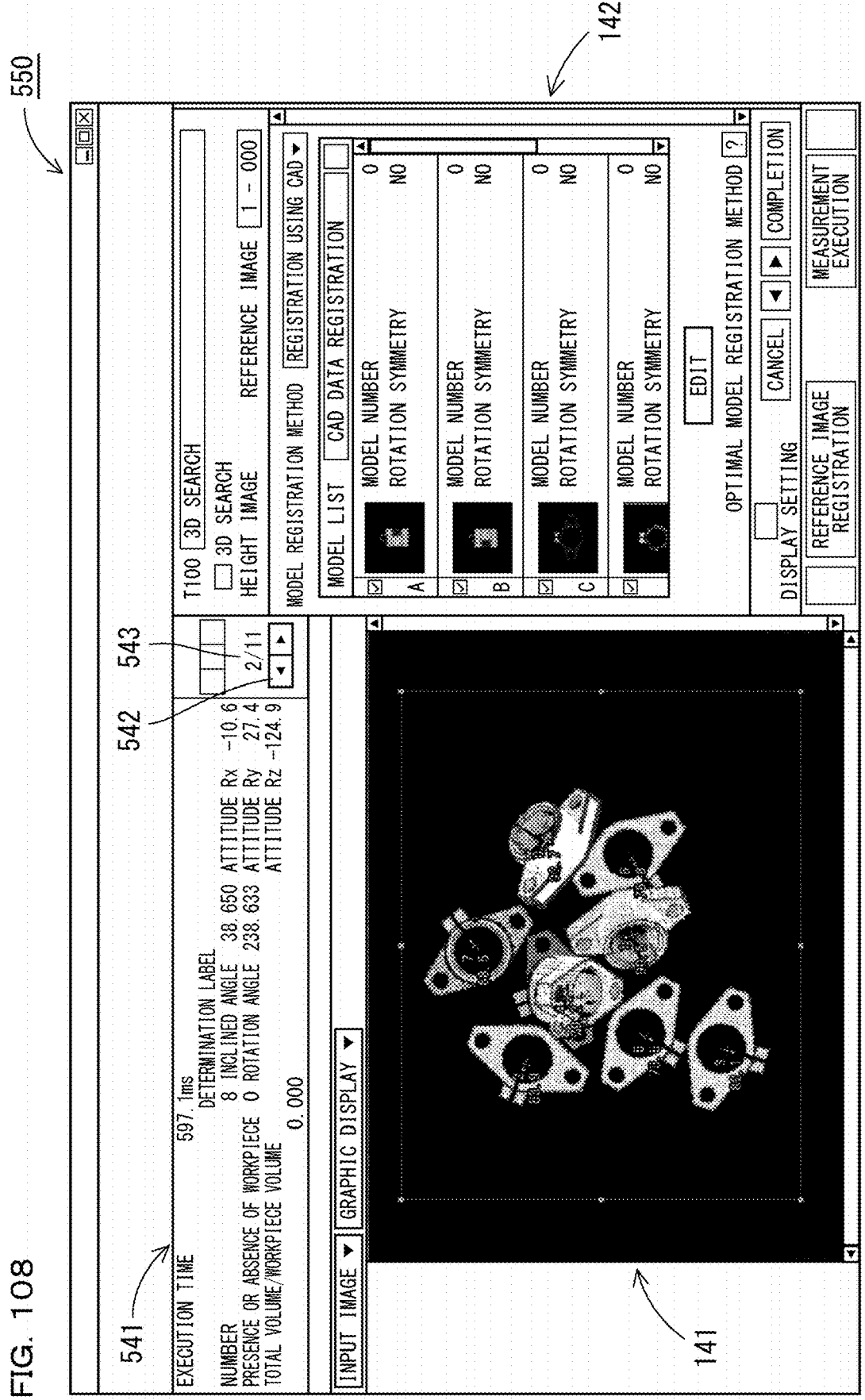
Figure 109:
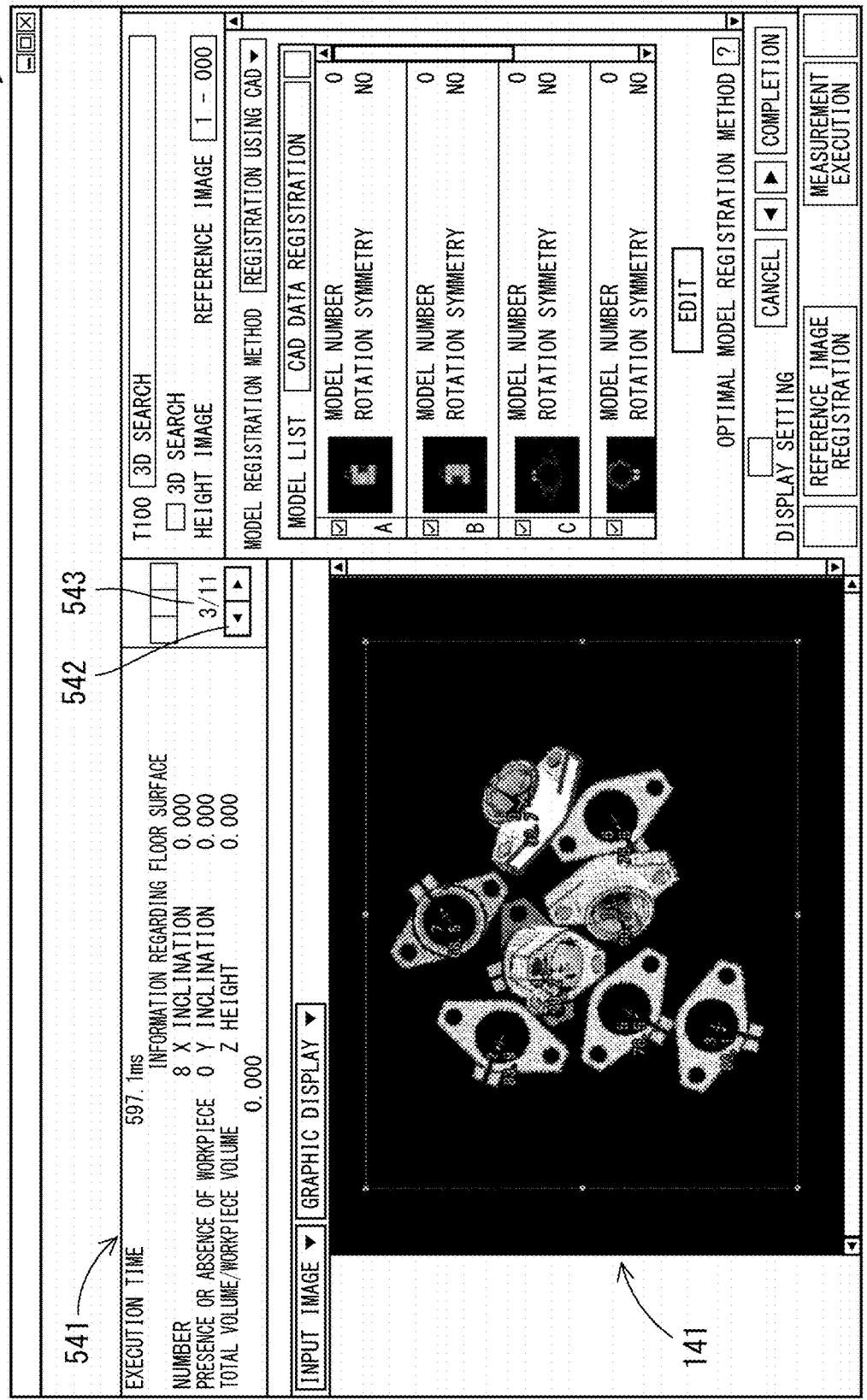
Figure 110:
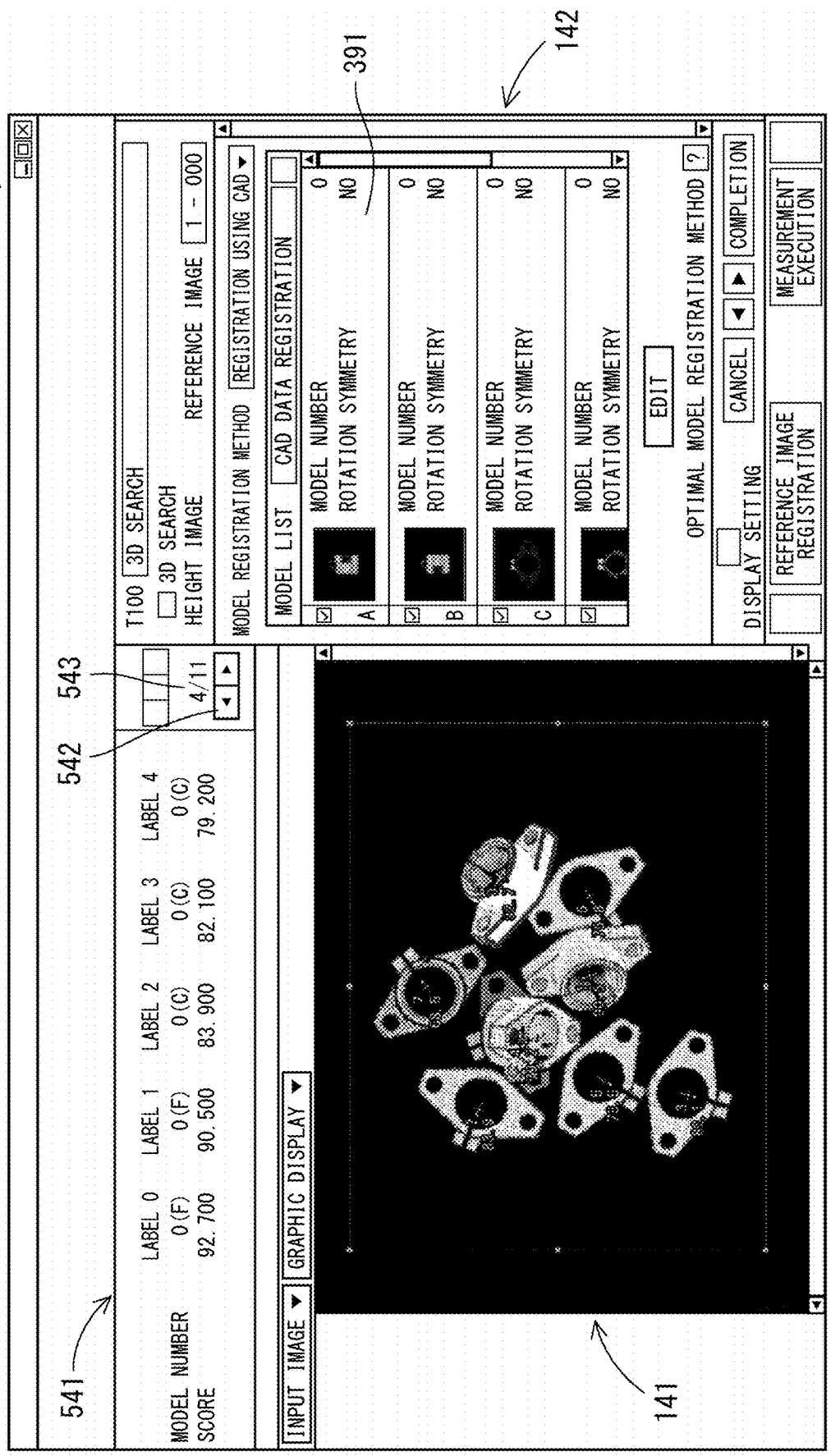
Figure 111:
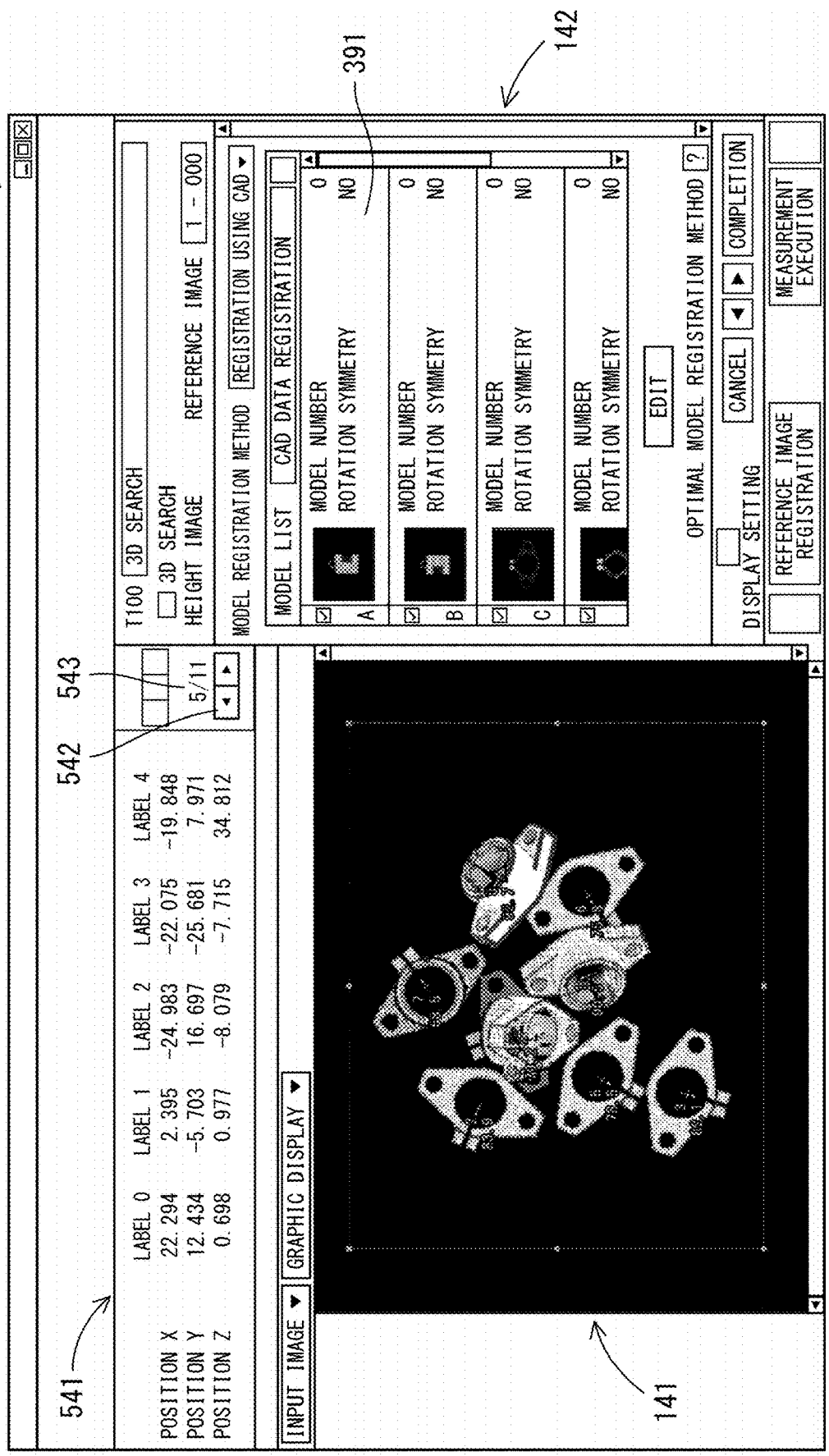
Figure 112:
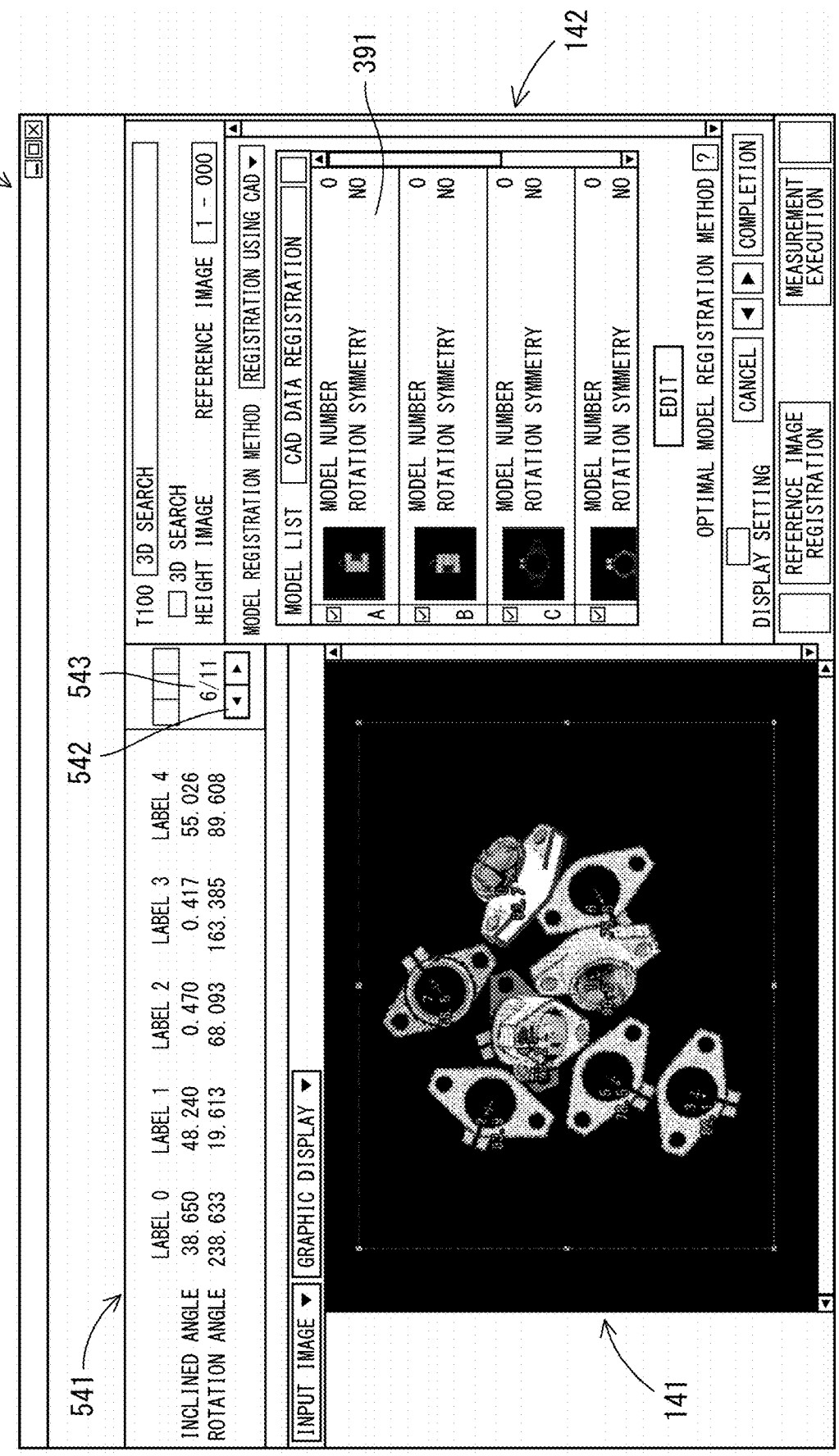
Figure 113:
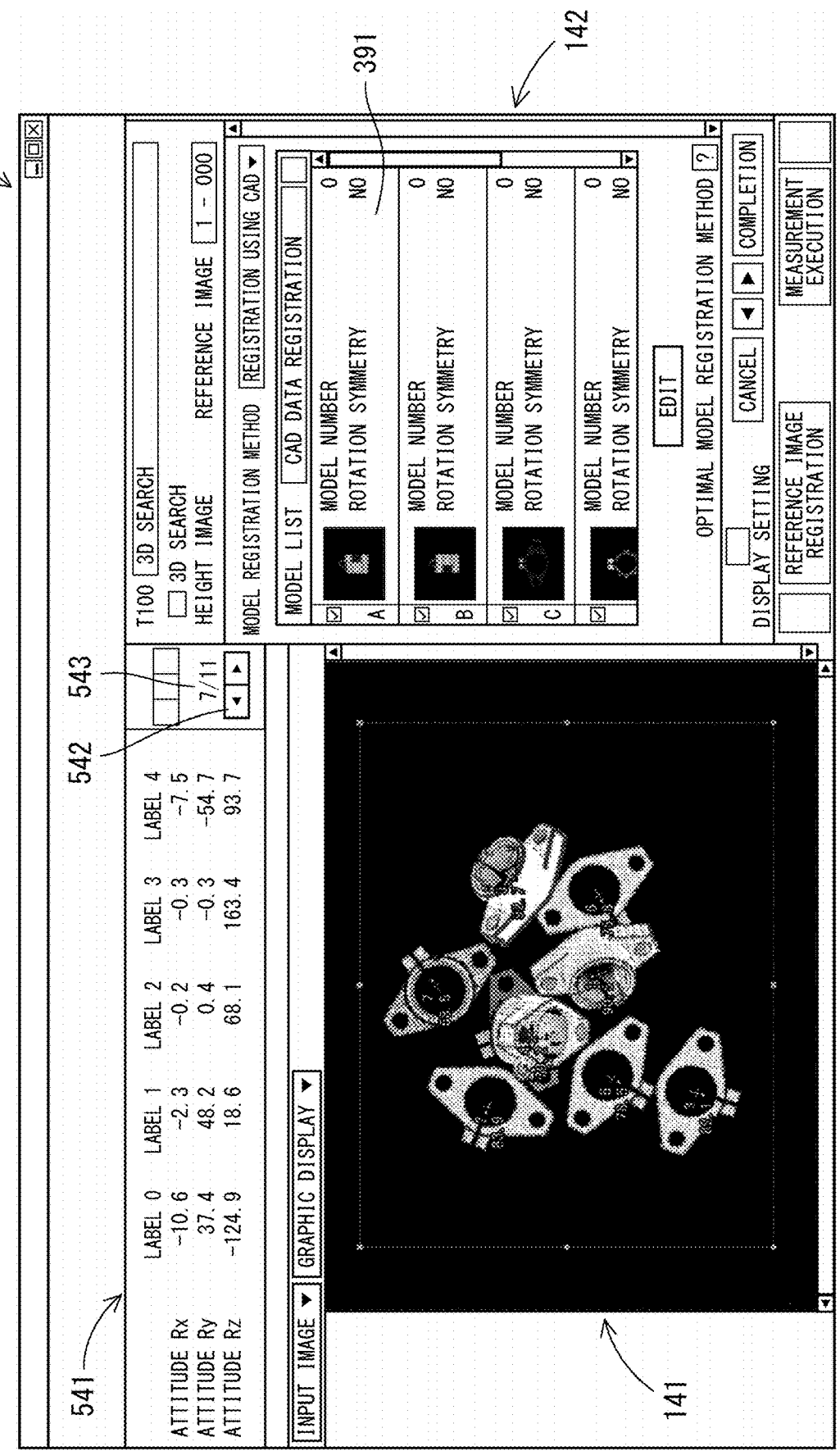
Figure 114:
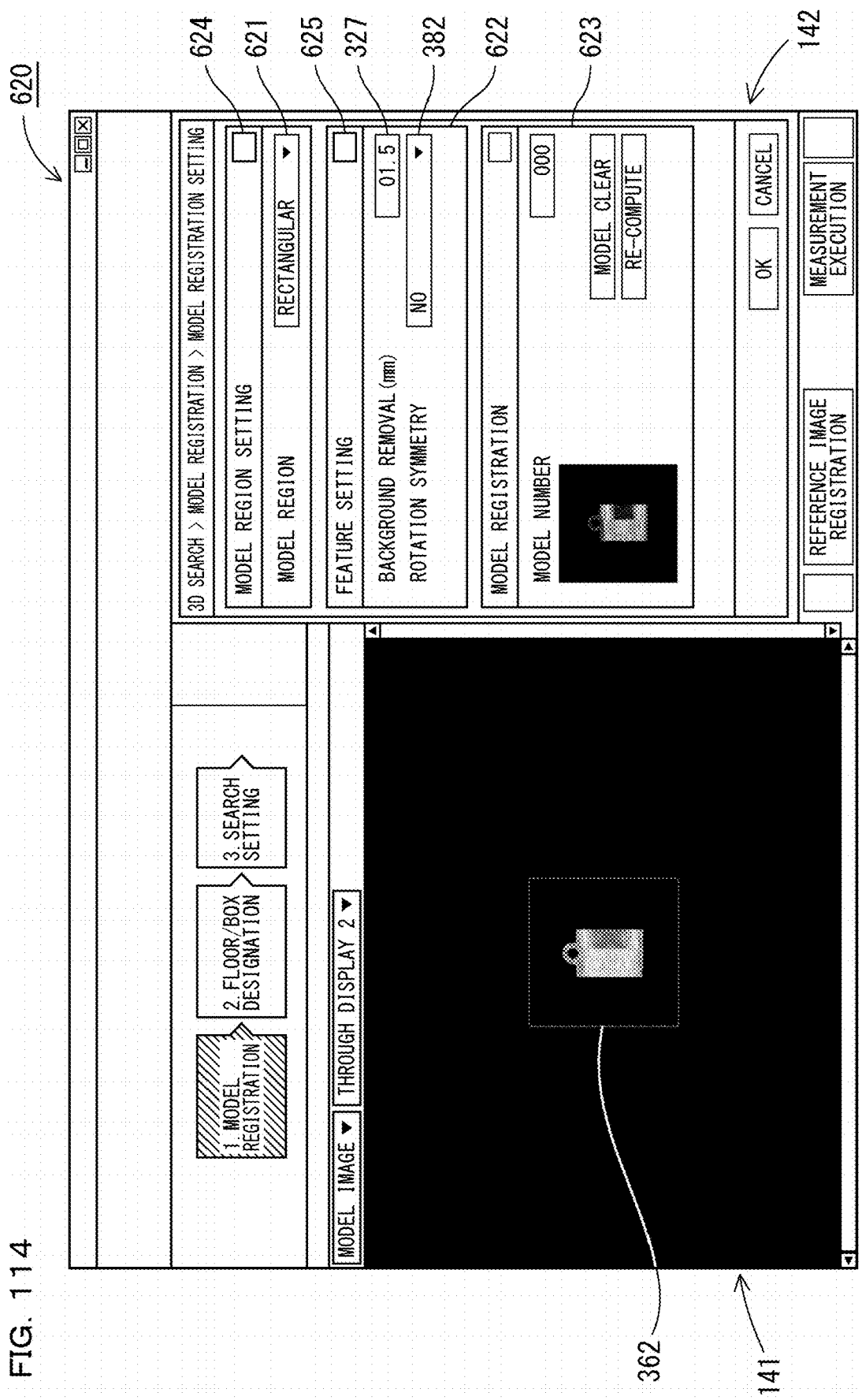
Figure 115:
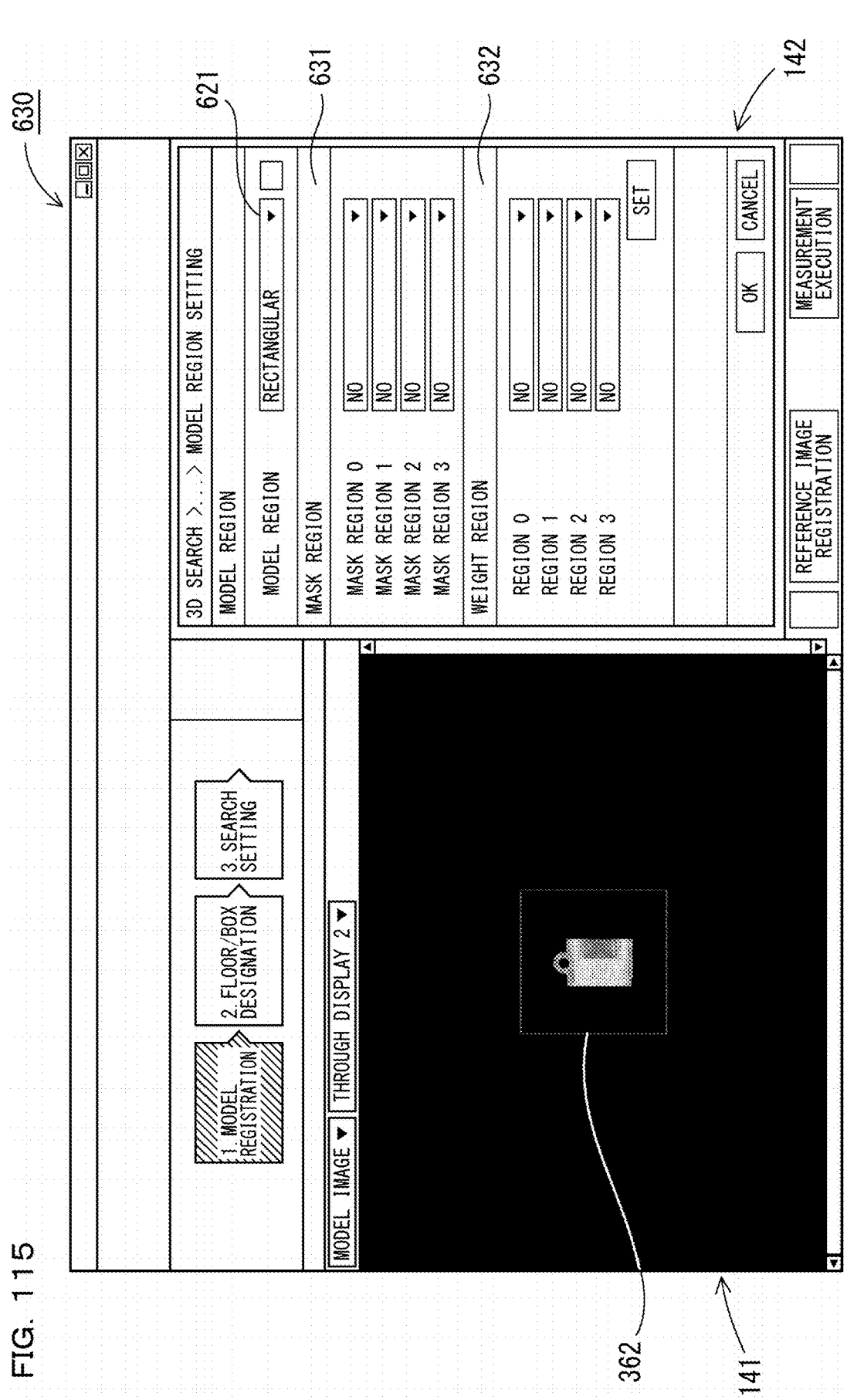
Figure 116:
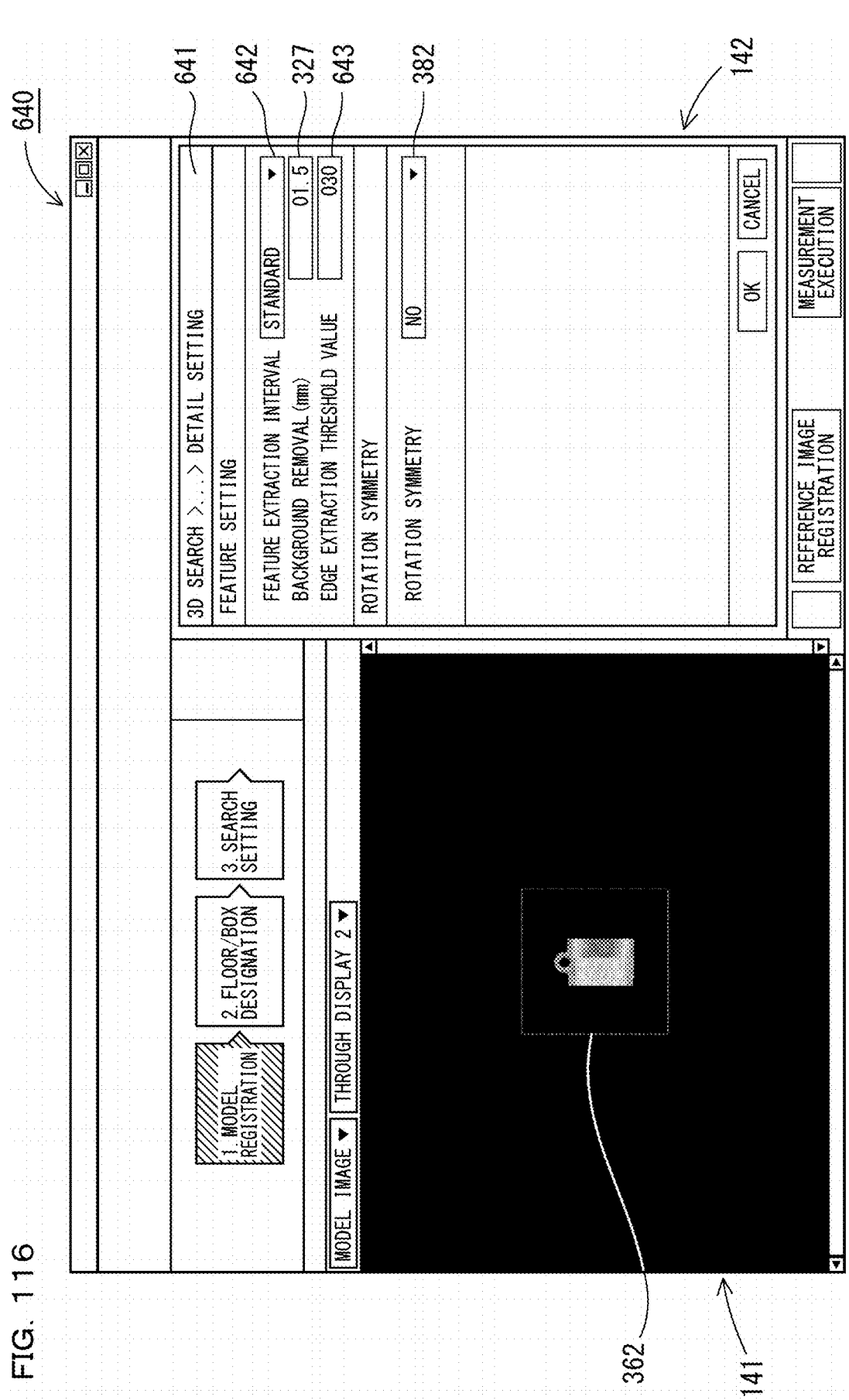
Figure 117:
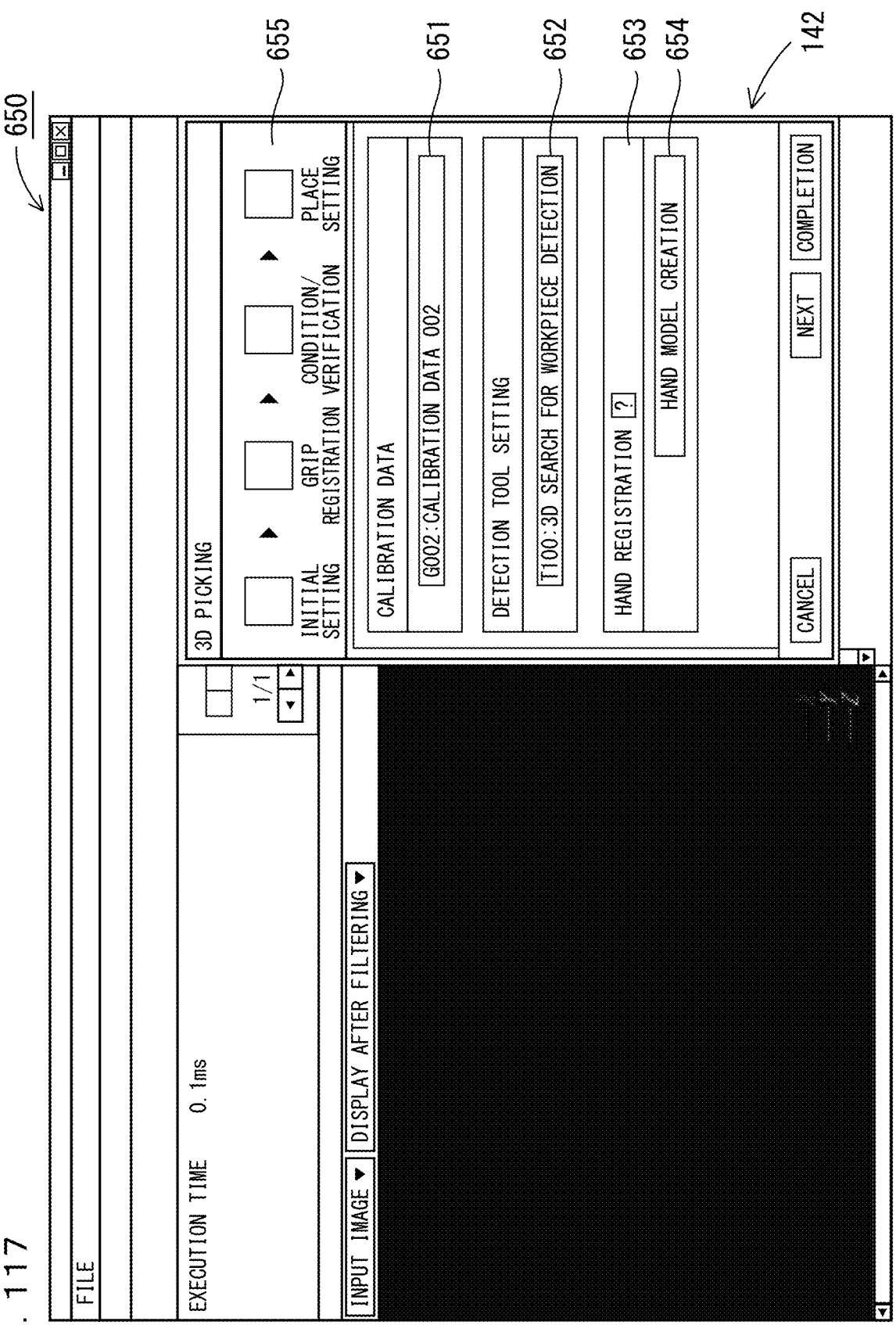

FIG. 92 is an image diagram illustrating a search model exclusion region setting screen;

FIG. 93 is an image diagram illustrating a rotation symmetry setting screen;

FIG. 94 is an image diagram illustrating a search model registration screen;

FIG. 95 is an image diagram illustrating a search model registration screen to which a search model is added;

FIG. 96 is an image diagram illustrating a search region setting screen;

FIG. 97 is an image diagram illustrating a search region setting screen on which a floor surface designation dialog is displayed;

FIG. 98 is an image diagram illustrating a search region setting screen on which floor surface information is displayed;

FIG. 99 is an image diagram illustrating a search parameter setting screen;

FIG. 100 is an image diagram illustrating a search parameter setting screen on which a detection detail condition setting dialog is displayed;

FIG. 101 is an image diagram illustrating a setting screen for a search parameter designated for each search model;

FIG. 102 is an image diagram illustrating a search model registration method selection screen;

FIG. 103 is an image diagram illustrating a CAD data reading screen;

FIG. 104 is an image diagram illustrating a search model registration screen based on three-dimensional CAD data;

FIG. 105 is an image diagram illustrating a search model registration screen on which a rotation symmetry designation dialog is displayed;

FIG. 106 is an image diagram illustrating a model list display screen;

FIG. 107 is an image diagram illustrating a search result display screen;

FIG. 108 is an image diagram illustrating a search result display screen;

FIG. 109 is an image diagram illustrating a search result display screen;

FIG. 110 is an image diagram illustrating a search result display screen;

FIG. 111 is an image diagram illustrating a search result display screen;

FIG. 112 is an image diagram illustrating a search result display screen;

FIG. 113 is an image diagram illustrating a search result display screen;

FIG. 114 is an image diagram illustrating a model editing screen;

FIG. 115 is an image diagram illustrating a model region detail setting screen;

FIG. 116 is an image diagram illustrating a feature detail setting screen;

FIG. 117 is an image diagram illustrating a three-dimensional picking initial setting screen.

Figure 118:
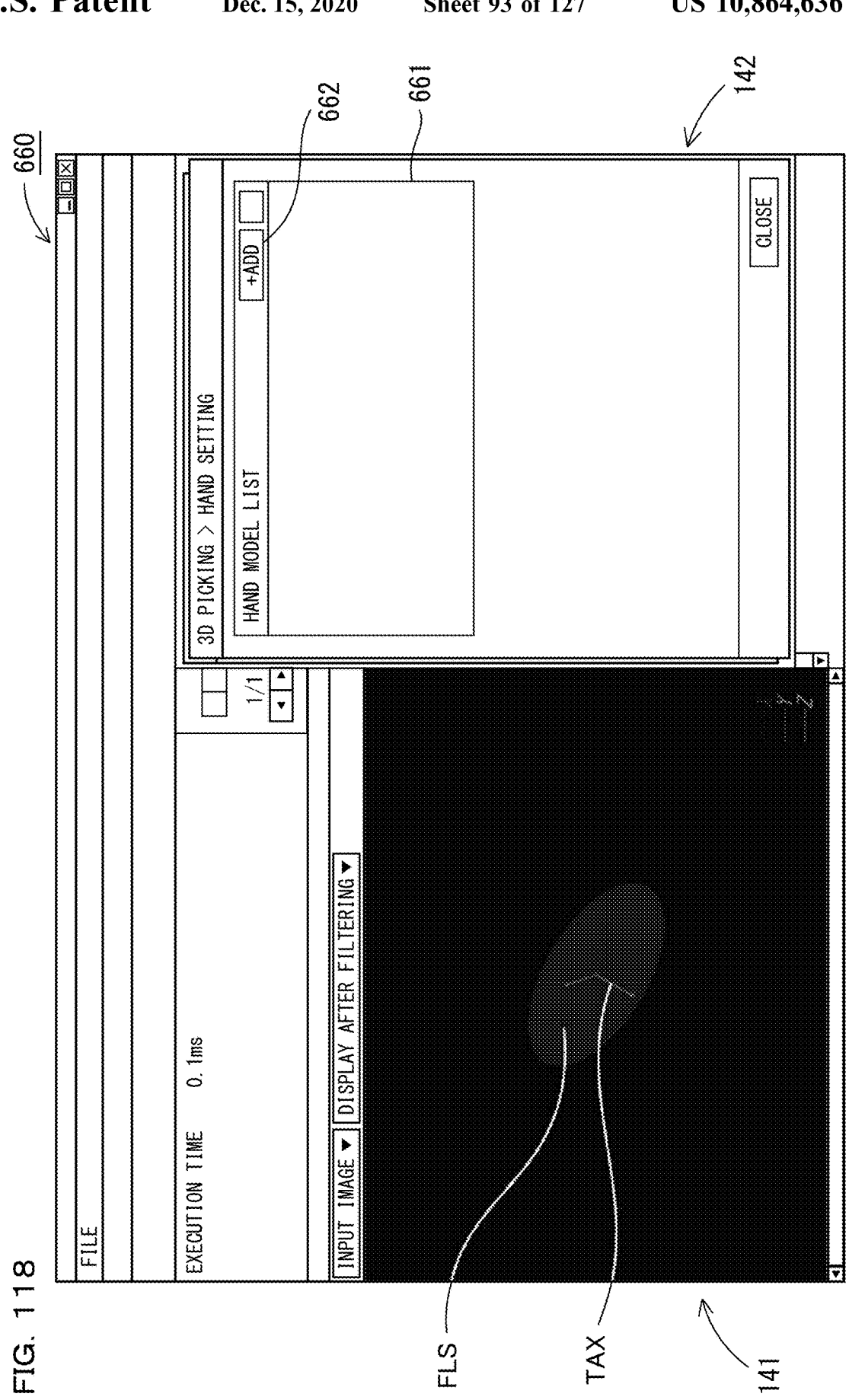
Figure 119:
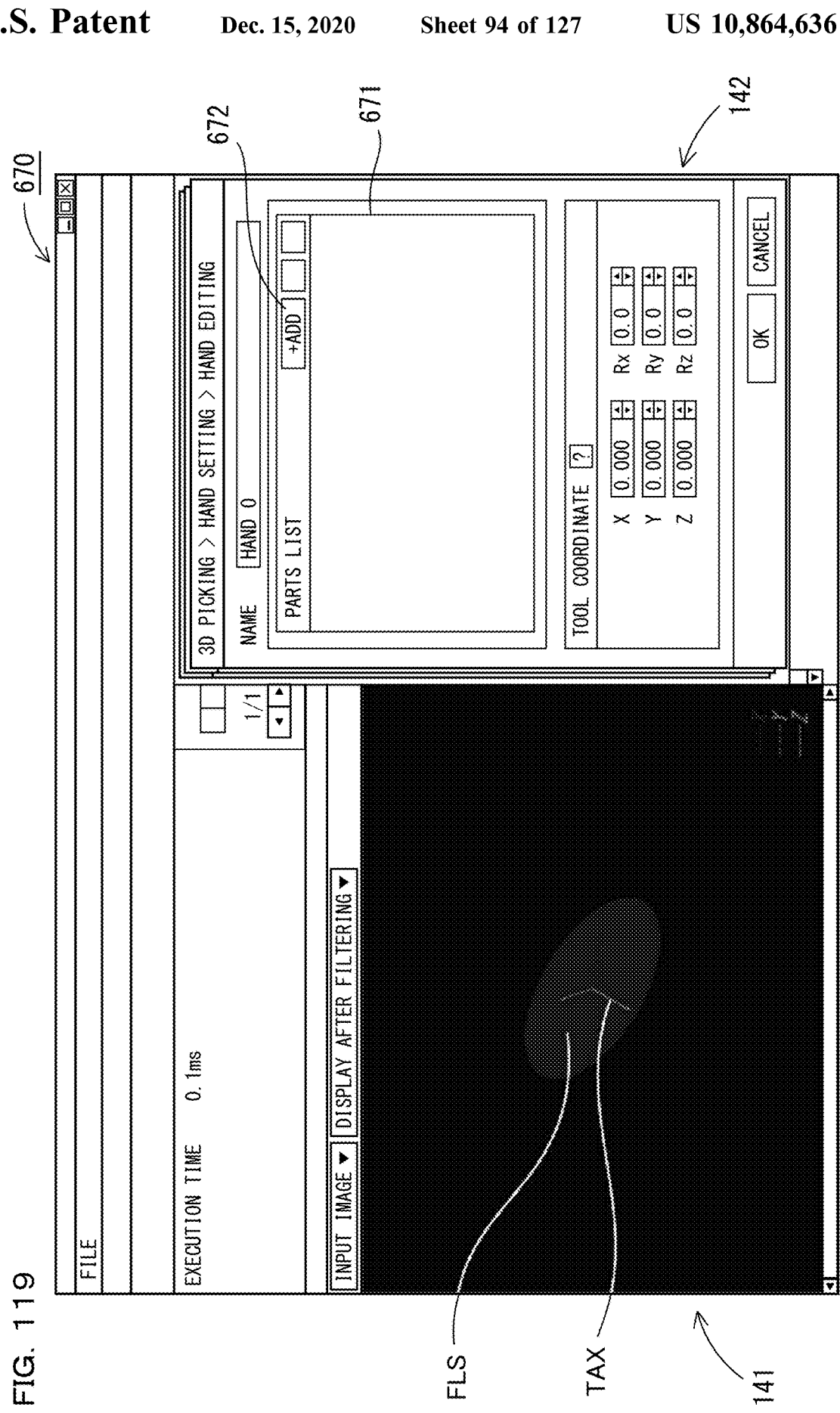
Figure 120:
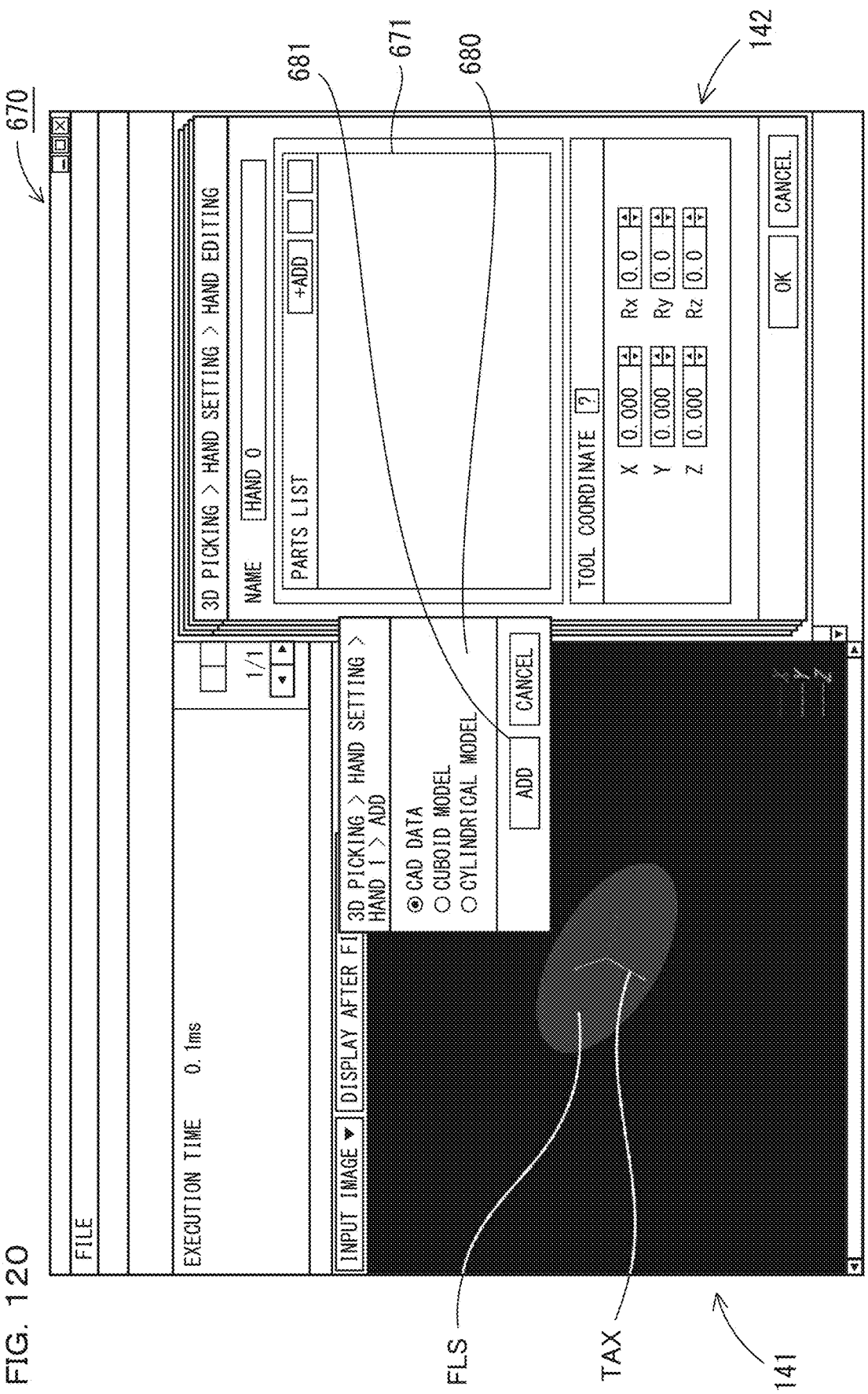
Figure 121:
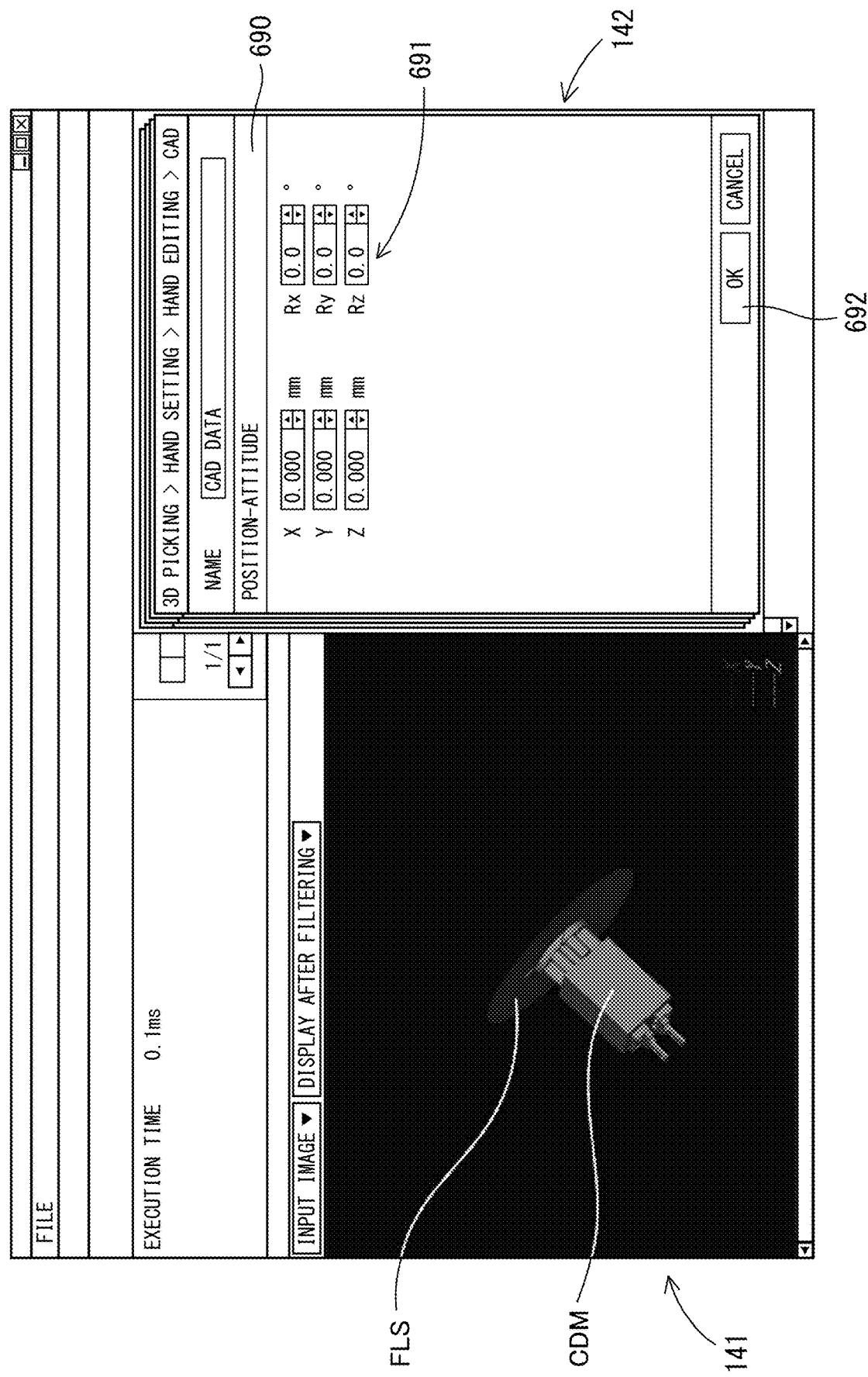
Figure 122:
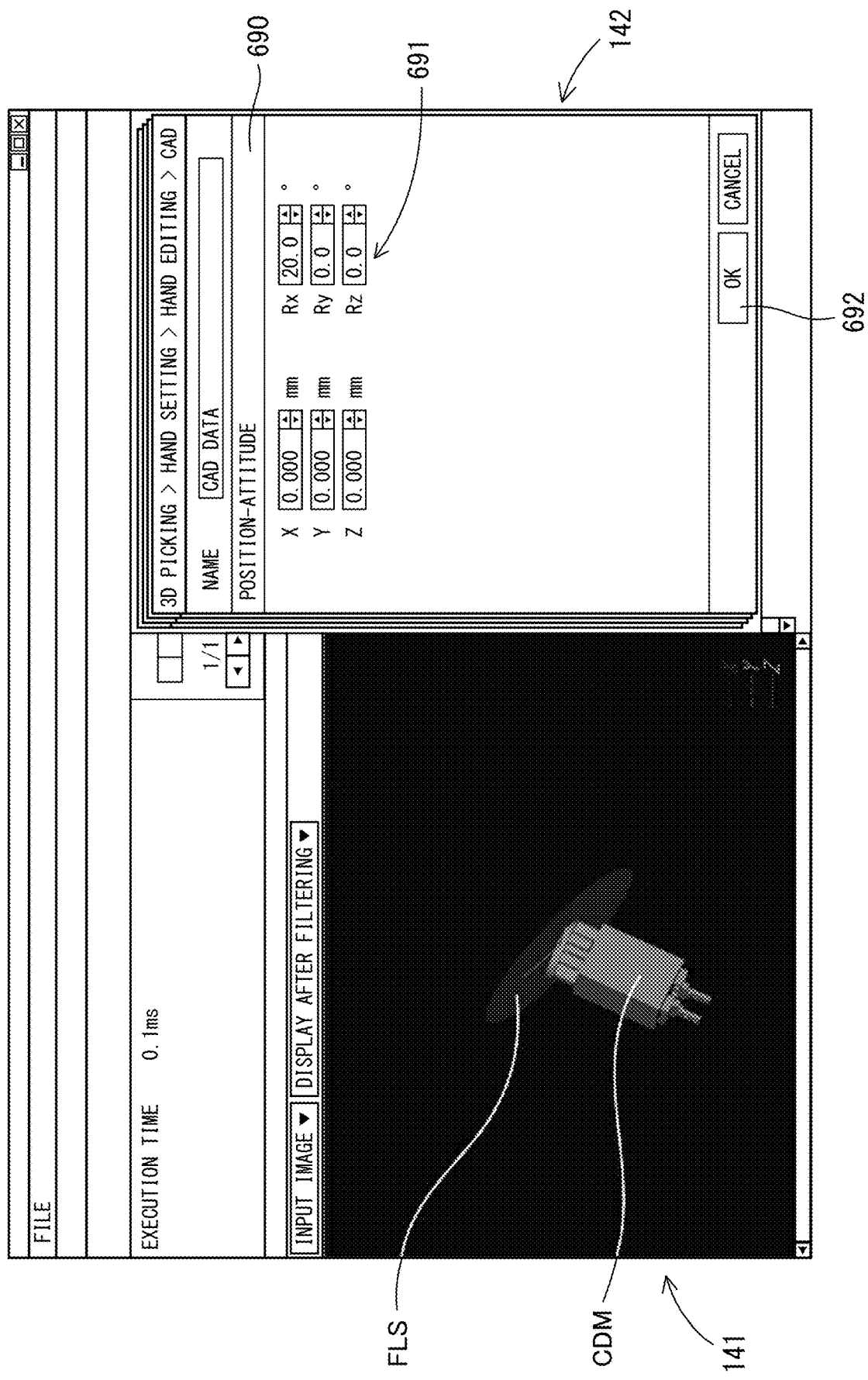
Figure 123:
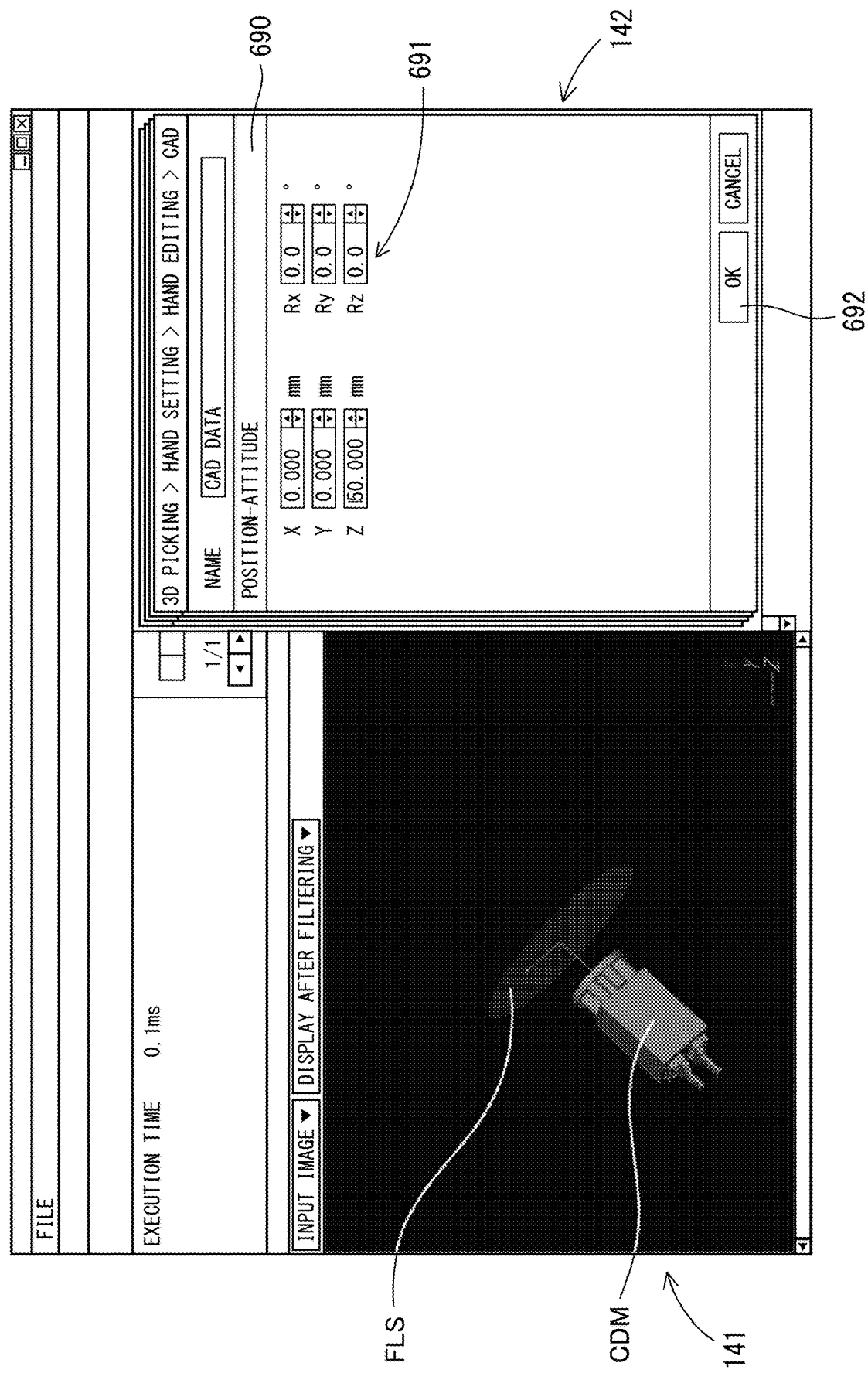
Figure 124:
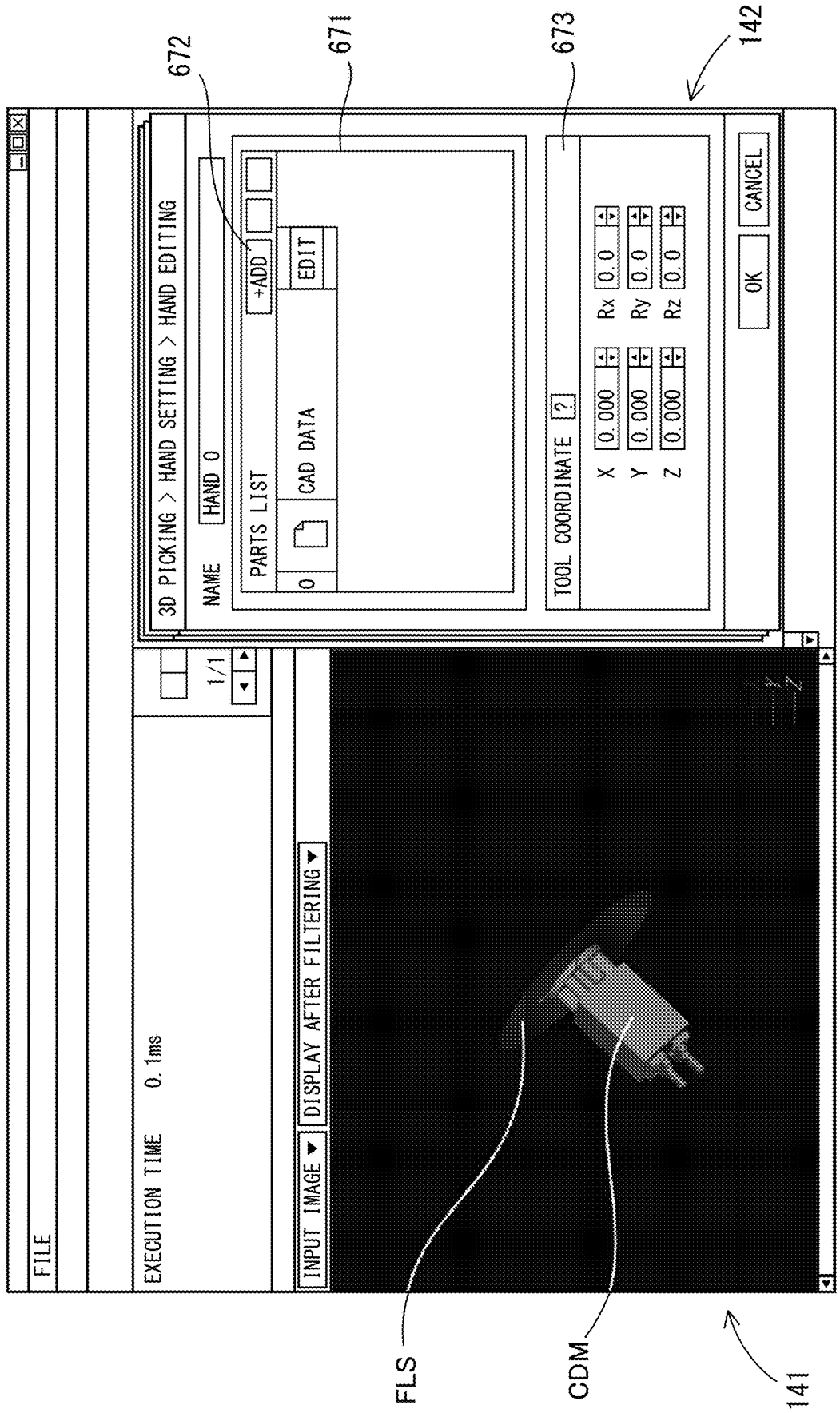
Figure 125:
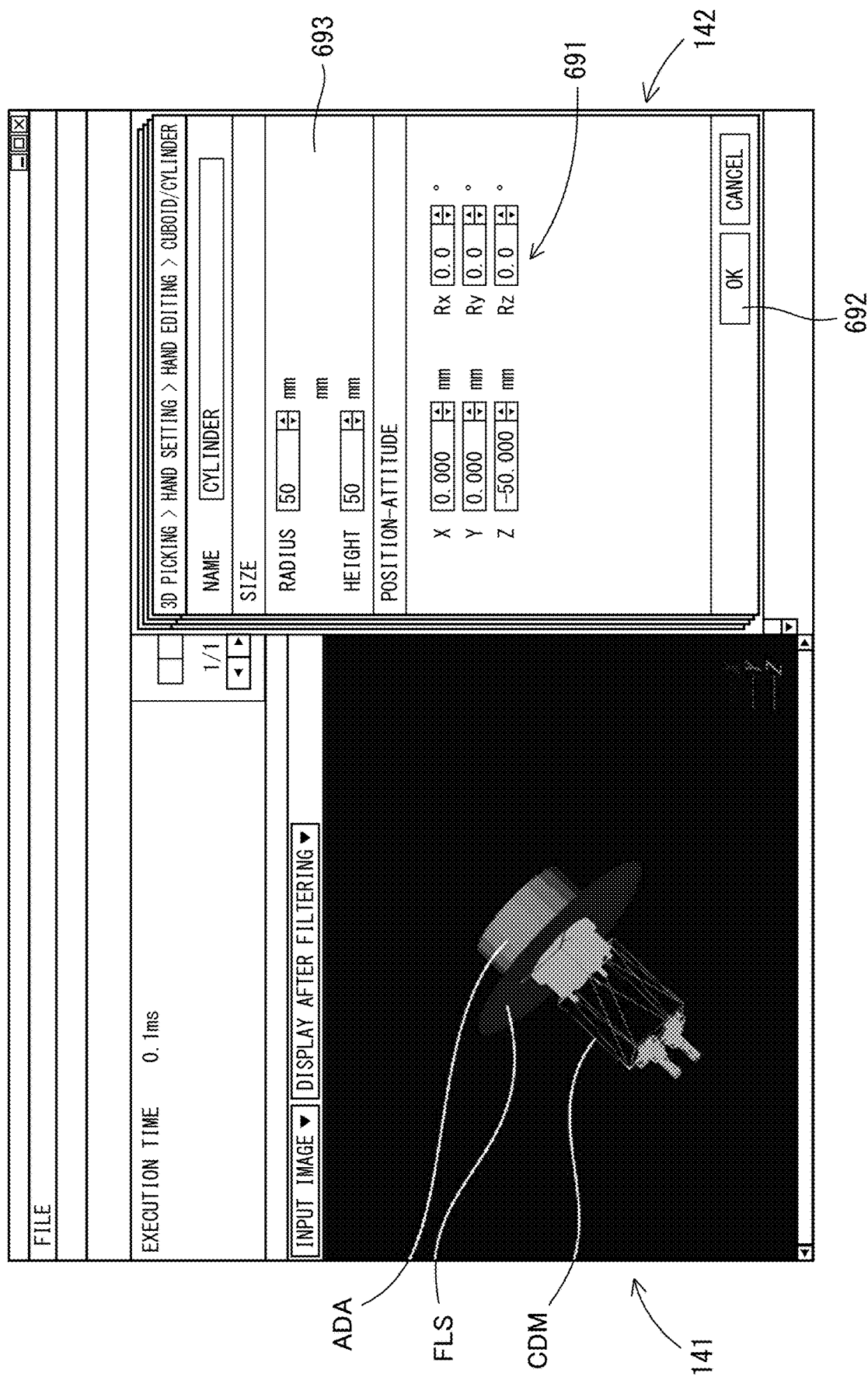
Figure 126:
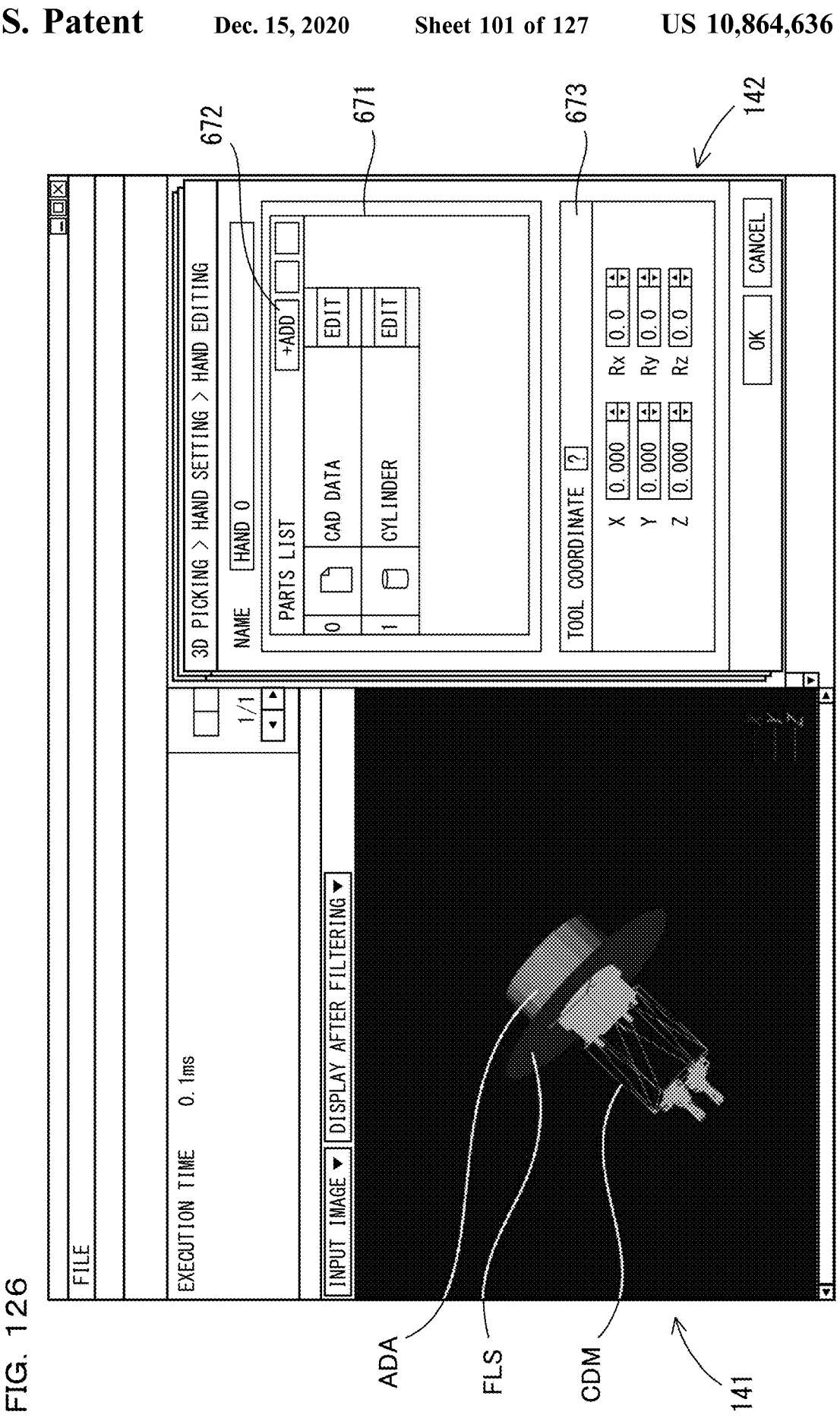
Figure 127:
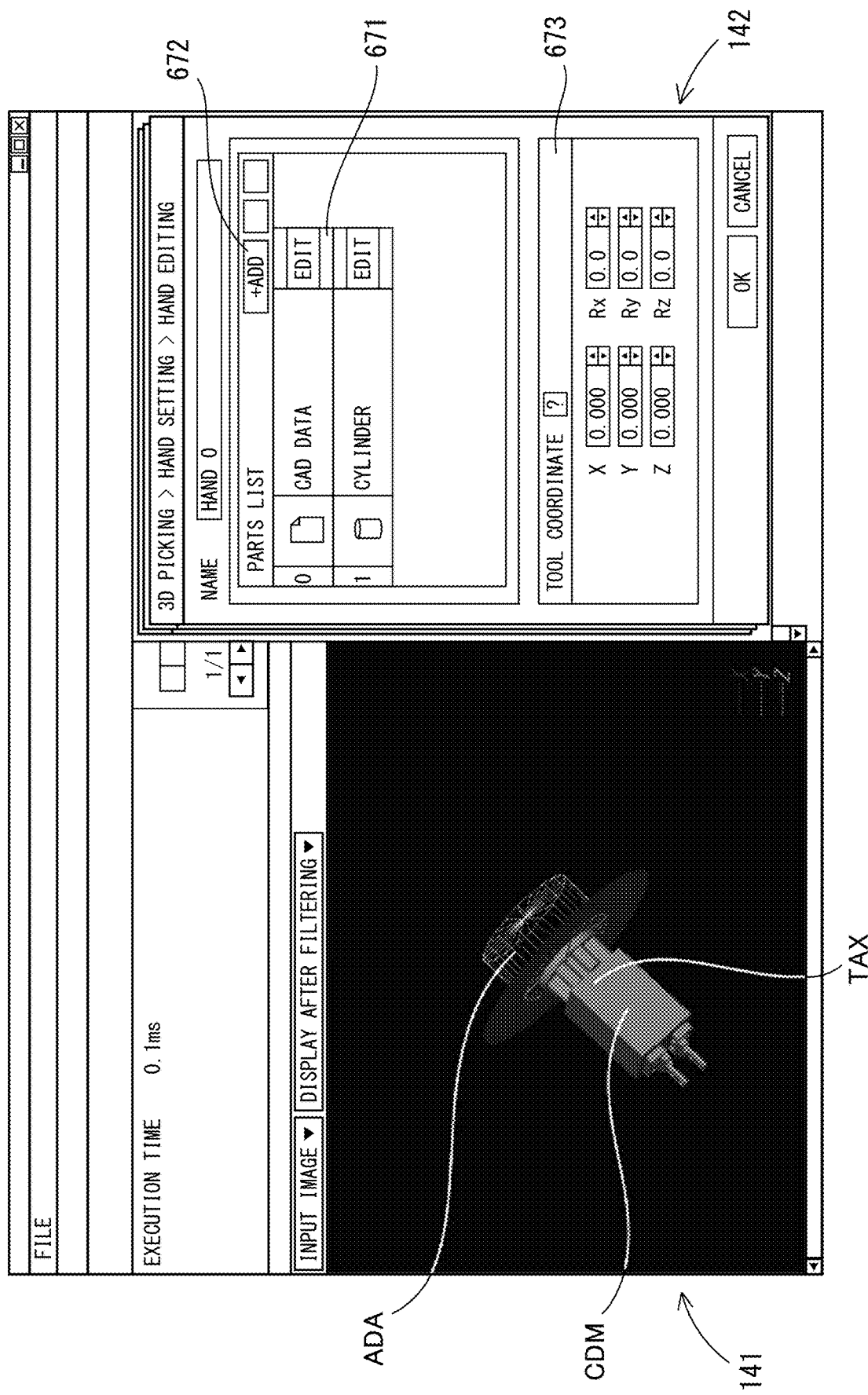
Figure 128:
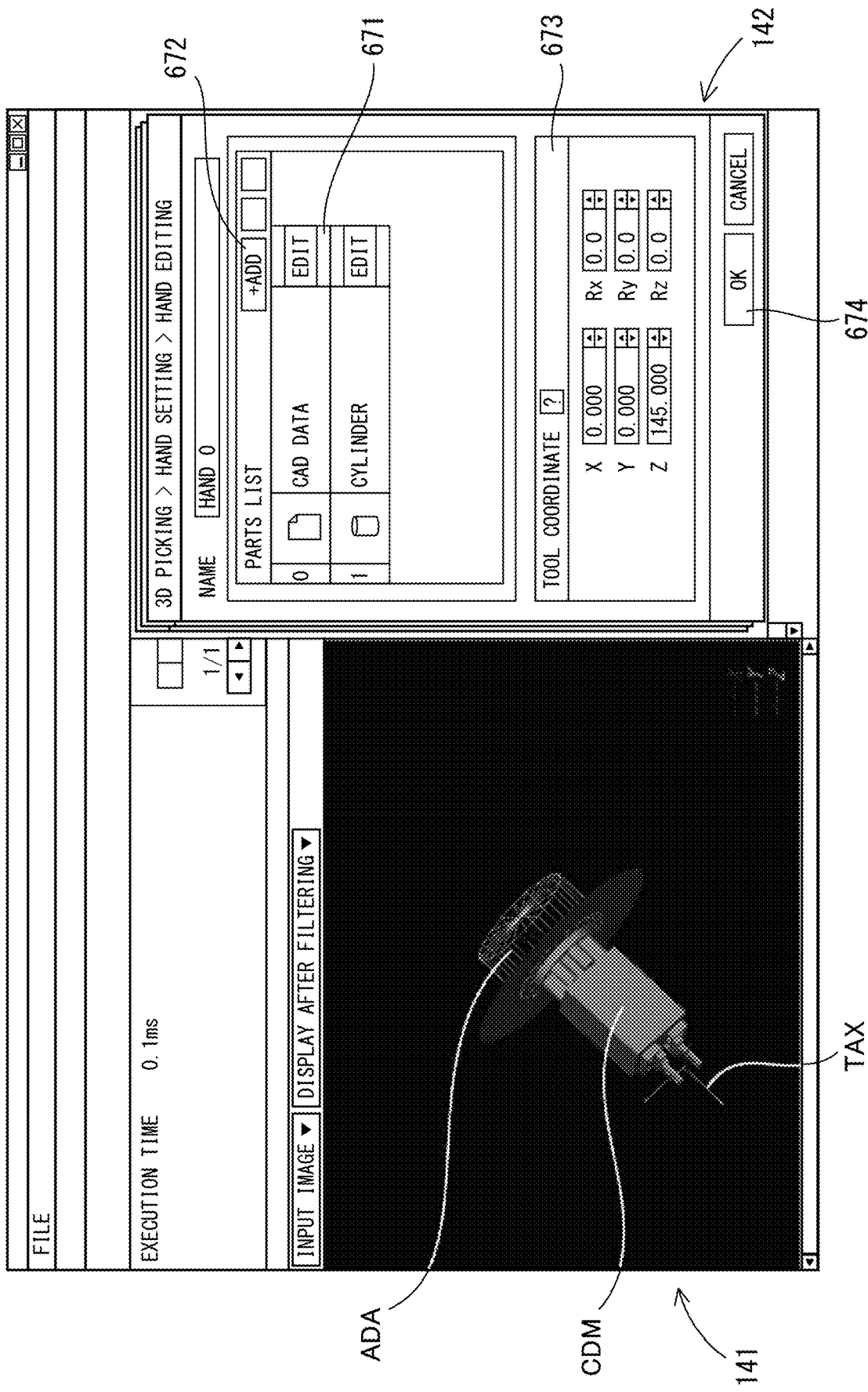
Figure 129:
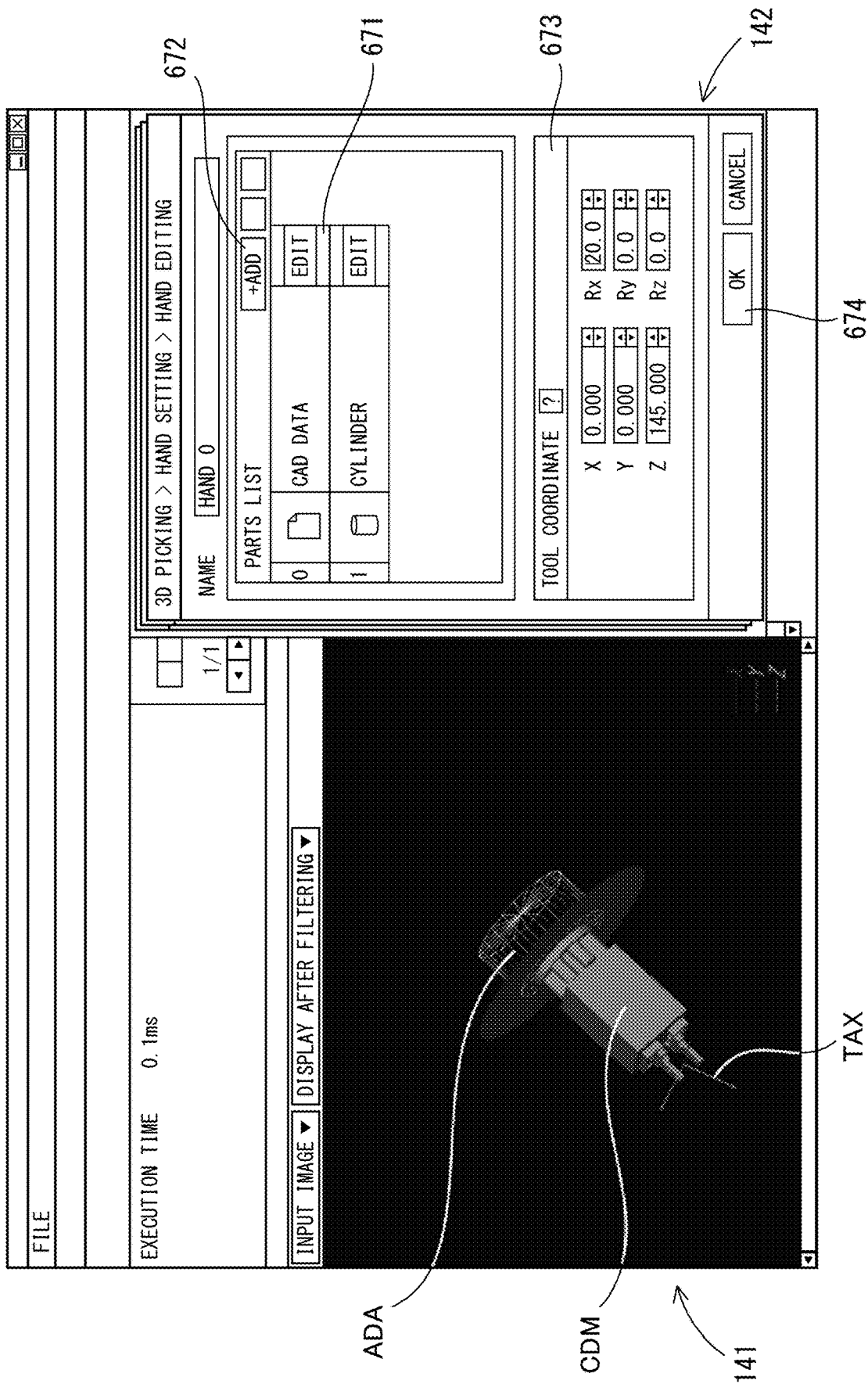
Figure 130:
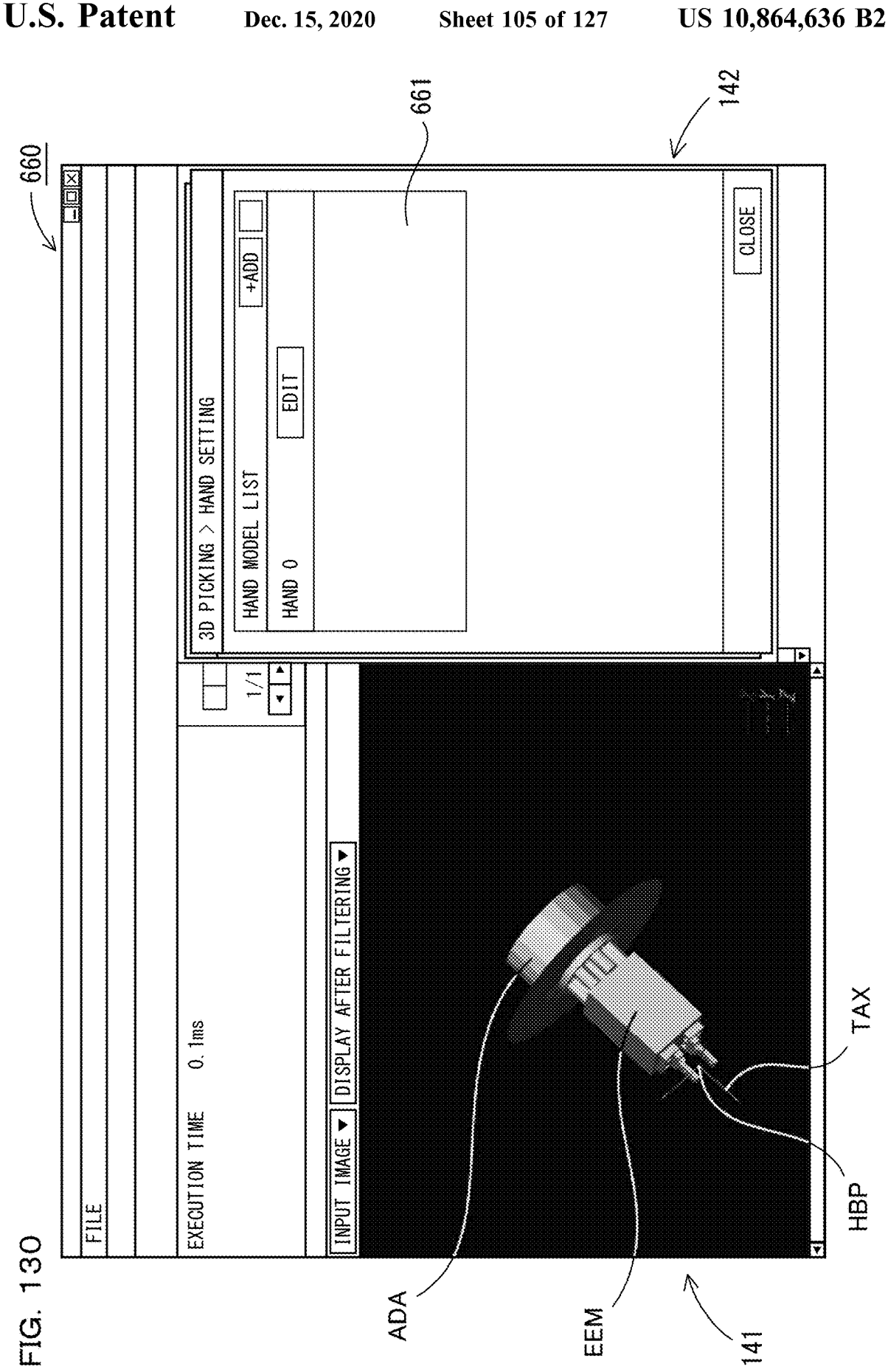
Figure 131:
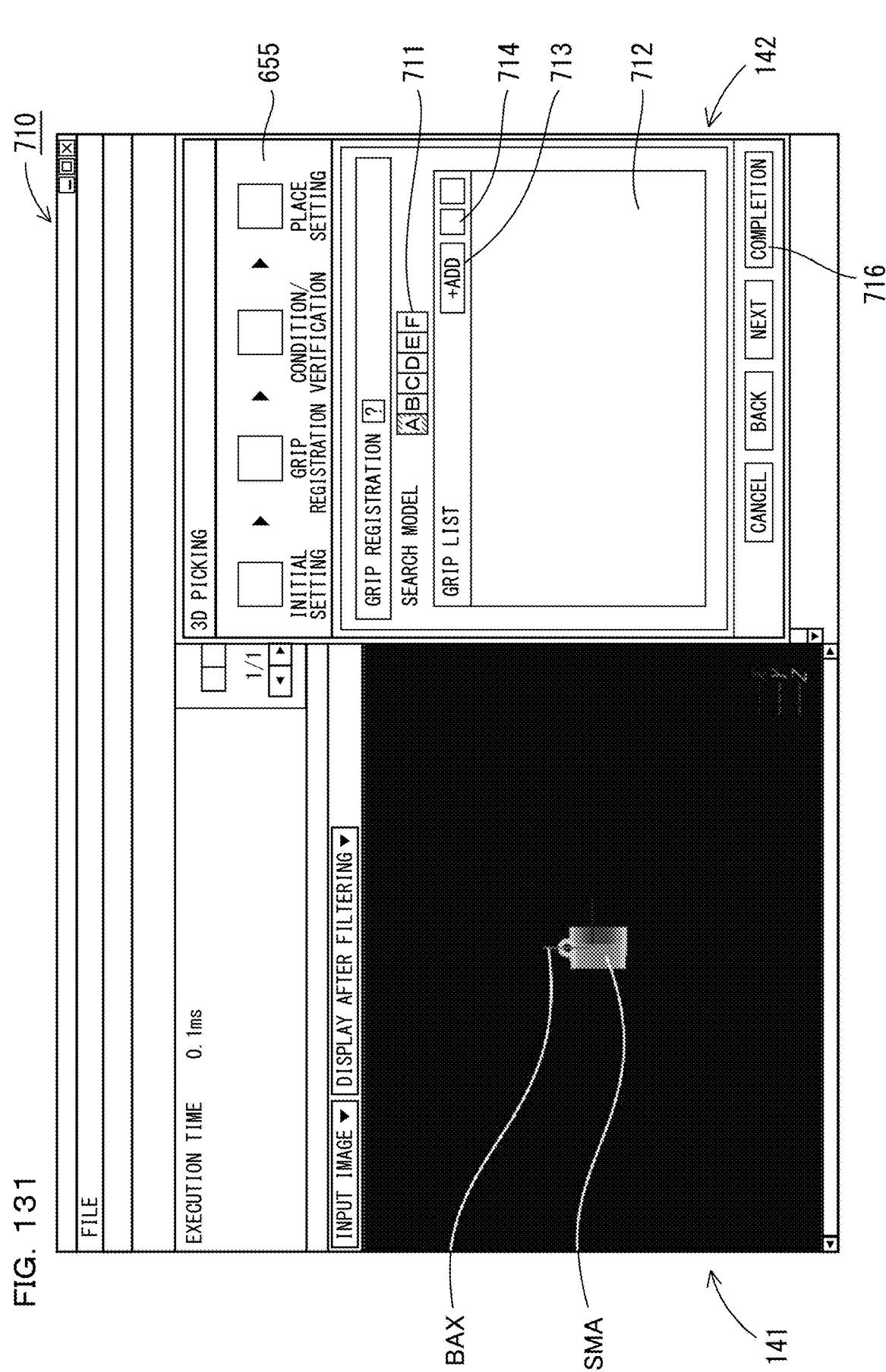
Figure 132:
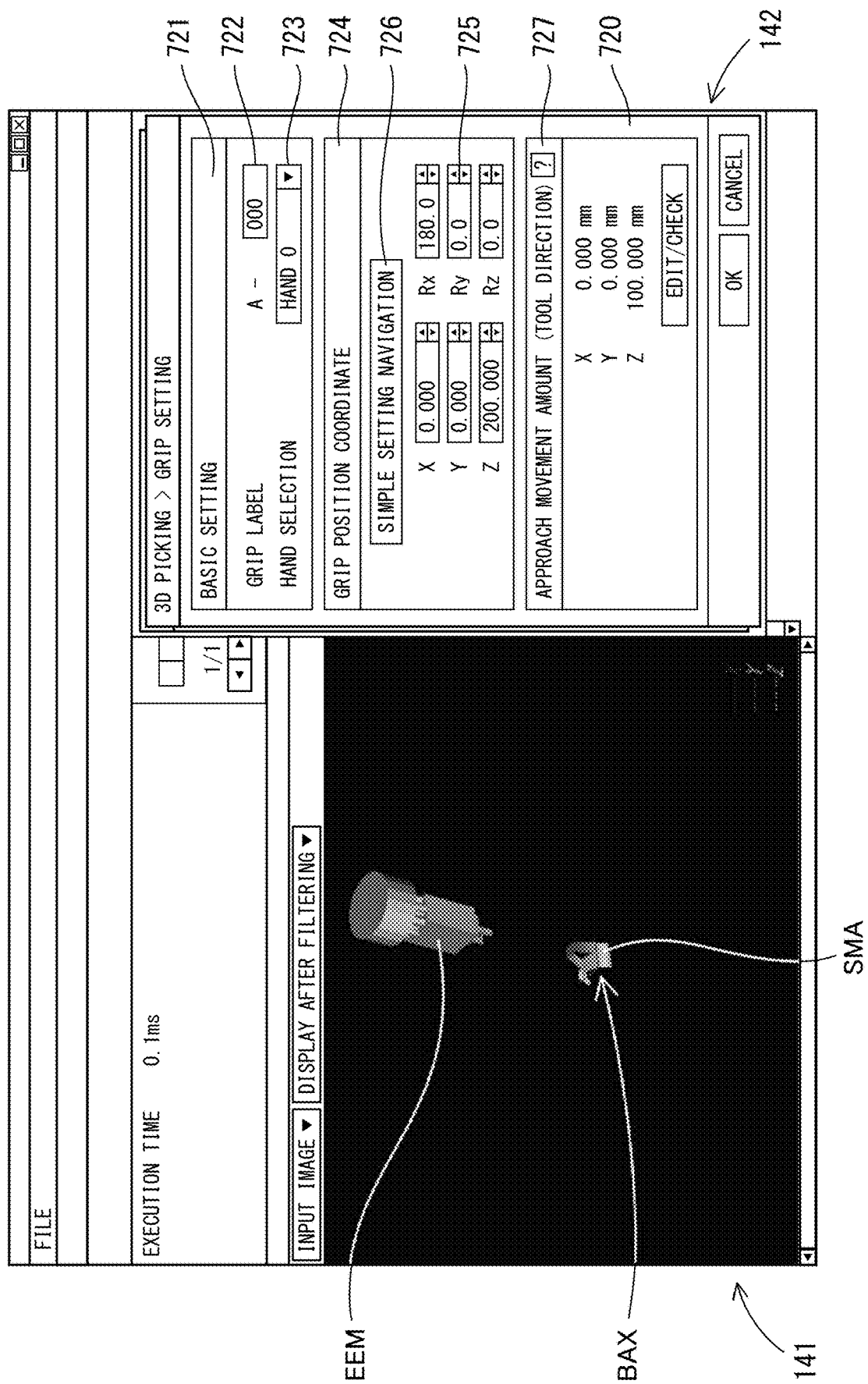
Figure 133:
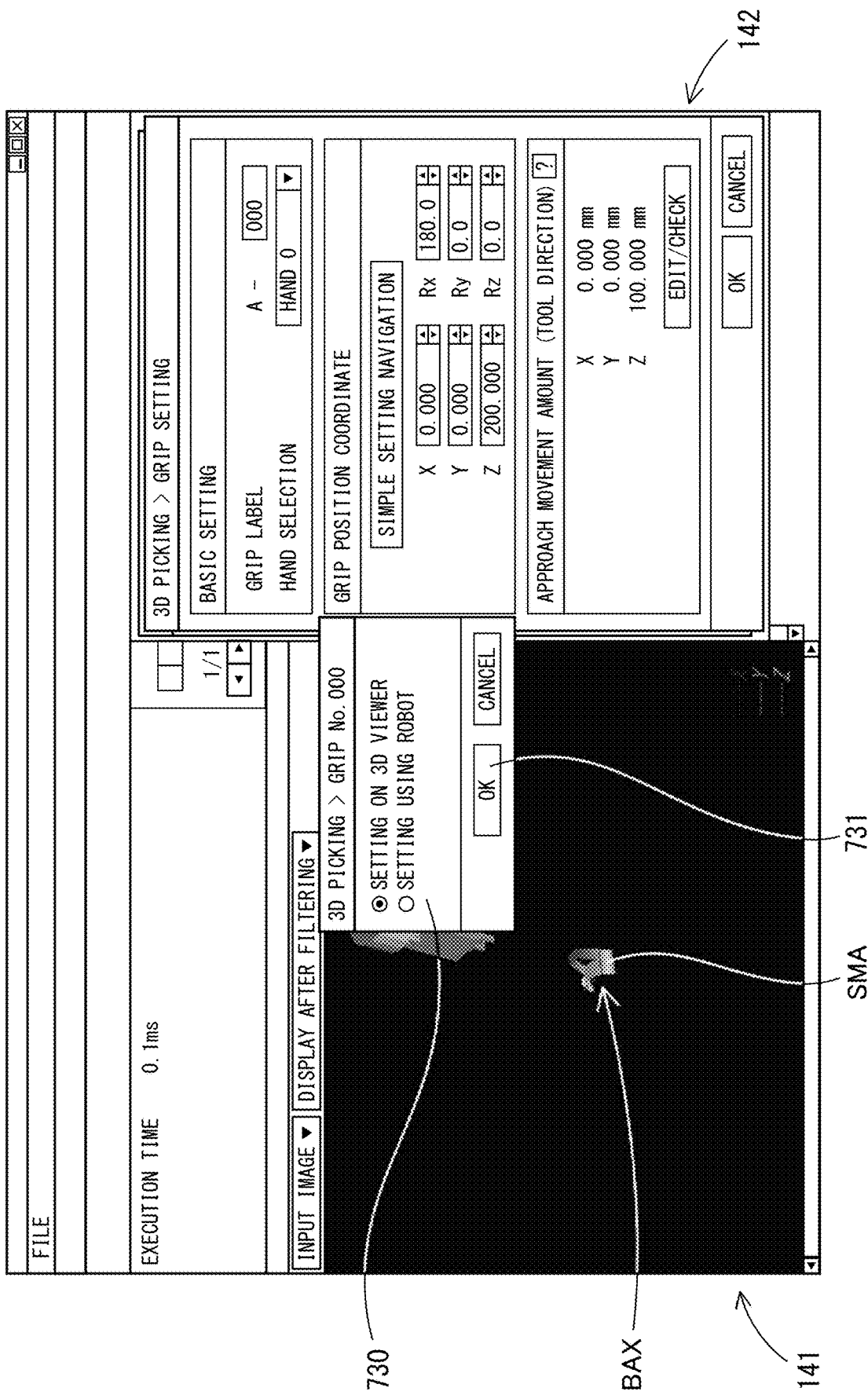
Figure 134:
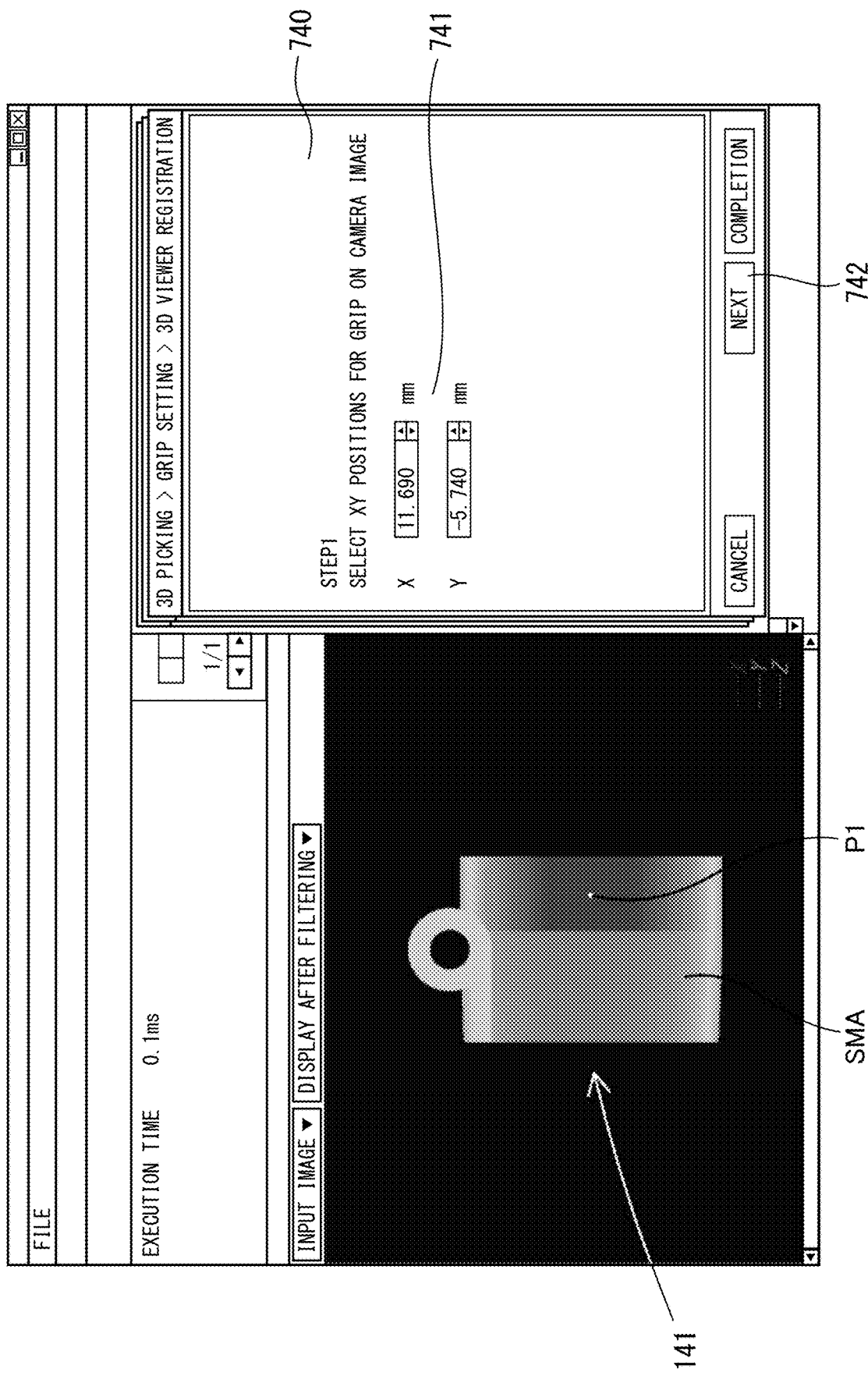
Figure 135:
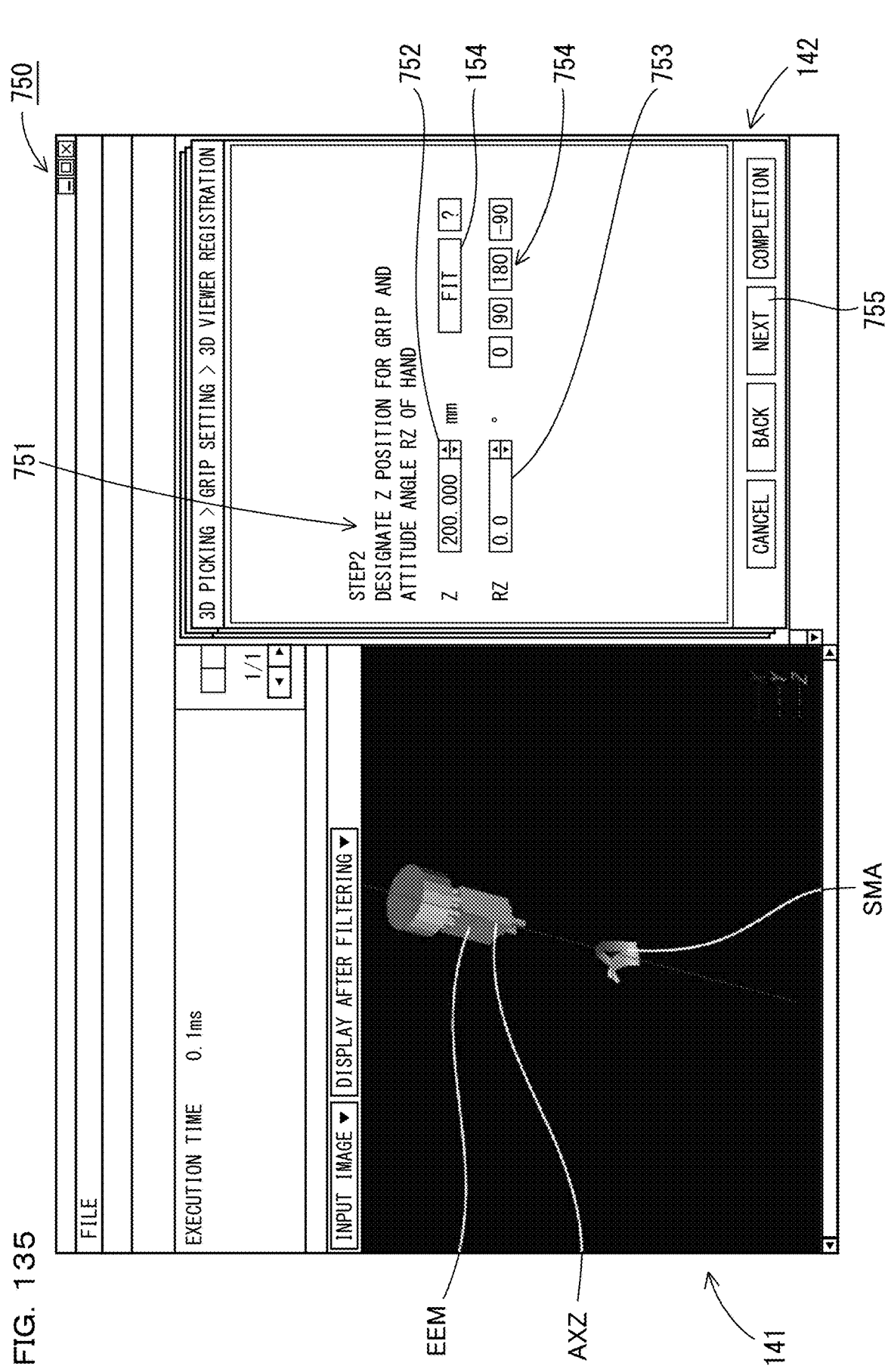
Figure 136:
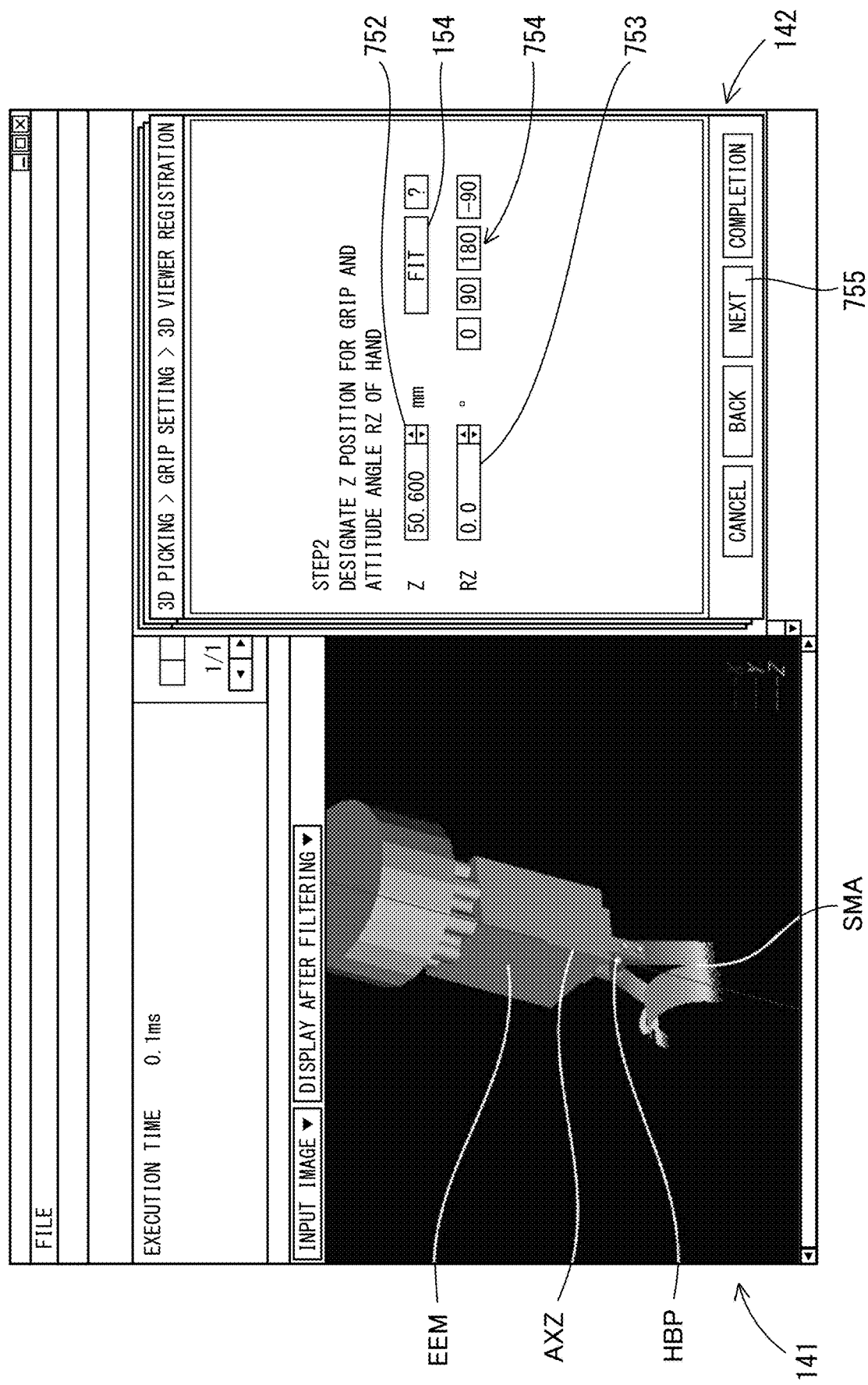
Figure 137:
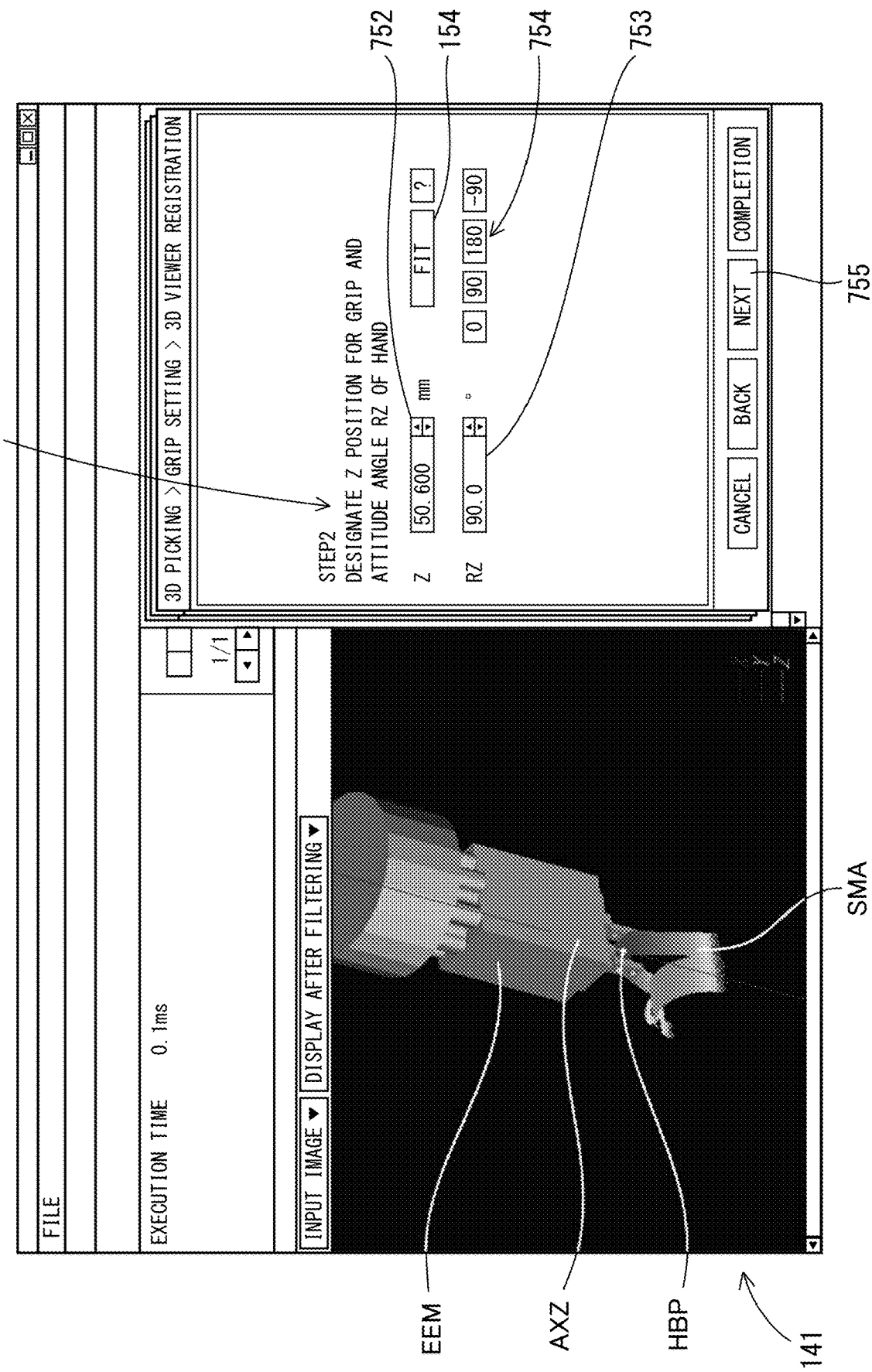
Figure 138:
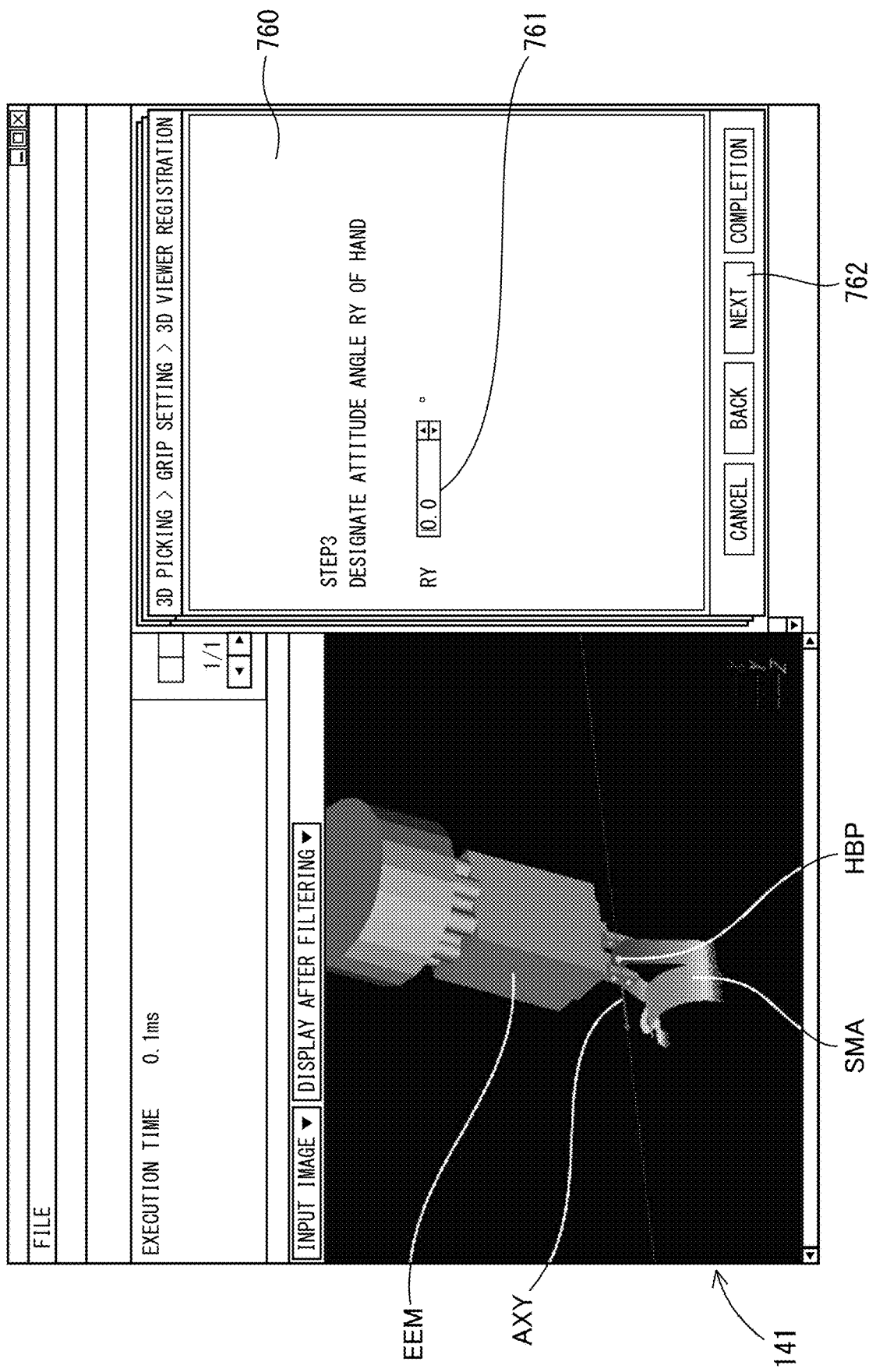
Figure 139:
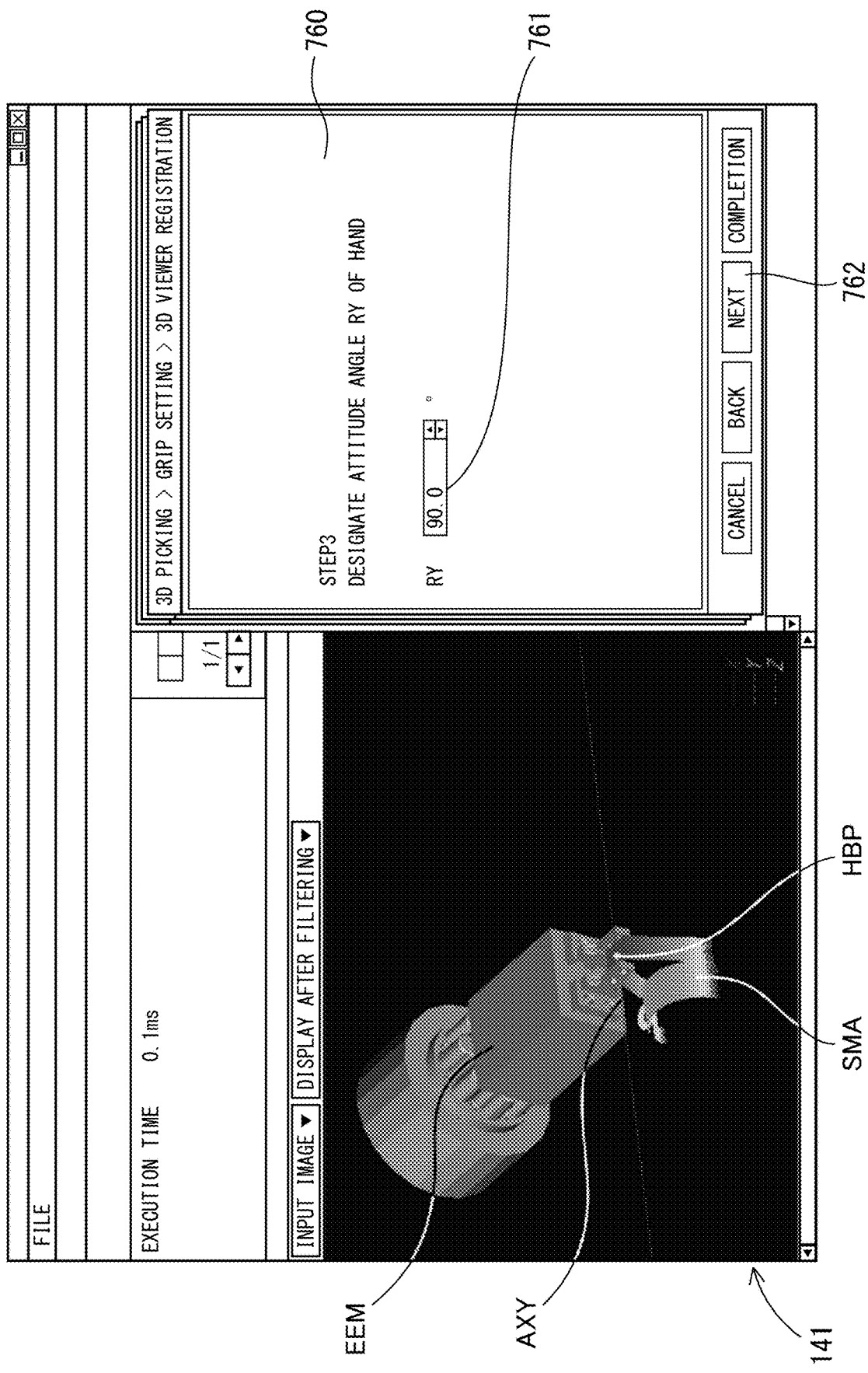
Figure 140:
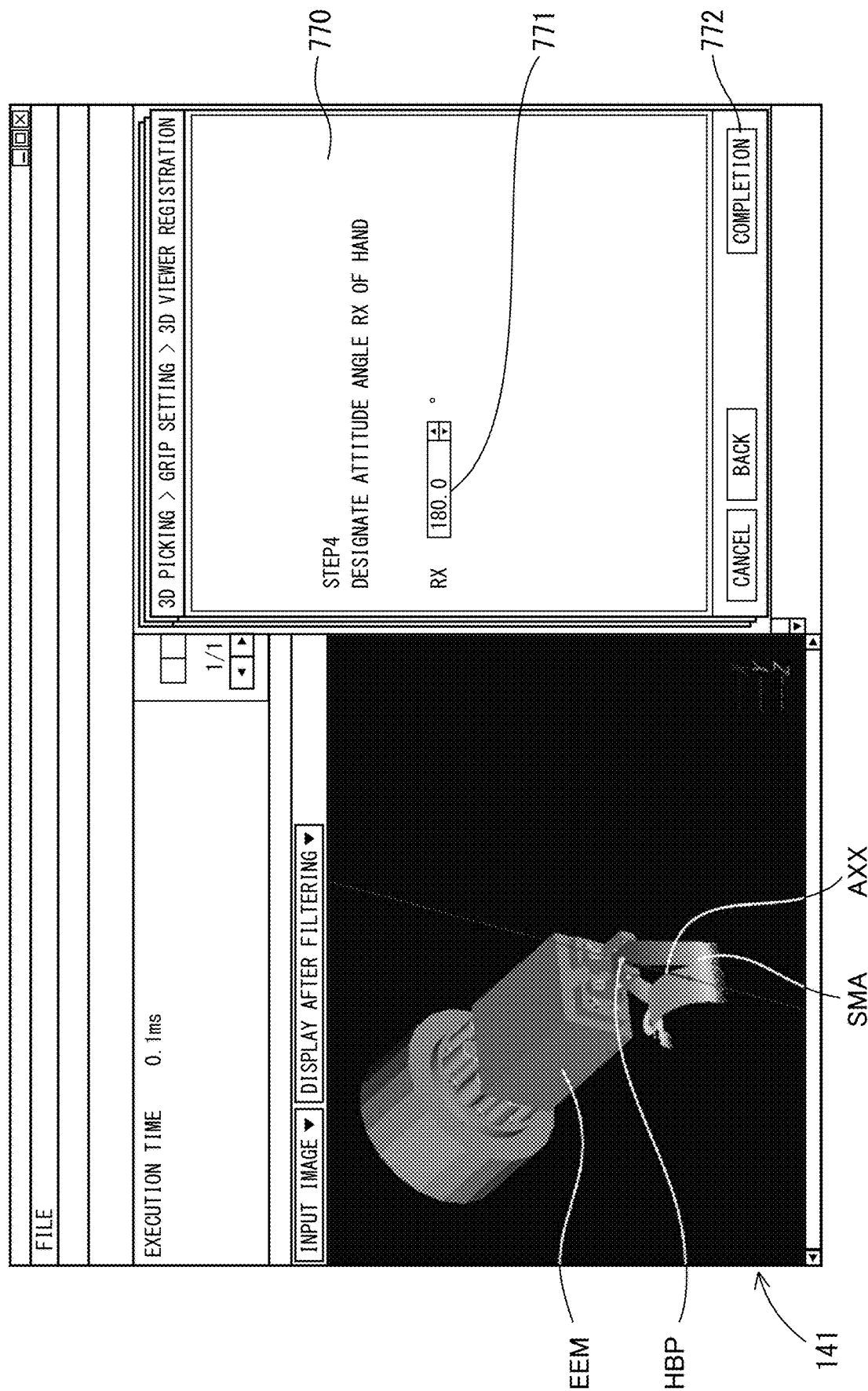
Figure 141:
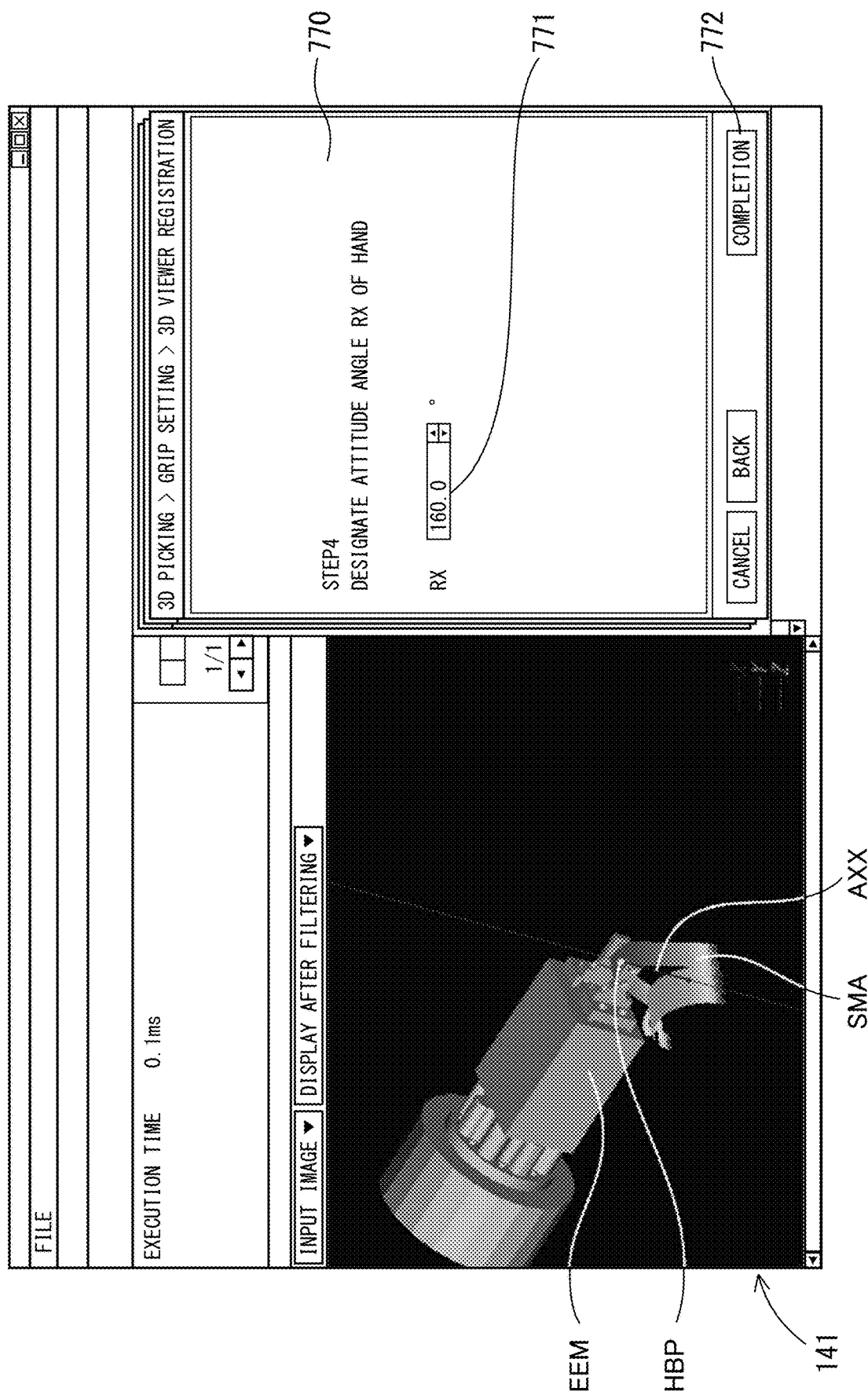
Figure 142:
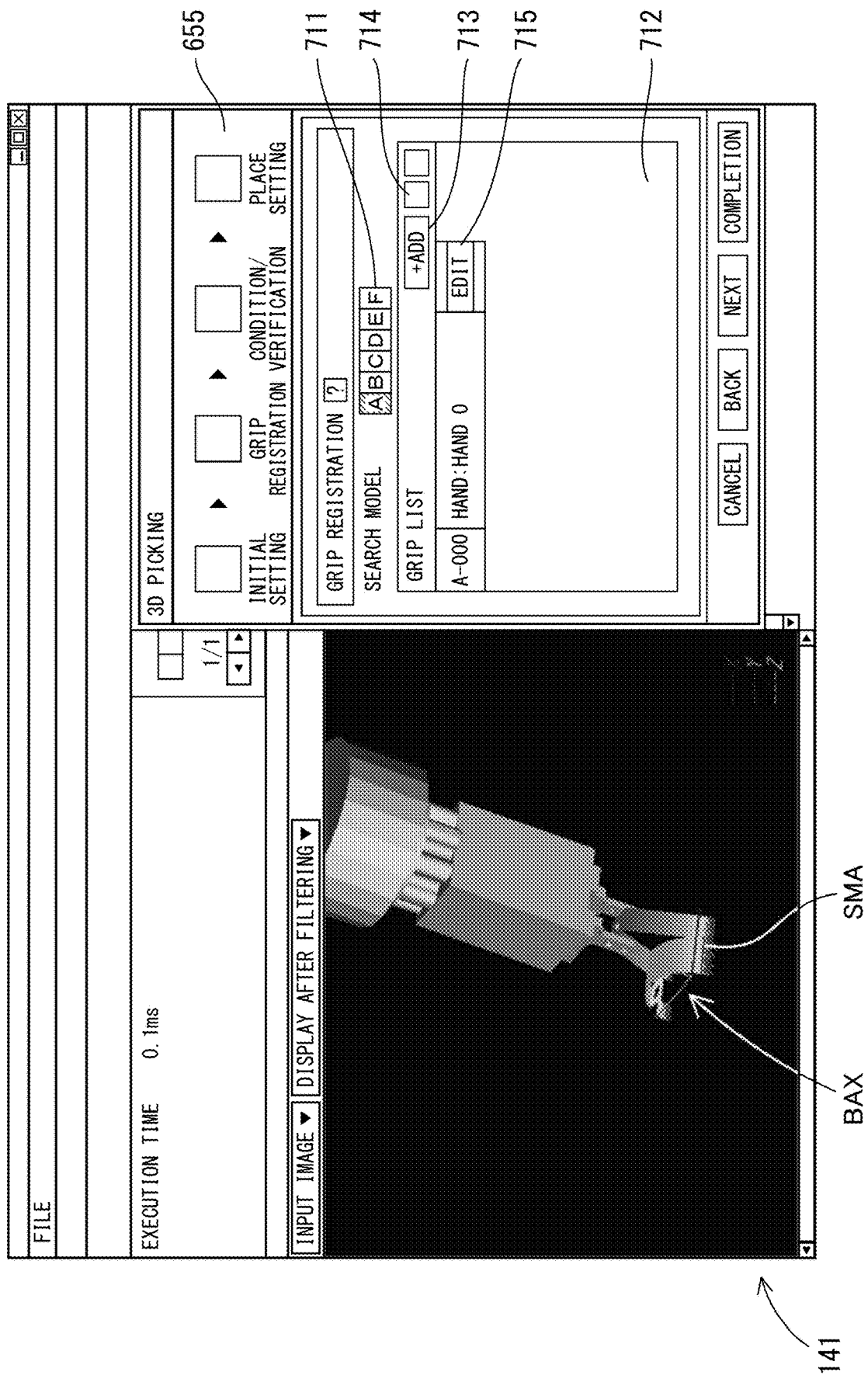
Figure 143:
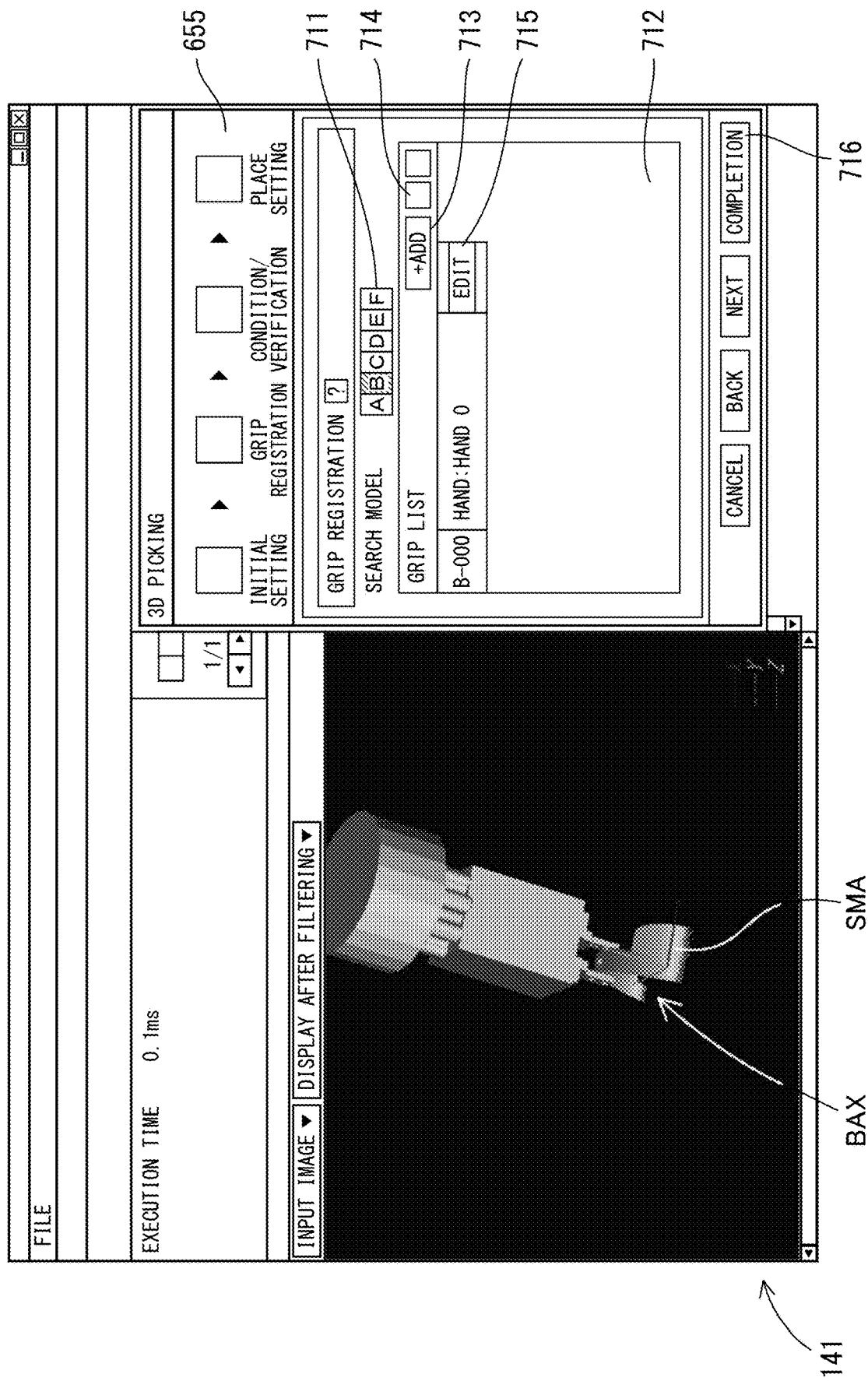
Figure 144:
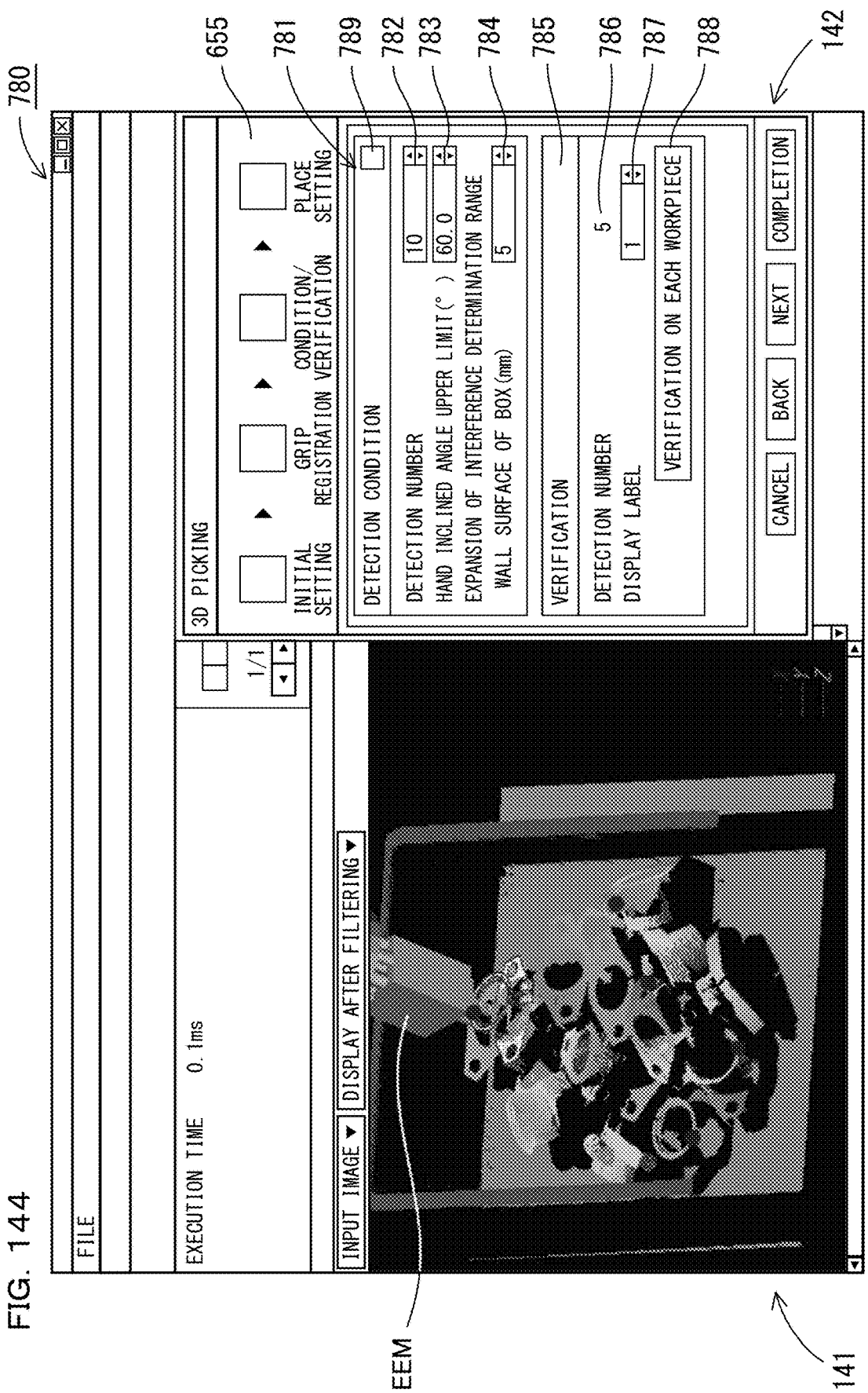
Figure 145:
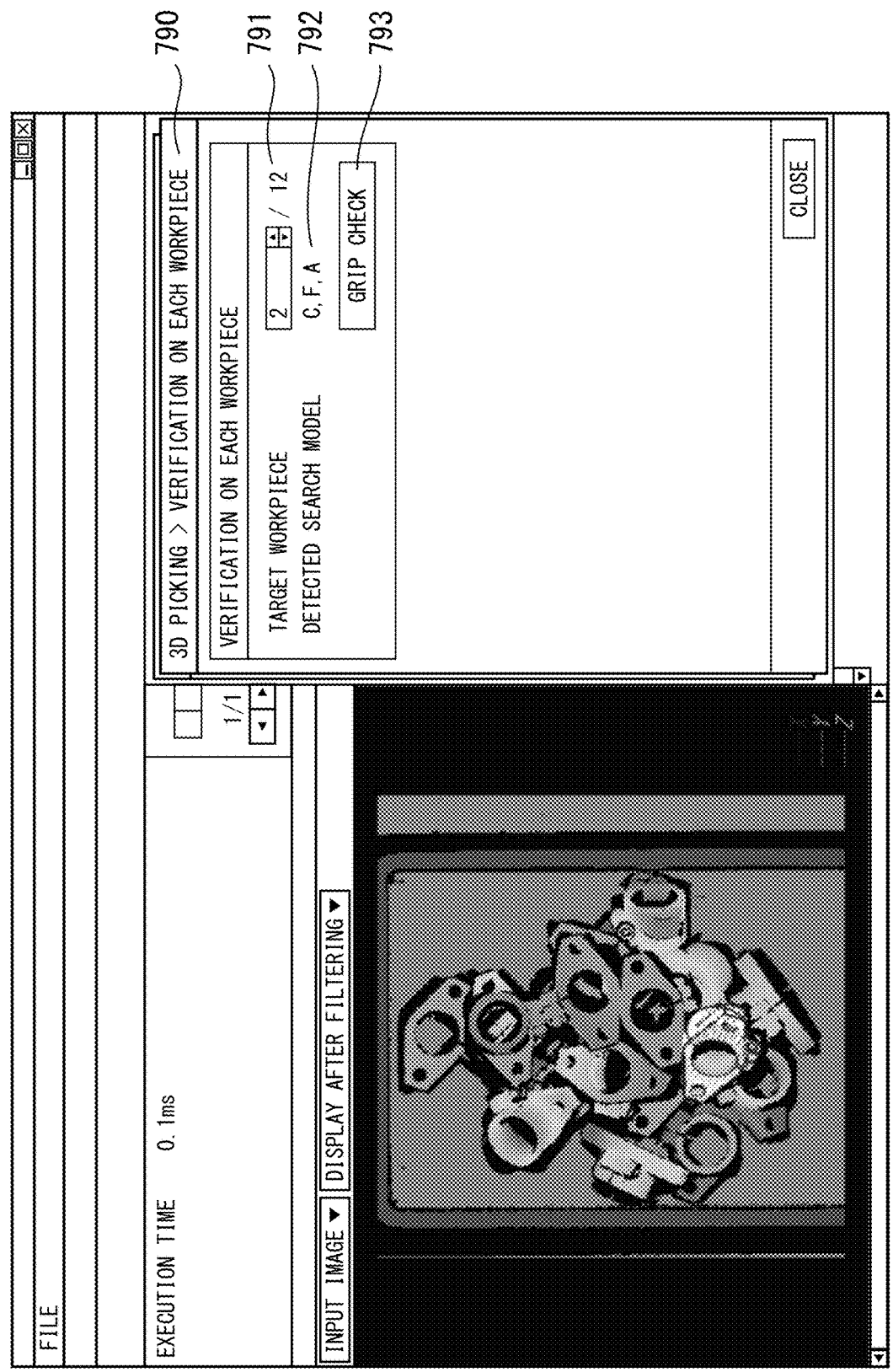
Figure 146:
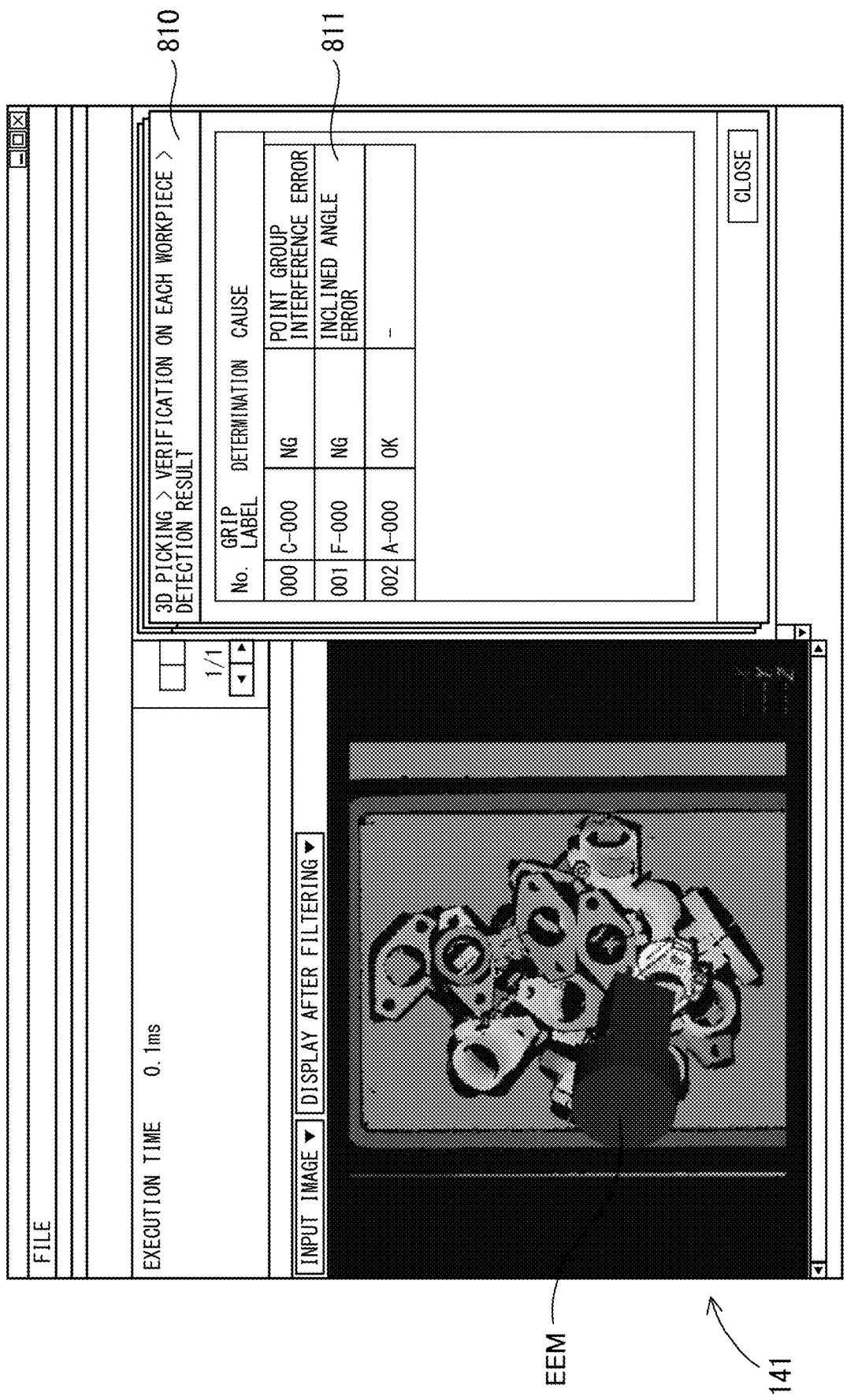
Figure 147:
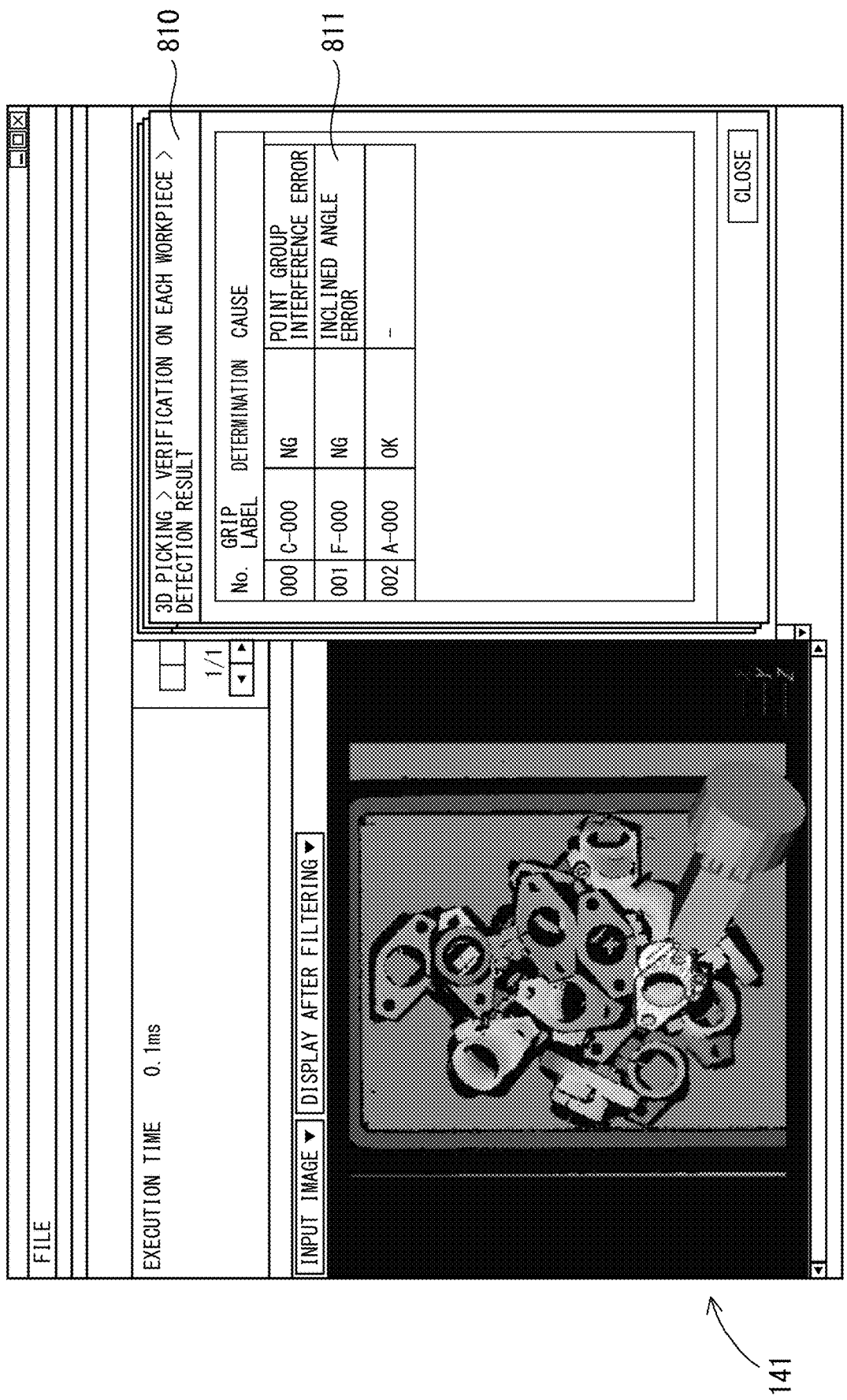
Figure 148:
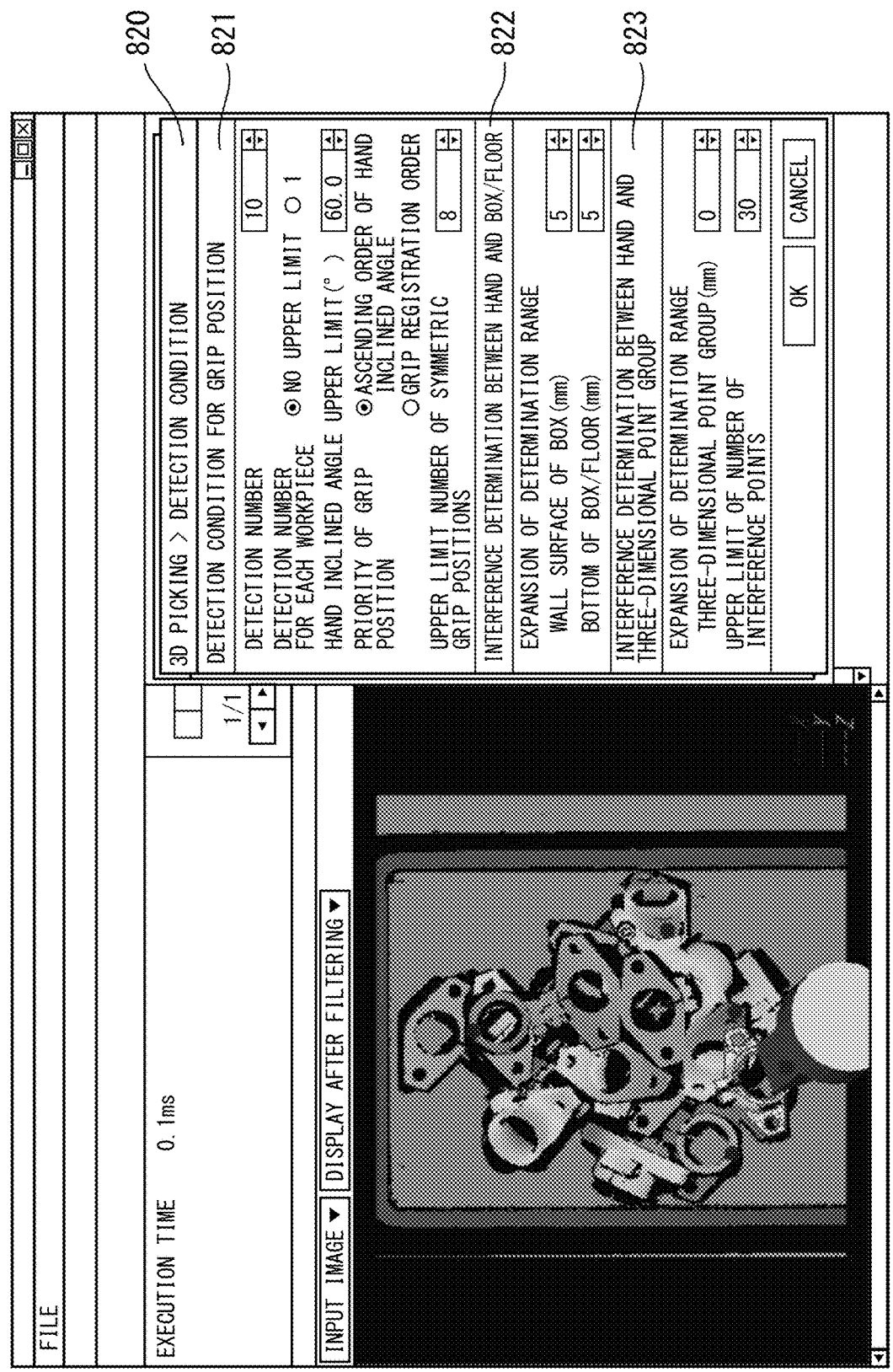
Figure 149:
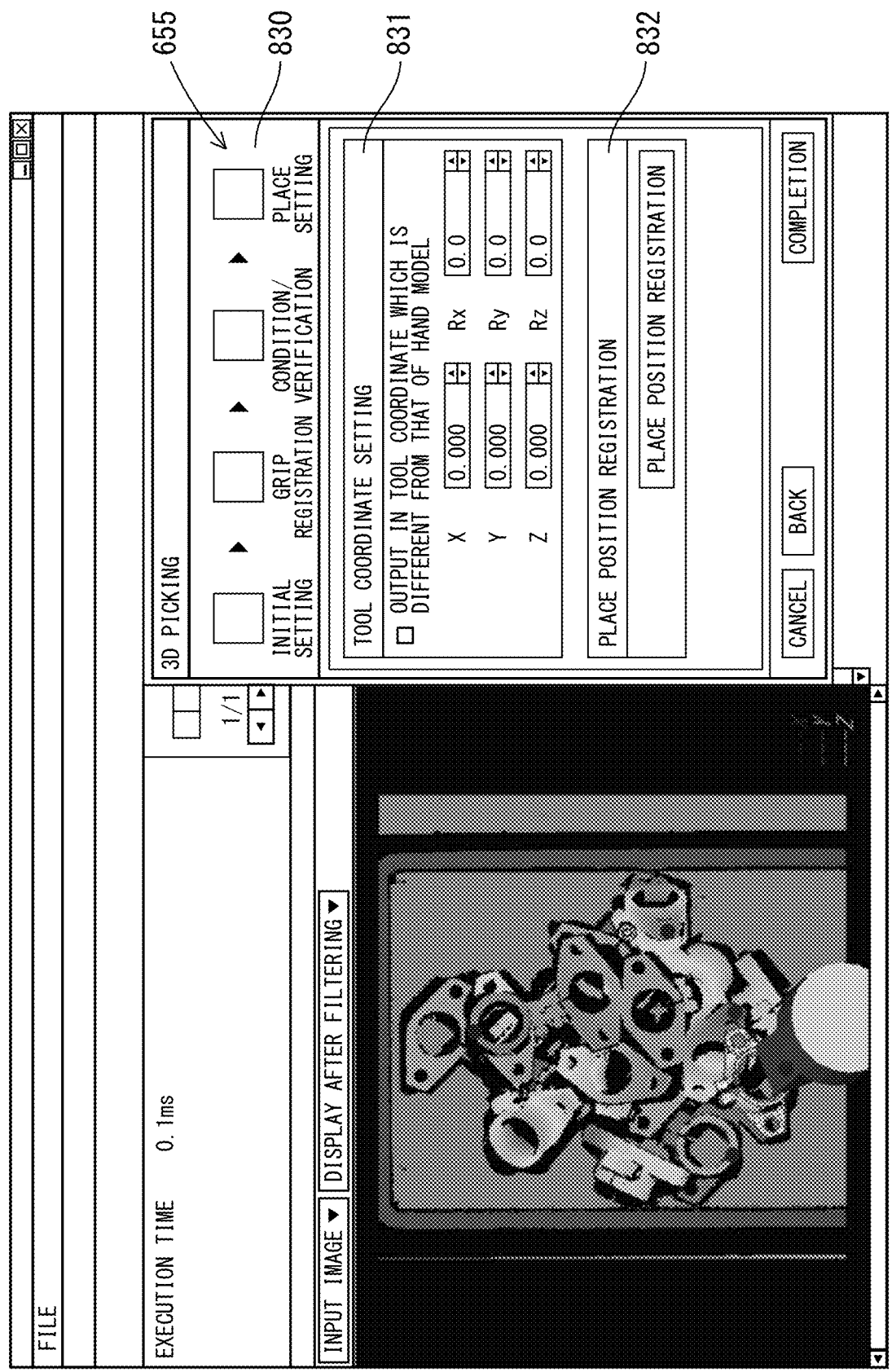
Figure 150:
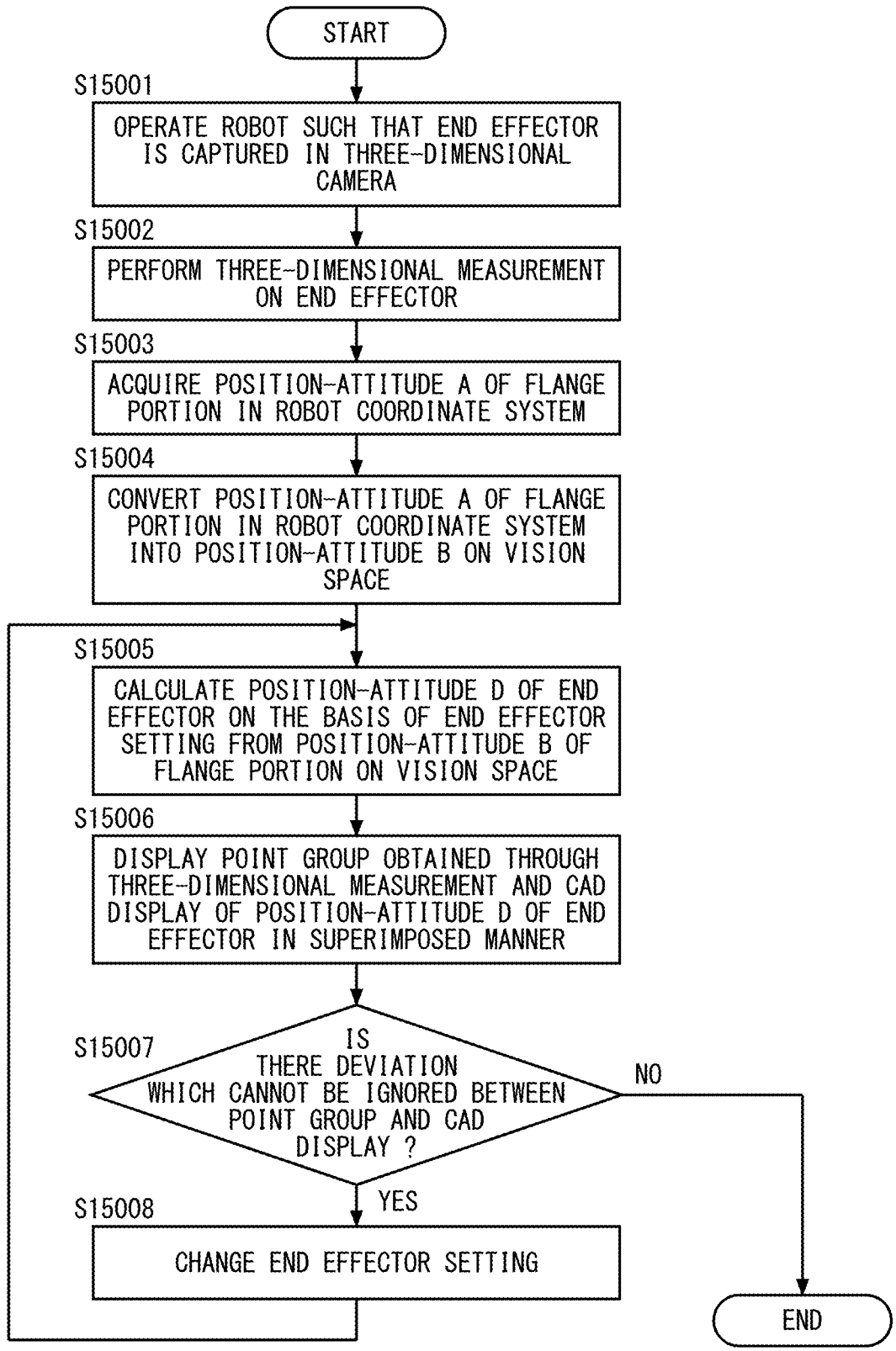
Figure 151:
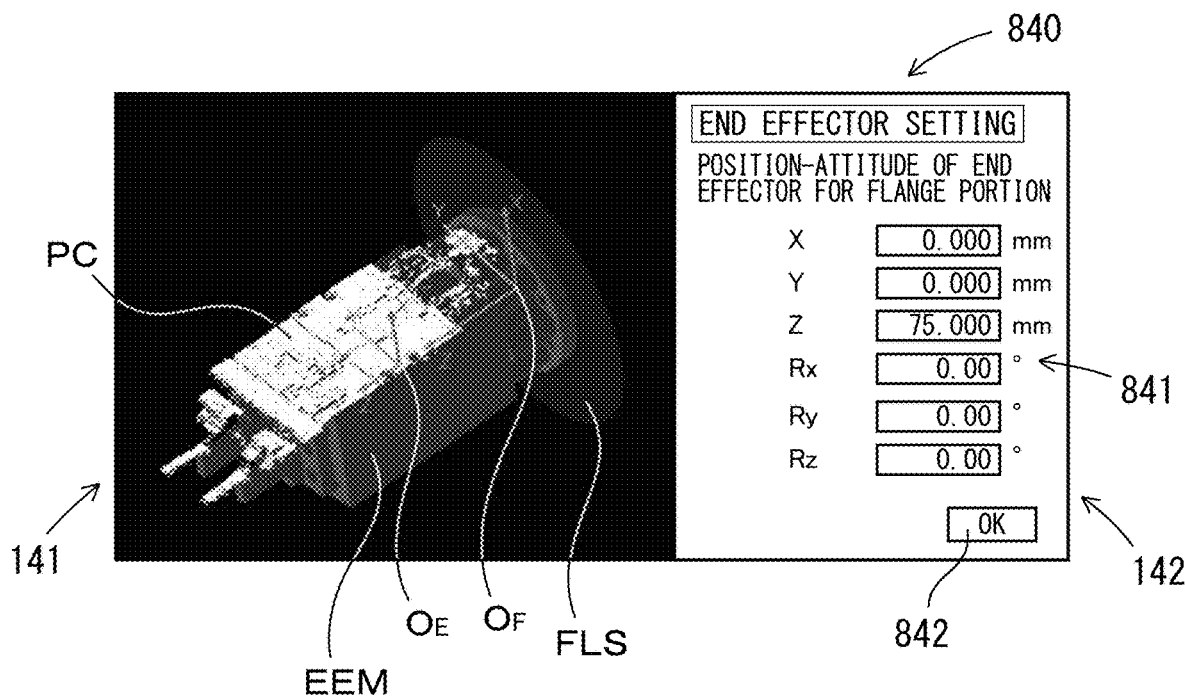
Figure 152:
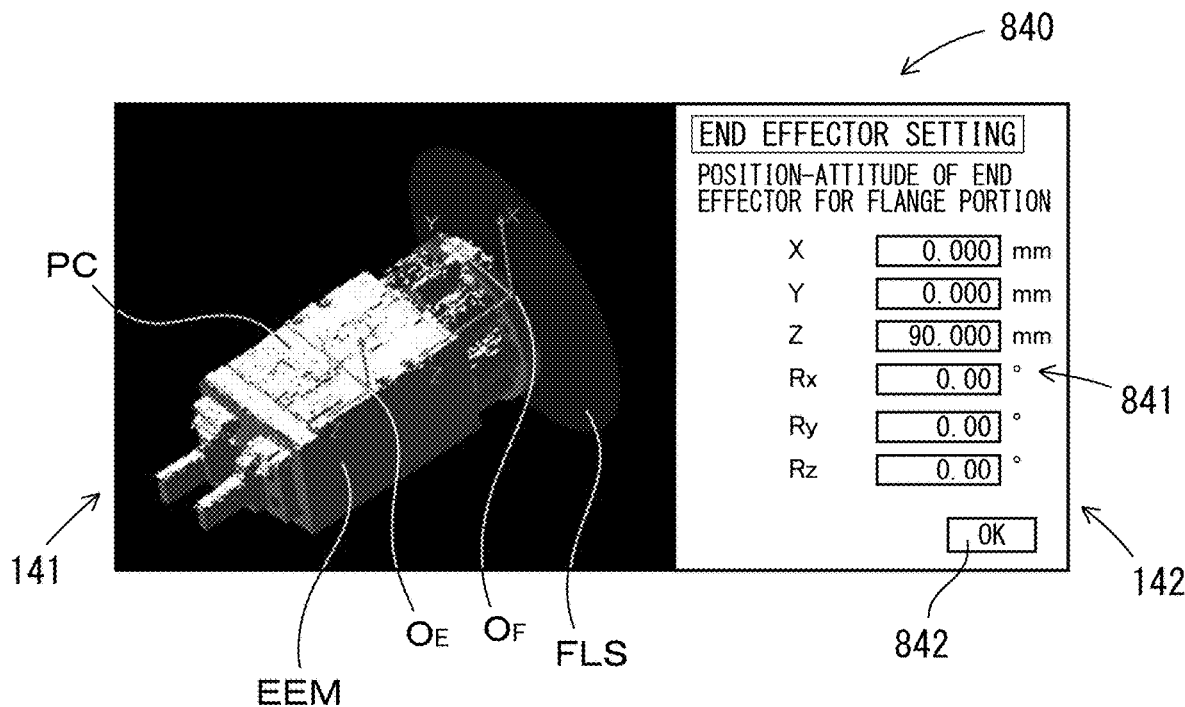
Figure 153:
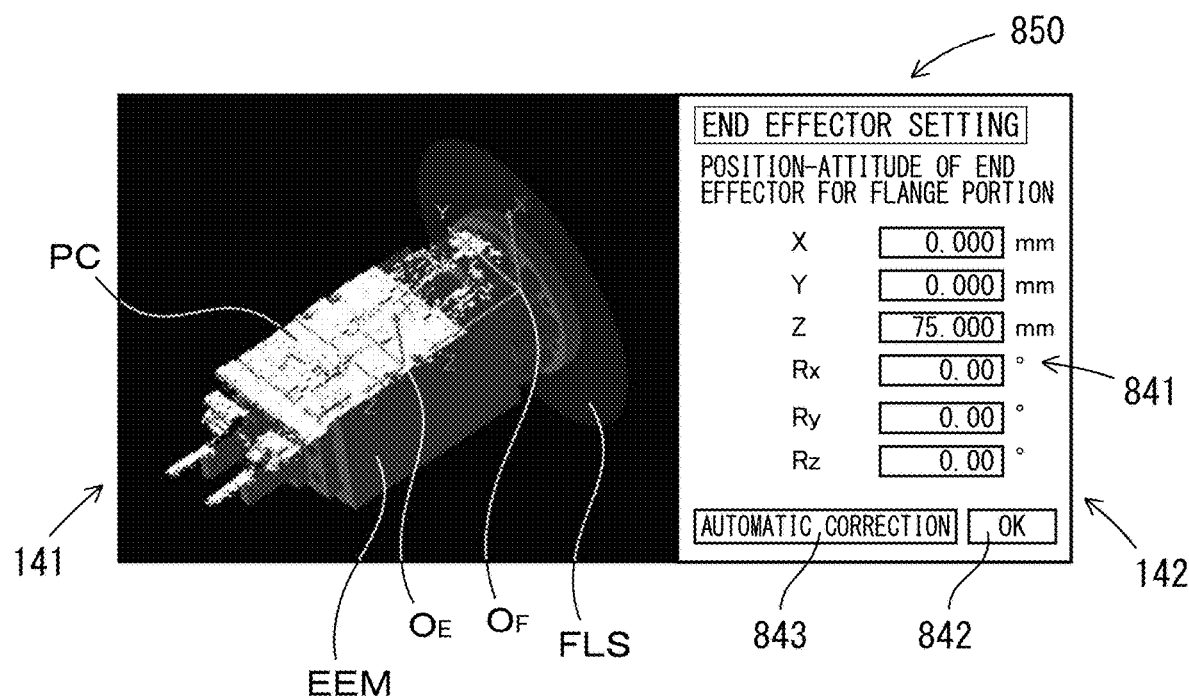

FIG. 118 is an image diagram illustrating an end effector model setting screen;

FIG. 119 is an image diagram illustrating an end effector model editing screen;

FIG. 120 is an image diagram illustrating a part adding screen;

FIG. 121 is an image diagram illustrating a CAD position and attitude setting screen;

FIG. 122 is an image diagram illustrating a CAD position and attitude setting screen;

FIG. 123 is an image diagram illustrating a CAD position and attitude setting screen;

FIG. 124 is an image diagram illustrating an end effector model editing screen;

FIG. 125 is an image diagram illustrating an additional region position and attitude setting screen;

FIG. 126 is an image diagram illustrating an end effector model editing screen;

FIG. 127 is an image diagram illustrating an end effector model editing screen;

FIG. 128 is an image diagram illustrating an end effector model editing screen;

FIG. 129 is an image diagram illustrating an end effector model editing screen;

FIG. 130 is an image diagram illustrating an end effector model editing screen;

FIG. 131 is an image diagram illustrating a grip registration screen;

FIG. 132 is an image diagram illustrating a grip setting dialog;

FIG. 133 is an image diagram illustrating a setting method selection dialog;

FIG. 134 is an image diagram illustrating an X-Y designation screen;

FIG. 135 is an image diagram illustrating a $Z$-$R_Z$ designation screen;

FIG. 136 is an image diagram illustrating a $Z$-$R_Z$ designation screen;

FIG. 137 is an image diagram illustrating a $Z$-$R_Z$ designation screen;

FIG. 138 is an image diagram illustrating an $R_Y$ designation screen;

FIG. 139 is an image diagram illustrating an $R_Y$ designation screen;

FIG. 140 is an image diagram illustrating an $R_X$ designation screen;

FIG. 141 is an image diagram illustrating an $R_X$ designation screen;

FIG. 142 is an image diagram illustrating a grip registration screen;

FIG. 143 is an image diagram illustrating a grip registration screen;

FIG. 144 is an image diagram illustrating a condition verification screen;

FIG. 145 is an image diagram illustrating a verification dialog;

FIG. 146 is an image diagram illustrating a detection result display dialog;

FIG. 147 is an image diagram illustrating a detection result display dialog;

FIG. 148 is an image diagram illustrating a detection condition detail setting screen;

FIG. 149 is an image diagram illustrating a place setting screen;

FIG. 150 is a flowchart illustrating procedures of manually performing deviation correction;

FIG. 151 is an image diagram illustrating an example of a deviation correction screen in a case where there is deviation which cannot be ignored;

FIG. 152 is an image diagram illustrating an example of a deviation correction screen in a case where there is deviation which can be ignored; and FIG. 153 is an image diagram illustrating an example of a deviation correction screen having functions of manually and automatically correcting deviation.

DESCRIPTION OF EMBODIMENTS

Hereinafter, embodiments of the present invention will be described with reference to the drawings. However, the embodiments described below are only examples for embodying the technical spirit of the present invention, and the present invention is not limited to the following embodiments. In the present specification, a member recited in the claims is not specified to a member in the embodiments. Particularly, regarding dimensions, materials, shapes, relative arrangements, and the like of the constituent components described in the embodiments, the scope of the present invention is not intended to be limited thereto unless otherwise specifically stated, and they are only explanation examples. Sizes of members or positional relationships therebetween illustrated in each drawing may be exaggerated for better understanding of description. In the following description, the same name and reference numeral indicate the same or equivalent member, and thus a detailed description thereof will be omitted as appropriate. Each element forming the present invention may have an aspect in which a plurality of elements form the same member, and a single member is used as the plurality of elements, and, on the contrary, a function of a single member may be shared and realized by a plurality of members.

Embodiment 1

Figure 1:
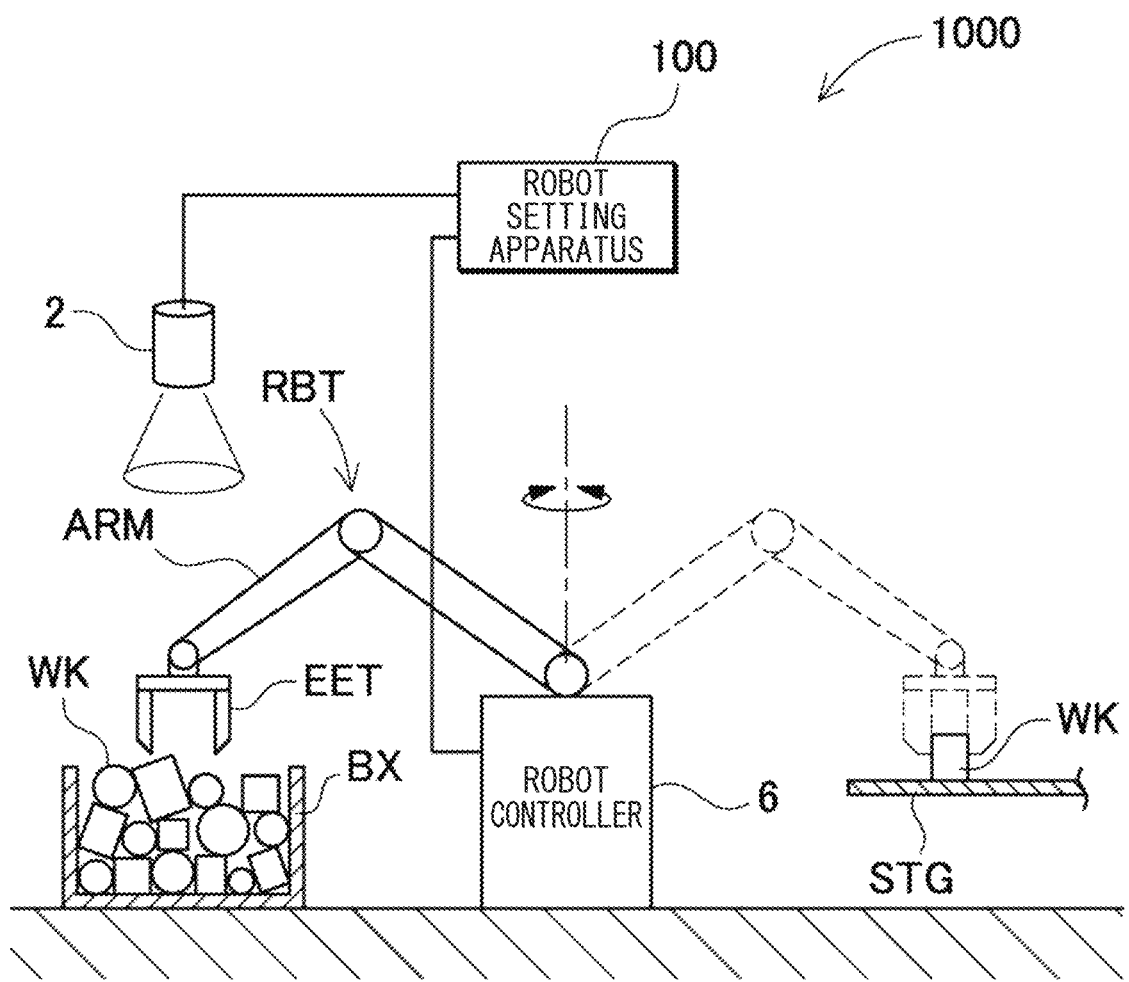
FIG. 1 is a schematic diagram illustrating a state in which a bin picking operation is performed by using a robot system.

FIG. 1 illustrates a configuration example of a robot system 1000 for picking a picking target workpiece as Embodiment 1. In this example, a description will be made of an example of bin picking in which a plurality of workpieces WK stacked in a work space are sequentially taken out by using a robot RBT, and are disposed at a predetermined position. The robot RBT includes an arm portion ARM also referred to as a manipulator, and an end effector EET provided at a tip of the arm portion ARM. The arm portion ARM is provided with a plurality of movable portions, and the end effector EET is moved to a desired position on the basis of an angle formed between two arms or through rotation of an arm fulcrum. The end effector EET can grip or release the workpiece WK.

An operation of the robot RBT is controlled by a robot controller 6. The robot controller 6 controls movement of the arm portion ARM or opening and closing operations of the end effector EET. The robot controller 6 acquires information required for control of the robot RBT from a robot setting apparatus 100. For example, three-dimensional shapes of the workpieces WK which are a plurality of parts randomly put in a storage container BX are acquired by a sensor unit 2 such as a three-dimensional camera or a light, and a calculation unit 10 of the robot setting apparatus 100 detects a position or an attitude of the workpiece, and sends information to the robot controller 6. The robot controller 6 causes the end effector EET provided at the tip of the arm portion ARM of the robot RBT to grip the workpieces WK one by one, and arranges the workpieces WK at a predetermined position on a stage STG, for example, on a conveyer belt.

Figure 2:
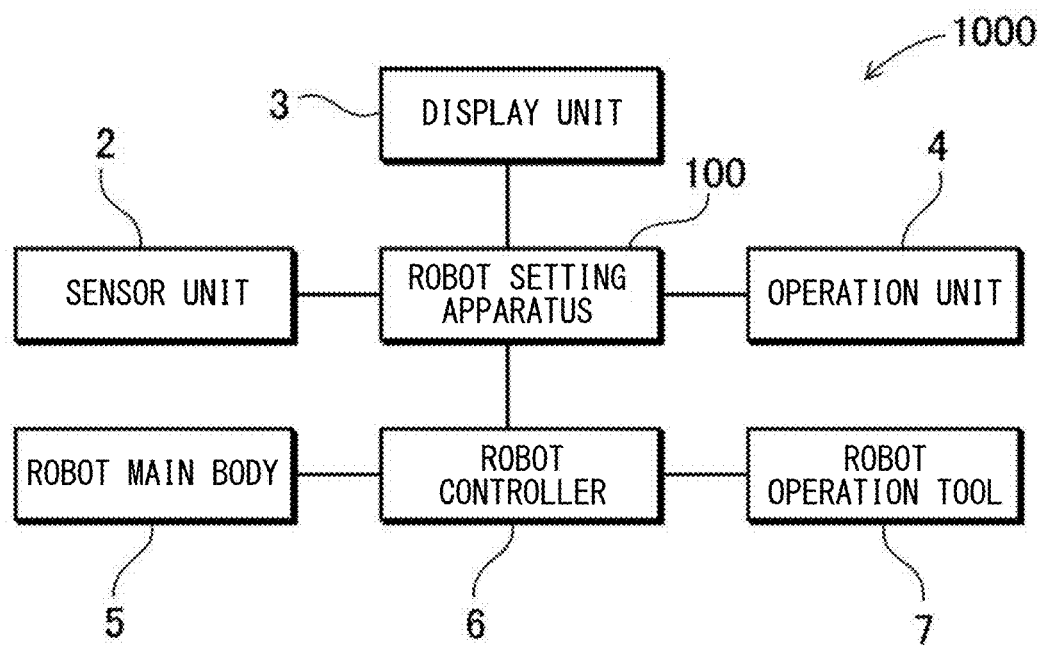
FIG. 2 is a block diagram of the robot system.

FIG. 2 is a functional block diagram of the robot system 1000. The robot system 1000 illustrated in FIG. 2 includes the robot setting apparatus 100, the sensor unit 2, a display unit 3, an operation unit 4, a robot main body 5, the robot controller 6, and a robot operation tool 7.

The operation unit 4 performs setting regarding image processing. The sensor unit 2 acquires a three-dimensional shape obtained by imaging a workpiece. Setting or an operation state is checked by using the display unit 3. The calculation unit 10 performs a three-dimensional search or interference determination, and calculates a grip solution or the like. On the other hand, the robot controller 6 controls the robot according to a result in the calculation unit 10. The robot operation tool 7 sets an operation of the robot. In the example illustrated in FIG. 2, the operation unit 4 and the robot operation tool 7 are separate members, but may be integrated into a single member.

The sensor unit 2 is a member which is called a robot vision, and images a work space or a workpiece. Three-dimensional shape data indicating a three-dimensional shape of each of workpieces loaded in bulk is obtained on the basis of an image captured by the sensor unit 2. Methods of acquiring a three-dimensional shape include a pattern projection method, a stereo method, a lens focusing method, a light section method, an optical radar method, an interference method, a TOF method, and the like. In the present embodiment, a phase shift method in the pattern projection method is used.

Figure 3:
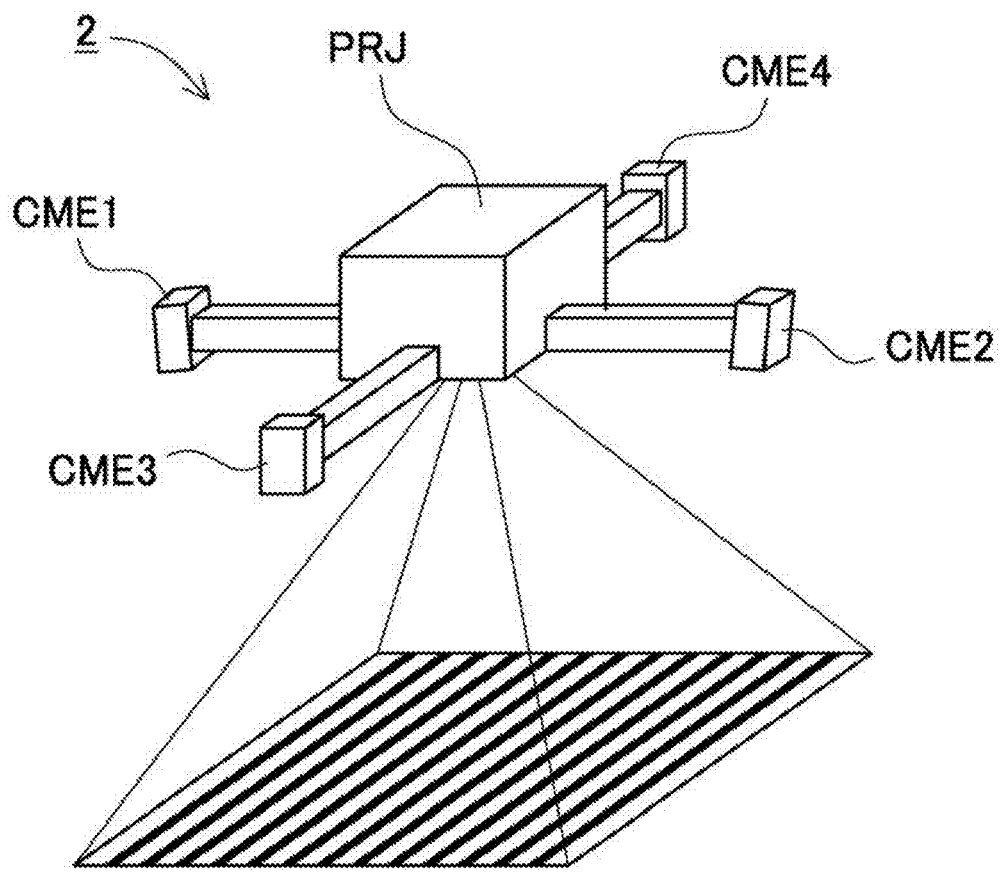
FIG. 3 is a perspective view illustrating an example of a sensor unit.

A configuration of the sensor unit 2 is determined depending on a technique of measuring a three-dimensional shape. The sensor unit 2 includes a camera, a light, or a projector. For example, in a case where a three-dimensional shape of a workpiece is measured according to the phase shift method, the sensor unit 2 includes a projector PRJ, and a plurality of cameras CME1, CME2, CME3 and CME4 as illustrated in FIG. 3. The sensor unit is formed of a plurality of members such as cameras or projectors, and may also be formed by integrating the members with each other. For example, a 3D imaging head having a head shape by integrating cameras or projectors with each other may be used as the sensor unit.

The three-dimensional shape data may be generated on the sensor unit side. In this case, an image processing IC or the like realizing a function of generating three-dimensional shape data is provided on the sensor unit side. Alternatively, there may be a configuration in which three-dimensional shape data is not generated by the robot setting apparatus side, and the robot setting apparatus performs image processing on an image captured by the sensor unit side so as to generate three-dimensional shape data such as a three-dimensional image.

Calibration which will be described later may be performed on the basis of an image captured by the sensor unit 2 such that an actual position coordinate (a coordinate of a movement position of the end effector EET) of the workpiece WK can be linked to a position coordinate on an image displayed on the display unit 3.

The robot setting apparatus 100 performs a three-dimensional search, interference determination, grip solution calculation, and the like on the basis of the three-dimensional shape data of the workpiece obtained in the above-described way. As the robot setting apparatus 100, a general purpose computer in which a dedicated robot setting program is installed, or an image processing controller or a robot vision apparatus specially designed may be used. The example illustrated in FIG. 2 is an example in which the sensor unit 2 or the robot controller 6 is configured separately from the robot setting apparatus 100, but the present invention is not limited to this configuration, and, for example, the sensor unit and the robot setting apparatus may be integrally formed, or the robot controller may be incorporated into the robot setting apparatus. As mentioned above, division of the members illustrated in FIG. 2 is only an example, and a plurality of members may be integrated with each other. For example, the operation unit 4 operating the robot setting apparatus 100 and the robot operation tool 7 operating the robot controller 6 may be integrated into a single member.

However, the sensor unit 2 is provided separately from the robot main body 5. In other words, the present invention is applied to a form called an off-hand type in which the sensor unit 2 is not provided in the arm portion ARM of the robot main body 5. In other words, the present invention does not include a form called an on-hand type in which the sensor unit is provided in the end effector.

The display unit 3 is a member for displaying a three-dimensional shape of a workpiece acquired in the robot setting apparatus 100 or checking various settings or an operation state, and may employ a liquid crystal monitor, an organic EL display, or a CRT. The operation unit 4 is a member for performing various settings such as image processing, and may employ an input device such as a keyboard or a mouse. The display unit 3 is formed of a touch panel, and thus the operation unit and the display unit can be integrally formed.

For example, in a case where the robot setting apparatus 100 is formed of a computer in which a robot setting program is installed, a graphical user interface (GUI) screen of the robot setting program is displayed on the display unit 3. Various settings can be performed on the GUI displayed on the display unit 3, and a processing result such as a simulation result can be displayed. In this case, the display unit 3 may be used as a setting unit for performing various settings.

The robot controller 6 controls an operation of the robot on the basis of information obtained through imaging in the sensor unit 2. The robot operation tool 7 is a member for setting an operation of the robot main body 5, and may employ a pendant or the like.

The robot main body 5 includes the movable arm portion ARM and the end effector EET fixed at the tip of the arm portion ARM. The robot main body 5 is driven by the robot controller 6, picks a single workpiece WK by operating the arm portion ARM, moves the workpiece WK to a desired position, and places and releases the workpiece WK at the position. To do so, the end effector EET gripping the workpiece WK is provided at the tip of the arm portion ARM. A placement position at which the workpiece WK is placed may be, for example, a position on a tray or a position on a conveyer.

As illustrated in FIG. 1, a plurality of workpieces WK are stored in the storage container BX such as a returnable box at random. The sensor unit 2 is disposed over such a work space. The sensor unit 2 includes a camera or a light, and the sensor unit 2 can measure a three-dimensional shape of the workpiece WK. The robot controller 6 specifies a grip target workpiece WK from among the plurality of workpieces on the basis of the three-dimensional shape of the workpiece WK measured by the sensor unit 2, and controls the robot to grip the workpiece WK. The arm portion ARM is operated to be moved to a predefined placement position, for example, a predetermined position on the stage STG, in a state of gripping the workpiece WK, and places the workpiece WK at a predetermined attitude. In other words, the robot controller 6 specifies a picking target workpiece WK with the sensor unit 2, and controls an operation of the robot such that the end effector EET grips the workpiece WK, and places the workpiece WK at a placement position at a predetermined reference attitude, and then the end effector EET is opened.

Figure 4A:
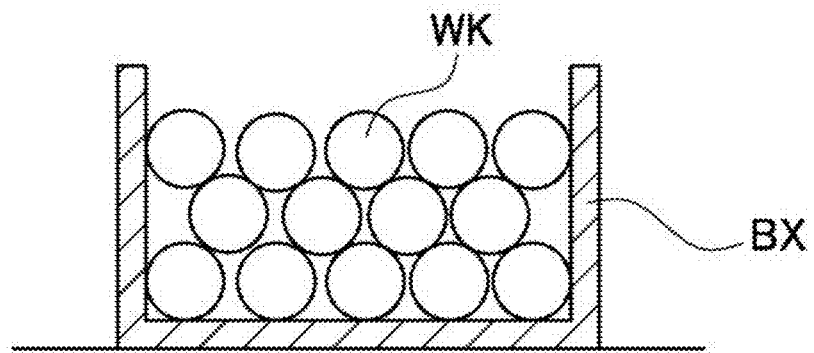
FIG. 4A is a schematic sectional view illustrating an example in which workpieces are put into a storage container and are stacked at random.
Figure 4B:
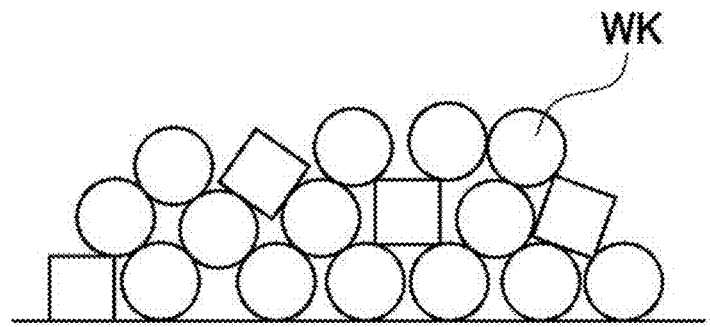
FIG. 4B is a schematic sectional view illustrating an example in which workpieces are stacked on a floor surface.
Figure 4C:
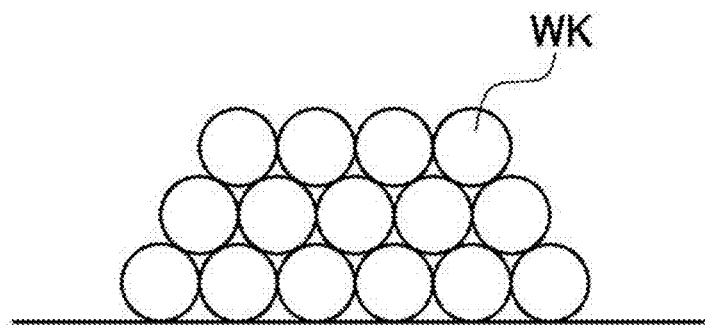
FIG. 4C is a perspective view illustrating a state in which workpieces are arranged on a tray at a predetermined attitude.

Here, in the present specification, the term "bin picking" indicates not only an example in which the workpieces WK put in the storage container BX as illustrated in FIG. 4A and randomly stacked are gripped by the robot and are placed at a predetermined position, but also an example in which the workpieces WK stacked in a predetermined region without using a storage container are gripped and placed as illustrated in FIG. 4B, or an example in which the workpieces WK arranged and stacked at a predetermined attitude are sequentially gripped and placed as illustrated in FIG. 4C. A state in which workpieces are stacked in an overlapping manner is not necessary, and a state in which workpieces are randomly put on a plane without the workpieces overlapping each other is also referred to as a bulk state (this is for the same reason as the reason why even a case where workpieces are sequentially picked and do not overlap each other at the end of picking is still referred to as bin picking).

In the example illustrated in FIG. 1, the sensor unit 2 is fixed over the work space, but may be disposed at any constant position such as an oblique position, a side position, or a lower position as long as the work space can be imaged at the position. However, an aspect is excluded in which the sensor unit is disposed on a movable position which is not fixed such as an upper part of the arm portion ARM. The number of cameras or lights of the sensor unit 2 is not limited to one, and may be plural. Connection between the sensor unit 2 or the robot and the robot controller 6 is not limited to wired connection, and may be wireless connection.

Figure 5A:
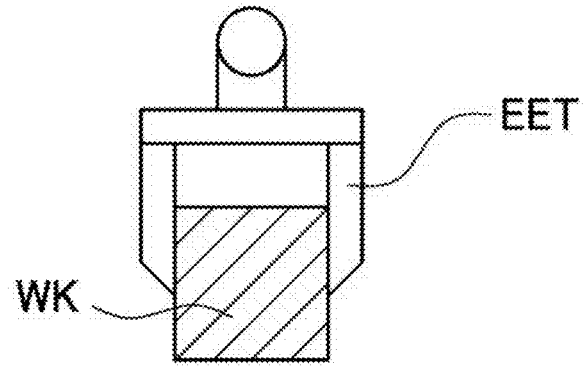
FIG. 5A is a schematic diagram illustrating an example in which a workpiece is gripped by an end effector.
Figure 5B:
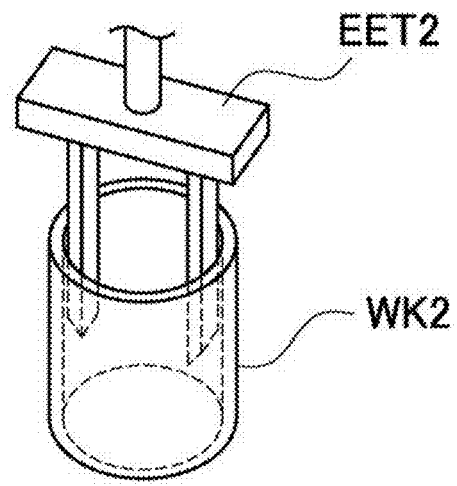
FIG. 5B is a schematic diagram illustrating an example in which a workpiece having a cavity is gripped from an inner surface of the workpiece.
Figure 5C:
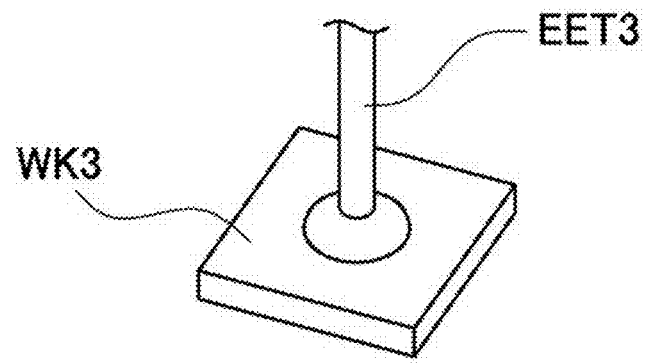
FIG. 5C is a schematic diagram illustrating an example of sucking and gripping a tabular workpiece.

The term "gripping of a workpiece" includes not only an example in which an outer surface of the workpiece WK is clamped as illustrated in FIG. 5A, but also an example in which claws of an end effector EET2 are inserted into the inside of a workpiece WK2 having a cavity and are expanded, and thus the workpiece is held, as illustrated in FIG. 5B, and an example in which a tabular workpiece WK3 is sucked and held by an end effector EET3 as illustrated in FIG. 5C. Hereinafter, a description will be made of an aspect of catching an outer surface of a workpiece from both sides as an example of gripping of the workpiece. Hereinafter, a description will be made of setting of a grip position (teaching work) in a bin picking operation in which, as illustrated in FIG. 1, a plurality of workpieces are stored and stacked at random in the storage container BX, the end effector EET grips the workpieces WK one by one in this state, and repeatedly performs work of placing the workpiece WK at a placement position.

When the robot system 1000 performs the bin picking operation, teaching including setting for performing the bin picking operation is performed in advance. Specifically, a relationship between a part of a workpiece to be gripped and an attitude of the end effector, a grip position, and the like are registered. Such setting is performed by the robot operation tool 7 such as a pendant.

Teaching Work

Figure 6:
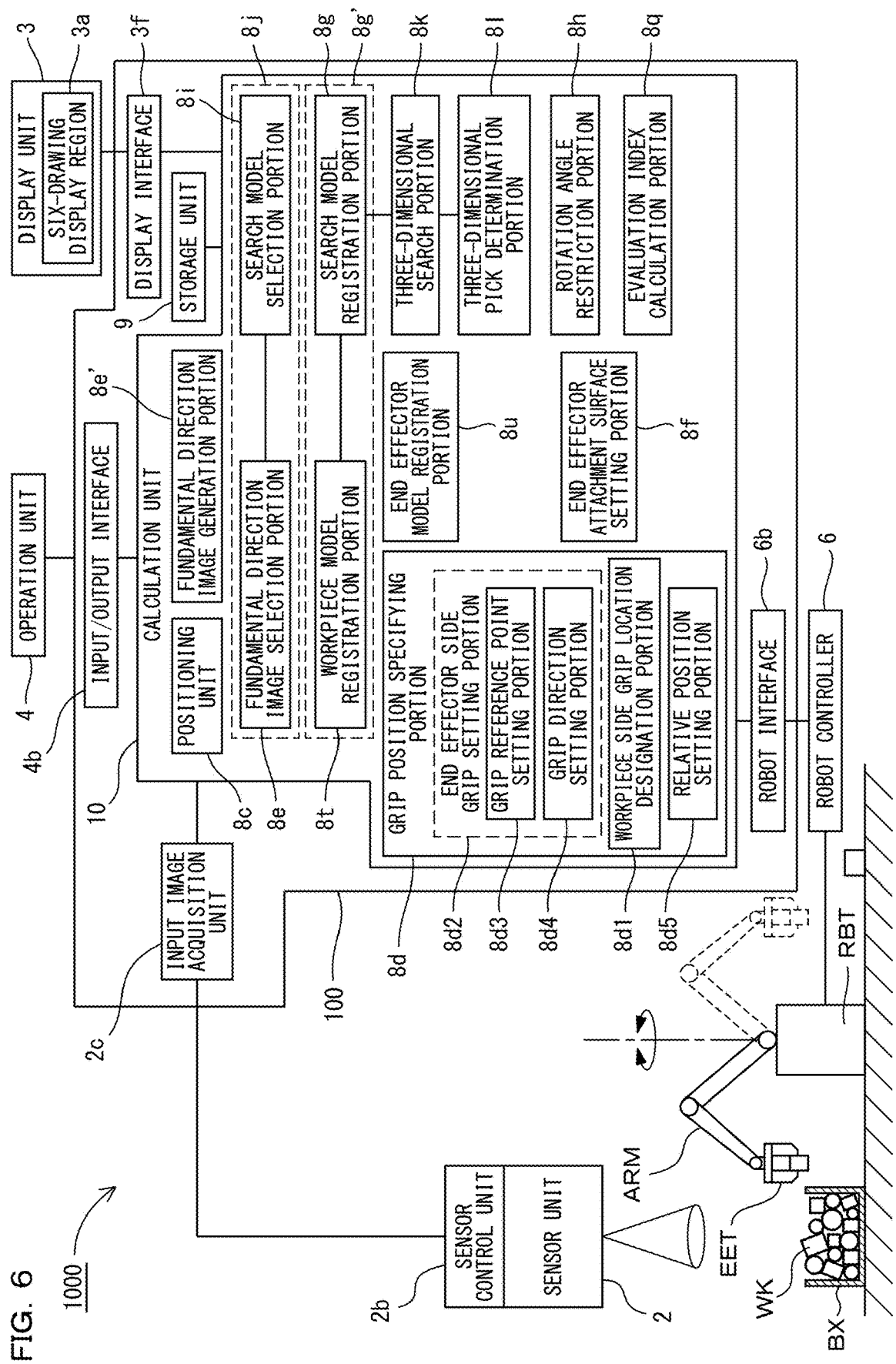
FIG. 6 is a block diagram illustrating a robot system according to Embodiment 1.

FIG. 6 is a functional block diagram of the robot system including the robot setting apparatus realizing a function of teaching the grip position. The robot system 1000 illustrated in FIG. 6 includes the robot setting apparatus 100, the display unit 3, the operation unit 4, the sensor unit 2, and the robot RBT.

The sensor unit 2 three-dimensionally measures a three-dimensional shape of a workpiece disposed at a work position. The sensor unit 2 is controlled by a sensor control unit 2b. In this example, the sensor control unit 2b is integrally formed with the sensor unit 2, but may be provided separately therefrom. The robot includes the arm portion ARM and the end effector EET. The robot is controlled by the robot setting apparatus 100, and grips a workpiece at a grip position. Herein, a state in which a workpiece is gripped at a reference attitude and is placed at the reference attitude is imaged by the sensor unit 2 so as to be registered. Here, the reference attitude includes a position and an attitude of a workpiece.

Display Unit 3

The display unit 3 displays a workpiece model which virtually expresses a three-dimensional shape of a workpiece or an end effector model which virtually expresses a three-dimensional shape of an end effector and is formed of three-dimensional CAD data, in a three-dimensional shape in a virtual three-dimensional space. A height image is an image having height information, and is also referred to as a distance image or the like. The display unit 3 has a six-drawing display region 3a in which a fundamental direction image of a workpiece model is displayed as six drawings. Consequently, each attitude of a workpiece model is displayed in six drawings, grip position setting work can be performed on a fundamental direction image in which a grip position is easily set, and thus it is possible to easily perform grip position setting work which is troublesome in the related art.

The operation unit 4 is a member for performing various settings such as image processing, and may employ an input device such as a keyboard or a mouse. The display unit 3 is formed of a touch panel, and thus the operation unit and the display unit can be integrally formed.

Robot Setting Apparatus 100

The robot setting apparatus 100 in FIG. 6 includes an input image acquisition unit 2c, a storage unit 9, the calculation unit 10, an input/output interface 4b, a display interface 3f, and a robot interface 6b.

The input image acquisition unit 2c acquires an input image including a three-dimensional shape on the basis of an image including a plurality of workpieces and peripheral objects measured by the sensor unit 2. The input image including a three-dimensional shape may be generated on the sensor unit side or the sensor control unit side, or may be generated on the robot setting apparatus side (for example, the input image acquisition unit). In the example illustrated in FIG. 6, an input interface is provided such that the robot setting apparatus 100 acquires an input image exhibiting a three-dimensional shape acquired in the sensor unit 2. However, this configuration is only an example, and an input image which is captured in advance and is held in a storage unit such as a recording medium may be read and acquired.

The storage unit 9 is a member for holding various settings, and may employ a nonvolatile memory, a hard disk, a storage medium, or the like. The storage unit 9 functions as a grip position preservation unit preserving a grip position of a workpiece model or an end effector model.

The input/output interface 4b is connected to an input device such as a keyboard or a mouse, and receives input of data.

The display interface 3f forms an output interface with the display unit, and is controlled to display image data which is generated by the calculation unit 10 and is displayed on the display unit.

The robot interface 6b forms a communication interface with the robot controller 6.

Calculation Unit 10

The calculation unit 10 includes a positioning portion 8c, a fundamental direction image generation portion 8e', a fundamental direction image selection portion 8e, a search model selection portion 8i, a workpiece model registration portion 8t, a search model registration portion 8g, an end effector model registration portion 8u, a grip position specifying portion 8d, an end effector attachment surface setting portion 8f, a rotation angle restriction portion 8h, a three-dimensional search portion 8k, and a three-dimensional pick determination portion 8l.

The positioning portion 8c is a member for adjusting a position and an attitude of a workpiece model displayed on the display unit 3 in a virtual three-dimensional space.

The fundamental direction image generation portion 8e' is a member for generating at least three height images in which the workpiece model positioned in the virtual three-dimensional space by the positioning portion 8c is viewed from respective axis directions of three axes which are orthogonal to each other in the virtual three-dimensional space as fundamental direction images. Since fundamental direction images are automatically generated as mentioned above, and a user is not required to separately acquire fundamental direction images by manually changing a direction of a workpiece, it is possible to obtain an advantage of being capable of achieving labor-saving for grip position registration work.

The fundamental direction image selection portion 8e is a member for selecting one of a plurality of fundamental direction images which are different from fundamental direction images of which viewing ways are different from each other with respect to at least three fundamental direction images displayed on the display unit 3. As mentioned above, a face having the same viewing way is deleted, display or the like of an unnecessary fundamental direction image is excluded, and thus it is possible to further simplify setting work. For example, one of fundamental direction images including a top face and a bottom face of a cylindrical workpiece having the same appearance is deleted. The fundamental direction image selection portion 8e may allow a user to manually select one of at least three fundamental direction images in a state in which the fundamental direction images are displayed on the display unit 3. Alternatively, the fundamental direction image selection portion may automatically extract fundamental direction images of which viewing ways are the same as each other from at least three fundamental direction images, and select one thereof.

The search model selection portion 8i is a member for selecting a fundamental direction image to be registered as a search model. As will be described later, a search model used for a three-dimensional search and a model for specifying a grip position are commonized, and thus the search model selection portion 8i and the fundamental direction image selection portion 8e can be formed as a common image selection portion 8j.

The workpiece model registration portion 8t is a member for registering a workpiece model virtually expressing a three-dimensional shape of a workpiece. Herein, for example, the workpiece model registration portion 8t uses three-dimensional point group data obtained by imaging a real workpiece as a workpiece model. In this case, three-dimensional point group data acquired by the sensor unit 2 or the input image acquisition unit 2c is registered as a workpiece model by the workpiece model registration portion 8t. Alternatively, three-dimensional CAD data indicating a shape of a workpiece which is separately created is read and registered as a workpiece model. In this case, three-dimensional CAD data which is input via the input/output interface 4b is registered as a workpiece model by the workpiece model registration portion 8t. Alternatively, three-dimensional CAD data simulating a workpiece may be created and registered as a workpiece model. In this case, the workpiece model registration portion 8t realizes a function of simple three-dimensional CAD.

Search Model Registration Portion 8g

The search model registration portion 8g is a member for registering a search model virtually expressing a three-dimensional shape of a workpiece and used to perform a three-dimensional search for specifying an attitude and a position of each workpiece with respect to a plurality of workpiece groups included in an input image acquired by the input image acquisition unit 2c. Since the search model registration portion 8g is provided, a search model used to perform a three-dimensional search is registered in common to a fundamental direction image for designating a grip position of a workpiece model, and thus a user can achieve labor-saving for setting work. A grip position of a workpiece is also registered for each fundamental direction image used to search for a workpiece which can be gripped during an actual operation. Therefore, it is possible to prevent a fundamental direction image in which there is no grip position from being wastefully searched, and, conversely, it can be examined whether or not grip is possible at a grip position set in a searched fundamental direction image. Consequently, it is possible to perform a process with high efficiency.

The search model registration portion 8g is preferably configured to select whether or not a fundamental direction image selected by the fundamental direction image selection portion 8e is used as a search model for a three-dimensional search. Consequently, it is possible to select whether or not a fundamental direction image is used as a search model as a three-dimensional search, in other words, an unnecessary fundamental direction image can be excluded from a three-dimensional search target, for example, a fundamental direction image which may be wrongly detected as an image in which a tabular workpiece is viewed from a side surface is excluded. Therefore, a state in which the tabular workpiece is upright can be set not to undergo a three-dimensional search, and thus a restriction on an attitude of a workpiece model can be substantially easily set.

The search model registration portion 8g and the workpiece model registration portion 8t may be separately provided, and may be integrally provided. For example, in the robot system 1000 in FIG. 6, the search model registration portion 8g and the workpiece model registration portion 8t are integrated into a common model registration portion 8g'. Consequently, a model regarding a single workpiece is registered, and can thus be used in common to registration of a grip position and registration of a search model for a three-dimensional search, and thus it is possible to obtain an advantage that setting can be simplified.

The end effector model registration portion 8u is a member for registering an end effector model which is three-dimensional CAD data and virtually expresses a three-dimensional shape of an end effector.

The end effector attachment surface setting portion 8f is a member for displaying an end effector model and an attachment surface used to attach the end effector model to the tip of the arm portion of the robot on the display unit 3, and defining an attitude of the end effector model for the attachment surface in a state in which the attachment surface is displayed on the display unit 3.

The rotation angle restriction portion 8h is a member for setting a range of a rotation angle which is allowed for rotation of each workpiece model for each search model selected by the search model registration portion 8g which registers one of fundamental direction images as a search model for performing a three-dimensional search for specifying an attitude and a position of each workpiece with respect to a plurality of workpiece groups loaded in bulk.

Grip Position Specifying Portion 8d

The grip position specifying portion 8d is a member for specifying a grip position at which a workpiece model is gripped by an end effector with respect to at least one of height images in a state in which at least three fundamental direction images are displayed on the display unit 3, the fundamental direction images being images in which the workpiece model positioned in the virtual three-dimensional space by the positioning portion 8c is viewed from axis directions of three axes which are orthogonal to each other in a virtual three-dimensional space. The grip position specifying portion 8d includes a workpiece side grip location designation portion 8d1, an end effector side grip setting portion 8d2, and a relative position setting portion 8d5.

The workpiece side grip location designation portion 8d1 is a member for designating a grip position at which a workpiece model indicated by a fundamental direction image is gripped by an end effector model with respect to the fundamental direction image in a state in which a plurality of fundamental direction images selected by the fundamental direction image selection portion 8e are displayed on the display unit 3. The workpiece side grip location designation portion 8d1 is configured to register a plurality of grip positions with respect to each of a plurality of fundamental direction images.

End Effector Side Grip Setting Portion 8d2

The end effector side grip setting portion 8d2 is a member for performing setting regarding grip of a workpiece model for an end effector model. The end effector side grip setting portion 8d2 may include a grip reference point setting portion 8d3 and a grip direction setting portion 8d4. The grip reference point setting portion 8d3 defines a grip reference point corresponding to a position where a workpiece model is gripped with respect to an end effector model. On the other hand, the grip direction setting portion 8d4 defines a grip direction in which a workpiece model is gripped by an end effector model. The grip reference point setting portion 8d3 and the grip direction setting portion 8d4 may be integrally formed, and may be separately formed. The grip reference point setting portion 8d3 and the grip direction setting portion 8d4 may use predetermined values set in advance as a grip reference point and a grip direction. For example, the grip reference point is set to the center between claws with a workpiece interposed therebetween, provided at a tip of an end effector model. The grip direction is set to any one of tool coordinate axes for defining an end effector model. For example, if a Z axis direction is used as the grip direction, an operation is performed in which an end effector model is moved along the Z axis direction, that is, a height direction, so as to approach and grip a workpiece model, and thus a user can easily perceive the operation. Alternatively, in the grip reference point setting portion 8d3 or the grip direction setting portion 8d4, a grip reference point or a grip direction may be adjusted by a user.

Relative Position Setting Portion 8d5

The relative position setting portion 8d5 is a member for moving an end effector model displayed on the display unit 3 until the end effector model interferes with a workpiece model, and automatically defining a grip state at an attitude separated from a position reaching the interference position by a predetermined distance. Consequently, it is possible to indicate a grip position by automatically moving and bringing an end effector model into contact with a workpiece instead of a user manually moving and bringing the end effector model into contact with the workpiece, and thus to obtain an advantage that considerable labor-saving can be achieved for work required to be performed by a user side.

Registration of Grip Position

In teaching work, a positional relationship between a workpiece during gripping of the workpiece and an end effector is registered as a grip position. Hereinafter, a description will be made of an example in which a workpiece is gripped by using a hand portion as an end effector as a representative example of grip. During an actual operation of robot picking using a robot vision in a state in which a grip position is registered, each workpiece is detected by the robot vision from a workpiece group in which a plurality of workpieces are loaded in bulk, a grip position of an end effector side is computed with respect to a position or an attitude of the detected workpiece, and the robot is operated to pick the workpiece such that the end effector is located at the computed position. Here, as a method of registering a grip position, there is a method of registering a grip position by actually operating a robot, or a method of registering a grip position by operating an end effector model in a virtual three-dimensional space using a three-dimensional CAD. However, in the method of registering a grip position by actually moving a robot, there is a problem in that time-consuming registration work is required to be performed by actually moving a robot, and a large-scale verification environment is necessary or time is required for trial and error. On the other hand, in the method of registering a grip position by virtually operating a robot on a three-dimensional CAD space, there is an advantage in that a grip position can be registered without an actual robot, but a three-dimensional attitude of a virtual end effector model is required to be accurately aligned with a three-dimensional attitude of a virtual workpiece model, and thus setting such as positioning of three-dimensional coordinates is difficult. This method requires three-dimensional CAD data of a workpiece and an end effector, and thus setting cannot be performed in a state in which three-dimensional CAD data is not available.

Therefore, in the present embodiment, a plurality of height images viewed from respective axis directions of a three-dimensional CAD model are displayed as fundamental direction images, and, a fundamental direction image desired by a user is selected from among the fundamental direction images, a grip position is set for the selected fundamental direction image, and thus grip registration on a virtual three-dimensional space can be easily performed. As a result, when a grip position is registered by operating an end effector model on a virtual three-dimensional space in which a workpiece model of three-dimensional CAD data simulating a workpiece is disposed, grip registration is performed by selecting a fundamental direction image viewed from each axis direction for defining the virtual three-dimensional space, and thus an attitude of the end effector model viewed from a substantially vertical direction can be registered for each fundamental direction image. Therefore, grip setting can be easily performed. According to this method, even in a case where there is no three-dimensional CAD data, data obtained by three-dimensionally measuring a real workpiece can be used as a fundamental direction image. Thus, even in a case where there is no three-dimensional CAD data, grip registration can be easily performed on a virtual three-dimensional space according to the same procedures.

Three-Dimensional Pick Determination Portion 8*l*

The three-dimensional pick determination portion 8*l* is a member for adjusting a relative position between an end effector model and a workpiece model such that a grip direction defined by the grip direction setting portion 8*d*4 is orthogonal to a workpiece plane representing an attitude of the workpiece model displayed in the image display region, and a grip reference point and a grip position are located along the grip direction. Consequently, in a case where a grip state in which a workpiece is gripped by an end effector is simulated, it is possible to obtain an advantage that setting work for a position at which a workpiece model is gripped by an end effector model can be easily performed. Particularly, since a grip direction is orthogonal to a workpiece plane, and a grip reference point and a grip position are located on an axis in the grip direction, an end effector model has only to come close to a workpiece model along the grip direction such that the grip position can be adjusted, and thus it is possible to obtain an advantage that a work burden on a user side is considerably reduced. In the related art, a user performs work for alignment with an attitude of gripping a workpiece with the naked eyes while manually moving an end effector, and is thus considerably troublesome work since the number of parameters is large, and a degree of freedom increases depending on adjustment of a position or an attitude of the end effector. In contrast, a grip reference position and a grip direction are defined on an end effector model side in advance, and the grip direction is set to be orthogonal to a workpiece plane, and a grip reference point of the end effector model and a grip position of a workpiece are set to be located on an axis in the grip direction. Thus, a movement direction of the end effector model is defined, and a user can obtain a grip state by adjusting only a distance between the end effector model and a workpiece model. As a result, considerable labor-saving for fitting work between grip positions of an end effector model and a workpiece model, which is troublesome work in the related art, can be expected.

The three-dimensional pick determination portion 8*l* preferably automatically performs the work of adjusting a relative position between an end effector model and a workpiece model such that a grip direction is orthogonal to a workpiece plane and a grip reference point and a grip position are located on an axis in the grip direction. Consequently, automatic adjustment is performed such that a grip reference position and a grip direction are defined on an end effector model side in advance, and the grip direction is set to be orthogonal to a workpiece plane, and a grip reference point of the end effector model and a grip position of a workpiece are set to be located on an axis in the grip direction. Thus, a movement direction of the end effector model is defined, and a user can obtain a grip state by adjusting only a distance between the end effector model and a workpiece model. As a result, considerable labor-saving for fitting work between grip positions of an end effector model and a workpiece model, which is troublesome work in the related art, can be expected.

However, the present invention is not limited to automatic adjustment in the three-dimensional pick determination portion, and, for example, there may be a configuration in which, when a user manually performs adjustment such that a grip direction is orthogonal to a workpiece plane, and a grip reference point of an end effector model and a grip position of a workpiece are located on an axis in the grip direction in the positioning portion 8*c*, the three-dimensional pick determination portion supports the adjustment work. For example, there may be a configuration in which, in a first stage, in a state in which a workpiece plane and a grip direction are displayed in an image display region, an auxiliary line is displayed to a user such that the workpiece plane and the grip direction are orthogonal to each other, or text or an image including the content that "adjust an end effector model such that the grip direction is orthogonal to the workpiece plane" is displayed to prompt the user to perform adjustment work.

In a second stage, the three-dimensional pick determination portion may prompt the user to perform setting by displaying an extension line of a grip direction in the image display region such that a grip reference point of the end effector model and a grip position of the workpiece are located on an axis in the grip direction, and displaying a message that "adjust the end effector model such that a grip reference point of the end effector model and a grip position of the workpiece are located on the axis in the grip direction".

The three-dimensional pick determination portion 8*l* may realize a fitting function. For example, the three-dimensional pick determination portion 8*l* may move an end effector model along a grip direction until the end effector model interferes with a workpiece model, and may automatically define a grip state at an attitude separated from a position reaching the interference position by a predetermined distance in a state in which a grip direction is orthogonal to a workpiece plane and a grip reference point and a grip position are located on an axis in the grip direction by adjusting a relative position between the end effector model and the workpiece model. Consequently, it is possible to obtain an advantage that automatic adjustment to a position and an attitude at which a workpiece model is gripped by an end effector model can be performed, and thus a work burden on a user side can be further reduced.

Three-Dimensional Search Portion

The three-dimensional search portion is a member for performing a three-dimensional search for specifying an attitude and a position of each workpiece from an input image by using a search model registered by the search model registration portion. Prior to a three-dimensional search, in the search model registration portion, a search model virtually expressing a three-dimensional shape of a workpiece is registered in advance so as to be used to perform a three-dimensional search for specifying an attitude and a position of each workpiece from an input image indicating a state in which a plurality of workpiece groups are loaded in bulk. In this state, the three-dimensional pick determination portion 8*l* determines whether or not the workpiece can be gripped by the end effector at a grip position designated for the workpiece by the workpiece side grip location designation portion on the basis of a search result of the input image searched by the three-dimensional search portion. For example, the input image acquisition unit acquires an input image including a three-dimensional shape of each workpiece from among images of a plurality of workpiece groups measured by the sensor unit, and the three-dimensional search portion performs a three-dimensional search for specifying an attitude and a position of each workpiece from the input image by using a search model registered by the search model registration portion. Consequently, a three-dimensional search can be performed from an input image acquired by actually imaging a workpiece, and thus it is possible to perform grip determination conforming more to the actual circumstances.

Search Model

In bin picking, first, each workpiece is required to be extracted from a plurality of workpiece groups loaded in bulk in order to determine a workpiece which can be gripped. Here, a shape of a search target workpiece is registered as a workpiece model in advance with respect to shapes of a workpiece group having height information obtained by the sensor unit, and a three-dimensional search is performed by using the workpiece model such that a position and an attitude of each workpiece are detected.

Fundamental Direction Image

Figure 7:
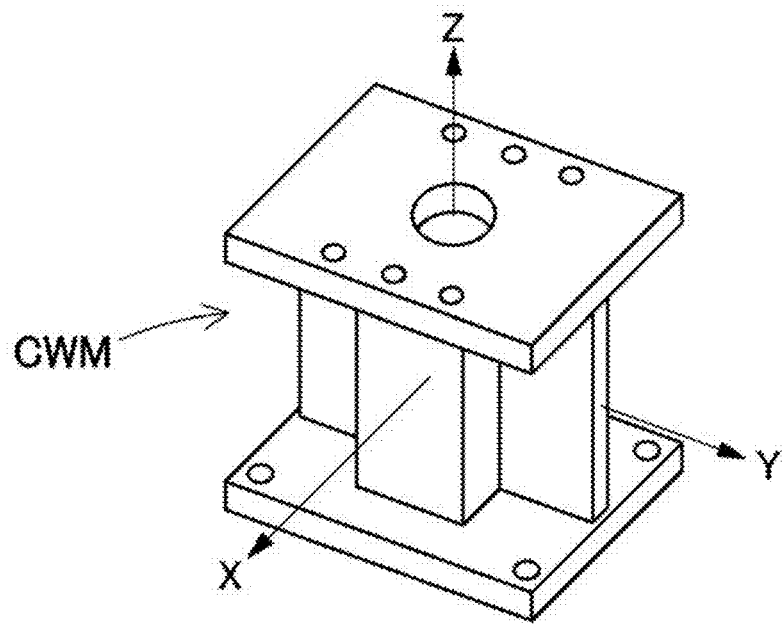
FIG. 7 is a perspective view illustrating a workpiece model built by three-dimensional CAD data.

A search model used to perform a three-dimensional search for a workpiece is created by using a height image in which a workpiece is viewed from a specific direction. A height image used as a search model may use three-dimensional CAD data which is a workpiece model three-dimensionally expressing a workpiece, or actually measured data obtained by actually imaging a workpiece in the sensor unit. Herein, a description will be made of an example in which three-dimensional CAD data is registered as a search model. For example, as illustrated in FIG. 7, a description will be made of a case where a workpiece model CWM built by using three-dimensional CAD data is used as a search model. Six height images, that is, six drawings viewed from positive directions and negative directions of respective axis directions of three axes (for example, an X axis, a Y axis, and a Z axis) which are orthogonal to each other on a virtual three-dimensional space are acquired as fundamental direction images on the basis of the workpiece model CWM. For example, the fundamental direction image generation portion 8*e'* in FIG. 6 generates six fundamental direction images, and displays the fundamental direction images in the six-drawing display region 3*a* of the display unit 3. The six fundamental direction images are automatically calculated to be obtained as "top", "bottom", "left", "right", "front", and "rear" of the workpiece model CWM, that is, a plan view, a bottom view, a left side view, a right side view, a front view, and a rear view, on the basis of the origin (which will be described later in detail) of the workpiece model CWM or faces forming the workpiece model CWM by the fundamental direction image generation portion 8*e'*. Here, the "top" indicates a height image viewed from a positive direction (positive side) of the Z axis, the "bottom" indicates a height image viewed from a negative direction (negative side) of the Z axis, the "left" indicates a height image viewed from a negative direction of the X axis, the "right" indicates a height image viewed from a positive direction of the X axis, the "front" indicates a height image viewed from a negative direction of the Y axis, and the "rear" indicates a height image viewed from a positive direction of the Y axis. However, these are only examples, and different coordinate systems may be used. For example, a straight line of X=Y in an X-Y plane may be set as an axis, and height images viewed from positive and negative directions of respective axes based on coordinate systems orthogonal to the axis may be used. When height images are generated on the basis of three-dimensional CAD data, the height images are not necessarily height images viewed from directions ("top", "bottom", "left", "right", "front", and "rear") orthogonal to an axis of CAD, and, for example, an attitude (viewpoint) of a workpiece model may be arbitrarily changed, and height images from changed viewpoints may be generated.

Origin of Workpiece Model

Here, the origin of a workpiece model is automatically determined by the robot setting apparatus on the basis of coordinate information of three-dimensional CAD data. For example, a virtual cuboid IBX circumscribing the workpiece model CWM is defined as indicated by dashed lines in FIG. 8 with respect to three-dimensional CAD data of the workpiece model CWM in FIG. 7, and the centroid of the virtual cuboid IBX is set as the origin O of the workpiece model.

Fundamental Direction Image Selection Portion 8*e*

Figure 9A:
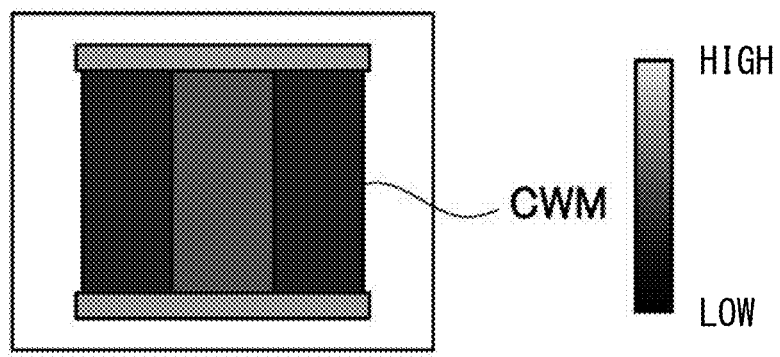
FIG. 9A is a fundamental direction image in which the workpiece model in FIG. 7 is viewed from a positive direction of an X axis.
Figure 9B:
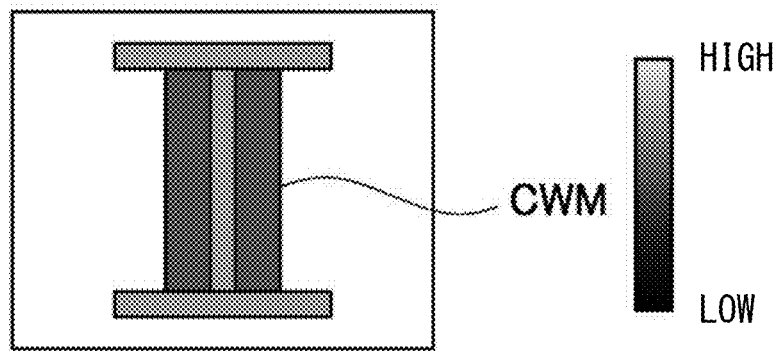
FIG. 9B is a fundamental direction image in which the workpiece model in FIG. 7 is viewed from a positive direction of a Y axis.
Figure 9C:
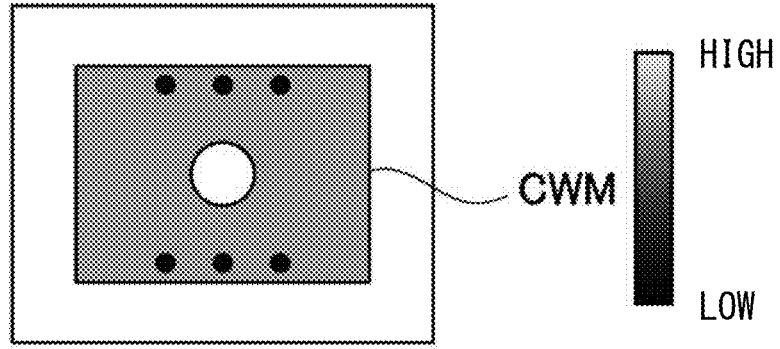
FIG. 9C is a fundamental direction image in which the workpiece model in FIG. 7 is viewed from a positive direction of a Z axis.
Figure 9D:
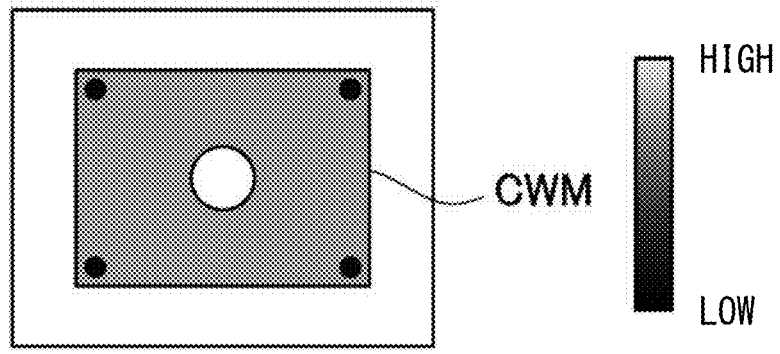
FIG. 9D is a fundamental direction image in which the workpiece model in FIG. 7 is viewed from a negative direction of the Z axis.

The number of fundamental direction images is not necessarily six, and at least a plurality of fundamental direction images may be used. For example, in a case where opposing faces have the same shape like a cuboid, only a fundamental direction image viewed from one face may be used. In other words, a fundamental direction image including the same shape can be excluded, and thus a processing load in a three-dimensional search can be reduced. Such a function of deleting a fundamental direction image of which a viewing way is the same as that of a certain fundamental direction image is realized by the fundamental direction image selection portion 8e. As an example, fundamental direction images acquired on the basis of the workpiece model CWM in FIG. 7 are illustrated in FIGS. 9A to 9D. In these figures, FIG. 9A illustrates a height image in which the workpiece model CWM in FIG. 7 is viewed from the positive direction of the X axis, FIG. 9B illustrates a height image in which the workpiece model CWM is viewed from the positive direction of the Y axis, FIG. 9C illustrates a height image in which the workpiece model CWM is viewed from the positive direction of the Z axis, and FIG. 9D illustrates a height image in which the workpiece model CWM is viewed from the negative direction of the Z axis. Herein, as the height image, a height image is used in which height information is expressed as a luminance value such that a point is brightened as the point becomes higher, and a point is darkened as the point becomes lower.

Here, matching/mismatching between viewing ways is checked by generating six height images viewed from top and bottom (positive and negative directions of the Z axis), front and rear (positive and negative directions of the Y axis), and left and right (positive and negative directions of the X axis) of a workpiece, and checking matching therebetween. Herein, rotation matching is checked at a pitch angle of 90°, and a face having the same viewing way as that of another face is excluded from a search model registration target. In the workpiece model CWM in FIG. 7, a height image viewed from the negative direction of the X axis and a height image viewed from the negative direction of the Y axis respectively have the same viewing ways as those of the height images in FIGS. 9A and 9B, and are thus excluded from search model generation targets. In the above-described way, search models corresponding to the number of faces having different viewing ways are generated. Fundamental direction images obtained by excluding unnecessary height images as mentioned above are displayed in the six-drawing display region 3a. The six-drawing display region is not limited to the name thereof, all of six faces of a workpiece model are not necessarily displayed, and display even in an aspect in which a height image having the same viewing way is excluded as an unnecessary image and five or less faces are displayed is also referred to as display in the six-drawing display region in the present specification.

Search Model Registration Screen 130

Such exclusion may be manually performed by a user, may be automatically performed by the robot setting apparatus side, or may be performed through a combination thereof.

Figure 10:
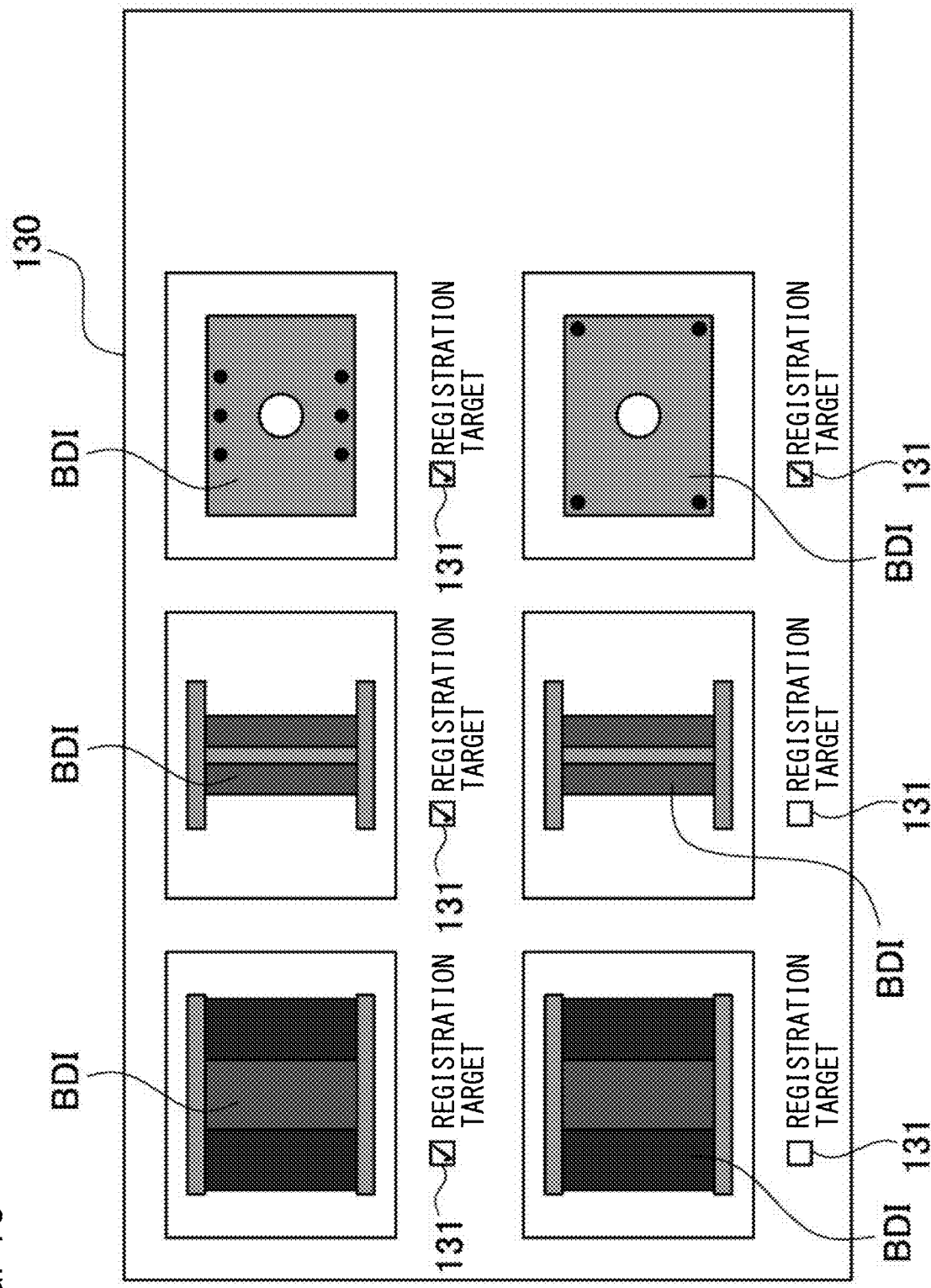
FIG. 10 is an image diagram illustrating a search model registration screen for registering a fundamental direction image as a search model for a three-dimensional search.

For example, on a search model registration screen 130, illustrated in FIG. 10, in which fundamental direction images BDI are registered as search models for a three-dimensional search, the fundamental direction image generation portion 8e' automatically generates the fundamental direction images BDI corresponding to six drawings, and displays the fundamental direction images in the six-drawing display region 3a of the display unit 3. In this case, in a case where there is a common fundamental direction image, a user is prompted to exclude the fundamental direction image from a search model registration target. Herein, a "registration target" checkbox 131 is provided for each of the fundamental direction images BDI which are search model candidates in the search model selection portion 8i which sets whether or not a search model is to be registered.

If a user checks the "registration target" checkbox 131, the fundamental direction image BDI can be registered as a search model, and if the user does not check the "registration target" checkbox 131, the fundamental direction image can be excluded from a search model.

In this case, with respect to a fundamental direction image having the same viewing way, the search model registration screen 130 is displayed to the user in a state in which the "registration target" checkbox 131 is not checked in advance by the fundamental direction image selection portion 8e. In an initial state, the user may check the fundamental direction images BDI to be registered as search models and accurate selection of fundamental direction images to be excluded from search models, and then may approve the selection or may perform correction or replacement as necessary. As mentioned above, since a fundamental direction image to be registered as a search model for a three-dimensional search is selected, and a fundamental direction image candidate to be excluded from registration is presented, in a default manner, labor-saving for search model registration work performed by a user can be achieved.

Actually Measured Data MWM

Figure 11:
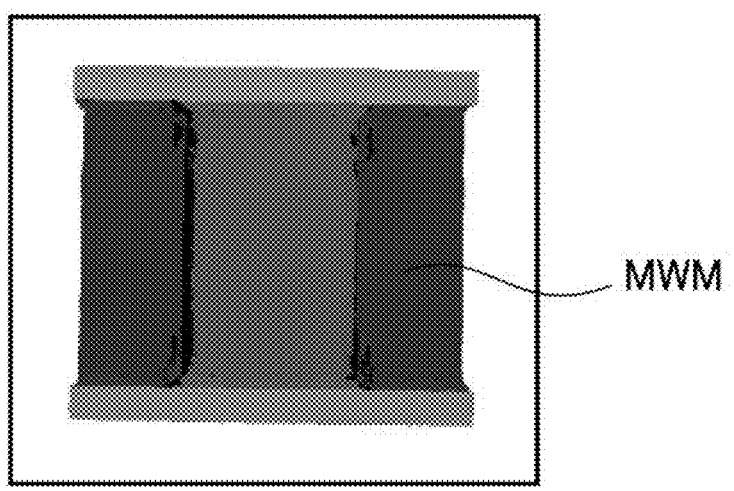
FIG. 11 is an image diagram illustrating actually measured data in which a workpiece corresponding to the workpiece model in FIG. 7 is imaged from the positive direction of the X axis.

A description has been made of an example of using three-dimensional CAD data as a search model for a three-dimensional search. However, as described above, the present invention is not limited to three-dimensional CAD data as a search model, and, for example, three-dimensional data obtained by analyzing a plurality of pieces of two-dimensional CAD data or actually measured data obtained by actually imaging a workpiece in the sensor unit may be used as a search model. As an example, FIG. 11 illustrates actually measured data MWM obtained by imaging a workpiece corresponding to the workpiece model CWM in FIG. 7 from the positive direction of the X axis. As mentioned above, in a case where there is no CAD data of a workpiece, data obtained by three-dimensionally measuring a real workpiece may be used. As illustrated in FIG. 10, pieces of the actually measured data MWM of the number required for a three-dimensional search are registered through imaging.

In a case where a real workpiece is registered, information (for example, a shape of a floor of the workpiece vicinity) regarding a bottom surface on which the workpiece is placed is three-dimensionally measured. Therefore, for example, preferably, unnecessary information regarding the bottom surface is excluded by cutting out only a location of a predetermined height or more from the bottom surface through threshold-value processing. Consequently, only a shape portion required for a three-dimensional search can be registered.

Extraction of Feature Point

Figure 12A:
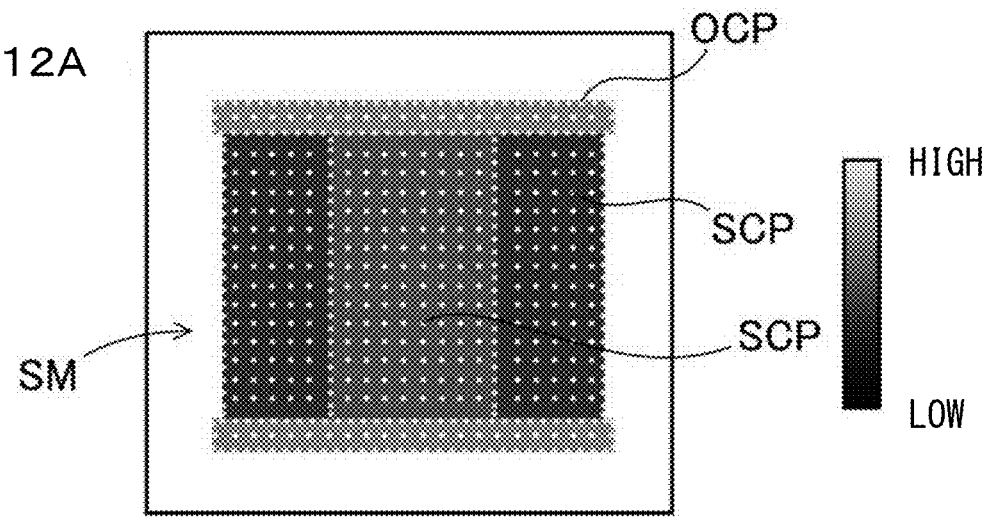
FIG. 12A is an image diagram illustrating a state in which feature points are extracted in the image in FIG. 9A viewed from the X axis direction.
Figure 12B:
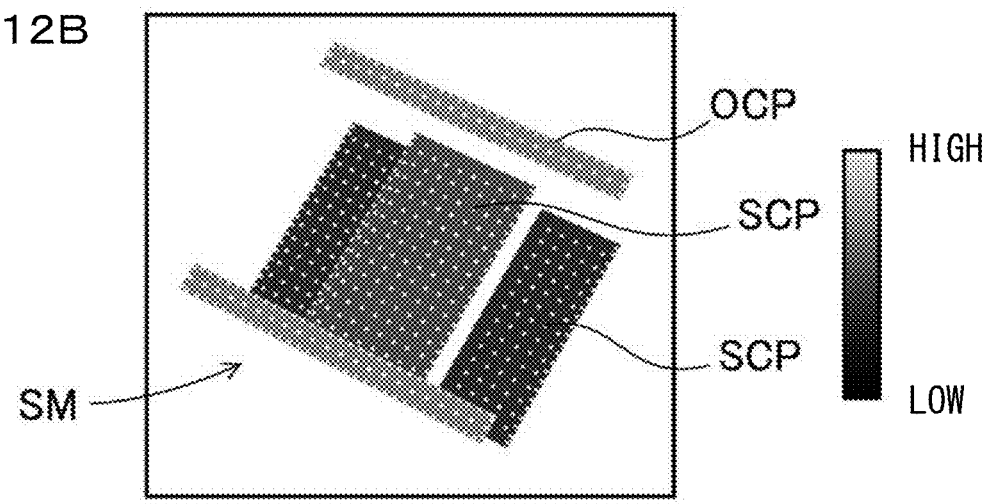
FIG. 12B is an image diagram illustrating a state in which the image in FIG. 12A is displayed in a three-dimensional manner.

Next, a search model of a registered face is generated in a state in which a height image corresponding to each face of a search model target workpiece is registered as mentioned above. Herein, a feature point required for a three-dimensional search is extracted for each registered face. Herein, a description will be made of an example in which two types of feature points such as a feature point (a feature point on a contour) representing a contour of a shape and a feature point (a feature point on a surface) representing a surface shape are used as the feature point. FIG. 12A illustrates a state in which two types of feature points are extracted with respect to a search model SM of a height image (corresponding to FIG. 9A) viewed from the X axis direction. FIG. 12B illustrates a state in which the search model SM is displayed in a perspective view. Here, feature points SCP on the surface and feature points OCP on the contour are preferably displayed in different display aspects.

For example, the feature points SCP on the surface are displayed white, and the feature points OCP on the contour are displayed light blue. Alternatively, other colors may be used, and, for example, the feature points on the contour may be displayed violet so as to be further differentiated from the feature points on the surface displayed white. Since the feature points are displayed in different colors as mentioned above, a user can easily visually differentiate implications of the respective feature points from each other.

The feature points SCP on the surface are extracted from a surface of a workpiece model at a predetermined interval. On the other hand, regarding the feature points OCP on the contour, for example, an edge of a location or the like of which a height changes is extracted, and a location further having undergone a thinning process is extracted as a feature point at a predetermined interval. As mentioned above, each feature point indicates a three-dimensional shape of a face.

Three-Dimensional Search Method

Figure 13A:
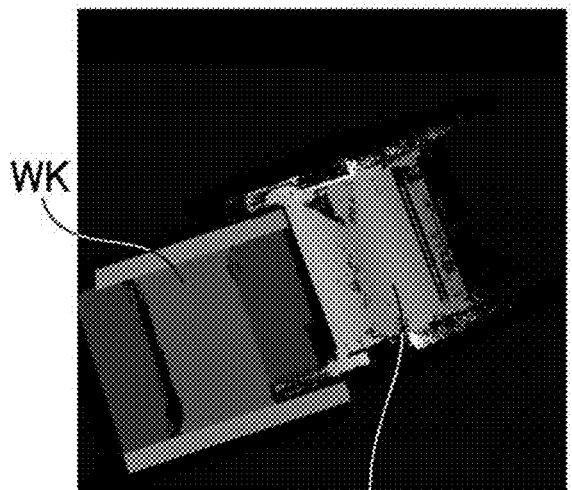
FIG. 13A is an image diagram illustrating an input image in which a workpiece group is displayed in a two-dimensional manner.
Figure 13B:
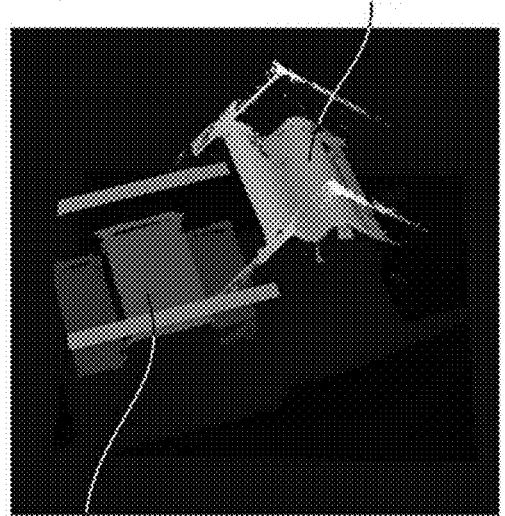
FIG. 13B is an image diagram illustrating an input image in which the image in FIG. 13A is displayed in a three-dimensional manner.

A three-dimensional search is performed by using the search model as a result of extracting the feature points. Here, a description will be made of a method of performing a three-dimensional search for extracting each workpiece in a state in which three-dimensional shapes are acquired by imaging a workpiece group in which a plurality of workpieces are loaded in bulk as illustrated in FIG. 13A or 13B as an input image. First, positions and attitudes (X, Y, Z, $R_X$, $R_Y$, and $R_Z$) in a state of each feature point of the search model most matching are searched from the input image. Here, $R_X$, $R_Y$, and $R_Z$ respectively indicate a rotation angle about the X axis, a rotation angle about the Y axis, and a rotation angle about the Z axis. Various expression methods for rotation angles are provided, but, herein, a Z-Y-X system Euler's angle is used (details thereof will be described later). The number of each of matching positions and attitudes is not necessarily one for each search model, and a plurality of matching positions and attitudes of a predetermined extent or higher may be detected.

Figure 13C:
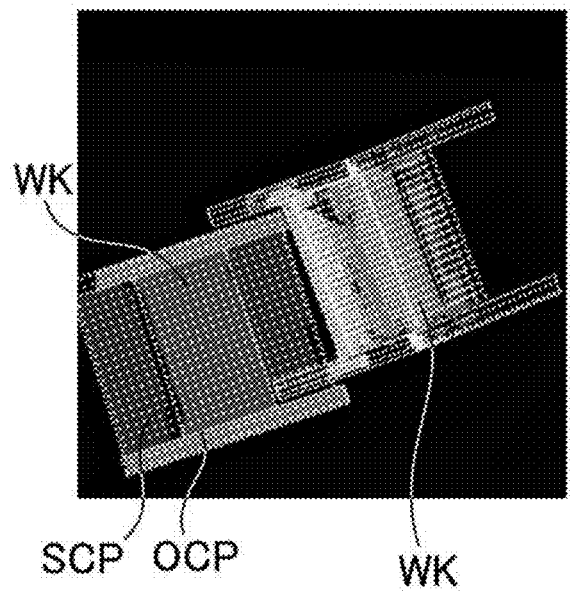
FIG. 13C is an image diagram illustrating a state in which a three-dimensional search is performed on the image in FIG. 13A.
Figure 13D:
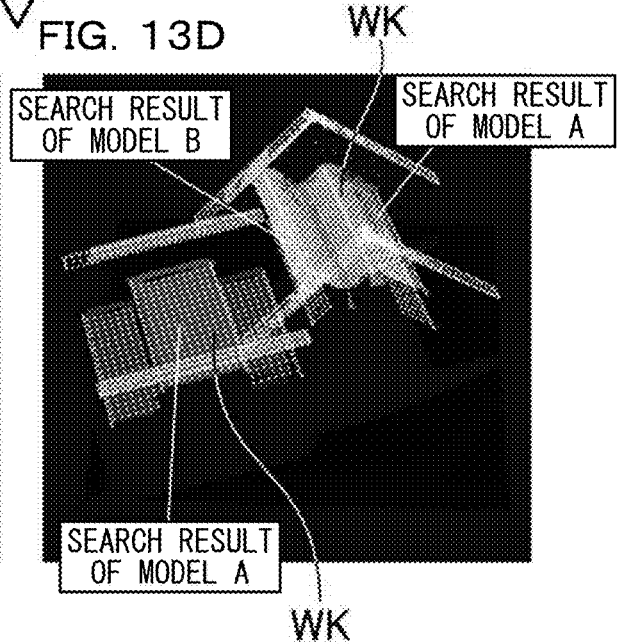
FIG. 13D is an image diagram illustrating a state in which the image in FIG. 13C is displayed in a three-dimensional manner.

Herein, a three-dimensional search is performed on as a workpiece group which is displayed in a two-dimensional manner as in FIG. 13A or a workpiece group which is displayed in a three-dimensional manner as in FIG. 13B in the input image, and the entire input image is searched. Thus, a searched image in which the workpiece group is displayed in a two-dimensional manner as in FIG. 13C or displayed in a three-dimensional manner as in FIG. 13D is obtained as a three-dimensional search result. As illustrated in FIGS. 13C and 13D, it can be seen that the feature points of the search model are searched for from the input image, and a workpiece corresponding to the search model is detected. FIG. 13D illustrates a state in which search results of a search model A and a search model B are obtained. The search model A and the search model B correspond to search models A and B displayed in a search model selection field in FIG. 14 which will be described later. For the right workpiece WK in FIG. 13D, two search results of the search models A and B are obtained with the same workpiece. If grip is possible at a grip position registered in each search model, a plurality of grip positions are obtained in this workpiece.

An image in which a workpiece is viewed for each face as in six drawings is used as a search model used for a three-dimensional search, and thus it is possible to obtain an advantage that a calculation process of the three-dimensional search can be simplified compared with a case of using a perspective view or the like, and thus a process can be performed at a high speed with a reduced load. A state displayed in search model registration work is easily viewed, and can thus be easily visually recognized by a user.

Evaluation Index of Three-Dimensional Search Result

An evaluation index of a three-dimensional search result may be set. For example, in the example illustrated in FIG. 13C or 13D, a three-dimensional search result is scored on the basis of to what degree corresponding feature points are present in an input image (for example, on the basis of a proportion of the number of feature points corresponding to an error of a predetermined distance or less with respect to a search result, or a value obtained by subtracting an error amount of a feature point as a penalty according to a defined computation formula). In this method, a score lowers in a state in which there is a lot of invalid data (invalid pixel) which cannot be three-dimensionally measured. As mentioned above, a score may be used as an index indicating the reliability of a three-dimensional search result. For example, workpieces are set to be preferentially gripped in an order of higher scores. There is a high probability that a three-dimensional search result of a predetermined score or less is determined as being wrongly detected, and thus a workpiece may be set to be excluded from a grip target. For example, in the robot setting apparatus 100 in FIG. 6, an evaluation index calculation portion 8q is provided in the calculation unit 10 so as to calculate an evaluation index for a search result on the basis of a predetermined criterion. Consequently, priority may be set in order from a search result with a high evaluation index, and a workpiece may be set to be gripped according to the priority. For example, a workpiece having the highest position in the Z direction may be set to be preferentially gripped among results of a predetermined score or higher. As a workpiece is located at a higher position in the Z direction, the workpiece hardly interferes with other workpieces. Thus, a workpiece located at a high position in the Z direction is set to be preferentially gripped, and thus it is possible to obtain an advantage that a processing load of interference determination can be reduced.

In the above-described way, each workpiece is detected from a workpiece group loaded in bulk, and thus a grip target workpiece can be recognized by the robot setting apparatus side. Next, in order to grip a workpiece with an end effector, it is necessary to recognize a grip position and a grip attitude of each workpiece. Thus, a grip position of a workpiece is registered. In the present specification, registration of a "grip position" and a "grip attitude" indicates registration of a position where a workpiece is gripped and an attitude at that time. As a grip position of a workpiece, one or more locations may be registered for the workpiece. Registration of a grip position is preferably performed in the face unit of a workpiece in terms of easiness of grip registration work or recognition of a grip position. In other words, an attitude of a workpiece is defined to be an attitude with a specific face as a surface, and then a grip position is registered.

Grip Registration Screen 140

Figure 14:
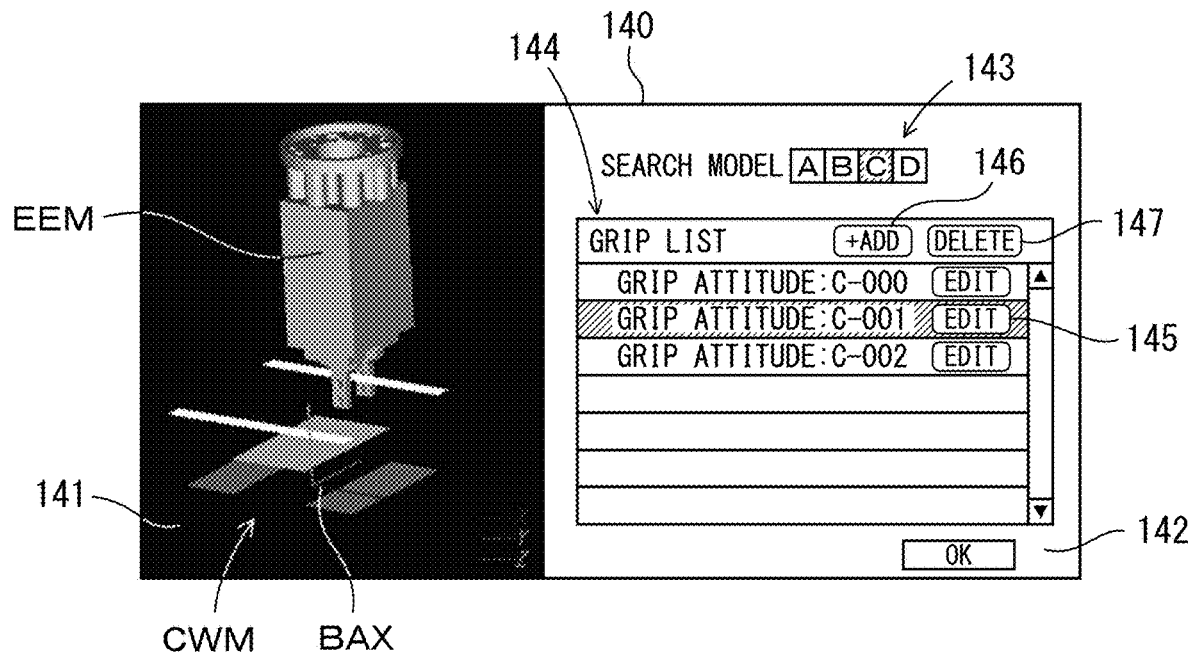
FIG. 14 is an image diagram of a user interface screen indicating a grip registration screen.
Figure 15:
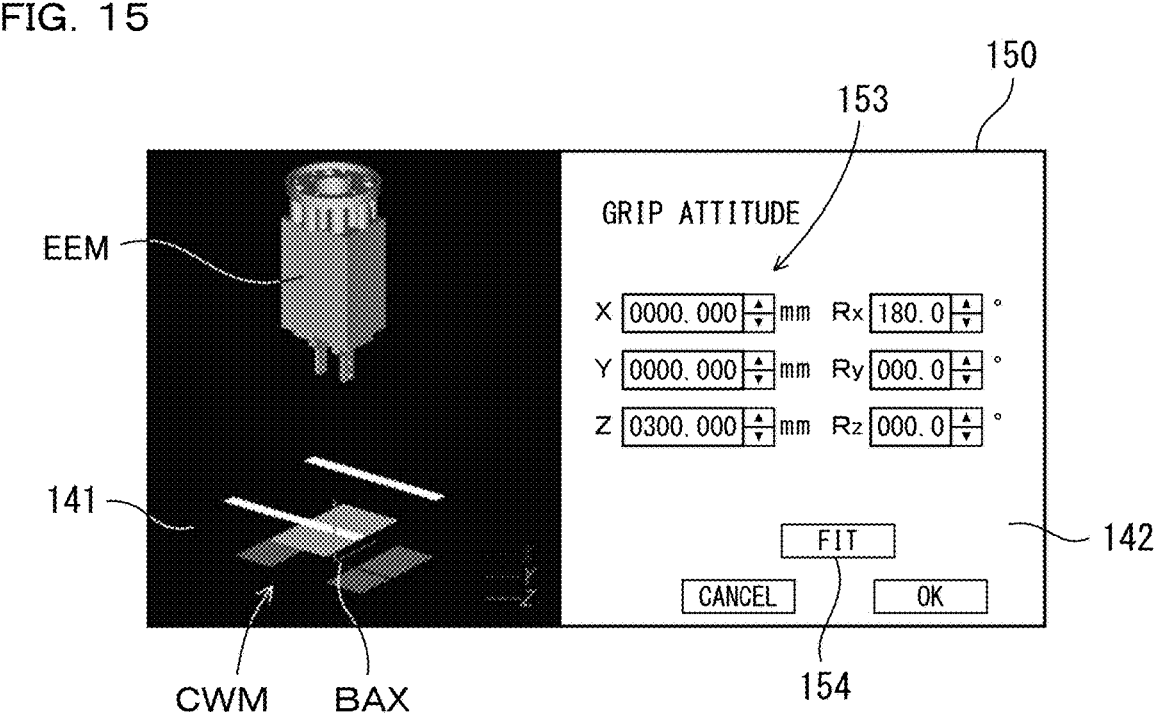
FIG. 15 is an image diagram illustrating a grip attitude adding screen.

Here, FIGS. 14 and 15 illustrate examples of a user interface screens on which grip registration of registering a grip position at which an end effector model grips a workpiece model is performed. A face of a workpiece model to be registered is designated, and a grip attitude is registered for each face, on a grip registration screen 140. The example illustrated in FIG. 14 is an example of a user interface screen on which four types of faces (respective faces of a search model) are designated, and a grip attitude is registered. Herein, a search model "C" is selected from among search models A to D, and three grip attitudes are displayed for the search model C.

In the grip registration screen 140 in FIG. 14, an image display field 141 for displaying an image is provided on the left part, and an operation field 142 for performing various operations is provided on the right part. The workpiece model CWM and an end effector model EEM are displayed in the image display field 141. A viewpoint can be changed by dragging the screen of the image display field 141. As mentioned above, the positioning portion 8c has a function of adjusting a position or an attitude of a workpiece model displayed in a display region on a virtual three-dimensional space. A display aspect in the image display field 141 may be switched to two-dimensional display or three-dimensional display. In order to easily recognize the current display aspect, a three-dimensional reference coordinate axis BAX is displayed in the image display field 141 in an overlapping manner. In the example illustrated in FIG. 14, a grip attitude registered in a grip attitude 001 selected in the operation field 142, that is, a state in which a part of the workpiece model CWM is gripped by the end effector model EEM is displayed in the image display field 141. In this example, the entire end effector model EEM is displayed, but the entire end effector model is not necessarily displayed during grip registration, and at least a part gripping the workpiece model CWM, for example, claws may be displayed.

The operation field 142 is provided with a search model selection field 143 for selecting a search model, and a grip attitude display field 144 displaying a grip attitude registered for a search model selected in the search model selection field 143. If a grip attitude is selected from among grip attitudes displayed in a list form in the search model selection field 143, a registered grip attitude corresponding thereto is displayed in the image display field 141. If an editing button 145 is pressed, the registered grip attitude can be corrected. The operation field 142 is further provided with an add button 146 for adding a grip attitude or a delete button 147 for deleting a registered grip attitude. If the delete button 147 is pressed, a selected grip attitude is deleted.

Grip Attitude Adding Screen 150

In a case where a new grip attitude is desired to be added, the add button 146 is pressed. Consequently, as illustrated in FIG. 15, a grip attitude adding screen 150 is displayed, and thus a grip attitude can be added. The end effector model EEM and the workpiece model CWM are displayed in the image display field 141. Grip attitude coordinate information 153 defining a grip attitude is displayed in the operation field 142. Here, position parameters X, Y, Z, $R_X$, $R_Y$ and $R_Z$ displayed as the grip attitude coordinate information 153 indicate data of a position and an attitude of the end effector model EEM for the origin of the search model. The origin of the search model may be the centroid of the workpiece model CWM or a center coordinate of CAD data as described above.

If values of X, Y, Z, $R_X$, $R_Y$ and $R_Z$ of the grip attitude coordinate information 153 are changed, the position and the attitude of the end effector model EEM which is three-dimensionally displayed in the image display field 141 are updated according thereto. Conversely, if the end effector model EEM in the image display field 141 is dragged and moved, the display content of the grip attitude coordinate information 153 in the operation field 142 is updated to a grip attitude coordinate after the movement. Consequently, a user can register a grip position and a grip attitude while checking the end effector model EEM in the image display field 141 and the grip attitude coordinate information 153 in the operation field 142. The three-dimensional reference coordinate axis BAX may be displayed in an overlapping manner in the image display field 141.

During registration of a grip position, a grip reference point corresponding to a position where the workpiece model CWM is gripped and a grip direction in which the workpiece model CWM is gripped by the end effector model EEM are defined for the end effector model EEM displayed in the image display field 141. The grip reference point and the grip direction are preferably set as default values on the robot setting apparatus 100 side. A position and an attitude of the end effector model EEM are automatically adjusted according to a position and an attitude of the workpiece model CWM on the grip attitude adding screen 150 in FIG. 15 such that the grip direction is orthogonal to a workpiece plane representing an attitude of the workpiece model CWM. This adjustment may be performed by, for example, the three-dimensional pick determination portion 8l. Alternatively, a user may manually adjust a position and an attitude of the end effector model EEM by using the positioning portion 8c such that the grip direction of the end effector model EEM is orthogonal to the workpiece plane of the workpiece model CWM.

During registration of a grip position, in an initial state in which the grip attitude adding screen 150 in FIG. 15 is open, a position and an attitude of the end effector model EEM have initial values in a state in which the end effector model EEM is directed downward, and the workpiece model CWM is located under the end effector model EEM. In the above-described way, since a grip attitude is defined if the end effector model EEM is moved down to be brought into contact with the workpiece model CWM, an operation of a user side can be intuitively performed, and thus it is possible to reduce the problem that three-dimensional alignment is troublesome. In other words, basically, only alignment of the end effector model EEM in the X, Y and Z directions and rotation about the Z axis are set, and thus a grip attitude can be easily registered.

There may be a configuration in which a grip position at which the end effector model EEM grips the workpiece model CWM is set, and thus a position of the end effector model EEM is automatically adjusted such that the grip position is located on an axis extending from a grip direction.

Registration of a grip attitude is performed with an image of a workpiece as a reference. Thus, it is not necessary to use CAD data, and, as described above, a grip attitude can be registered for actually measured data obtained by actually imaging a workpiece.

Fitting Function

When a grip position is designated, a user may manually perform work of moving an end effector model to a grip position of a workpiece model, and a fitting function of automatically performing the work may be provided. In the related art, when grip positions X, Y and Z or grip attitudes $R_X$, $R_Y$ and $R_Z$ at which an end effector model grips a workpiece model are designated, for example, in the image display field 141 in FIG. 15, the end effector model is dragged and moved until the end effector model is brought into contact with the workpiece model, or a numerical value is input to Z of the height direction in the operation field 142, and thus setting is performed. However, work of a user moving an end effector model and fitting the end effector model to an attitude at which a workpiece model is gripped with the naked eyes is troublesome, and, regarding designation of numerical values of position parameters, it is hard to understand how the six position parameters are preferably adjusted. Therefore, the fitting function of automatically performing work of locating an end effector model to a grip position of the workpiece model is provided.

Here, in a case where a workpiece model or an end effector model has height information as in three-dimensional CAD data, a position on the workpiece model desired to be gripped is designated through clicking on a mouse, a height direction of the position, that is, a Z coordinate is acquired, and a position obtained by adding an offset to the Z coordinate is set as a Z coordinate after the end effector model is moved. Consequently, time and effort for a user to manually move an end effector model to a grip position or to manually input a position parameter such as a Z coordinate can be reduced, and a grip position can be accurately designated. As an example of the fitting function, a "fit" button 154 which is one type of relative position setting portion 8d5 is disposed in the operation field 142 displayed on the grip attitude adding screen 150 in FIG. 15. If the "fit" button 154 is pressed, the end effector model EEM is virtually moved in the Z direction, and is stopped at a position of being brought into contact with the workpiece model CWM, and a position obtained by subtracting an offset amount from the interference position in a reverse direction is set as a grip position. The offset amount is a numerical value for slight separation in order to prevent the tip of the end effector model EEM from interfering with the workpiece model CWM or being damaged due to contact, and may be defined according to a workpiece or an application, such as 1 mm.

In the above-described example, a description will be made of the method of performing grip registration by using height images used to generate a three-dimensional search model for performing a three-dimensional search. Since a search model for extracting a workpiece and a model for registering a grip position are commonized, a user can perform a three-dimensional search or setting of a grip position for a common workpiece, and can thus obtain a unified operation feeling, and can intuitively easily understand the common workpiece. However, in the present invention, a search model for a three-dimensional search does not necessarily match a grip registration target model. If a correspondence relationship between a three-dimensional search model and a model used for grip registration is known, a model used as a search model is not necessarily used for grip registration.

Figure 16:
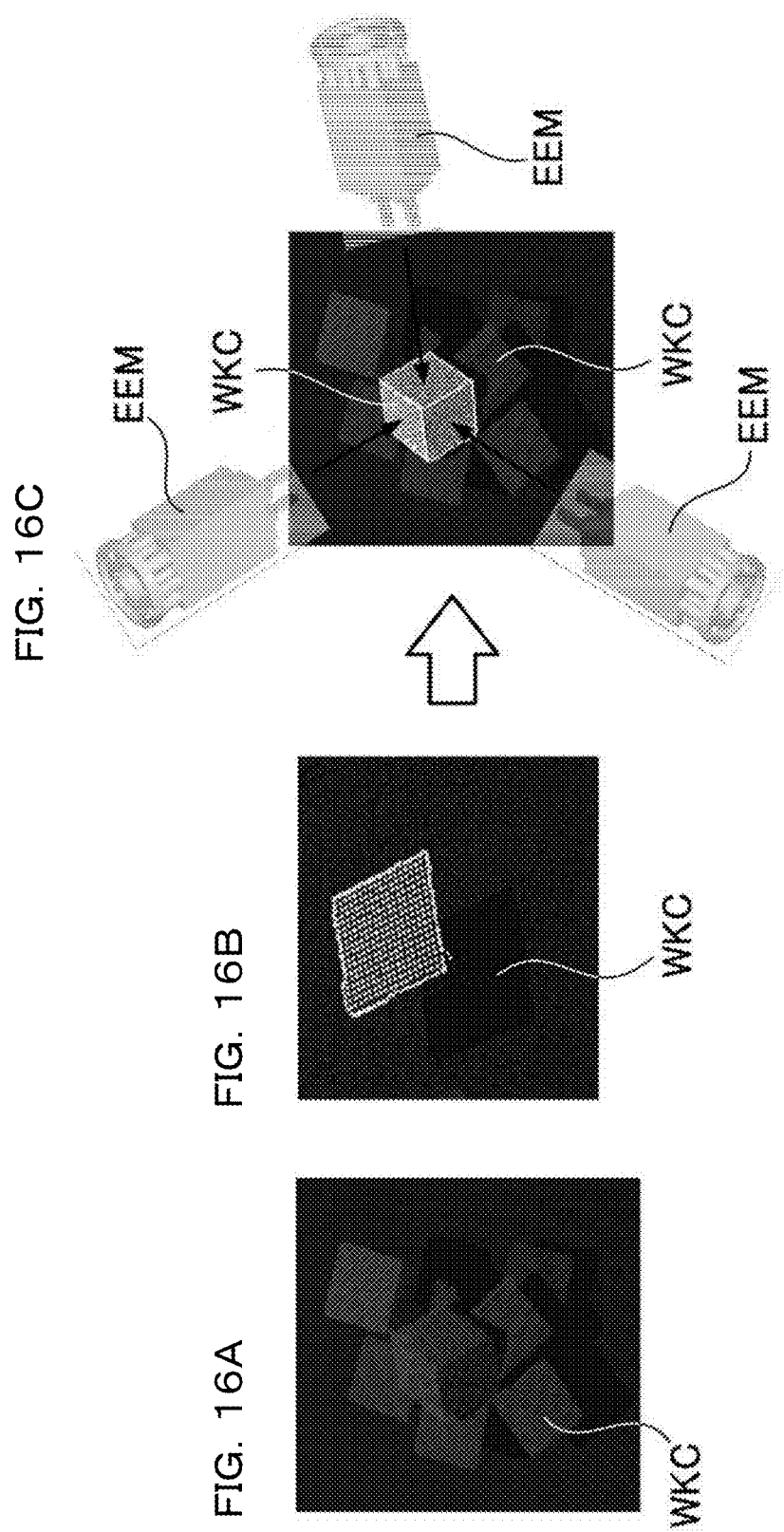
FIG. 16A is an image diagram illustrating a state in which a plurality of cubic workpieces are loaded in bulk.
FIG. 16B is an image diagram illustrating a state in which the workpiece model is registered in a search model.
FIG. 16C is an image diagram illustrating a state in which a grip attitude is registered in the workpiece model in FIG. 16B.

Checking of matching between viewing ways after a height image is generated on the basis of three-dimensional CAD data is not limited to checking using positive and negative directions of the respective axes. For example, a workpiece having, for example, a cuboid shape has the same viewing way even when viewed from any direction such as positive and negative directions of the X axis, positive and negative directions of the Y axis, and positive and negative directions of the Z axis, and thus a search model for a single face may be generated. Similarly, also regarding registration of a grip position, grip may be designated for a single face. Therefore, all faces (the positive and negative directions of the X axis, the positive and negative directions of the Y axis, and the positive and negative directions of the Z axis) are in a state of being able to be gripped. For example, with respect to workpieces WKC each having a cuboid shape as illustrated in FIG. 16A and loaded in bulk, one face of the cuboid is registered as a model as illustrated in FIG. 16B, and a grip attitude of gripping the face directly from the top has only to be registered. Thus, as illustrated in FIG. 16C, it is possible to perform a three-dimensional search on all of the six faces and for the end effector model EEM to grip all of the six faces.

Calibration

In the above-described grip registration screen 140, relative position and attitude of the end effector model EEM for a workpiece during gripping are registered with respect to the origin of a search model. On the other hand, when a workpiece is picked by a real end effector, a vision coordinate which is a coordinate of a three-dimensional space (vision space) in which the workpiece is imaged by the sensor unit is required to be converted into a robot coordinate used for the robot controller 6 to actually drive the robot. Specifically, a position and an attitude of a workpiece obtained as a result of a three-dimensional search are obtained as a position (X,Y,Z) and an attitude $(R_X, R_Y, R_Z)$ in the vision space (the attitude $(R_X, R_Y, R_Z)$ indicates an attitude expressed by a Z-Y-X system Euler's angle which will be described later). An attitude of the end effector gripping the workpiece is also obtained as a position (X,Y,Z) and an attitude $(R_X, R_Y, R_Z)$ in a virtual three-dimensional space of the robot setting apparatus. In order for the robot controller 6 to drive the robot, the position and the attitude in the vision space are required to be converted into a position (X',Y',Z') and an attitude $(R_X', R_Y', R_Z')$ in the robot space. A process of calculating a conversion formula for converting a position and an attitude calculated in the coordinate system displayed by the robot setting apparatus into a position and an attitude in the coordinate system used for the robot controller to operate an end effector is referred to as calibration.

Embodiment 2

Figure 17:
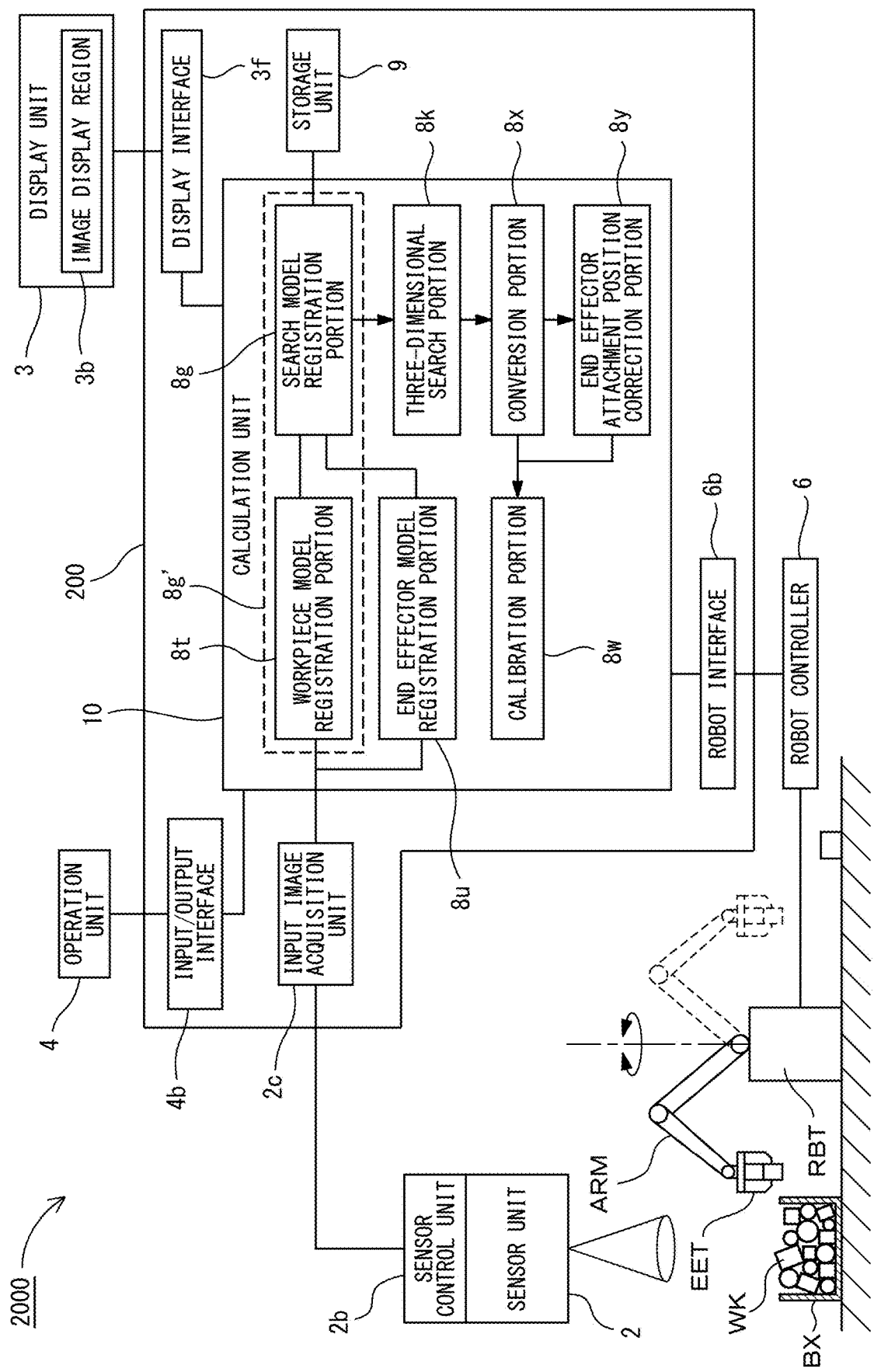
FIG. 17 is a functional block diagram illustrating a robot system according to Embodiment 2.

FIG. 17 is a functional block diagram illustrating an example of a robot system having a calibration function between a robot setting apparatus (machine vision apparatus) and a robot as Embodiment 2. In FIG. 17, a robot system 2000 includes a robot setting apparatus 200, a display unit 3, an operation unit 4, a sensor unit 2, a robot controller 6, and a robot RBT. In the robot system illustrated in FIG. 17, a member common to FIG. 6 or the like described above is given the same reference numeral, and a detailed description thereof will be omitted as appropriate.

Robot Setting Apparatus 200

The robot setting apparatus 200 includes an input image acquisition unit 2c, a storage unit 9, a calculation unit 10, an input/output interface 4b, a display interface 3f, and a robot interface 6b.

The input image acquisition unit 2c acquires an input image including a three-dimensional shape on the basis of an image including an end effector measured by the sensor unit. When the input image acquisition unit 2c acquires an input image of the end effector, the input image preferably includes an attachment position attached to a flange surface at a tip of an arm portion of the robot. The input image is captured at an attitude at which an area of the end effector is increased. For example, a user operates the robot such that the input image of the end effector is captured at an attitude of being sideways as a horizontal attitude.

The calculation unit 10 includes an end effector model registration portion 8u, a workpiece model registration portion 8t, a calibration portion 8w, a search model registration portion 8g, a three-dimensional search portion 8k, a conversion portion 8x, an end effector attachment position correction portion 8y, and a grip position specifying portion 8d.

The end effector model registration portion 8u is a member for registering an end effector model which is three-dimensional CAD data and virtually expresses a three-dimensional shape of an end effector. For example, the end effector model registration portion 8u reads three-dimensional CAD data indicating a shape of an end effector created separately, and registers the three-dimensional CAD data as an end effector model. In this case, the end effector model registration portion 8u registers three-dimensional CAD data which is input via the input/output interface 4b as an end effector model. Alternatively, three-dimensional point group data obtained by imaging a real end effector may be used as an end effector model. In this case, the end effector model registration portion 8u registers three-dimensional point group data acquired in the sensor unit 2 or the input image acquisition unit 2c as an end effector model. Alternatively, three-dimensional CAD data simulating an end effector may be created and registered. In this case, the end effector model registration portion 8u realizes a function of a simple three-dimensional CAD.

The calibration portion 8w is a member for acquiring calibration information for converting a position and an attitude calculated in a coordinate system of a vision space which is a virtual three-dimensional space displayed on the display unit into a position and an attitude in a coordinate system of a robot space in which the robot controller operates an end effector.

The calibration portion 8w calculates a conversion formula between an actual position coordinate of the end effector EET of the robot and a position coordinate on an image displayed on the robot setting apparatus with respect to a plurality of position coordinates. A coordinate conversion method is not particularly limited, and a known method such as three-dimensional affine conversion may be used as appropriate.

The storage unit 9 stores calibration information from the calibration portion 8w.

The three-dimensional search portion 8k is a member for performing a three-dimensional search for specifying an image region corresponding to a position and an attitude of an end effector from an input image acquired by the input image acquisition unit 2c by using an end effector model as a search model.

The conversion portion 8x converts a vision coordinate into a robot coordinate on the basis of calibration information obtained by the calibration portion 8w. The conversion portion 8x reads the calibration information stored in the storage unit 9.

The end effector attachment position correction portion 8y corrects errors between a position and an attitude on the vision space of the end effector and a position and an attitude on the robot space by using information obtained by converting the position and the attitude of the end effector on the vision space searched for by the three-dimensional search portion into the position and the attitude on the robot space in the conversion portion 8x. Consequently, since a three-dimensional search is performed by using an end effector model, an error of a virtual end effector model can be corrected by taking into consideration an attachment state of a real end effector, and thus more accurate setting work can be performed.

The grip position specifying portion 8d specifies one or more grip positions at which a workpiece model registered by the workpiece model registration portion 8t is gripped by an end effector model.

Z-Y-X System Euler's Angle

Here, a Z-Y-X system Euler's angle will be described. In the related art, in order to define a grip position at which a workpiece is gripped by an end effector, the Z-Y-X system Euler's angle is used for positioning of an attitude of a workpiece model or an end effector model on the basis of three-dimensional CAD data. In this case, a position and an attitude of the end effector model for the workpiece model are expressed by six position parameters (X, Y, Z, $R_X$, $R_Y$, and $R_Z$). Here, X, Y, and Z indicate orthogonal coordinate axes defining a three-dimensional space, and $R_X$, $R_Y$, and $R_Z$ respectively indicate rotation angles obtained through rotation centering on the X axis, the Y axis, and the Z axis.

Figure 18:
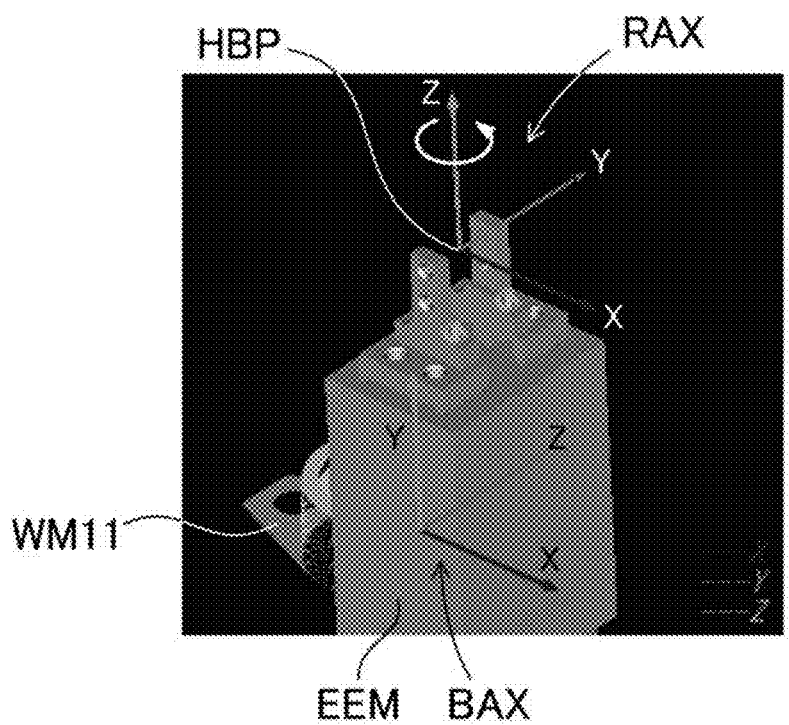
FIG. 18 is an image diagram illustrating a state before an end effector model is rotated according to a Z-Y-X system Euler's angle.
Figure 19:
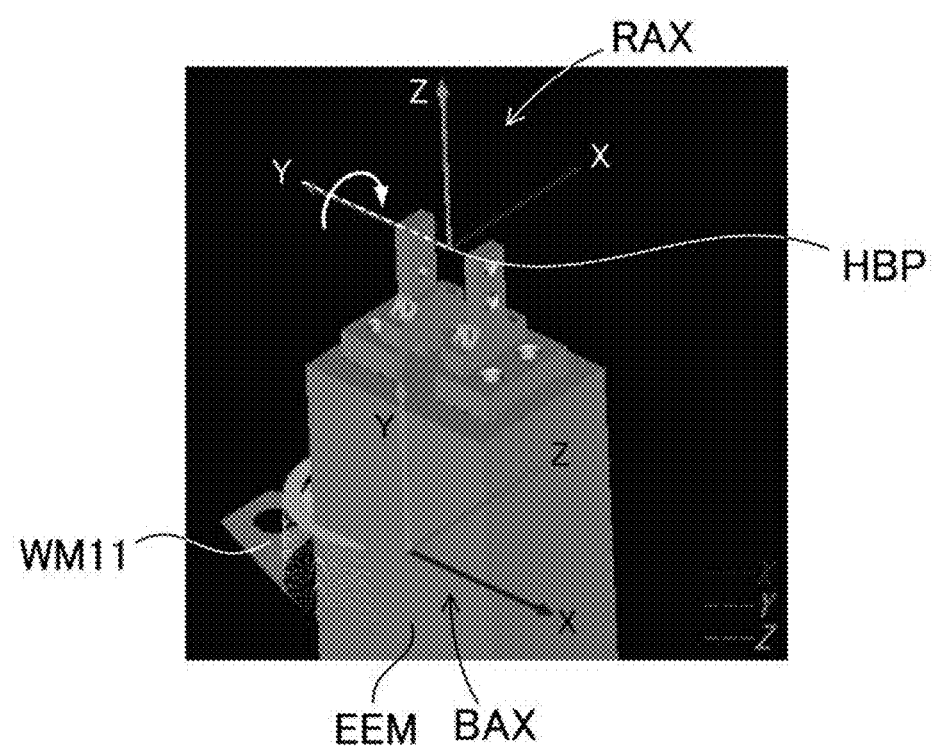
FIG. 19 is an image diagram illustrating a state in which rotation is performed by 90° about a Z axis in FIG. 18.

Here, with reference to FIGS. 18 to 21, a description will be made of an example of rotating an end effector model according to the Z-Y-X system Euler's angle. First, FIG. 18 illustrates a state in which the end effector model EEM and a workpiece model WM11 are displayed in an image display region of the display unit 3. In this example, for better understanding of description, reference coordinate axes BAX (XYZ) defining a virtual three-dimensional space and rotation-completed coordinate axes RAX (XYZ) which are three-dimensional space coordinate axes after a rotation target (here, the end effector model EEM) is rotated are separately displayed.

In the example illustrated in FIG. 18, since the workpiece model WM11 side is stopped, and the end effector model EEM side is rotated, the reference coordinate axes BAX express a position and an attitude of the workpiece model WM11, and the rotation-completed coordinate axes RAX express a position and an attitude of the end effector model EEM. In the rotation-completed coordinate axes RAX of the end effector model EEM side, the origin thereof matches a grip reference point HBP which is a grip position of the end effector model EEM (details thereof will be described later).

Figure 20:
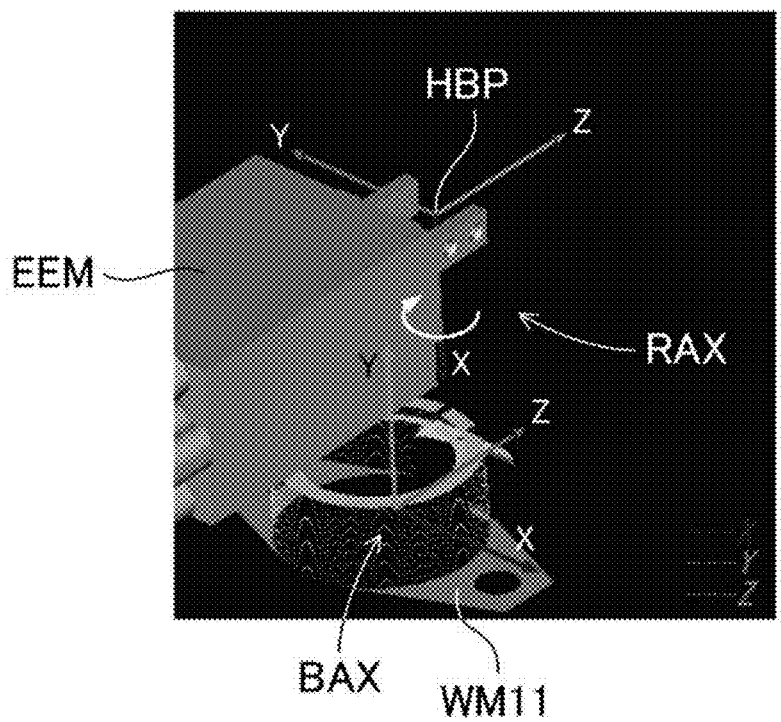
FIG. 20 is an image diagram illustrating a state in which rotation is performed by 90° about a Y axis in FIG. 19.

In a state before rotation, the rotation angles $R_X$, $R_Y$, and $R_Z$ about the XYZ axes are $R_X$=0°, $R_Y$=0°, and $R_Z$=0°, and the reference coordinate axes BAX match the rotation-completed coordinate axes RAX. If the end effector model EEM is rotated counterclockwise by 90° centering on the Z axis in this state, a rotation result is as illustrated FIG. 19. In a state illustrated in FIG. 19, the rotation angles $R_X$, $R_Y$ and $R_Z$ are $R_X$=0°, $R_Y$=0°, and $R_Z$=90°, and thus the rotation-completed coordinate axes RAX displayed in the image display region are updated to an attitude after the rotation. If the end effector model EEM is rotated clockwise by 90° centering on the Y axis in the state illustrated in FIG. 19, a rotation result is as illustrated in FIG. 20. In this state, the rotation angles $R_X$, $R_Y$ and $R_Z$ are $R_X$=0°, $R_Y$=90°, and $R_Z$=90°, and thus the rotation-completed coordinate axes RAX are also updated to an attitude after the rotation. If the end effector model EEM is rotated clockwise by 90° centering on the X axis in the state illustrated in FIG. 20, a rotation result is as illustrated in FIG. 21, and the rotation angles $R_X$, $R_Y$ and $R_Z$ are $R_X$=90°, $R_Y$=90°, and $R_Z$=90°.

In the related art, a workpiece model or an end effector model is generated or a position thereof is expressed by using the Z-Y-X system Euler's angle. However, the number of operable position parameters is six and is large, and thus work of a user adjusting a position or an attitude to an expected position or an expected attitude by adjusting the position parameters is not easy. The XYZ axes used to move a position while an attitude is maintained are different from the $R_X$, $R_Y$ and $R_Z$ axes used for rotation, and thus there is a problem in that, if the position parameters are changed, it is hard to intuitively recognize a change result. This state will be described with reference to FIG. 22.

Figure 21:
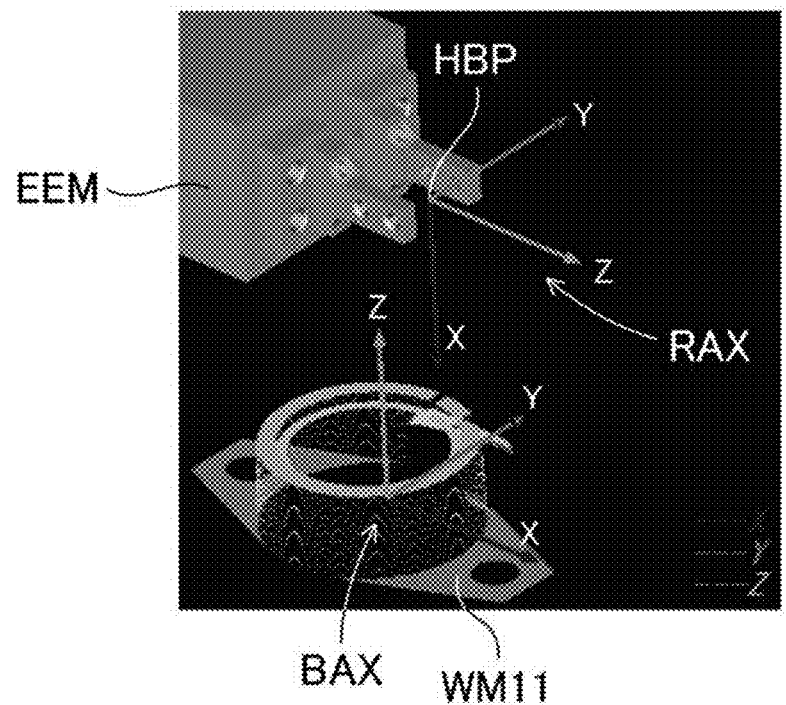
FIG. 21 is an image diagram illustrating a state in which rotation is performed by 90° about an X axis in FIG. 20.

Now, in a state illustrated in FIG. 21, the rotation-completed coordinate axes RAX which are orthogonal coordinate axes after rotation by the rotation angles $R_X$=90°, $R_Y$=90°, and $R_Z$=90° are displayed in the image display region. If $R_Y$ or $R_Z$ is changed in this state, rotation is performed centering on axes which are different from the displayed rotation-completed coordinate axes RAX. For example, $R_Y$ rotation is performed centering on the Y axis (the Y axis of the rotation-completed coordinate axes RAX in FIG. 19) before $R_X$ rotation as indicated by a dashed line in FIG. 22, instead of the Y axis of the rotation-completed coordinate axes RAX in FIG. 22. $R_Z$ rotation is not performed centering on the Z axis of the rotation-completed coordinate axes RAX in FIG. 22, and is performed centering on the Z axis (the Z axis of the rotation-completed coordinate axes RAX in FIG. 18) before $R_X$ or $R_Y$ rotation indicated by dashed lines.

This is because the Z-Y-X system Euler's angle is defined on the basis of rotation being performed in an order of the Z axis, the Y axis, and the X axis. According to the Z-Y-X system Euler's angle, the Z axis is used as a reference, and rotational axes of $R_X$ and $R_Y$ are rotated due to $R_Z$ rotation about the Z axis. Here, a rotational axis about the Z axis is not moved, but rotational axes of $R_X$ and $R_Y$ are rotated due to $R_Z$ rotation about the Z axis. If rotation is performed by $R_Y$ about the Y axis determined according thereto, the X axis is thus also rotated. Here, since a rotational axis about the Y axis is defined depending on $R_Z$ rotation about the Z axis, even if rotation is performed by $R_X$ about the X axis, a rotational axis about the Y axis and a rotational axis about the Z axis are not changed. In other words, in the Z-Y-X system Euler's angle, it can be said that $R_Z$ has an independent rotational axis, $R_Y$ has a rotational axis which depends on $R_Z$, and $R_X$ has a rotational axis which depends on $R_Y$.

As mentioned above, in the related art, in the Z-Y-X system Euler's angle generally used for control of a robot, since the three rotational axes are correlated with each other, and an axis after rotation about another rotational axis is also rotated, a user hardly recognizes which axis is a rotational axis, and thus it is not easy to perform rotation as intended.

Display of Correction Rotational Axis

In contrast, in the method according to the present embodiment, rotational axes of $R_X$, $R_Y$, and $R_Z$ are displayed with actual rotational axes as references. Unlike the axes being displayed in a three-dimensional space using the Z-Y-X system Euler's angle of the related art (FIGS. 18 to 21), a real rotational axis which is corrected by taking into consideration a state after rotation about another rotational axis is displayed as a correction rotational axis. For example, a description will be made of an example of displaying a correction rotational axis of $R_Z$ in a state illustrated in FIG. 22. In this case, as illustrated in FIG. 23, the Z axis of when $R_X$ and $R_Y$ are computed to be 0° is a correction rotational axis. A correction rotational Z axis AXZ displayed here is the Z axis of when $R_X$ is 0°, $R_Y$ is 0°, and $R_Z$ is 90°.

Figure 22:
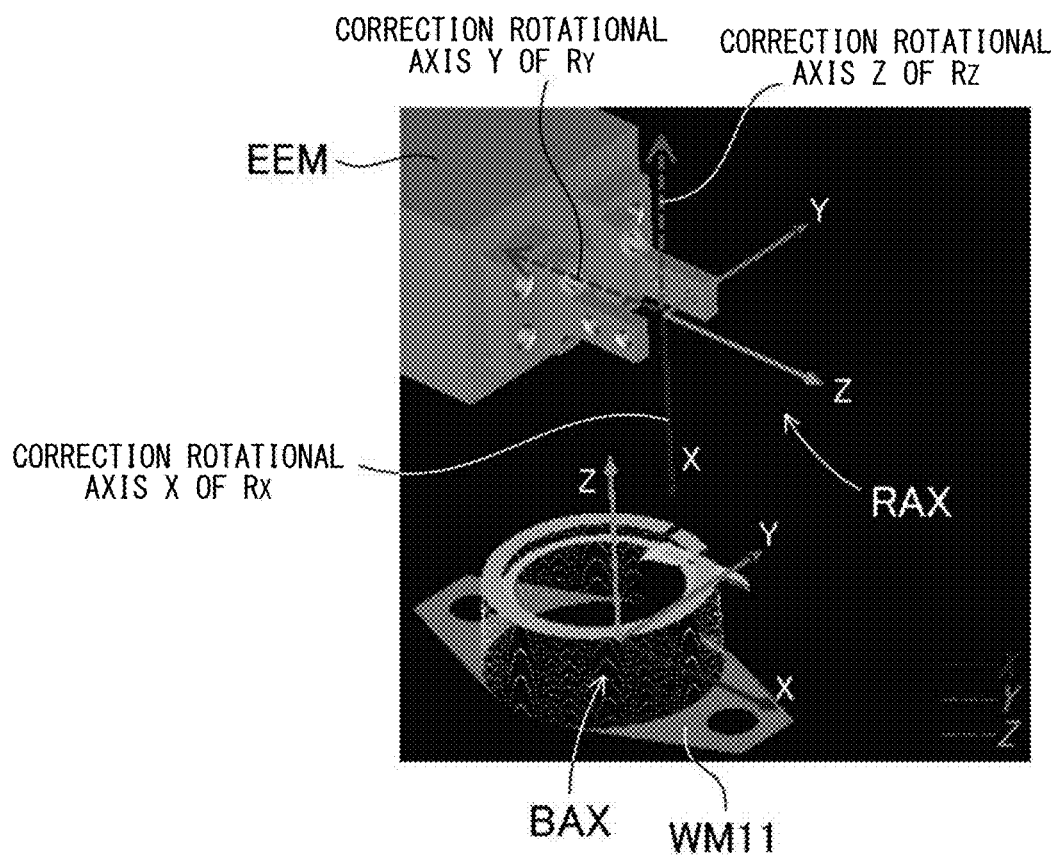
FIG. 22 is an image diagram illustrating a rotational axis of $R_Y$ or $R_Z$ in the state illustrated in FIG. 21.
Figure 23:
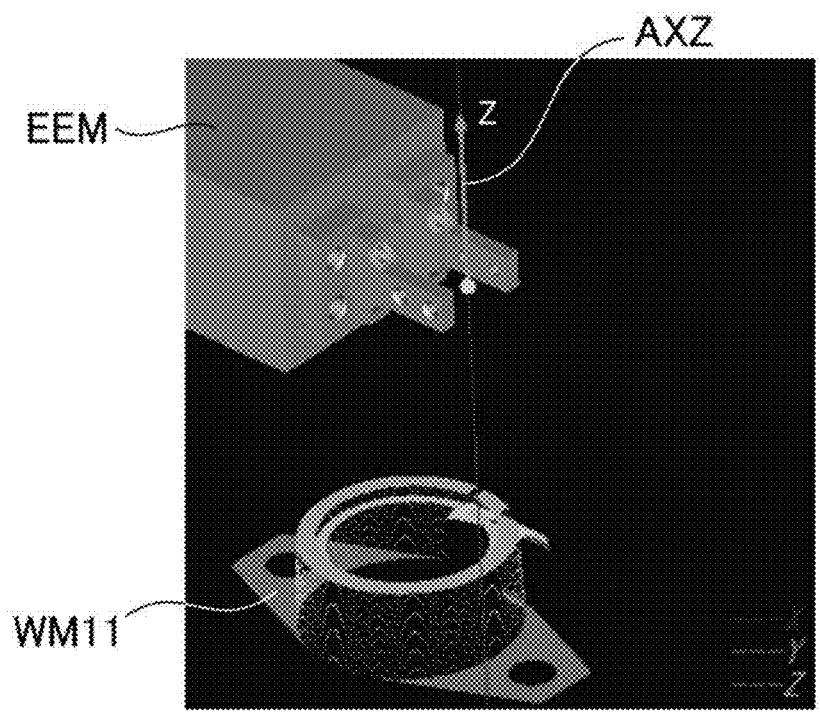
FIG. 23 is an image diagram illustrating a state in which a correction rotational axis of $R_Z$ is displayed in the state illustrated in FIG. 22.
Figure 24:
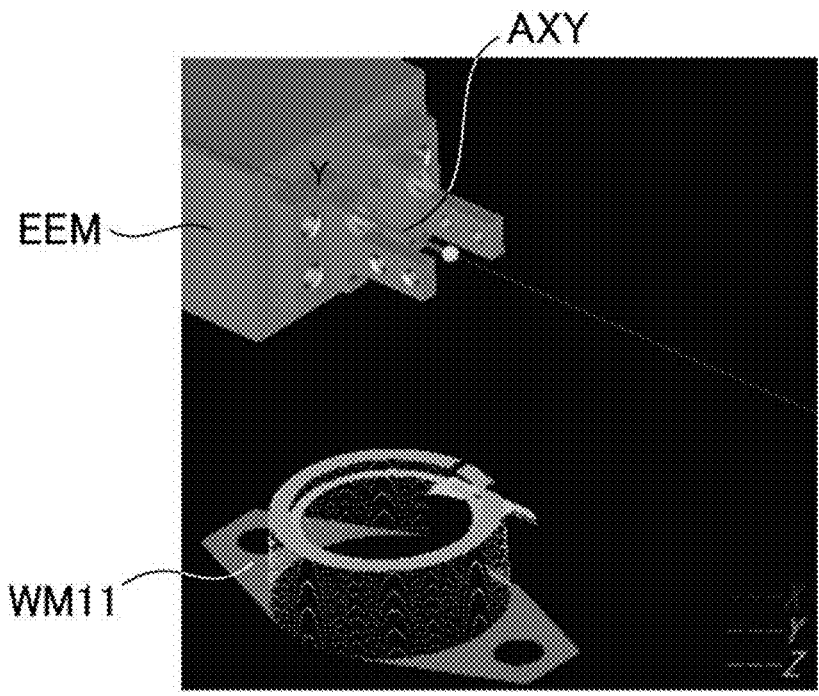
FIG. 24 is an image diagram illustrating a state in which a correction rotational axis of $R_Y$ is displayed in the state illustrated in FIG. 22.

On the other hand, in a case where a correction rotational axis of $R_Y$ is displayed in the state illustrated in FIG. 22, the Y axis of when $R_X$ is computed to be 0° is a real rotational axis as illustrated in FIG. 24. A correction rotational Y axis AXY displayed here is the Y axis of when $R_X$ is 0°, $R_Y$ is 90°, and $R_Z$ is 90°.

Figure 25:
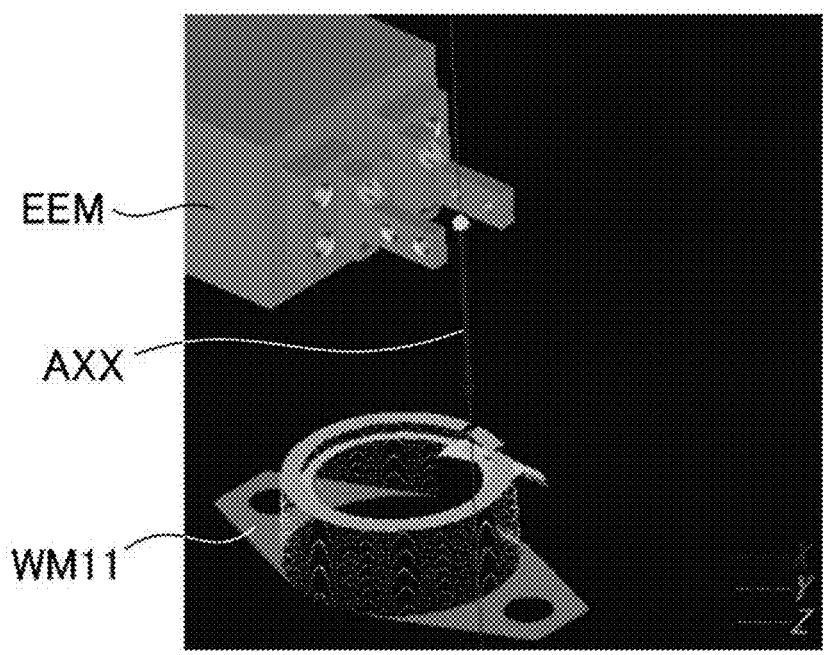
FIG. 25 is an image diagram illustrating a state in which a correction rotational axis of $R_X$ is displayed in the state illustrated in FIG. 22.

On the other hand, in a case where a correction rotational axis of $R_X$ is displayed in the state illustrated in FIG. 22, the X axis may be displayed without being changed. FIG. 25 illustrates an example in which a correction rotational X axis as a correction rotational axis is displayed. A correction rotational X axis AXX displayed here is the X axis of when $R_X$ is 90°, $R_Y$ is 90°, and $R_Z$ is 90°.

A start point of the correction rotational axis is preferably the center of rotation of an end effector model. For example, an intermediate position of a pair of claws which is a grip position of the end effector model EEM is used as the start point.

X-Y-Z Euler's Angle

Regarding the correction rotational axis, a rotational axis may be displayed in the same manner even in a case where a rotation order is changed. For example, in the examples illustrated in FIGS. 23 to 25, the Z-Y-X system Euler's angle is used, and thus rotation is performed in an order of $R_Z$, $R_Y$, and $R_X$. On the other hand, since if an X-Y-Z Euler's angle is used, rotation is performed in an order of $R_X$, $R_Y$, and $R_Z$, an axis computed to be 0° is different from that in the Z-Y-X system Euler's angle. For example, assuming that rotation is performed in the order of $R_X$, $R_Y$, and $R_Z$ in the same manner as in FIGS. 18 to 21 in order to obtain correction rotational axes with the X-Y-Z Euler's angle, in a case where the Z axis is displayed as a correction rotational axis, the Z axis after rotation is displayed without being changed. In a case where the Y axis is displayed as a correction rotational axis, the Y axis of when $R_Z$ is computed to be 0° is displayed. In a case where the X axis is displayed as a correction rotational axis, the X axis of when $R_Z$ and $R_Y$ are computed to be 0° is displayed.

When a user sets a grip position or a grip attitude by using an Euler's angle in the above-described way, a rotational axis can be displayed to be easily understandable, and thus it is possible to perform an intuitive operation without understanding the complex concept of an Euler's angle.

Embodiment 3

Figure 26:
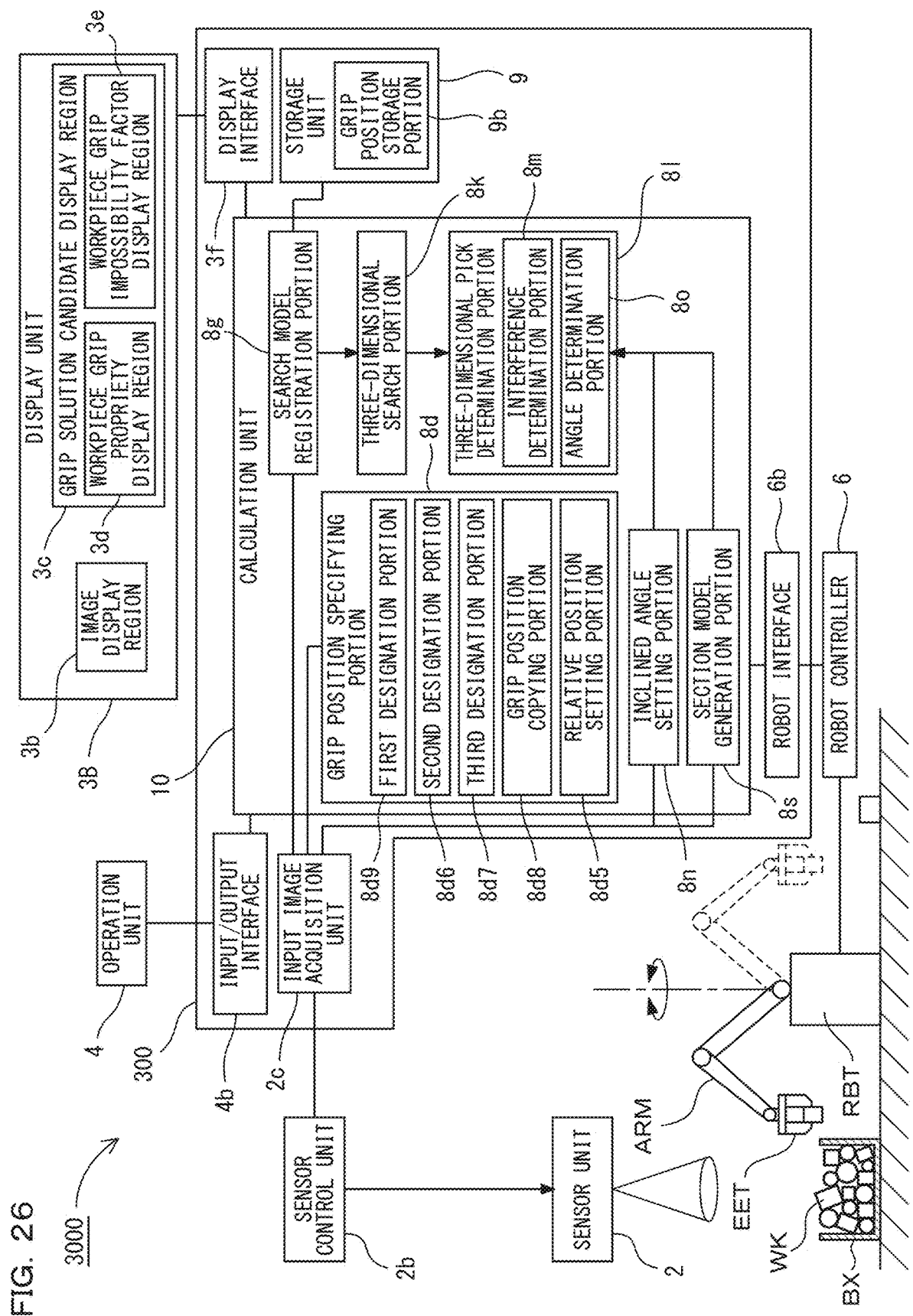
FIG. 26 is a block diagram illustrating a robot system according to Embodiment 3.

It is not easy for a user to set a position or an attitude of an end effector or a workpiece defined by a plurality of position parameters, as in an Euler's angle. Therefore, setting procedures of position parameters may be guided such that a user can designate a restricted position parameter among the plurality of position parameters, and a necessary position parameter may be sequentially set according to the guide. Such an example is illustrated in FIG. 26 as a robot system 3000 according to Embodiment 3. The robot system 3000 illustrated in FIG. 26 includes a robot setting apparatus 300, a display unit 3B, an operation unit 4, a sensor unit 2, a robot controller 6, and a robot RBT. In the robot system illustrated in FIG. 26, a member common to FIG. 6 or the like described above is given the same reference numeral, and a detailed description thereof will be omitted as appropriate.

Robot Setting Apparatus 300

The robot setting apparatus 300 includes an input image acquisition unit 2c, a calculation unit 10, a storage unit 9, an input/output interface 4b, a display interface 3f, and a robot interface 6b. The storage unit 9 includes a grip position storage portion 9b. The grip position storage portion 9b is a member for storing a grip position of a workpiece model or an end effector model designated by a grip position specifying portion 8d.

The calculation unit 10 includes the grip position specifying portion 8d, a grip position copying portion 8d8, a relative position setting portion 8d5, a search model registration portion 8g, a three-dimensional search portion 8k, a three-dimensional pick determination portion 8l, and a section model generation portion 8s.

The grip position specifying portion 8d is a member for designating six position parameters including an X coordinate, a Y coordinate, and a Z coordinate which are respectively coordinate positions on the X axis, the Y axis, and the Z axis, and an $R_X$ rotation angle, an $R_Y$ rotation angle, and an $R_Z$ rotation angle centering on the X axis, the Y axis, and the Z axis, for specifying a position and an attitude of one or both of a workpiece model or an end effector model displayed on a virtual three-dimensional space on the display unit.

The grip position copying portion 8d8 is a member for reading a grip position of a workpiece model or an end effector model stored in the grip position storage portion 9b, changing the grip position, and registering the changed grip position as a new grip position. Consequently, when a plurality of grip positions are registered, a grip position which is already registered is read, and a grip position is changed on the basis of the grip position so as to be registered as a new grip position. Therefore, a grip position can be more easily added than a case where a grip position is registered from the beginning, and thus it is possible to achieve labor-saving of registration work.

The three-dimensional pick determination portion 8l is a member for determining whether or not an end effector can grip a workpiece model at a grip position designated for the workpiece model by the grip position specifying portion 8d with respect to each search result obtained through a search in the three-dimensional search portion 8k.

The section model generation portion 8s generates a section model formed of sets of a plurality of sections and section positions, each of the sections being obtained by cutting an end effector model in a plane orthogonal to a fundamental axis along the fundamental axis which is set to be linear in one direction for the end effector model, and each of the section positions being a point at which an orthogonal plane including each section intersects the fundamental axis. Polygon data or the like is used for an end effector model for creating the section model.

Grip Position Specifying Portion 8d

The grip position specifying portion 8d illustrated in FIG. 26 includes a first designation portion 8d9, a second designation portion 8d6, and a third designation portion 8d7. The first designation portion 8d9 is a member which can designate at least one of an X coordinate, a Y coordinate, and a Z coordinate, and cannot designate other position parameters. The second designation portion 8d6 is a member which can designate at least one of an $R_X$ rotation angle, an $R_Y$ rotation angle, and an $R_Z$ rotation angle, and cannot designate other position parameters, with respect to a workpiece model or an end effector model for which some position parameters are designated by the first designation portion 8d9. The third designation portion 8d7 is a member which can designate a position parameter not designated by the second designation portion 8d6 among at least some of the $R_X$ rotation angle, the $R_Y$ rotation angle, and the $R_Z$ rotation angle, and cannot designate other position parameters, with respect to a workpiece model or an end effector model for which some position parameters are designated by the first designation portion 8d9 and the second designation portion 8d6.

Consequently, regarding designation of a grip position, all of the six position parameters are not designated on a single screen, position parameters which can be designated are designated separately by a plurality of restricted designation portions, and thus it is possible to prevent a situation in which a plurality of position parameters are intertwined with each other, so that a position or an attitude is hardly recognized, and position parameters are sequentially designated such that information necessary for specifying a position and an attitude can be set. Particularly, since any part on a planar workpiece model displayed on the display unit is designated by the first designation portion 8d9 through mouse clicking or the like as an initial position of a grip position, a user can perform designation in a visually easily understandable method such as direct designation of a workpiece model with an attitude at which the workpiece model is easy to view, and thus work can be considerably simplified compared with complex and trouble work such as fixation of an attitude or definition of a numerical value as in the related art. In the first designation portion 8d9, a workpiece model is not limited to an aspect of being displayed in a two-dimensional form, and may be displayed in a three-dimensional form.

Procedures in Setting Work

Here, in relation to setting work for operating the robot system, procedures of teaching work performed before an actual operation will be described with reference to a flowchart of FIG. 27.

First, in step S2701, a search model for three-dimensionally searching for a workpiece is registered. Here, as the search model, a workpiece model as described above, for example, three-dimensional CAD data may be registered. Alternatively, actually measured data obtained by actually imaging a workpiece in the sensor unit may be registered as the search model.

Next, in step S2702, an end effector model of the robot is registered. Herein, three-dimensional CAD data may be registered as the end effector model. Next, in step S2703, a face of the workpiece model to be gripped is selected from a height image. Next, in step S2704, a position and an attitude of the robot of when the selected face is gripped are registered. Next, in step S2705, it is determined whether or not positions and attitudes of the necessary number are registered, and, in a case where positions and attitudes of the necessary number are not registered, the flow returns to step S2703, and the process is repeatedly performed. In a case where positions and attitudes of the necessary number are registered, the process is finished.

Procedures of Registering Three-Dimensional CAD Data as Search Model

Here, in step S2701, a description will be made of examples of procedures of registering a search model of a workpiece in a case where three-dimensional CAD data is used as a search model with reference to a flowchart of FIG. 28. First, in step S2801, a three-dimensional CAD data model of the workpiece is read. Next, in step S2802, the center of a circumscribing cuboid of the three-dimensional CAD data model is corrected to the origin of the three-dimensional CAD data. In step S2803, height images viewed from respective directions of "top", "bottom", "left", "right", "front", and "rear" are generated. Here, in a case where a height image is generated on the basis of the three-dimensional CAD data, the height image is generated such that the origin of CAD is the center of the height image.

Next, in step S2804, a height image having the same viewing way is deleted from the generated height images. Finally, in step S2805, a search model is registered by using the generated height images.

In the above-described way, a user can register a search model used for a three-dimensional search according to a guidance.

Registration of End Effector Model

Figure 29:
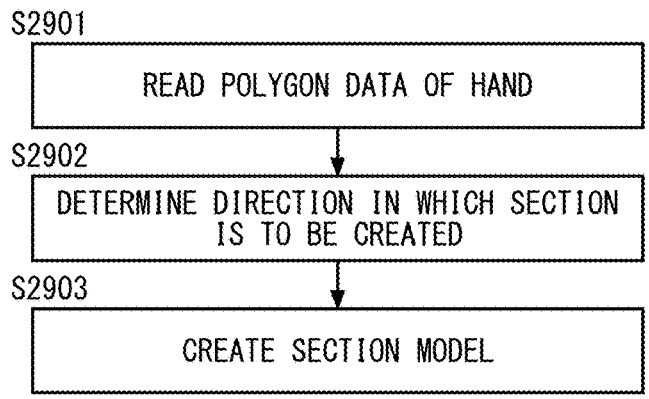
FIG. 29 is a flowchart illustrating procedures of registering an end effector model.

Next, a description will be made of details of procedures of registering an end effector model in step S2702 in FIG. 27 with reference to a flowchart of FIG. 29. Herein, three-dimensional CAD data forming an end effector model is formed of polygon data.

First, in step S2901, polygon data of the end effector model is read. Next, in step S2902, a direction in which a section is to be created is determined. In step S2903, a section model is created. The section model generation portion 8s in FIG. 26 creates the section model. Details of creation of the section model will be described later. In the above-described way, the end effector model is registered in the storage unit 9.

Additional Region

Figure 30:
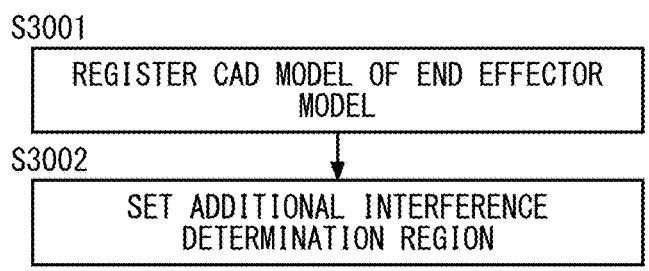
FIG. 30 is a flowchart illustrating procedures of registering an end effector model to which an additional region is added.

When an end effector model is registered, an additional region may be added to an original end effector model. Procedures thereof will be described with reference to a flowchart of FIG. 30. First, in step S3001, the end effector model is registered. For example, an end effector model formed of three-dimensional CAD data such as STL data is read.

Next, in step S3002, an additional region is set. The additional region is used to add a shape of a real end effector or a shape simulating a cover or a seat belt added thereto, to a surface of the end effector model, for example, during interference determination (which will be described later in detail), and thus the accuracy of interference determination can be improved.

Embodiment 4

Figure 31:
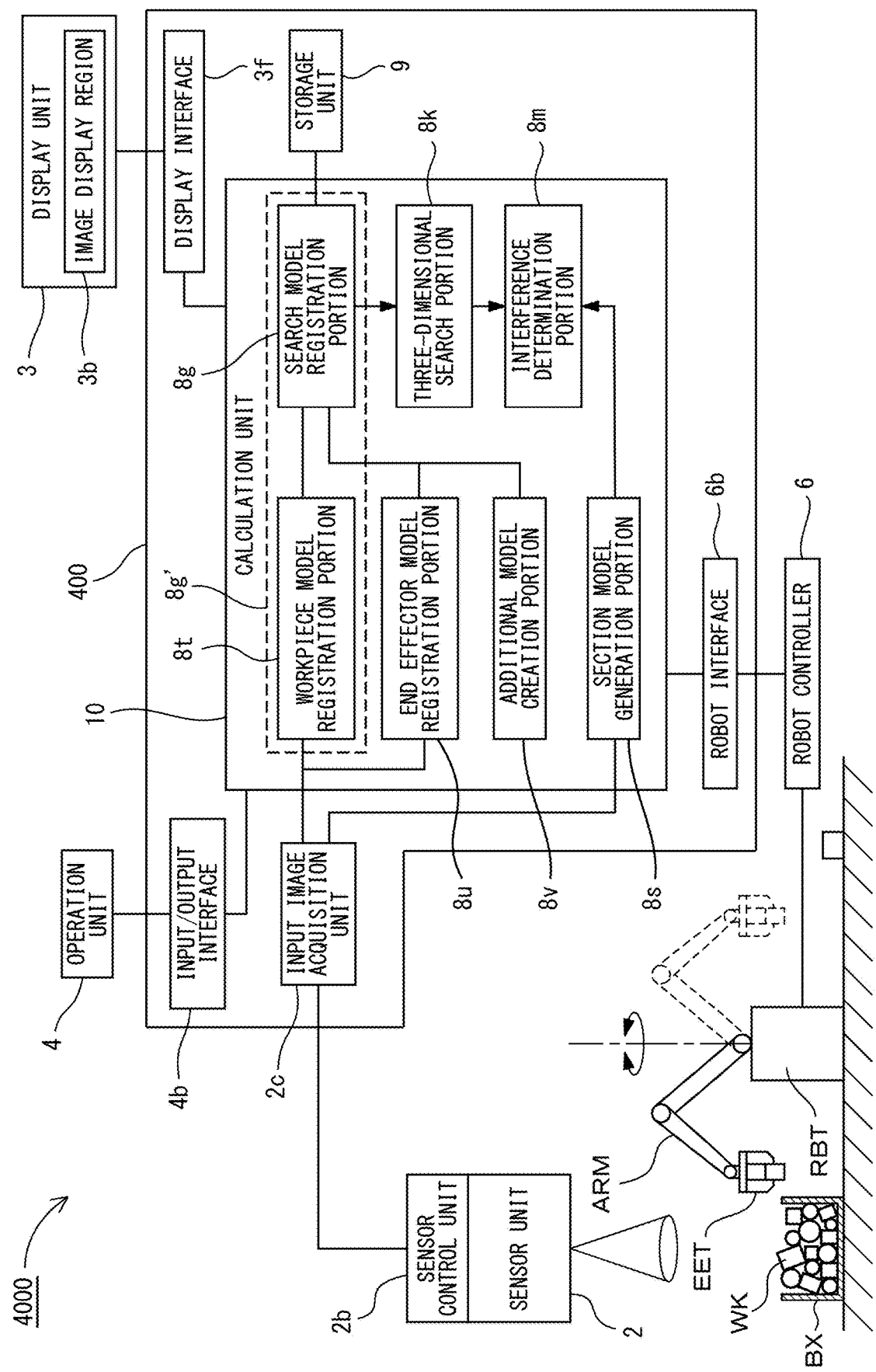
FIG. 31 is a block diagram illustrating a robot system according to Embodiment 4.

An additional model creation function is used to set such an additional region. An example of a robot system having the additional model creation function is illustrated in a block diagram of FIG. 31 as Embodiment 4. A robot system 4000 illustrated in FIG. 31 includes a robot setting apparatus 400, a display unit 3, an operation unit 4, a sensor unit 2, a robot controller 6, and a robot RBT. In the robot system illustrated in FIG. 31, a member common to FIG. 6 or the like described above is given the same reference numeral, and a detailed description thereof will be omitted as appropriate.

Robot Setting Apparatus 400

The robot setting apparatus 400 includes an input image acquisition unit 2c, a calculation unit 10, a storage unit 9, an input/output interface 4b, a display interface 3f, and a robot interface 6b.

The calculation unit 10 includes a workpiece model registration portion 8t, an end effector model registration portion 8u, an additional model creation portion 8v, a grip position specifying portion 8d, a search model registration portion 8g, a three-dimensional search portion 8k, an interference determination portion 8m, and a section model generation portion 8s.

The additional model creation portion 8v is a member for creating an additional model in which an additional region expressed by one or more predefined solid figures is added to a surface of an end effector model. Consequently, an interference determination region with a simple shape such as a cuboid or a cylinder is added to an end effector model without editing three-dimensional CAD data, interference determination corresponding to each region is performed, so that interference determination can be easily performed. The solid figures include not only fundamental figures prepared on the robot setting apparatus side in advance, but also figures which can be freely designed by a user.

The grip position specifying portion 8d is a member for specifying one or more grip positions at which a workpiece model is gripped by an end effector model for the workpiece model registered by the workpiece model registration portion 8t.

The three-dimensional search portion 8k is a member for performing a three-dimensional search for specifying an image region corresponding to a position and an attitude of each workpiece by using a search model registered by the search model registration portion 8g from an input image acquired by the input image acquisition unit 2c.

The interference determination portion 8m is a member for performing interference determination for determining the presence or absence of interference with another object which may hinder an operation when an end effector is operated by using an additional model created by the additional model creation portion 8v. The interference determination portion 8m performs interference determination on an image including a peripheral object of a workpiece in an input image in order to determine whether or not the peripheral object of the workpiece interferes with an end effector when the end effector is moved to a position in order to grip any one of workpieces included in the input image acquired by the input image acquisition unit 2c. Consequently, interference determination can be performed through comparison between an end effector model and an input image. The interference determination portion 8m determines, for example, the presence or absence of interference with an object present in the vicinity of a workpiece in a case where an end effector model is disposed at a grip position specified by the grip position specifying portion 8d in order to grip the workpiece with respect to a search result corresponding to a position and an attitude of each workpiece searched for from an input image by the three-dimensional search portion 8k.

Additional Region Setting Screen 310

Figure 32:
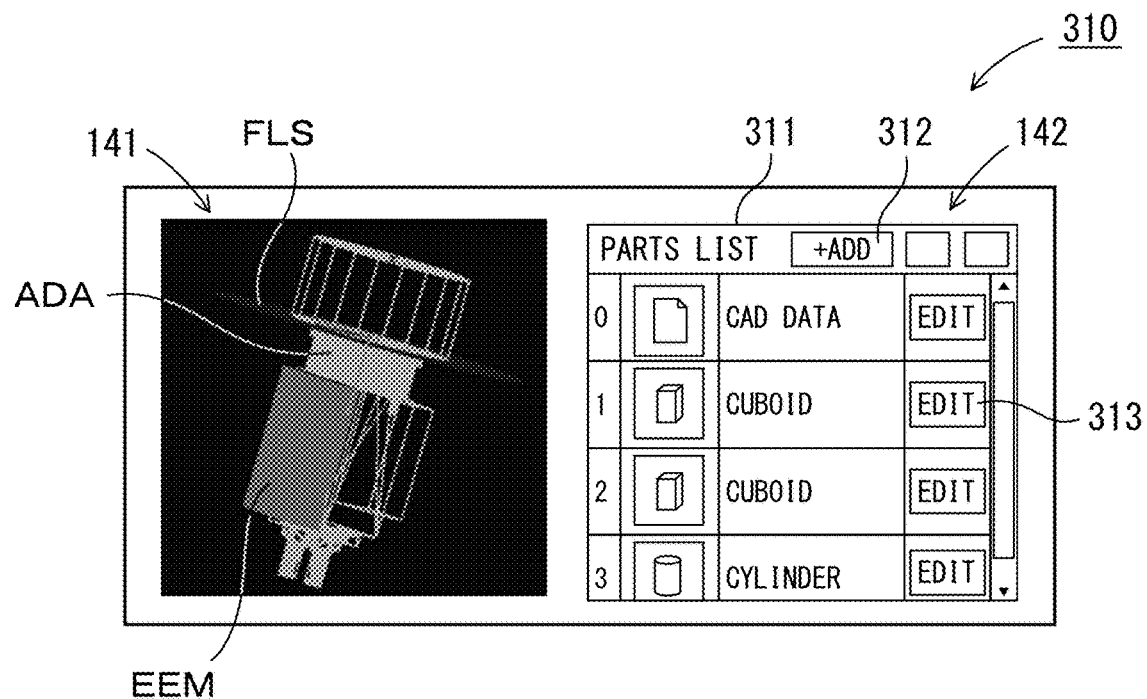
FIG. 32 is an image diagram illustrating an additional region setting screen.

An additional region is added to an end effector model formed of three-dimensional CAD data. Here, FIG. 32 illustrates an additional region setting screen 310 for adding an additional region to an end effector model as an aspect of the additional model creation portion 8v. On the additional region setting screen 310, the end effector model EEM which is three-dimensional CAD data of an end effector may be read, and a figure may be added thereto. The additional region setting screen 310 includes an image display field 141 and an operation field 142. The three-dimensional CAD data of the read end effector model EEM is displayed in the image display field 141. The operation field 142 is provided with a basic figure display field 311. A list of selectable basic figures is displayed in the basic figure display field 311. The basic figures may include a cuboid, a cylinder, a circular cone, a triangular cone, and a hexagonal prism. A user can add a basic figure to a designated position on the end effector model EEM by selecting the desired basic figure from the basic figure display field 311 and pressing an "add" button 312. An "edit" button 313 is provided in each of rows displayed in a list form in the basic figure display field 311, and, if the button is pressed, setting of a selected basic figure can be changed. For example, basic figure parameters such as a length of one side of a bottom, a diameter, and a height can be adjusted.

Figure 33:
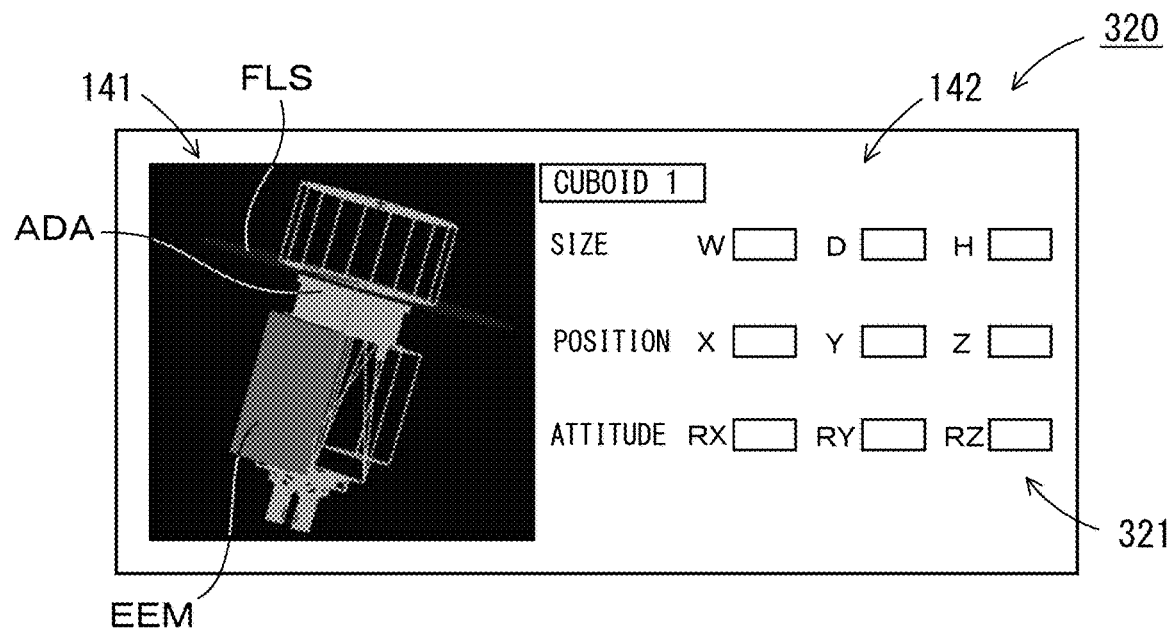
FIG. 33 is an image diagram illustrating a fundamental figure editing screen.
Figure 34:
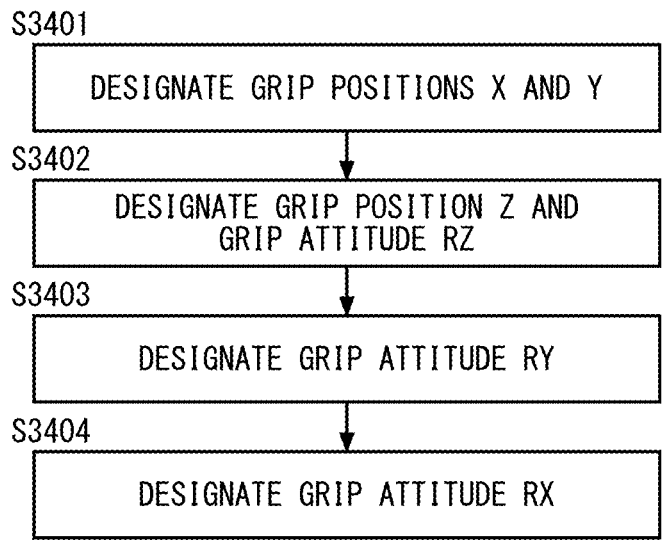
FIG. 34 is a flowchart illustrating procedures of registering a grip position and an attitude at which a workpiece is gripped by an end effector.

In the example illustrated in FIG. 32, a cuboid is selected as a basic figure desired to be added, and is highlighted in the basic figure display field 311. If the "edit" button 313 is pressed in this state, a basic figure editing screen 320 in FIG. 33 is displayed. A basic figure parameter adjustment field 321 is provided in the operation field 142 of the basic figure editing screen 320, and a size or a basic figure or a position or an attitude of an end effector for a reference position can be changed therefrom. If a basic figure parameter is adjusted from the basic figure parameter adjustment field 321, the display content of the image display field 141 is also updated according thereto.

In the example illustrated in FIG. 32, an additional region ADA is inserted between a flange surface FLS at the tip of the arm portion and the end effector model EEM. Consequently, a state in which an attachment tool or the like is interposed between the arm portion and the end effector can be reproduced. In a case where the flange surface at the tip of the arm portion is deviated from a surface set for calculation on the robot setting apparatus side, a basic figure may be used to offset a deviation amount.

A plurality of figures may be added. In the example illustrated in FIG. 32, various basic figures may be added by selecting a desired basic figure from the basic figure display field 311 and pressing the "add" button 312. Consequently, various shapes can be expressed through a combination of a plurality of basic figures.

As mentioned above, since the function of setting an additional region for an end effector model is provided, a shape can be easily added by only adding a basic figure prepared in advance without changing a shape through direct editing of a shape of three-dimensional CAD data as in the related art. As a result, in interference determination of checking whether or not a workpiece interferes with a peripheral object in advance when an end effector is disposed at a grip position of gripping the workpiece, in a case where there is a member which is not included in an end effector model but is actually present, the accuracy of a determination result can be improved by using a shape simulating the member. For example, in a case where an end effector is connected to the tip of the arm portion via a joint, the entire end effector may be offset, and thus the tip may protrude slightly. There is a case where an additional element such as a cover for contact prevention or a cable extending from an end effector is present on the outside of the end effector. Such an additional element is often not included in three-dimensional CAD data of an end effector model, and CAD data is not often prepared separately. Thus, it takes time to process and edit three-dimensional CAD data of an end effector model such that a shape corresponding to the additional element is obtained. Even if a complex shape can be expressed by CAD data, if three-dimensional CAD data indicating a complex shape is used for interference determination, a calculation process becomes complex, and a processing time is increased.

Therefore, if such an additional element is expressed as a figure, an end effector model having a form close to an actual state can be obtained with a simple additional region without performing a troublesome editing work, and thus a shape suitable for a real shape can be easily expressed. According to the method, a form of CAD data is not changed, and an interference determination region is added, and a processing time increase amount is reduced.

Grip Position Setting Procedures

Next, in step S2704 in FIG. 27, a description will be made of procedures of registering a grip position and a grip attitude at which a workpiece is gripped by an end effector with reference to a flowchart of FIG. 34 and FIGS. 35A to 38. Herein, six position parameters, that is, grip position parameters X, Y and Z and grip attitude parameters $R_X$, $R_Y$ and $R_Z$ defining a position and an attitude (hereinafter, collectively referred to as a "grip position") of the end effector model EEM for the workpiece model WM11 of when the workpiece model WM11 is gripped in a state in which the workpiece model WM11 is fixed by using the workpiece model WM11 and the end effector model EEM formed of three-dimensional CAD data, are sequentially set according to procedures illustrated in the flowchart of FIG. 34.

X-Y Designation Unit

First, in step S3401, an X coordinate and a Y coordinate of a grip position are designated. Herein, a two-dimensional plane image onto which a workpiece is projected onto a plane with an X-Y designation unit is displayed, and a grip position is designated on the plane image. An X-Y designation screen 230 as an aspect of the X-Y designation unit is illustrated in FIG. 35B. On the X-Y designation screen 230 illustrated in FIG. 35A, three-dimensional CAD data of a workpiece is displayed in a plan view in the image display field 141. In this state, a user designates a part of a workpiece model WM11F desired to be gripped by an end effector model and displayed in the plan view. If a grip position is selected with a pointing device such as a mouse on the plan view as in FIG. 35B, a desired position can be designated in an easily understandable aspect without being aware of an attitude, a rotation angle, or the like. Particularly, since a grip position on the workpiece model WM11F displayed in the plan view is clicked and designated, it is possible to obtain an advantage that easy designation can be performed compared with a case of adjusting a position by inputting a numerical value. A user may determine X and Y coordinates of a grip position on the basis of a manually designated position and a scale of an image. An X and Y coordinate display field on which X and Y coordinates are displayed in numerical values may be provided on the X-Y designation screen.

$Z$-$R_Z$ Designation Unit

Figure 36:
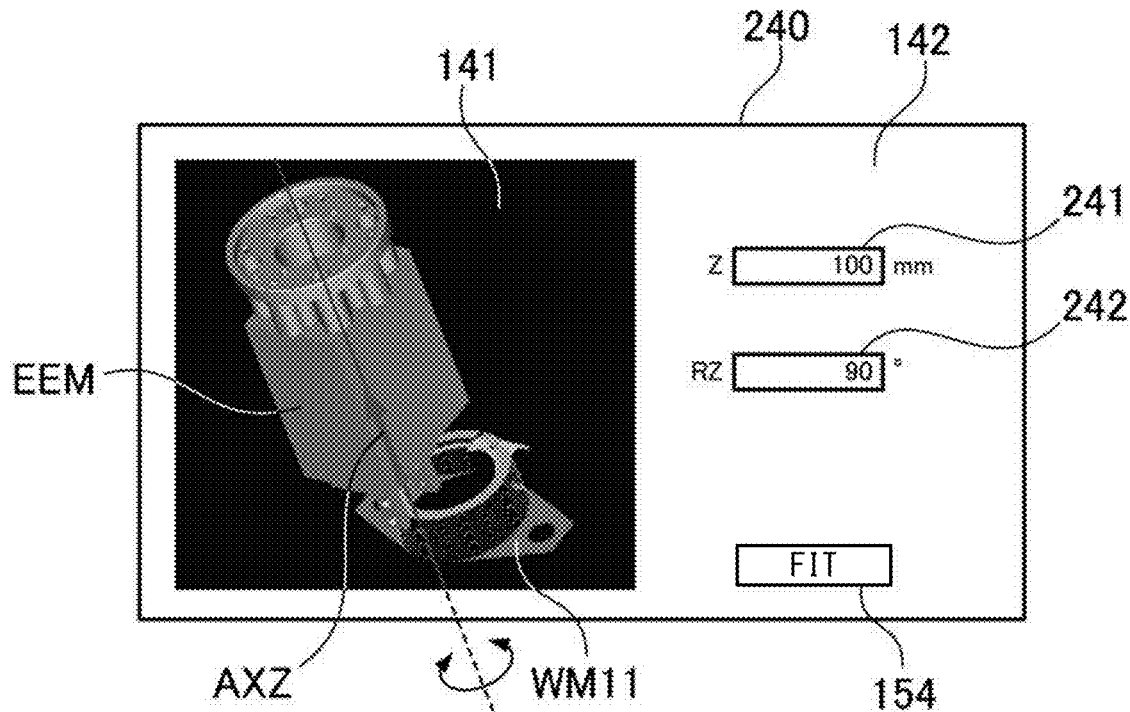
FIG. 36 is an image diagram illustrating a Z-$R_Z$ designation screen.
Figure 37:
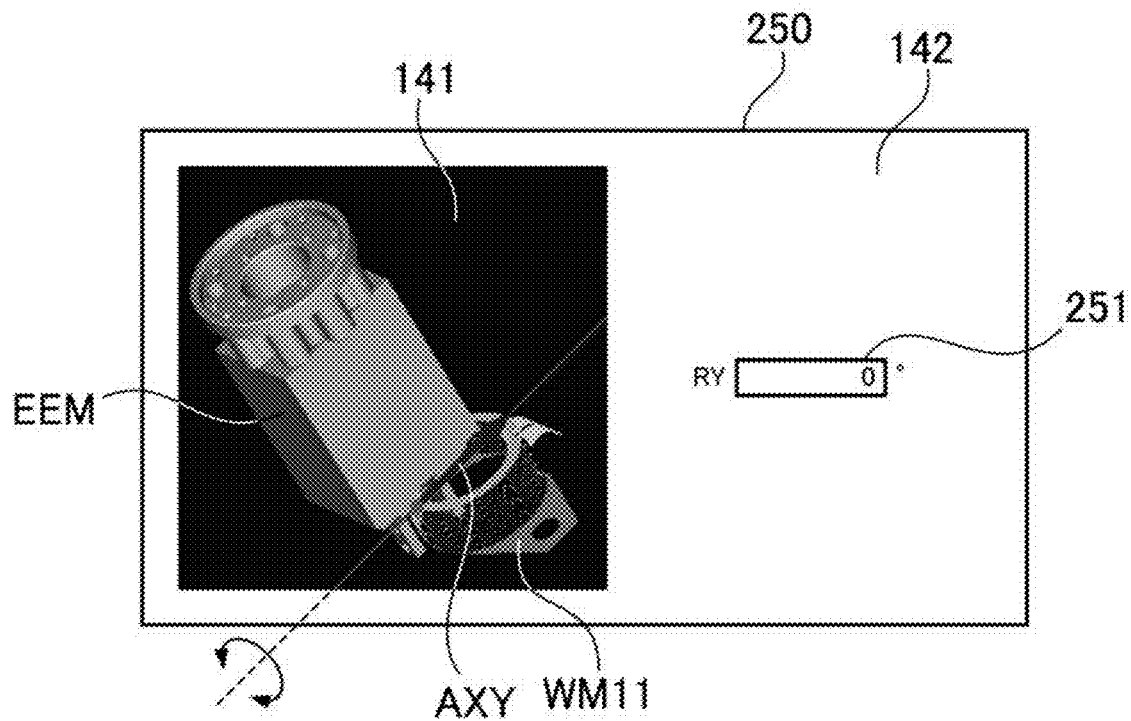
FIG. 37 is an image diagram illustrating an $R_Y$-designation screen.
Figure 38:
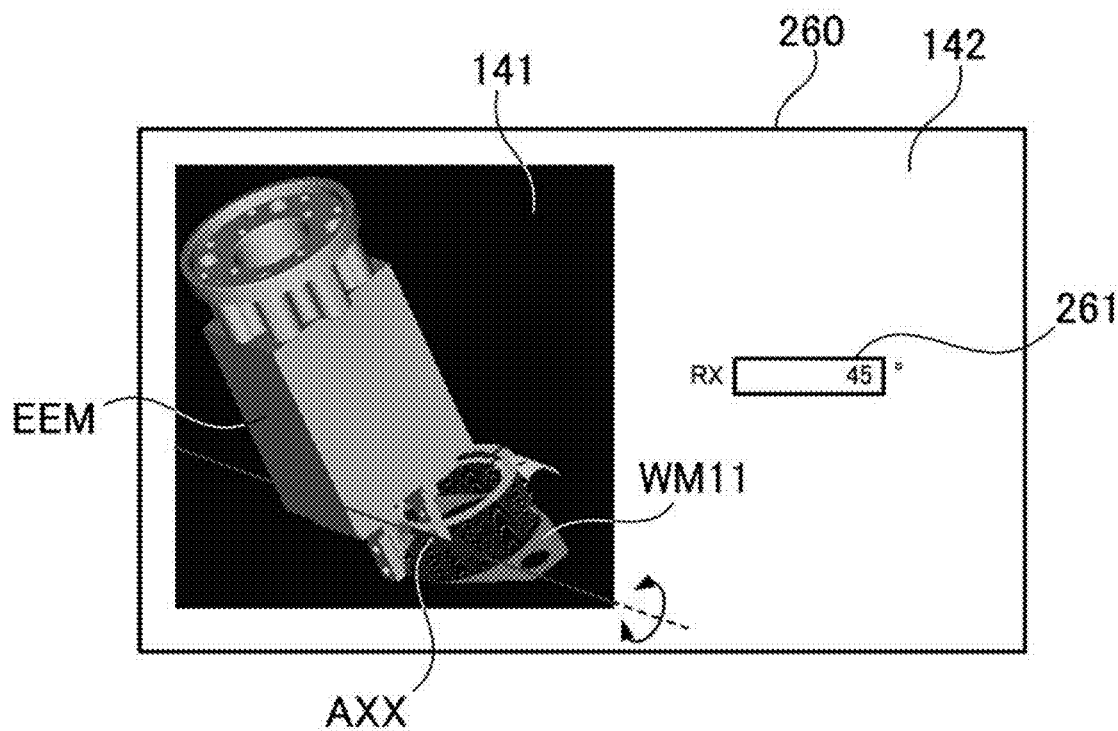
FIG. 38 is an image diagram illustrating an $R_X$-designation screen.

Next, in step S3402, a grip position Z and a grip attitude $R_Z$ are designated from a $Z$-$R_Z$ designation unit. FIG. 36 illustrates a $Z$-$R_Z$ designation screen 240 as an aspect of the $Z$-$R_Z$ designation unit. The $Z$-$R_Z$ designation screen 240 illustrated in FIG. 36 includes an image display field 141 and an operation field 142. The operation field 142 is provided with a Z coordinate designation field 241 for designating a Z coordinate of a grip position and an $R_Z$ rotation angle designation field 242 for designating an $R_Z$ rotation angle of a grip attitude. In this stage, the X and Y coordinates are already determined in step S3401, and thus only a Z axis may be displayed. Thus, only the correction rotational Z axis AXZ as a correction rotational axis is displayed in an overlapping manner in a state of displaying the end effector model EEM and the workpiece model WM11 in the image display field. Consequently, a user can imagine how the end effector model EEM displayed in the image display field 141 is rotated when a rotation angle is changed, and thus it is possible to obtain an advantage that position adjustment work for the end effector model EEM can be easily performed. Particularly, the user can visually recognize a rotation direction without being confused since other rotational axes are not displayed. Since position parameters other than the Z coordinate and the $R_Z$ rotation angle cannot be designated, it is possible to prevent other position parameters from being wrongly designated, and thus a user can concentrate on and set only position parameters that can be designated, and can thus focus on only necessary setting in a state in which confusion such as misunderstanding and erroneous setting is eliminated.

Regarding rotation of the end effector model EEM, a numerical value is input to the $R_Z$ rotation angle designation field 242, and thus the end effector model EEM in the image display field 141 is automatically rotated and displayed. The end effector model EEM displayed in the image display field 141 is dragged and rotated, and thus a value of the $R_Z$ rotation angle displayed in the $R_Z$ rotation angle designation field 242 is also changed.

$R_Y$ Designation Unit

In step S3403, a grip attitude $R_Y$ is designated. Herein, an $R_Y$ rotation angle is designated from an $R_Y$ rotation angle designation field 251 by using an $R_Y$ designation screen 250 illustrated in FIG. 37. In this example, an attitude of the end effector model EEM or the workpiece model WM11 is expressed by a Z-Y-X system Euler's angle. Thus, a direction of a rotational axis of $R_Y$ can be corrected by using the value of the $R_Z$ designated in step S3402. The correction rotational Y axis AXY which is a computed correction rotational axis is displayed in the image display field 141 as described above. If the $R_Y$ rotation angle is adjusted by displaying the rotational axis as mentioned above, a user can imagine how the end effector model EEM is changed, and can easily perform setting.

$R_X$ Designation Unit

Finally, in step S3404, a grip attitude $R_X$ is designated. Herein, an $R_X$ rotation angle is designated from an $R_X$ rotation angle designation field 261 by using an $R_X$ designation screen 260 illustrated in FIG. 38. The correction rotational X axis AXX indicating a direction of the rotational axis of $R_X$ is also displayed in the image display field 141.

In the above-described way, a user can designate six position parameters such as X, Y, Z, $R_X$, $R_Y$, and $R_Z$ regarding a grip position at which an end effector grips a workpiece. Particularly, since a position parameter which can be adjusted is restricted for each screen, and a rotational axis to be displayed is restricted to display of only a rotational axis regarding a position parameter related to designation, a user performs setting according to such guidance, and can thus sequentially define a necessary position parameter. As a result, it is possible to smoothly perform designation work, difficult in the related art, for a grip position at which three-dimensional position and attitude are designated. When $R_X$, $R_Y$ and $R_Z$ rotation angles of Euler's angles are set, rotational axes thereof are computed, and are displayed as correction rotational axes in the image display field 141, and thus a user can easily imagine how rotational axes are moved by changing position parameters which are being set.

Figure 39:
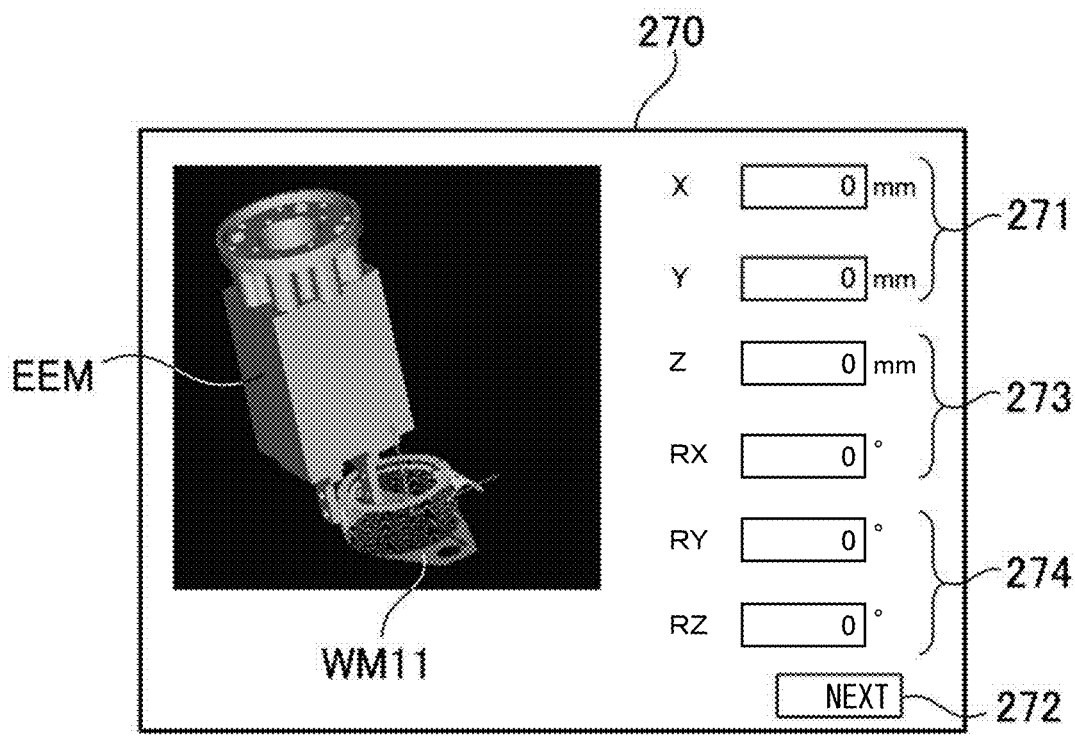
FIG. 39 is an image diagram illustrating a position parameter designation screen.

If registration of a grip position is divided into a plurality of steps, and a position parameter which can be adjusted is restricted in each step, a user can easily imagine how a rotational axis is moved by moving the position parameter. Particularly, a designation screen is provided in each step, and different position parameters are registered on different designation screens. Thus, a position parameter to be set by a user can be presented without confusion, and it is possible to guide setting work. In the example illustrated in FIGS. 36 to 38, a description has been made of an example in which different designation screens are provided, but the present invention is not limited to this example. For example, as illustrated in a position parameter designation screen 270 in FIG. 39, a position parameter which can be designated may be restricted in each step by using a common designation screen for designating a plurality of position parameters. In the example illustrated in FIG. 39, only X and Y coordinates can be designated from an X and Y coordinate designation field 271, and other position parameters are grayed out so as not to be designated and selected. If designation of the X and Y coordinates is completed, and a "next" button 272 is pressed, only separate position parameters, for example, a Z coordinate and an $R_Z$ rotation angle can be designated from a Z coordinate and $R_Z$ rotation angle designation field 273 in the next step, and other position parameters including the designated X and Y coordinates are all grayed out or not displayed to be unselectable. If the Z coordinate and the $R_Z$ rotation angle are designated, and then the "next" button 272 is pressed, only further separate position parameters, for example, $R_X$ and $R_Y$ rotation angles can be designated from an $R_X$ and $R_Y$ rotation angle designation field 274 in the next step, and other position parameters cannot be selected. With this configuration, it is also possible to realize a guidance function of presenting restricted position parameters which can be designated to a user, and sequentially setting the position parameters.

The number or division of steps for sequentially defining position parameters is not limited to the above-described example. For example, a Z coordinate and an $R_Z$ rotation angle may be set in separate steps, or an $R_X$ rotation angle and an $R_Y$ rotation angle may be set in the same step. For example, as an example of dividing a step related to a position into a plurality of steps, the Z-$R_Z$ designation unit is formed of a Z designation unit for designating a Z coordinate and an $R_Z$ designation unit for designating an $R_Z$ rotation angle centering on the Z axis. Alternatively, the $R_X$-$R_Y$ designation unit may be formed of an $R_X$ designation unit for designating an $R_X$ rotation angle centering on the X axis and an $R_Y$ designation unit for designating an $R_Y$ rotation angle centering on the Y axis. Alternatively, the screens illustrated in FIGS. 37 and 38 may be integrated into a single screen and used as an $R_X$-$R_Y$ designation unit such that an $R_X$ rotation angle and an $R_Y$ rotation angle can be designated.

In the above-described example, a description will be made of an example in which a position and an attitude of an end effector model are adjusted in a state in which a workpiece model side is fixed, but the present invention is not limited to the example, and a position and an attitude of a workpiece model side may be adjusted in a state in which an end effector model is fixed. Alternatively, positions and attitudes of both of an end effector model and a workpiece model may be adjusted.

Figure 40:
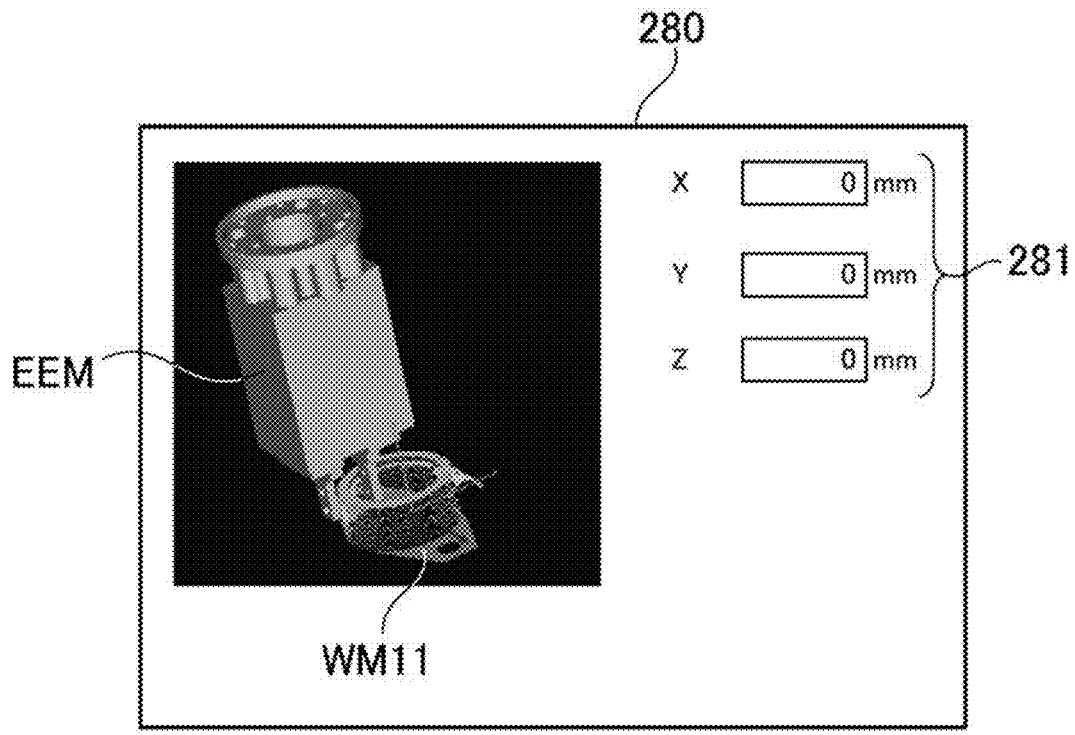
FIG. 40 is an image diagram illustrating an X-Y-Z designation screen.
Figure 41:
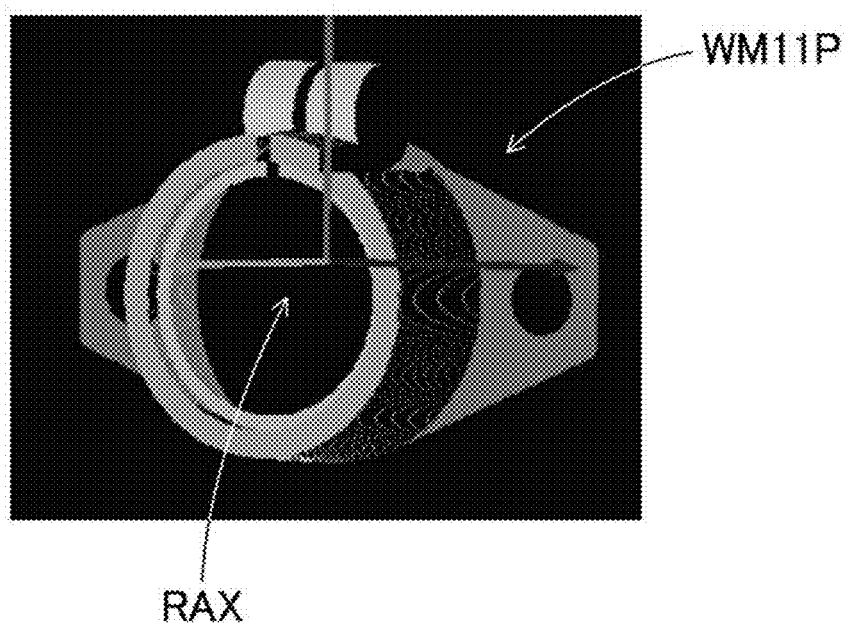
FIG. 41 is an image diagram illustrating a state in which a grip position is designated in a state in which a workpiece model in FIG. 35B is projected from an inclined direction.

In the above-described example, a description will be made of an example in which, regarding the six position parameters such as X, Y, Z, $R_X$, $R_Y$, and $R_Z$, X and Y coordinates are defined in the X-Y designation unit, a Z coordinate and an $R_Z$ rotation angle are defined in the Z-$R_Z$ designation unit, and $R_X$ and $R_Y$ rotation angles are defined in the $R_X$-$R_Y$ designation unit in this order, but an order or a combination of defining the respective position parameters is not limited to the above-described configuration. For example, an X-Y-Z designation unit, an $R_Z$ designation unit, and an $R_X$-$R_Y$ designation unit may be prepared, X, Y and Z coordinates of an end effector model or a workpiece model may be designated in the X-Y-Z designation unit, then an $R_Z$ rotation angle centering on the Z axis may be designated in the $R_Z$ designation unit, and, finally, an $R_X$ rotation angle centering on the X axis and an $R_Y$ rotation angle centering on the Y axis may be designated in the $R_X$-$R_Y$ designation unit. In this case, for example, an X-Y-Z designation screen 280 as illustrated in FIG. 40 may be used as the X-Y-Z designation unit, and X, Y and Z coordinates may be designated from an X, Y and Z-coordinate designation field 281 with respect to the end effector model EEM or a workpiece model displayed in a three-dimensional manner. As mentioned above, an image for initially designating a grip position is not limited to a plane image projected onto an XY plane as illustrated in FIG. 35B, and different projection directions may be used, and, for example, designation may be performed by using a perspective view WM11P obtained through projection from an inclined direction as illustrated in FIG. 41.

Figure 35A:
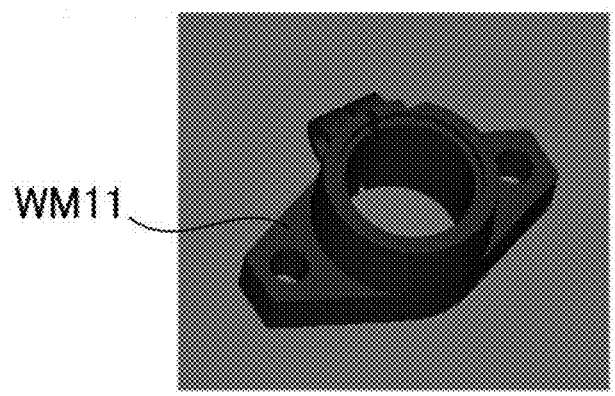
FIG. 35A is an image diagram of a workpiece model formed of three-dimensional CAD data.
Figure 35B:
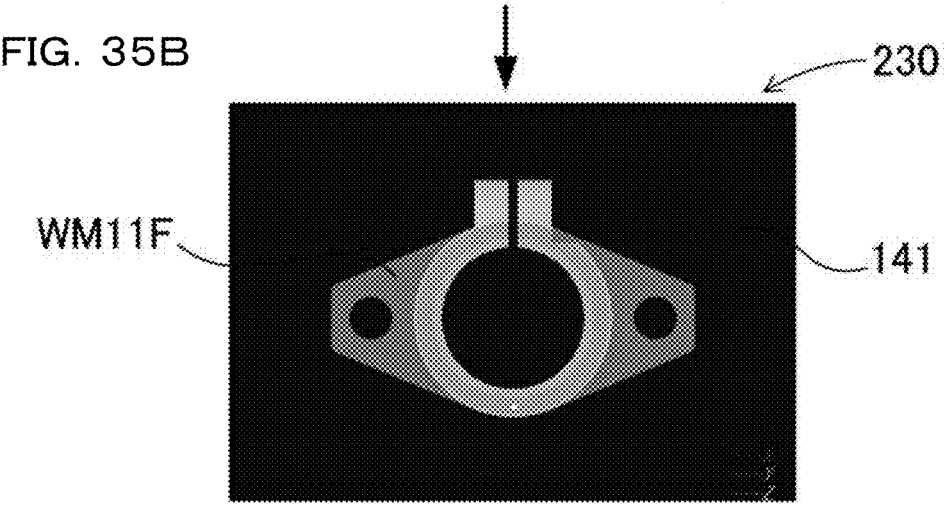
FIG. 35B is an image diagram illustrating an X-Y designation screen.
Figure 42:
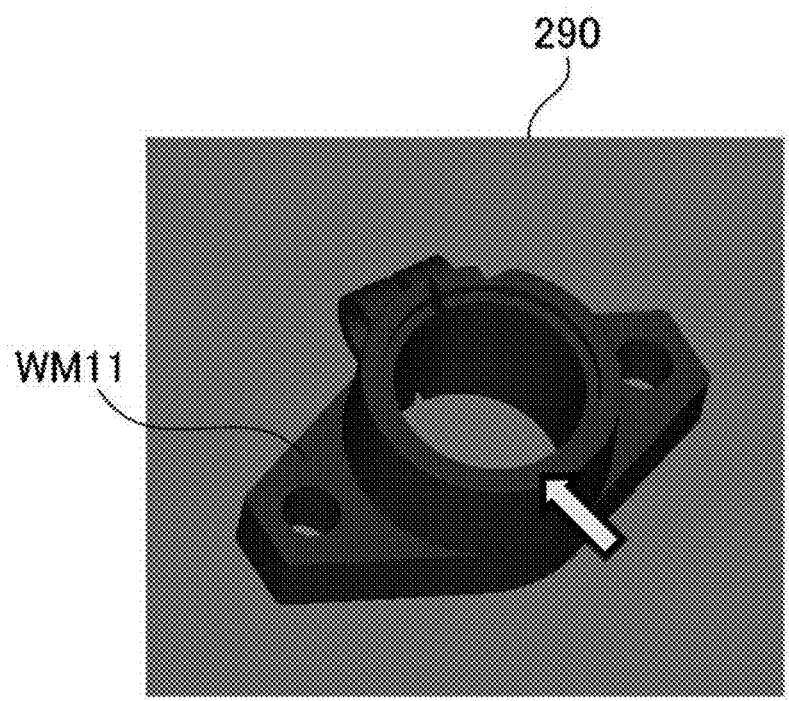
FIG. 42 is an image diagram illustrating a state in which a grip position is designated on a three-dimensional image viewer.

The present invention is not limited to the method of designating a grip position on an image projected onto a plane as in FIG. 35B, and a grip position may be designated in a state without projection as illustrated in FIG. 35A. For example, in a state in which the workpiece model WM11 is three-dimensionally displayed on a three-dimensional image viewer 290 as illustrated in FIG. 42, a grip position is designated on the screen by using an operation unit formed of a pointing device such as a mouse.

Modification Examples

In the above-described example, a description will be made of procedures of designating the six position parameters such as X, Y, Z, $R_X$, $R_Y$, and $R_Z$ according to a Z-Y-X system Euler's angle, but the present invention is not limited to this aspect, and a position and an attitude of an end effector or the like may be defined as other aspects of defining a position and an attitude of an end effector or a workpiece, for example, an X-Y-Z system Euler's angle, a X-Z-Y system Euler's angle, a Y-X-Z system Euler's angle, a Y-Z-X system Euler's angle, a Z-X-Y system Euler's angle, an X-Y-X Euler's angle, an X-Z-X Euler's angle, a Y-X-Y system Euler's angle, an Y-Z-Y Euler's angle, a Z-X-Z system Euler's angle, an Z-Y-Z Euler's angle, or roll/pitch/yaw angle expression, and a rotational axis/rotation angle expression.

In the above-described example, a description has been made of an example in which only a correction rotational axis regarding a position parameter to be designated is displayed as a correction rotational axis, but other correction rotational axes are not limited to a configuration in which the axes are completely not displayed. For example, the same effect can be achieved even if three orthogonal axes including other correction rotational axes are displayed, and a rotational axis related to a rotation angle to be designated is highlighted more than other correction rotational axes. As an example, a rotational axis related to a rotation angle which is being designated is displayed in boldface, and is highlighted through coloring or blinking, and, on the contrary, a rotational axis which cannot be designated is grayed out or is displayed in a thin line, so that appearance thereof is distinct. Particularly, in three-dimensional display of an image, if there are orthogonal coordinate axes, a user can intuitively recognize three-dimensional display, and thus the user hardly confuses rotational axes by differentiating a target rotational axis from other rotational axes while display of three axes is maintained. The origin of when the three axes are displayed is preferably the center of rotation. For example, the origin is set to an intermediate position of a pair of claws which is a grip position of the end effector model EEM as described above.

Grip Position Copying Function

A grip position copying function may be provided in which, when a plurality of grip positions are registered, a grip position which is already registered is read, and a grip position is changed on the basis of the grip position so as to be registered as a new grip position. Generally, a plurality of grip positions are often registered for a single workpiece. This is because, if a plurality of grip positions are registered, an optimal solution can be selected from among a plurality of grip solutions, and, thus, even in a case where an obtained grip solution candidate interferes, if there are other grip solution candidates, there is a high probability that it is determined that grip is possible. In a case where a plurality of grip solutions are registered, if grip registration is performed from the beginning every time, much trouble is caused when the same grip position is registered, and thus the work is troublesome. Therefore, a grip position which is already registered is copied, some position parameters set for the grip position are changed, and thus a new grip position can be stored. Therefore, time and effort can be saved, and a plurality of grip positions can be easily registered. Similarly, an existing grip position may be read, and a position parameter may be corrected, overwritten, and stored.

Grip Position Copying Portion 8d8

The grip position copying function or a grip position editing function is realized by using the grip position copying portion 8d8 illustrated in FIG. 26. The grip position copying portion 8d8 reads a grip position of a workpiece model or an end effector model stored in the grip position storage portion 9b, and changes and registers position parameters forming the grip position. If position parameters are also sequentially registered according to guidance as described above when a grip position is changed by the grip position copying portion 8d8, it becomes easier to understand which position parameter is preferably changed in a corresponding step, and thus grip registration is simplified.

As described above, a fitting function may be added in which, when a grip position is designated, an end effector model is automatically moved to a grip position of a workpiece model. For example, a "fit" button 154 may be provided in the operation field 142 on the Z-$R_Z$ designation screen 240 in FIG. 36, and the fitting function may be executed such that a Z coordinate can be automatically set.

Embodiment 5

Figure 43:
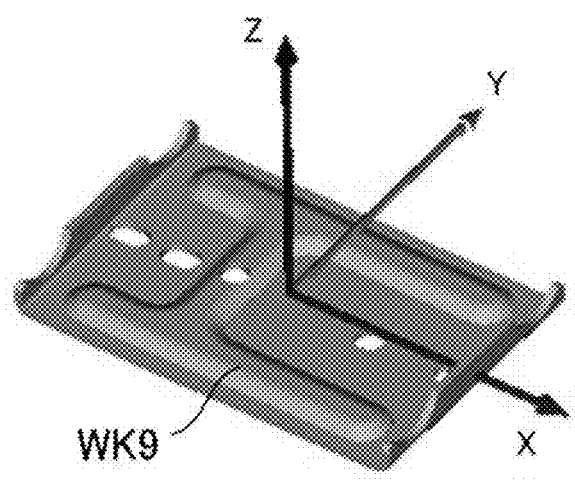
FIG. 43 is an image diagram illustrating a tabular workpiece.
Figure 44E:
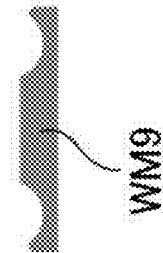
FIG. 44E is a right side view of the workpiece model.
Figure 44F:
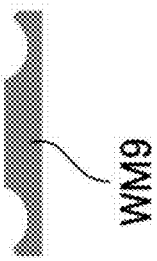
FIG. 44F is a left side view of the workpiece model.
Figure 44C:
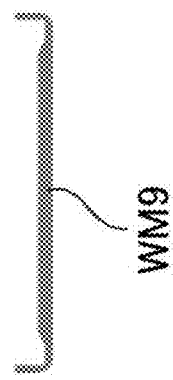
FIG. 44C is a front view of the workpiece model.
Figure 44D:
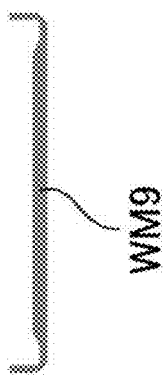
FIG. 44D is a rear view of the workpiece model.
Figure 44A:
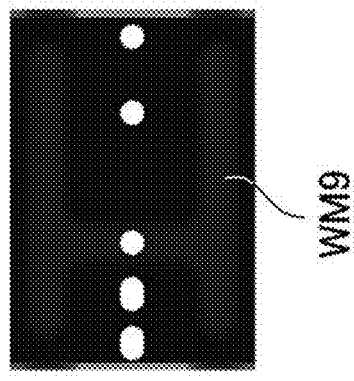
FIG. 44A is a plan view of a workpiece model indicating the workpiece in FIG. 43.
Figure 44B:
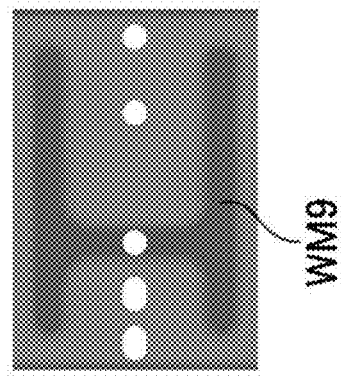
FIG. 44B is a bottom view of the workpiece model.
Figure 45:
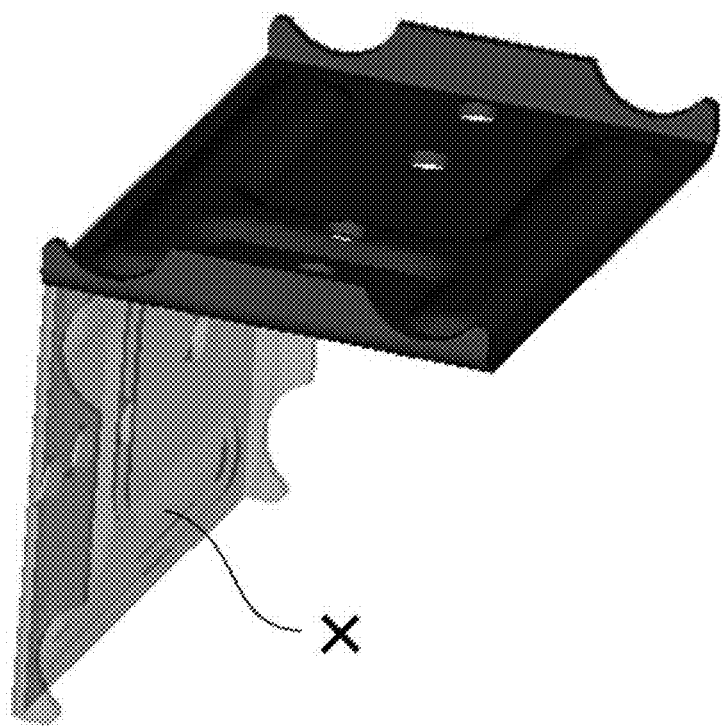
FIG. 45 is an image diagram illustrating a result in which a three-dimensional search is performed on point group data obtained by imaging a workpiece group in which a plurality of the workpieces in FIG. 43 are loaded in bulk.

An attitude or an angle which can be taken by a search model may be restricted in order to improve the accuracy of a three-dimensional search. For example, it is considered that a position and an attitude of a workpiece are detected through a three-dimensional search from a workpiece group in which a plurality of plate-like workpieces WK9 as illustrated in FIG. 43 are loaded in bulk. In this case, respective faces of a workpiece model WM9 representing the workpieces WK9 in FIG. 43 with three-dimensional CAD data are illustrated in FIGS. 44A to 44F. In other words, FIG. 44A is a plan view of the workpiece model WM9, FIG. 44B is a bottom view thereof, FIG. 44C is a front view thereof, FIG. 44D is a rear view thereof, FIG. 44E is a right side view, and FIG. 44F is a left side view. Faces excluding repeated faces from the fundamental direction images are registered as search models. Herein, it is assumed that four faces in FIGS. 44A, 44B, 44C and 44E are registered. In this state, point group data having three-dimensional information is acquired by imaging the bulk workpiece group, and a three-dimensional search is performed. As a result, wrong detection may occur as if the workpiece is present at a vertical attitude as indicated by X in FIG. 45. Actually, a thin plate-like workpiece is scarcely upright, and thus a plate-like workpiece is substantially linear or rectangular in a front view as illustrated in FIG. 44C. Therefore, there is a case where a shape of a part of the workpiece is in common with a shape of another part forming a surface of the workpiece, for example, the shape illustrated in FIG. 44A or 44B, and thus wrong detection occurs.

Figure 46:
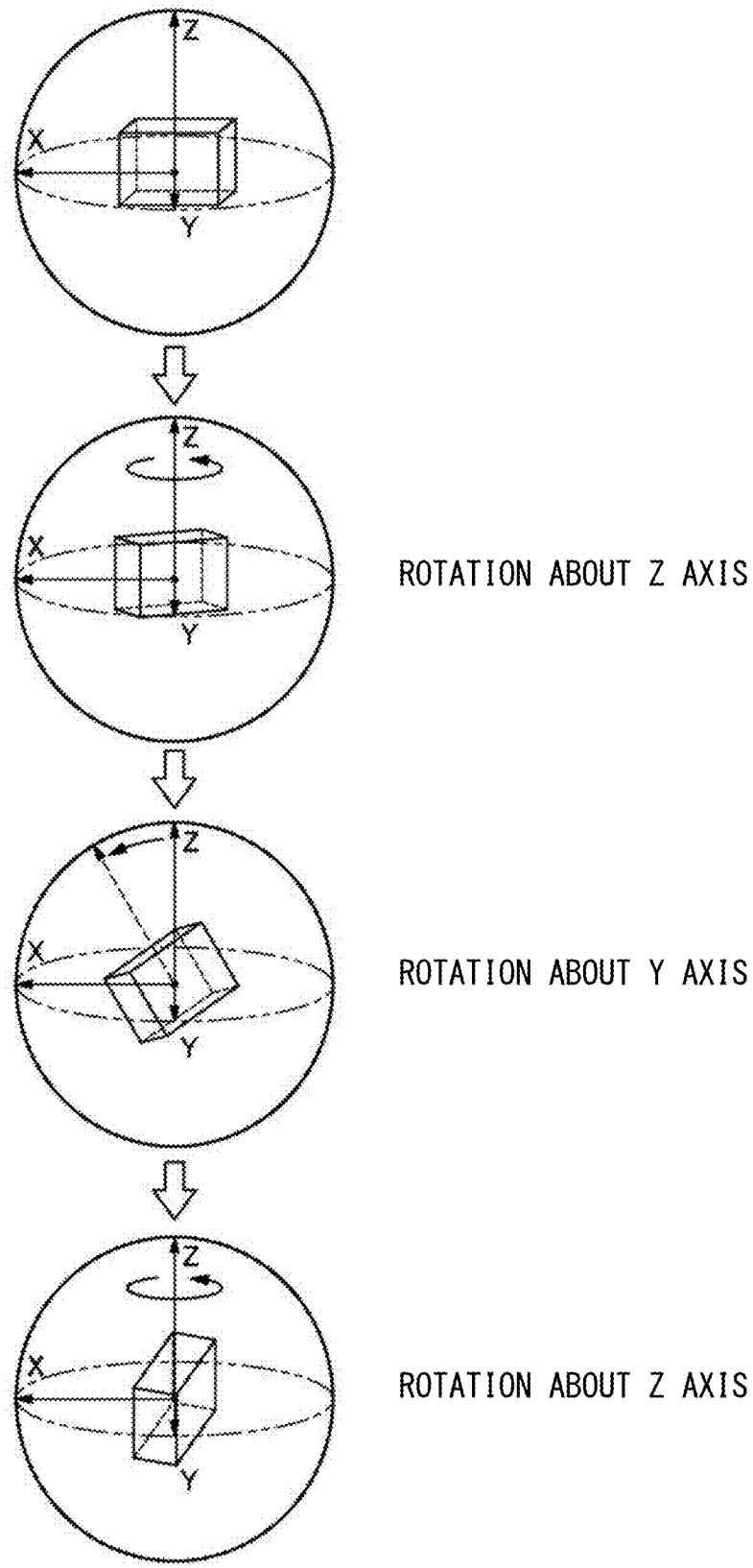
FIG. 46 is a schematic diagram illustrating an example of expressing an attitude of a workpiece by using a Z-Y-X system Euler's angle.

In contrast, an attitude which can be taken by a workpiece may be restricted, and a three-dimensional search may be performed, but it is difficult to set a condition for performing attitude restriction. For example, there is a method in which all attitudes of a workpiece can be expressed by defining rotation angle ranges of the Z axis, the Y axis, and the Z axis by using a Z-Y-Z system Euler's angle as illustrated in FIG. 46, but, in this method, it is not easy to define a rotation angle about each axis such that an attitude range desired by a user is obtained.

Therefore, in Embodiment 5, a user can easily set an attitude which can be taken by a workpiece without using such a troublesome concept. Specifically, when a search model is registered, an attitude which is scarcely taken in bulk is excluded, and thus a face related to the attitude is not detected. Such setting is performed by using the search model registration portion 8g illustrated in FIG. 6. The search model registration portion 8g selects a fundamental direction image registered as a search model for performing a three-dimensional search for specifying a position and an attitude of each workpiece from among some fundamental direction images with respect to a plurality of workpiece groups loaded in bulk. Regarding a difference between the search model registration portion 8g and the fundamental direction image selection portion 8e, the fundamental direction image selection portion 8e selects one of fundamental direction images having the same viewing way. In contrast, the search model registration portion 8g excludes a fundamental direction image which is not desired to be a search target during a three-dimensional search from a search model registration target. Preferably, in a state in which the fundamental direction image selection portion 8e excludes a fundamental direction image having the same viewing way, the search model registration portion 8g further excludes an unnecessary fundamental direction image from a search model registration target. Alternatively, a fundamental direction image desired to be searched is selected. Consequently, a user selects fundamental direction images which are narrowed to search model registration candidates in advance, and can thus easily perform search model registration work by reducing the number of candidates.

Search Model Registration Screen 130B

Figure 47:
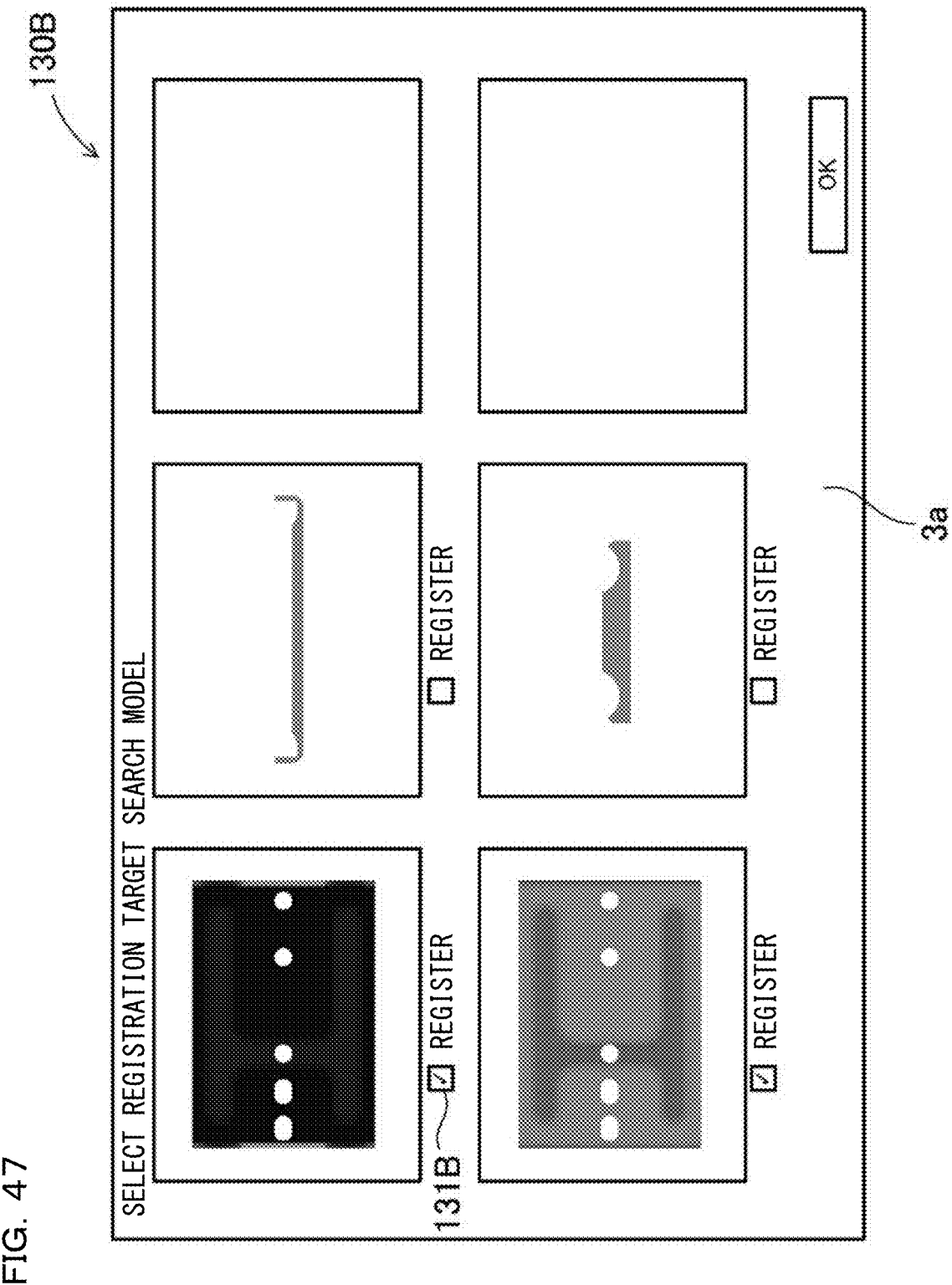
FIG. 47 is an image diagram illustrating a search model registration screen.

Here, FIG. 47 illustrates an example of a search model registration screen 130B on which a search model is registered for the workpiece in FIG. 43 described above. On the search model registration screen 130B illustrated in FIG. 47, the fundamental direction image selection portion 8e excludes two fundamental direction images in FIGS. 44D and 44F having the same viewing way, in the examples illustrated in FIGS. 44A to 44F, from six fundamental direction images corresponding to six drawings generated by the fundamental direction image generation portion 8e' with respect to the workpiece model WM9 corresponding to the workpieces WK9 in FIG. 43, and displays the remaining four fundamental direction images in the six-drawing display region 3a of the display unit in this state. In this state, as an aspect of the search model registration portion 8g setting whether or not a search model is to be registered, a selection checkbox 131B such as "register" displayed in each fundamental direction image on the search model registration screen 130B is provided. If a user checks the selection checkbox 131B, a corresponding fundamental direction image is registered as the search model, but, conversely, if the user does not check the selection checkbox 131B, a corresponding fundamental direction image is excluded from a search model registration target. A user can exclude an attitude which is scarcely taken in an actual bulk state while viewing each fundamental direction image displayed in the six-drawing display region 3a. In the example illustrated in FIG. 47, the selection checkboxes 131B of the model C and the model D are not checked, and attitudes at which such side faces are viewed, that is, attitudes at which the tabular workpiece is upright can be excluded from three-dimensional search targets. Consequently, a user can exclude an image on which a search is not required to be performed or select only a necessary image while viewing a fundamental direction image indicating an attitude of a workpiece without performing work such as troublesome angle computation or range designation for the workpiece, and can easily put a restriction on an attitude of a workpiece which is a three-dimensional search target.

The search model registration portion 8g is not limited to an aspect in which a user manually selects a search model registration target or a search model exclusion target, and may automatically extract and exclude a fundamental direction image of an attitude which is scarcely taken by calculating a shape or the centroid of a workpiece model.

Alternatively, a combination of automatic calculation and manual selection may be used, and, for example, as illustrated in FIG. 47, there may be a configuration in which the selection checkbox 131B is displayed not to be checked as an initial state with respect to a fundamental direction image of an attitude which is determined as being scarcely taken through calculation while displaying all fundamental direction images selected by the fundamental direction image selection portion 8e on the search model registration screen 130B. A user can manually correct selection as necessary while referring to an automatic determination result in the search model registration portion 8g, and can more reliably register a search model by pressing an OK button.

In FIG. 47, a description has been made of the example in which selection in the fundamental direction image selection portion 8e is performed through automatic calculation, but automatic determination and manual selection in the fundamental direction image selection portion may be combined with each other in the same manner. For example, as a result of determination in the fundamental direction image selection portion, one of fundamental direction images determined as having the same viewing way is grayed out and is displayed in the six-drawing display region, and thus a user can check a result of automatic determination in the fundamental direction image selection portion. In a case where a determination result is wrong, the user may manually select the fundamental direction image so as to remain the fundamental direction image as a fundamental direction image or conversely exclude the fundamental direction image. As mentioned above, a result of automatic calculation is displayed and is checked by a user, and thus it is possible to further increase the accuracy of image selection. A state in which selection/non-selection is set in advance on the basis of an automatic determination result is used as an initial state. Thus, if a result of selection based on automatic determination is correct, a user presses an OK button so as to approve the selection, so that time and effort on the user side can be minimized.

The purpose of excluding an unnecessary face from a three-dimensional search target is also applicable to states other than a workpiece upright state. For example, in addition to an aspect in which workpieces are stacked completely randomly, in a state in which an input image of a workpiece group is given in an aspect in which a specific face is exposed, it is possible to prevent wrong detection by excluding faces not exposed. Particularly, this is effective to a workpiece of which shapes of front and rear faces are similar to each other, and thus the rear face is easily wrongly detected. As mentioned above, if a search model of the rear face which cannot be actually viewed has only to be excluded from a three-dimensional search target, it is possible to achieve the same effect as restricting an attitude of a workpiece such that a rear face side of the workpiece is not detected.

Procedures of Registering Search Model

Figure 48:
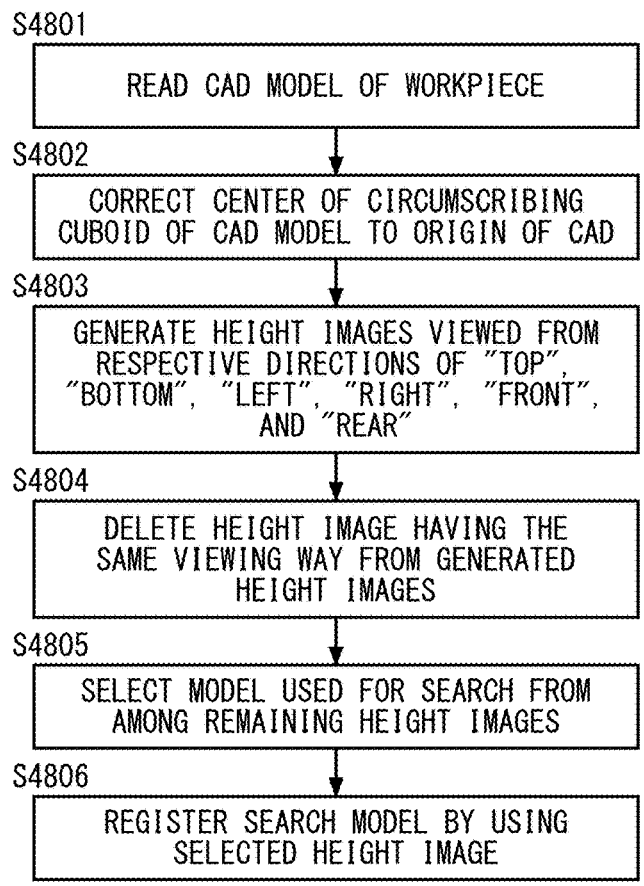
FIG. 48 is a flowchart illustrating registration procedures for a search model in which an attitude restriction is provided.

A description will be made of procedures of registering a search model in which an attitude restriction is provided with reference to a flowchart of FIG. 48. Herein, a description will be made of procedures of registering three-dimensional CAD data of a workpiece as a search model.

First, in step S4801, three-dimensional CAD data of a workpiece is read. Next, in step S4802, the center of a circumscribing cuboid of the three-dimensional CAD data model is corrected to the origin of the three-dimensional CAD data. In step S4803, height images viewed from respective directions of "top", "bottom", "left", "right", "front", and "rear" are generated. Here, in a case where a height image is generated on the basis of the three-dimensional CAD data, the height image is generated such that the origin of CAD is the center of the height image. In step S4804, a height image having the same viewing way is deleted from the generated height images.

In step S4805, a search model used for a three-dimensional search is selected from among the remaining height images. Herein, the search model selection portion 8i excludes an unnecessary fundamental direction image, and selects a necessary fundamental direction image.

Finally, in step S4806, the selected height image is registered as a search model. Herein, the search model registration portion 8g registers the search model. In the above-described way, a fundamental direction image of an unnecessary attitude can be excluded, and thus a search model can be registered in a state in which an attitude restriction is substantially provided.

Embodiment 6

Figure 49:
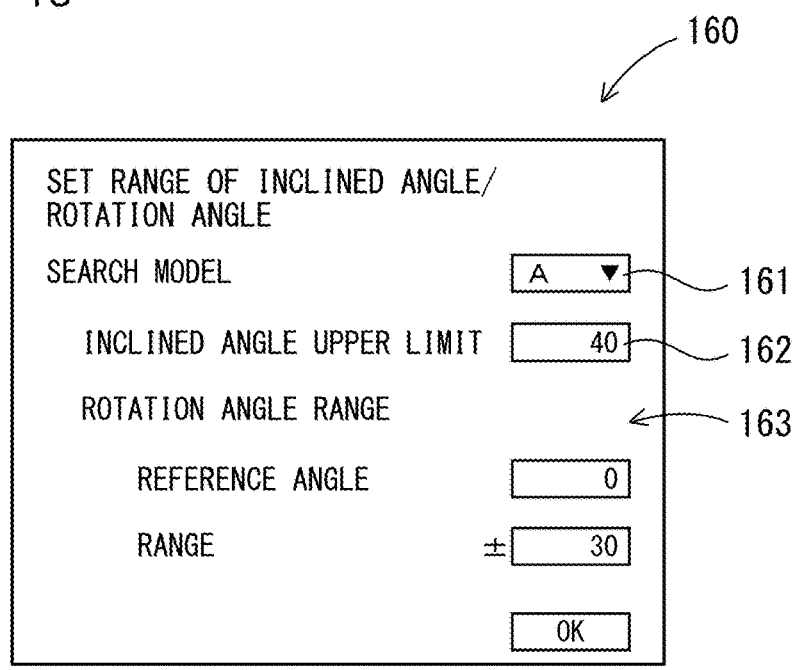
FIG. 49 is an image diagram illustrating an inclined angle/rotation angle setting screen.

A description has been made of an example of restricting a three-dimensional search target by using an image instead of a numerical value. However, the present invention is not limited to this aspect, and an attitude may be restricted by using an inclined angle or a rotation angle of a search model instead thereof or in addition thereto. Consequently, a three-dimensional search condition can be appropriately set according to a state in which workpieces are actually stacked, and thus it is possible to reduce wrong detection in a search. An example of an inclined angle/rotation angle setting screen 160 on which an attitude restriction using an inclined angle and a rotation angle is performed is illustrated in FIG. 49 as Embodiment 6. The inclined angle/rotation angle setting screen 160 illustrated in FIG. 49 includes an attitude restriction search model selection field 161 for selecting a search model on which an attitude restriction is performed, an inclined angle upper limit setting field 162 for designating an upper limit of an allowable inclined angle, and a rotation angle range setting field 163 for defining an allowable rotation angle range.

Inclined Angle/Rotation Angle Setting Screen 160

On the inclined angle/rotation angle setting screen 160, designation is performed by using an "inclined angle" and a "rotation angle" from an attitude during registration of a search model as easily understandable parameters without having professional knowledge instead of a difficult method of designating a three-dimensional attitude by using, for example, $R_X$, $R_Y$, and $R_Z$ indicating rotation angles about coordinate axes for a workpiece. Herein, an inclined angle and a rotation angle are designated from a state in which an attitude in a fundamental direction image registered as a search model is used as a registration attitude (details thereof will be described later).

Specifically, on the inclined angle/rotation angle setting screen 160 in FIG. 49, a search model on which an attitude restriction is imposed is selected in the attitude restriction search model selection field 161. In the example illustrated in FIG. 49, the search model of the model A registered on the search model registration screen 130B in FIG. 47 is selected.

An inclined angle within a predetermined range which is output as a result of a three-dimensional search with respect to the attitude during registration is set in the inclined angle upper limit setting field 162.

A reference angle and an angle range are set in the rotation angle range setting field 163. First, a rotation angle for the attitude during registration is input to a reference angle setting field. The rotation angle set here is a reference angle when a rotation angle range is designated. A rotation angle range which is output as a result of a three-dimensional search with respect to the reference angle set in the reference angle setting field is set in a range setting field.

Attitude Restriction Method Using Inclined Angle and Rotation Angle

Here, a description will be made of a method of obtaining an inclined angle and a rotation angle on the basis of a three-dimensional attitude of a search model. In a method of restricting a face to be registered as a search model in the three-dimensional search, a form of automatically imposing an attitude restriction is obtained. On the other hand, in a case where an attitude restriction is imposed on the face registered as a search model, an attitude registered for the face is used.

Herein, an attitude restriction is performed with two angles such as an "inclined angle" for a registered attitude and a "rotation angle" directly viewed from the top for the registered attitude. If only the two angles are used, the concept thereof is easily understandable, and an angle restriction can be performed relatively simply.

Inclined Angle

First, an inclined angle is defined as an angle for a Z vertical direction of an attitude of a workpiece model when registered as a search model as illustrated in FIGS. 50A to 50C. FIG. 50A illustrates an attitude of a workpiece model WMR when a search model is registered and a Z axis defined as a vertical direction of the workpiece model. In contrast, an attitude of a workpiece WKI and a Z' axis defined as a vertical direction of the workpiece WKI included in an input image are in a state as illustrated in FIG. 50B. In this state, an "inclined angle" is defined as an inclined angle between the Z axis and the Z' axis, that is, an inclination of the workpiece in the vertical direction, as illustrated in FIG. 50C. Consequently, the inclined angle can be represented by a single angle such as an inclination relative to a registered state of the search model regardless of an inclined direction. It is possible to obtain an advantage that a user can conceptually easily understand an inclined angle.

Rotation Angle

On the other hand, a rotation angle is a defined as a rotation angle when viewed from a vertical direction during registration, that is, the Z axis. Here, the rotation angle will be described with reference to FIGS. 51A to 51C. Among these figures, FIG. 51A illustrates a workpiece model WMR when a search model is registered, and a Y axis defining an XY plane. In contrast, an attitude of a workpiece WKI and a Y' axis defining an XY plane included in an input image are in a state as illustrated in FIG. 51B. In this state, a "rotation angle" is defined as a rotation angle when viewed from the vertical direction, that is, the Z axis, as illustrated in FIG. 51C. In this example, the rotation angle is defined as an angle of the Y axis viewed from the Z axis direction with a coordinate axis in the Y axis direction defining a workpiece model or a workpiece as a reference. With this definition, it is possible to obtain an advantage that a user can easily understand a rotation angle in the same concept as an angle in a two-dimensional pattern search of the related art.

Figure 8:
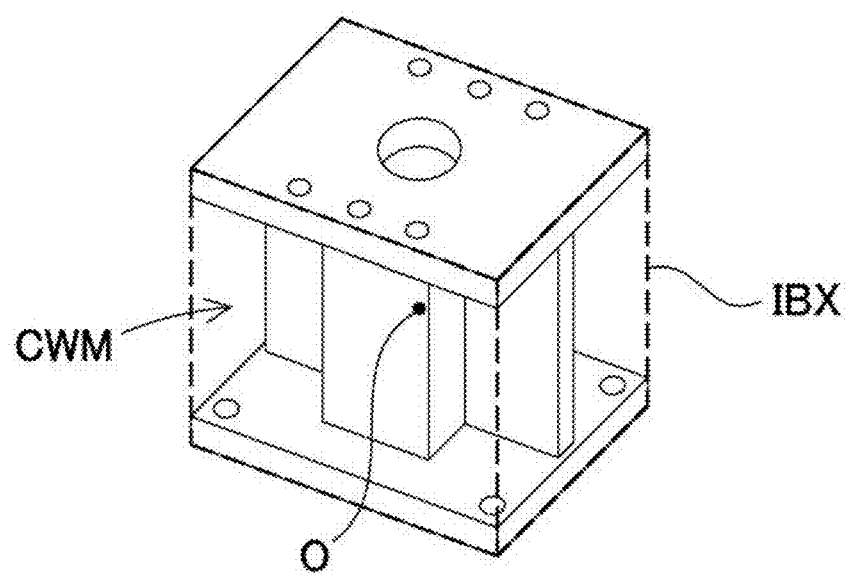
FIG. 8 is an image diagram illustrating a state in which the origin of a search model is set for the workpiece model illustrated in FIG. 7.

As a method of defining the origin and XYZ axes for a workpiece, a known algorithm may be used. For example, as illustrated in FIG. 8, a figure circumscribing a workpiece, for example, a cuboid or a sphere is calculated on the basis of shape information of a workpiece model or the workpiece included in an input image, the centroid thereof is calculated to be used as the origin of the workpiece, and XYZ axes are defined. Regarding a method of defining XYZ axes, in a case where CAD data is used, directions of coordinate axes of original CAD data may be used as directions of the respective XYZ axes. In a case of using actually measured data obtained by actually three-dimensionally imaging a workpiece, a vertical direction of the actually measured data may be used as a Z axis, an upper direction of the actually measured data in a plan view may be used as a Y axis, and a rightward direction of the actually measured data in a plan view may be used as an X axis. Regarding the origin, the centroid or a workpiece model or a center coordinate of CAD data may be used as the origin.

Procedures of Obtaining Inclined Angle and Rotation Angle on the Basis of Three-Dimensional Attitude Here, a description will be made of procedures obtaining an inclined angle and a rotation angle on the basis of a three-dimensional attitude with reference to a flowchart of FIG. 52. First, in step S5201, an inclined angle is obtained. For example, in a case where an attitude of the workpiece WKI included in an input image is as in FIG. 53B with respect to the workpiece model WMR when registered in a state as illustrated in FIG. 53A, the inclined angle is obtained as an inclination of the Z axis in the vertical direction as illustrated in FIG. 53C.

Next, in step S5202, the input image is three-dimensionally rotated such that the Z' axis matches the Z axis. In other words, the inclination is removed. For example, as illustrated in FIG. 54A, the Z' axis is rotated to overlap the Z axis with an outer product vector VP between a vector of the Z' axis and a vector of the Z axis as a rotational axis with respect to the input image WKI in FIG. 53C as illustrated in FIG. 54A. As a result, a rotated input image WKI' is obtained as in FIG. 54B, and the inclination is removed.

Finally, in step S5203, a rotation angle is obtained. For example, a Y axis of the workpiece model WMR when registered, illustrated in FIG. 55A and a Y' axis of the input image WKI' in which the inclination is removed as illustrated in FIG. 55B, are obtained. In this state, as illustrated in FIG. 55C, an angle between the Y axis and the Y' axis when viewed from the vertical direction, that is, the Z axis is obtained as a rotation angle. In the above-described way, an inclined angle and a rotation angle may be obtained on the basis of a three-dimensional attitude in an input image.

Setting of Upper Limit of Inclined Angle

As an example of setting an inclined angle upper limit on the inclined angle/rotation angle setting screen 160 in FIG. 49, for example, in a case of a metal workpiece with high gloss, a range in which three-dimensional measurement cannot be performed is widened as a face is inclined. If a three-dimensional search is performed in this state, a risk that wrong detection occurs in the three-dimensional search is increased. Therefore, too inclined attitude in which the risk of wrong detection is equal to or more than a predetermined level is excluded from a three-dimensional search target, and thus it is possible to leave only a search result with high reliability. For example, if an inclination is equal to or more than 40 degrees, an inclined angle upper limit is set to 40 degrees for a workpiece in which wrong detection easily occurs, and thus a search result in which an inclination is 40 degrees or higher can be excluded.

Setting of Upper Limit of Rotation Angle Range

On the other hand, as an example of setting a rotation angle range on the inclined angle/rotation angle setting screen 160 in FIG. 49, since, for example, the model A or the model B in FIG. 47 described above has many similar portions in the whole shape characteristics even in a state of being rotated by 180 degrees, if the number of locations where three-dimensional measurement is not performed due to the influence of multiple reflection or the like is increased, a rotation attitude may be wrongly detected as an attitude rotated by 180 degrees. In a case where real workpieces are stacked only in a predetermined direction, a result in an opposite direction can be excluded by using such an attitude restriction. For example, in a case where a rotation angle range is set to ±30 degrees with respect to a reference angle, only a search result within the angle range is detected.

End Effector Attachment Position Setting Screen 170

Figure 56:
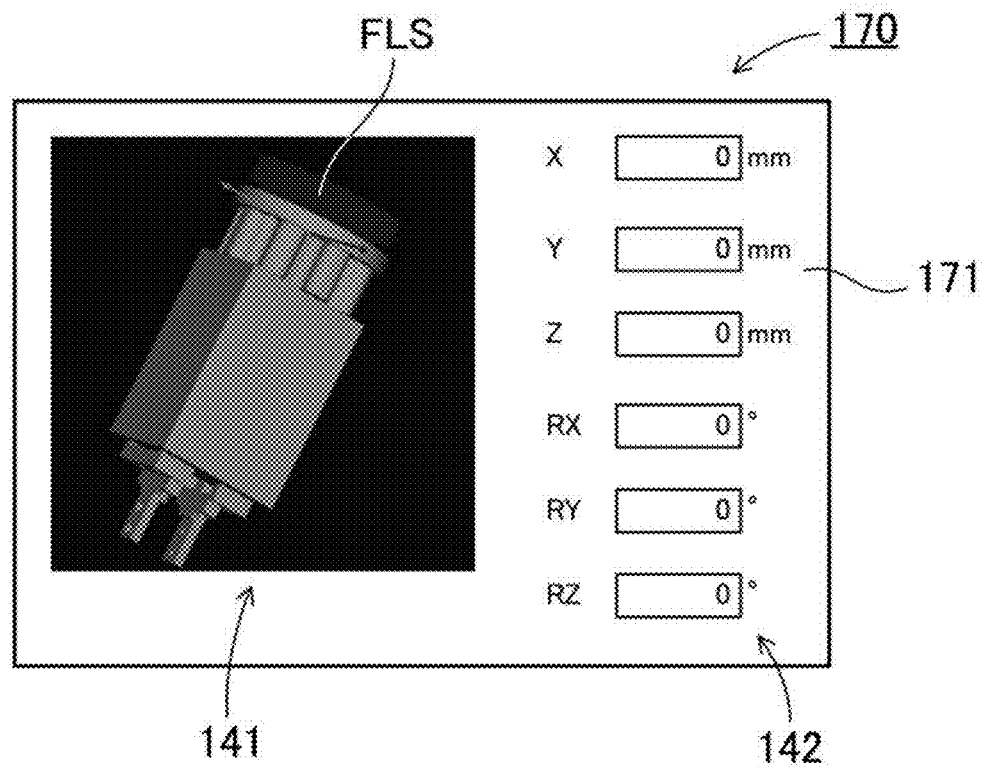
FIG. 56 is an image diagram illustrating an end effector attachment position setting screen.

The above method of defining a position and an attitude using an Euler's angle may be used not only for defining a position and an attitude at which a workpiece model is gripped by an end effector model but also for defining a position at which an end effector is attached to the tip of the arm portion of the robot. Here, a description will be made of procedures of setting a position at which an end effector is attached to the tip of the arm portion of the robot. Setting of an attachment position of the end effector is performed on an end effector attachment position setting screen 170 as illustrated in FIG. 56. The end effector attachment position setting screen 170 illustrated in FIG. 56 includes an image display field 141 and an operation field 142. An end effector model is displayed in the image display field 141. Three-dimensional CAD data which is created in advance is read as the end effector model. Alternatively, the end effector model may be formed of a basic figure such as a cuboid or a cylinder simulating an end effector so as to be displayed.

An end effector attachment position setting field 171 for defining an attachment position of an end effector attached to the tip of the arm portion is provided in the operation field 142. End effector attachment position parameters set in the end effector attachment position setting field 171 include attachment position parameters (X, Y, and Z) and attachment attitude parameters ($R_X$, $R_Y$, and $R_Z$) of the end effector model. For example, the parameters are defined for the center of the flange surface FLS at the tip of the arm portion by using an Euler's angle.

A positional relationship between a part (for example, a pair of claws provided at the tip) of an end effector model gripping a workpiece model and a gripped workpiece is registered on the grip position registration screen of the workpiece model illustrated in FIG. 14 or the like described above. In contrast, an attachment position at which the end effector model is attached to the tip of the arm portion is registered on the end effector attachment position setting screen 170. Therefore, a workpiece model or the like is not required to be displayed, and the end effector model and the flange surface FLS are displayed in the image display field 141.

Grip Position Designation Screen 180

Figure 57:
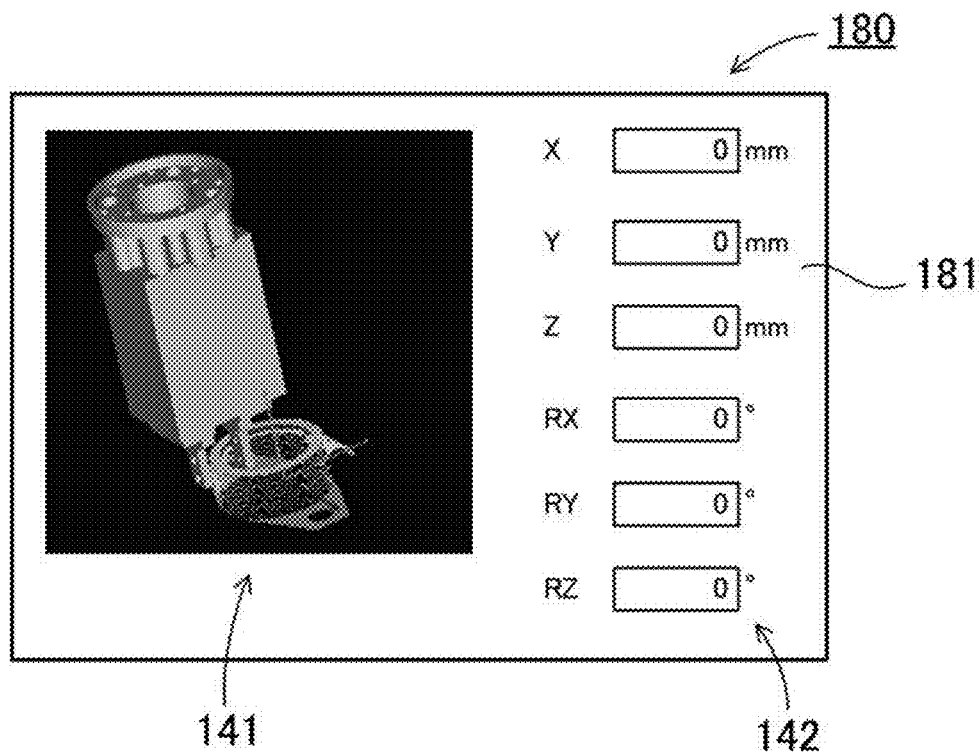
FIG. 57 is an image diagram illustrating a grip position designation screen.

In contrast, as illustrated in FIG. 57, an end effector model and a workpiece model are displayed, and a location gripping the workpiece model is designated, on a grip position designation screen 180 for designating a grip position of the workpiece model. The grip position designation screen 180 illustrated in FIG. 57 includes an image display field 141 and an operation field 142, and a grip target workpiece is selected, and the workpiece is drawn in a three-dimensional image and is displayed at an attitude at which a gripped face is directed toward a surface, in the image display field 141. An end effector model is further displayed, and is adjusted to a position and an attitude at which the workpiece model is gripped. A grip position designation field 181 for designating a grip position is set in the operation field 142. A user adjusts position parameters in the grip position designation field 181 such that a relative relationship between the workpiece model and the end effector model is accurate. Alternatively, a position or an attitude is adjusted on the screen by dragging the end effector model or the workpiece model displayed in the image display field 141. A position parameter adjusted on the screen is reflected in the grip position designation field 181. A position parameter in the grip position designation field 181 may be expressed by using the above-described Euler's angle.

Plural-Grip Position Selection Screen 190

Figure 58:
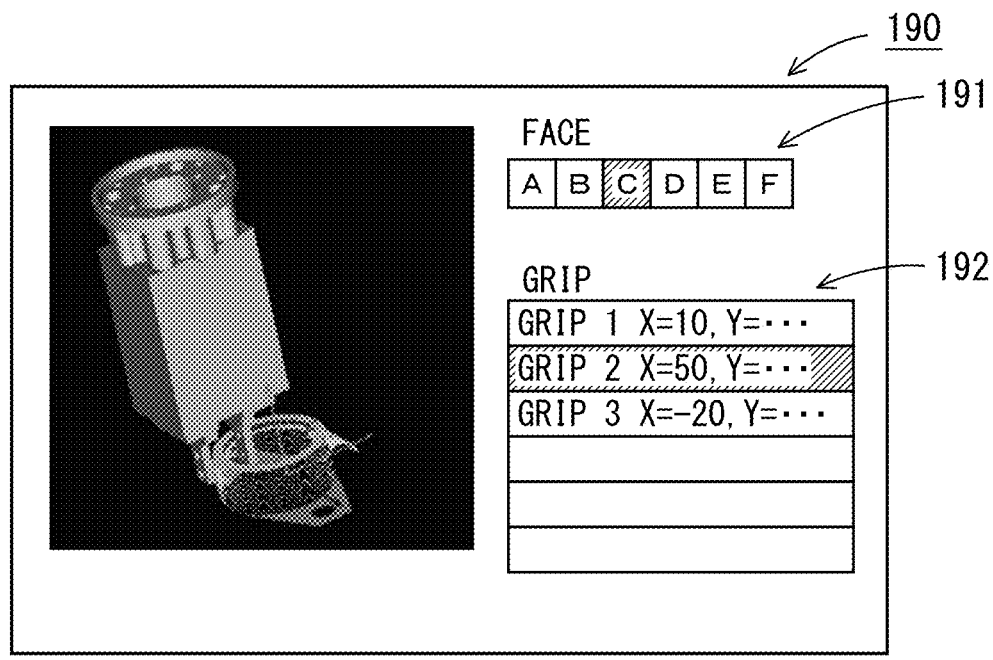
FIG. 58 is an image diagram illustrating a plural-grip position selection screen.

Regarding registration of a grip position, a single location is not designated for a single face (for example, a fundamental direction image) of a certain workpiece, and a plurality of locations may be designated. Grip positions registered at a plurality of locations may be checked with an image. For example, FIG. 58 illustrates an example of a plural-grip position selection screen 190. The plural-grip position selection screen 190 also includes the image display field 141 and the operation field 142. The operation field 142 is provided with a face selection field 191 for selecting a face of a workpiece model for which a grip position is defined and a grip position list display 192 in which grip positions set for a face selected in the face selection field 191 are displayed in a list form. In this example, a face C is selected in the face selection field 191, and grips 1 to 3 as grip positions set for the face C are displayed in a list form in the grip position list display 192. If, among the grips, the grip 2 is selected, a scene in which the end effector model grips the workpiece model at a grip position and a grip attitude registered as the grip 2 is displayed in the image display field 141. In the above-described way, a user can select and check a plurality of registered grip positions. A registered grip position may be corrected and updated as necessary. Also herein, a grip attitude may be displayed by using the above-described Euler's angle. In the above-described way, the concept of the Euler's angle which is difficult for a user to understand is displayed to be visually understandable without deep understanding thereof while registration is performed by using the Euler's angle, a rotational axis is corrected and displayed, and a parameter which can be adjusted is restricted due to the guidance function. Therefore, it is possible to perform setting work by reducing confusion.

Function of Correcting End Effector Attachment Position

As described above, an end effector is attached to the tip of the arm portion of the robot. On the other hand, registration (teaching) of the grip position or grip determination (simulation) of whether or not an end effector model can grip a workpiece model at registered position and attitude is performed on a virtual three-dimensional space of the robot setting apparatus side (robot vision side) without using a real end effector. Conversion from a coordinate position of a vision space which is a virtual three-dimensional space into a coordinate position of a robot space which is a real space is performed by the conversion portion 8x on the basis of calibration information obtained by the calibration portion 8w in FIG. 17.

However, in a case where an attachment state of an end effector model virtually set on the robot setting apparatus side is different from an attachment state of the end effector EET of the real robot RBT, a correspondence relationship between the vision space and the robot space defined in the calibration information is not maintained, and thus deviation occurs when a workpiece is to be gripped by using the real robot RBT.

Figure 59:
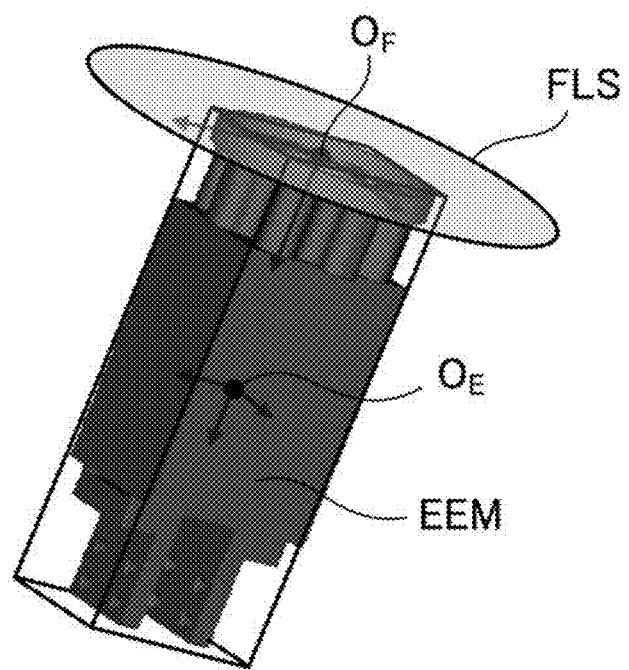
FIG. 59 is an image diagram illustrating an end effector attachment position correction screen.

Here, FIG. 59 illustrates a positional relationship between an end effector model and the flange surface FLS. FIG. 59 illustrates the origin $O_F$ of the flange surface FLS at the tip of the arm portion of the robot, and the center $O_E$ of the end effector model EEM as a position of the end effector model EEM. A position of the end effector model EEM is set as a position (X, Y, and Z) and an attitude ($R_X$, $R_Y$, and $R_Z$) for the flange surface FLS at the tip of the arm portion of the robot on the robot setting apparatus side. In other words, in the example illustrated in FIG. 59, the position (X, Y, and Z) and the attitude ($R_X$, $R_Y$, and $R_Z$) of the center $O_E$ of the end effector model EEM viewed from the origin $O_F$ of the flange surface FLS are set. Here, if there is an error in a real attachment state of an end effector, deviation may occur in the position of the end effector model EEM for the origin of the flange surface FLS. As a result, gripping is performed at a deviated position on the robot setting apparatus side and the robot side due to the attachment state of the end effector.

Therefore, in the present embodiment, a function of correcting an end effector attachment position is provided to reflect an attachment state of a real end effector on the robot setting apparatus side, and thus such deviation or an error does not occur. The function of correcting an end effector attachment position is realized by the end effector attachment position correction portion 8y illustrated in FIG. 17. Specifically, a three-dimensional search is performed on actually measured data obtained by imaging a real end effector and performing three-dimensional measurement by using three-dimensional CAD data which is an end effector model used for registration of a grip position of a workpiece or for interference determination when the end effector is disposed and which virtually expresses a three-dimensional shape of the end effector, so as to acquire a position and an attitude of a real attachment position. Therefore, such an error is detected, and thus setting of an end effector attachment position on the robot setting apparatus side is corrected. As mentioned above, a user can perform manual adjustment while checking deviation between a point group obtained by three-dimensionally measuring a real end effector and an attachment state of an end effector model defined on a virtual three-dimensional space on the robot setting apparatus side in the image display region of the display unit.

Procedures of Automatically Correcting Deviation

Figure 60:
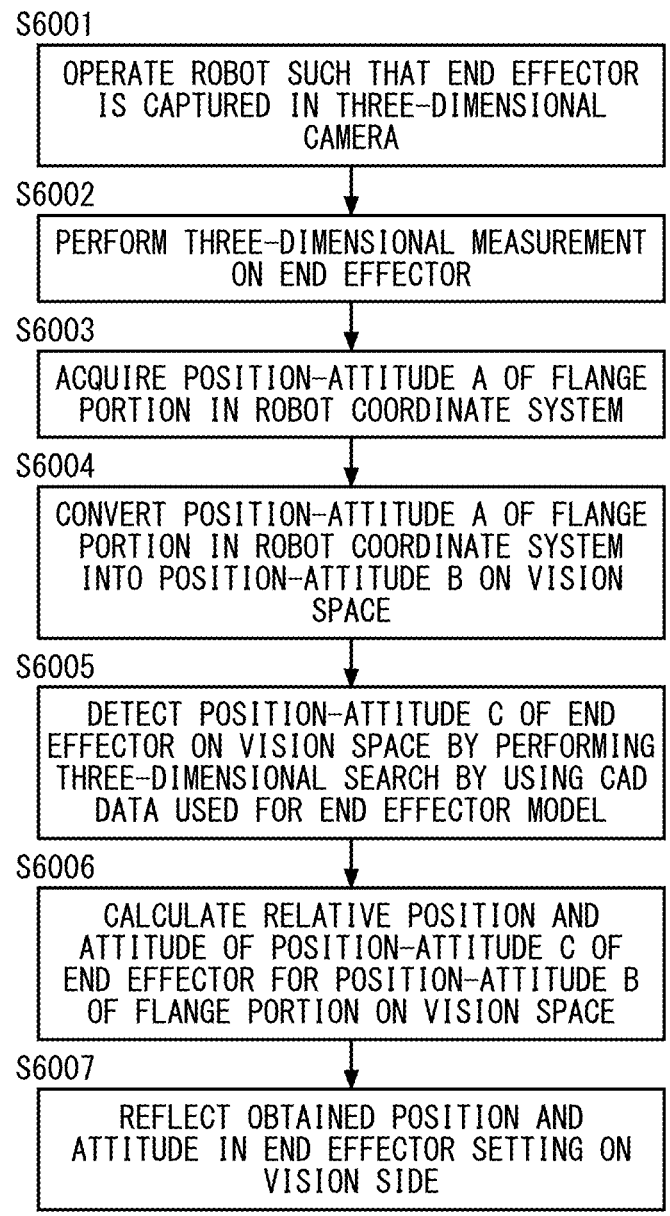
FIG. 60 is a flowchart illustrating procedures of automatically correcting an end effector attachment position.

Here, a description will be made of a correction function of automatically correcting an error between a real end effector and an end effector model formed of three-dimensional CAD data with reference to a flowchart of FIG. 60. It is assumed that calibration of converting a coordinate position of a vision space which is a virtual space into a coordinate position of a robot space which is a real space is performed by the calibration portion 8w illustrated in FIG. 17 in advance, and calibration information is held in the storage unit 9. It is also assumed that an end effector model is prepared by using three-dimensional CAD data.

End Effector Imaging Screen 330

First, in step S6001, preparation for imaging a real end effector in the sensor unit is made. Specifically, the robot is operated to move the end effector such that the end effector can be imaged by a three-dimensional camera which is an aspect of the sensor unit. Next, in step S6002, three-dimensional measurement is performed on the end effector.

Figure 61:
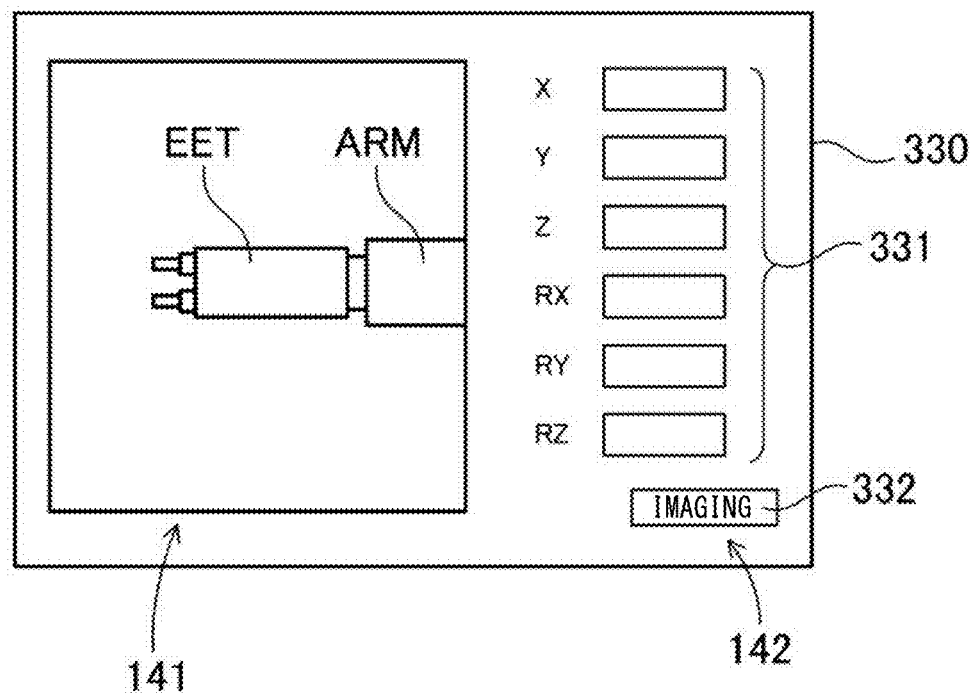
FIG. 61 is an image diagram illustrating an end effector imaging screen.

For example, an end effector imaging screen 330 illustrated in FIG. 61 is used as an aspect of an end effector imaging unit for imaging the real end effector in the sensor unit. The end effector imaging screen 330 includes an image display field 141 and an operation field 142. The end effector EET attached to the flange portion at the tip of the arm portion ARM imaged by the sensor unit 2 is displayed in the image display field 141 in real time. The operation field 142 is provided with an end effector position designation field 331 showing a position and an attitude of the end effector EET. A user manually operates the robot such that the camera forming the sensor unit can image the end effector EET of the robot on the end effector imaging screen 330. In this case, an imaging target is not the claw portion of the end effector EET gripping a workpiece but an attachment state with the arm portion. Therefore, preferably, imaging is performed such that an area of the end effector EET is increased. Preferably, the entire image of the end effector EET is captured by the camera at a downward attitude at which the end effector EET easily grips a normal workpiece and also at a horizontal attitude. In the above-described way, the user positions the attitude of the end effector EET and then presses an "imaging" button 332. Consequently, a three-dimensional captured image of the end effector is acquired. In other words, three-dimensional measurement is performed on the end effector.

Next, in step S6003, position-attitude A of the flange portion in a robot coordinate system is acquired. Here, the position-attitude A in the robot coordinate system is assumed to be, for example, a position and an attitude in the robot coordinate system of the flange portion FLS to which the imaged end effector is attached. Orders of the processes in step S6003 and step S6002 may be replaced with each other.

In step S6004, the position-attitude A of the flange portion in the robot coordinate system is converted into position-attitude B on the vision space. Herein, the conversion portion 8x in FIG. 17 performs conversion between the real space and the virtual space on the basis of the calibration information for coordinate conversion between the robot space and the vision space, obtained by performing calibration in advance.

In step S6005, a three-dimensional search is performed such that position-attitude C of the end effector on the vision space is detected. Herein, a three-dimensional search is performed on the three-dimensional measured data obtained in step S6002 by using three-dimensional CAD data used for the end effector model as a search model. A three-dimensional search method may employ a known algorithm as appropriate. Consequently, a position and an attitude of the end effector on the vision space are detected.

In step S6006, relative position-attitude of the position-attitude C of the end effector for the position-attitude B of the flange portion FLS on the vision space is calculated. A coordinate position obtained here gives a position and an attitude of the end effector model which are accurate for the flange portion FLS, in other words, in which position deviation or the like is taken into consideration.

Finally, in step S6007, the obtained position and the attitude are reflected in end effector setting on the vision side. In other words, the obtained position and the attitude are reflected in setting of a position and an attitude of the end effector model on the vision side. In the above-described way, an attachment state of a real end effector can be automatically reflected on the vision side.

Procedures of Manually Correcting Deviation

The above description relates to the procedures of automatically correcting deviation between the robot space and the vision space. However, the present invention is not limited to a configuration of automatically correcting deviation, and deviation may be manually corrected. Next, a description will be made of procedures of manually correcting deviation with reference to a flowchart of FIG. 150. Here, processes in steps S15001 to S15004 are the same as the processes in steps S6001 to S6004 in FIG. 60 related to the above-described automatic correction, and detailed description thereof will be omitted. That is, in step S15001, the robot is operated to move the end effector such that the end effector of the robot can be imaged by a three-dimensional camera, in step S15002, three-dimensional measurement is performed on the end effector, in step S15003, position-attitude A of the flange portion in a robot coordinate system is acquired, and, in step S15004, the position-attitude A of the flange portion in the robot coordinate system is converted into position-attitude B on the vision space.

In step S15005, position-attitude D of the end effector is calculated on the basis of the end effector setting from the position-attitude B of the flange portion on the vision space. Herein, the position-attitude D of the end effector is obtained on the basis of information regarding the position-attitude B of the flange portion at the tip of the robot on the vision space, and the position-attitude of the end effector for the flange portion set in the end effector setting.

Next, in step S15006, a point group obtained through three-dimensional measurement and CAD display of the position-attitude D of the end effector are displayed in a superimposed manner. Herein, the end effector model EEM which is three-dimensional CAD data of the end effector is displayed at a position of the position-attitude D of the end effector obtained in step S15005, and a point group PC obtained through three-dimensional measurement is displayed to be superimposed on the real end effector. FIGS. 151 and 152 illustrate examples of a deviation correction screen on which such superimposed display is performed.

In step S15007, it is determined whether or not there is deviation which cannot be ignored between the point group and the CAD display. In a case where there is deviation which cannot be ignored, the flow proceeds to step S15008, and the end effector setting is changed such that the deviation is corrected, and then the flow returns to step S15005 such that the above-described processes are repeatedly performed. The end effector setting includes a position and an attitude of the end effector for the flange portion. On the other hand, in a case where there is no deviation, the process is finished.

Deviation Correction Unit

FIG. 151 illustrates an example of a deviation correction screen as an aspect of a deviation correction unit performing deviation correction. FIG. 151 illustrates a case where there is deviation which cannot be ignored. The point group PC is displayed to be superimposed on the end effector model EEM in the image display field 141 on a deviation correction screen 840. As illustrated in FIG. 151, it can be seen that the point group PC obtained by actually three-dimensionally measuring the end effector and indicated by white points is deviated in the left obliquely downward direction relative to the end effector model EEM.

The operation field 142 is provided with an end effector setting field 841, and a position (X, Y, and Z) and an attitude $(R_X, R_Y, \text{and } R_Z)$ of the end effector for the flange portion are defined. Herein, long coordinate axes of XYZ illustrated on the right part in FIG. 151 indicate the origin $O_F$ of the flange portion FLS which is the robot tip. Short coordinate axes of XYZ illustrated on the left part indicate the origin $O_E$ of three-dimensional CAD data of the end effector model EEM for the robot tip (flange portion). The user adjusts a position and an attitude of the end effector model EEM while checking the end effector model EEM and the point group PC displayed in the image display field 141. For example, a position and an attitude of the end effector model EEM are designated as a numerical value in the end effector setting field 841 of the operation field 142, or the end effector model EEM is dragged and moved on the image display field 141, so that end effector model EEM is adjusted to be superimposed on the point group PC.

FIG. 152 illustrates an example in which the end effector model EEM matches the point group PC in the above-described way. In this example, in the end effector setting field 841, a position in the Z direction is set to 90 mm, and thus matching occurs by offsetting the end effector model EEM in the Z direction. After the position and the attitude of the end effector model are adjusted, if an "OK" button 842 is pressed, the end effector setting is updated. Consequently, a position and an attitude on the vision side can be adjusted according to an attachment state of a real end effector.

The above-described manual deviation correction may be performed in combination with automatic correction. Such an example will be described with reference to a deviation correction screen 850 in FIG. 153. In the deviation correction screen 850 illustrated in FIG. 153, the end effector setting field 841 for manually adjusting a position and an attitude of the end effector model EEM is provided in the operation field 142, and an "automatic correction" button 843 is provided on a lower part. If the "automatic correction" button 843 is pressed, a three-dimensional search is performed internally, and a position and an attitude of the end effector model EEM are automatically corrected to match the point group PC. For example, automatic deviation correction may be performed or an automatic correction result may be manually finely adjusted while checking states of the end effector model EEM and the point group PC displayed to be superimposed on each other in the image display field 141. Particularly, in a case where the automatic correction function cannot be executed well since metal with high gloss is used for an end effector, and thus the point group PC is not accurately detected due to reflected light, for example, in a case where a three-dimensional search fails, manual adjustment can cope with this case. In the above-described way, a user can manually correct deviation between the robot space and the vision space.

In the related art, in a case where an attachment member such as a connector can be assembled with an attachment portion between the flange portion and the end effector, but an offset amount thereof is forgotten to be set on the vision side, there is a problem in that a position or an attitude is deviated. In this case, if there is no function of checking deviation or function of correcting deviation, there is a problem in that gripping cannot be accurately performed when a workpiece is gripped by the robot during an actual operation, or collision occurs. Causes of such errors are various, and, in the related art, it takes lots of time and effort to investigate cause and debug. In contrast, according to the present embodiment, deviation can be manually or automatically corrected, and thus it is possible to easily perform flexible adjustment according to an attachment state of a real end effector.

In the example illustrated in FIG. 59, a position of the end effector model EEM is set to a central position of three-dimensional CAD data, but this is only an example, and other positions may be defined. For example, in FIG. 59, the center of the cuboid circumscribing three-dimensional CAD data is used, but an end portion of the circumscribing cuboid or the origin of three-dimensional CAD data as an input source may be used as a reference.

Procedures of Registering Actually Measured Data in Search Model

The above description relates to procedures in a case where three-dimensional CAD data is registered as a search model. However, the present invention is not limited to three-dimensional CAD data as a search model as described above, and, for example, actually measured data obtained by actually imaging a workpiece in the sensor unit may be registered as a search model. Here, in step S2701 in FIG. 27, a description will be made of procedures of registering actually measured data as a search model with reference to a flowchart of FIG. 62.

First, in step S6201, a face of a workpiece desired to be registered is directed upward, the workpiece is placed on a flat surface, and three-dimensional measurement is performed by the sensor unit.

Next, in step S6202, obtained actually measured data is registered as a search model.

Finally, in step S6203, it is determined whether or not the number of search models required for a three-dimensional search is registered, and, in a case where the number of search models required for a three-dimensional search is not registered, the flow returns to step S6201, the processes are repeatedly performed, and, in a case where the number of search models required for a three-dimensional search is registered, the process is finished. Details of the procedures will be described later with reference to FIGS. 102 to 106.

First Procedures During Actual Operation

In a state in which necessary setting work is finished in the above-described way, a picking operation is performed on a workpiece group actually loaded in bulk. Here, a description will be made of procedures of determining whether or not a workpiece can be gripped during an actual operation, that is, whether or not there is a grip solution for each detected workpiece in a state in which the search model is registered according to the procedures illustrated in FIG. 28, with reference to a flowchart of FIG. 63. Herein, the calculation unit 10 in FIG. 6 determines the presence or absence of a grip solution.

First, in step S6301, three-dimensional measurement starts to be performed on bulk workpieces. Herein, the three-dimensional measurement is performed by imaging a bulk workpiece group in the sensor unit, and thus a three-dimensional shape having height information is acquired.

Next, in step S6302, a three-dimensional search is performed on the obtained three-dimensional shape of the workpiece group by using a workpiece model, and a position and an attitude of each workpiece are detected.

Next, in step S6303, with respect to a single detected workpiece, a position and an attitude at which an end effector is to be disposed are computed on the basis of a position of the workpiece and a grip attitude of the workpiece registered during setting.

Next, in step S6304, interference determination of whether or not the end effector interferes with a peripheral object at the computed position is performed by using an end effector model.

In step S6305, it is determined whether or not the end effector interferes, and, in a case where the end effector does not interfere, it is determined that there is a grip solution for this workpiece, and the process is finished.

On the other hand, in a case where it is determined that the end effector interferes, the flow proceeds to step S6306, and it is determined whether or not there are other grip positions registered for this workpiece. In a case where other grip positions are registered, the flow returns to step S6303, and the processes are repeatedly performed on the grip positions.

On the other hand, in a case where other grip positions are not registered, the flow proceeds to step S6307, and it is determined whether or not there are other detected workpieces. In a case where there are other workpieces, the flow returns to step S6303, and the processes are repeatedly performed on the workpieces instead of the workpiece. In a case where there are no other workpieces, it is determined that there is no grip solution, and the process is finished.

In the above-described way, the calculation unit 10 in FIG. 6 determines the presence or absence of a grip solution in which a workpiece can be gripped. In a case where a grip solution is obtained, an instruction is given to the robot controller 6 such that the workpiece is gripped by an end effector at a determined grip position. Thus, the robot controller 6 controls the end effector to pick the workpiece as instructed.

In the above-described procedures, if a grip solution is obtained with any workpiece, a process of examining a grip position is finished at this time, and control is performed such that the workpiece is gripped at a grip position corresponding to the obtained grip solution. However, the present invention is not limited to this method, and, for example, there may be a configuration in which all grip positions at which grip is possible are obtained as grip position candidates, and then a grip position is selected from among the grip position candidates. For example, the evaluation index calculation portion 8q calculates a score as an evaluation index of each grip position candidate, and selects a grip position candidate having the highest score as a grip position. A position of a workpiece located at a high position, in other words, at a higher position in a bulk workpiece group may be selected as a grip position on the basis of height information of a workpiece. Preferably, the calculation unit 10 selects a grip position from among a plurality of grip solutions by taking into consideration both of a score and height information. In the above-described way, it is possible to perform more appropriate picking.

Second Procedures During Actual Operation

Figure 28:
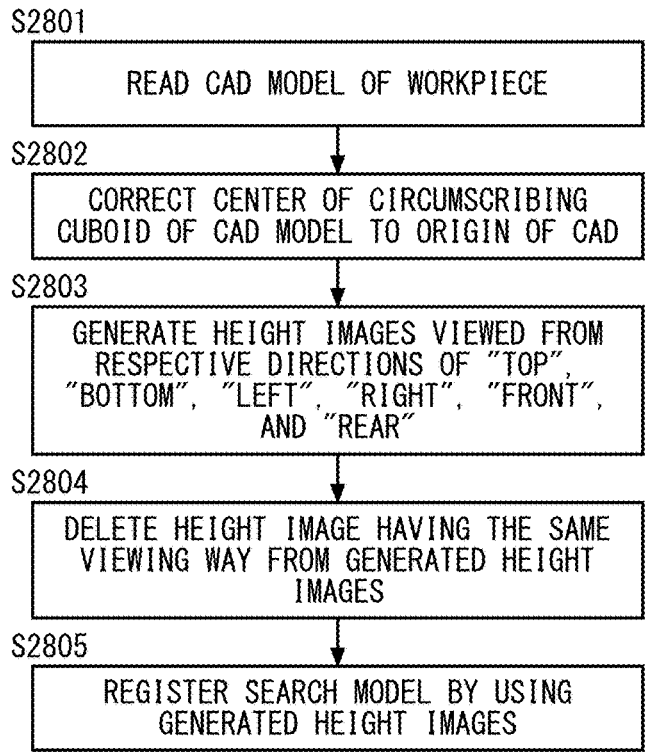
FIG. 28 is a flowchart illustrating procedures of registering three-dimensional CAD data as a search model.

The above description relates to procedures during an actual operation in a state a search model is registered according to the procedures in FIG. 28. When a search model is registered, as illustrated in FIG. 48, the search model may be registered in a state of imposing a restriction on an attitude thereof. Here, a description will be made of procedures during an actual operation of performing a picking operation on an actual bulk workpiece group in a state in which the search model is registered according to the procedures in FIG. 48, with reference to a flowchart of FIG. 64. First, in step S6401, three-dimensional measurement starts to be performed on bulk workpieces. Herein, the three-dimensional measurement is performed by imaging a bulk workpiece group in the sensor unit, and thus a three-dimensional shape having height information is acquired.

Next, in step S6402, a three-dimensional search is performed on the obtained three-dimensional shape of the workpiece group by using a workpiece model, and a position and an attitude of each workpiece are detected.

Next, in step S6403, an attitude not included in a range is excluded from a set range of an inclined angle and a rotation angle.

Next, in step S6404, with respect to a single detected workpiece, a position and an attitude at which an end effector is to be disposed are computed on the basis of a position of the workpiece and a grip attitude of the workpiece registered during setting.

Next, in step S6405, interference determination of whether or not the end effector interferes with a peripheral object at the computed position is performed by using an end effector model.

In step S6406, it is determined whether or not the end effector interferes, and, in a case where the end effector does not interfere, it is determined that there is a grip solution for this workpiece, and the process is finished.

On the other hand, in a case where it is determined that the end effector interferes, the flow proceeds to step S6407, and it is determined whether or not there are other grip positions registered for this workpiece. In a case where other grip positions are registered, the flow returns to step S6404, and the processes are repeatedly performed on the grip positions.

On the other hand, in a case where other grip positions are not registered, the flow proceeds to step S6408, and it is determined whether or not there are other detected workpieces. In a case where there are other workpieces, the flow returns to step S6404, and the processes are repeatedly performed on other workpieces instead of the workpiece. In a case where there are no other workpieces, it is determined that there is no grip solution, and the process is finished.

Interference Determination

Figure 63:
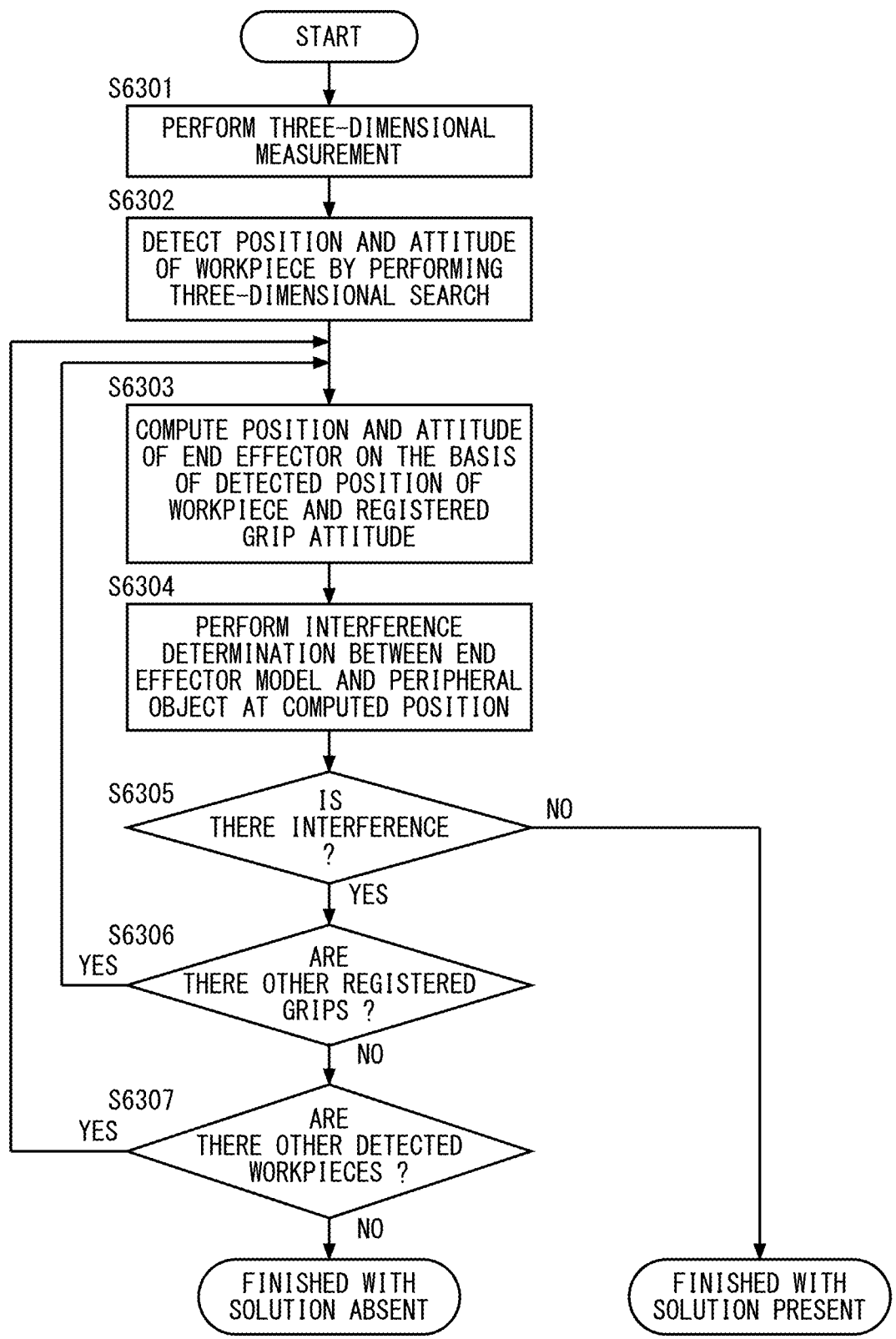
FIG. 63 is a flowchart illustrating procedures of determining the presence or absence of a grip solution for each workpiece during an actual operation.
Figure 64:
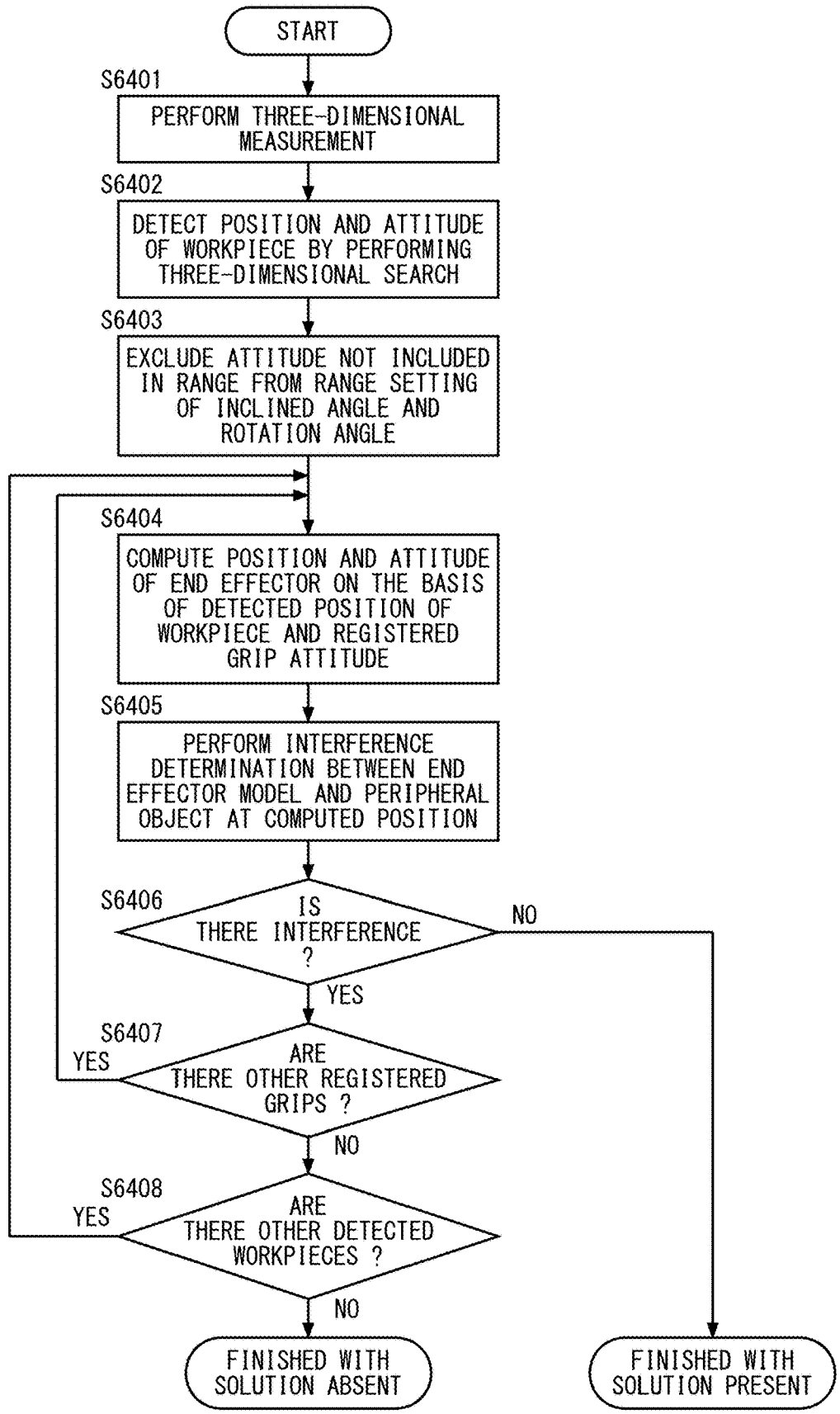
FIG. 64 is a flowchart illustrating procedures during an actual operation in which a picking operation is performed in a state in which the search model is registered according to the procedures in FIG. 48.

Here, a description will be made of an interference determination method using an end effector model in step S6304 in FIG. 63 or in step S6405 in FIG. 64 described above. When a workpiece is gripped by an end effector, if the end effector interferes with a peripheral obstacle such as another workpiece or a storage container, gripping cannot be accurately performed. Therefore, a position or an attitude of the end effector of when an end effector model grips a workpiece model at a grip position candidate is calculated by the interference determination portion 8m in FIG. 31 in advance, and thus an interference determination with a peripheral member is performed. In this case, a three-dimensional point group of a bulk workpiece group or a storage container, obtained through actual measurement in the sensor unit 2, is used as a peripheral member. A position of a storage container or the like may be registered in advance, and interference determination with an end effector model may be performed. On the other hand, three-dimensional CAD data of an end effector is generally formed of polygon data. For example, STL data which is frequently used as three-dimensional CAD data is expressed by an aggregate of minute triangles called a polygon.

In a case where interference determination is performed by using the polygon data and the three-dimensional point group data, in the related art, it is determined whether each three-dimensional point forming three-dimensional point group data is located inside or outside an end effector model, and, in a case where the three-dimensional point is located inside the end effector model, it is determined that interference occurs, and, in a case where the three-dimensional point is located outside the end effector model, it is determined that interference does not occur. However, in this method, calculation or comparison is required to be performed on each point, and, thus, if an amount of data increases, a calculation amount also increases.

Procedures of Interference Determination Using Section Model

Figure 65:
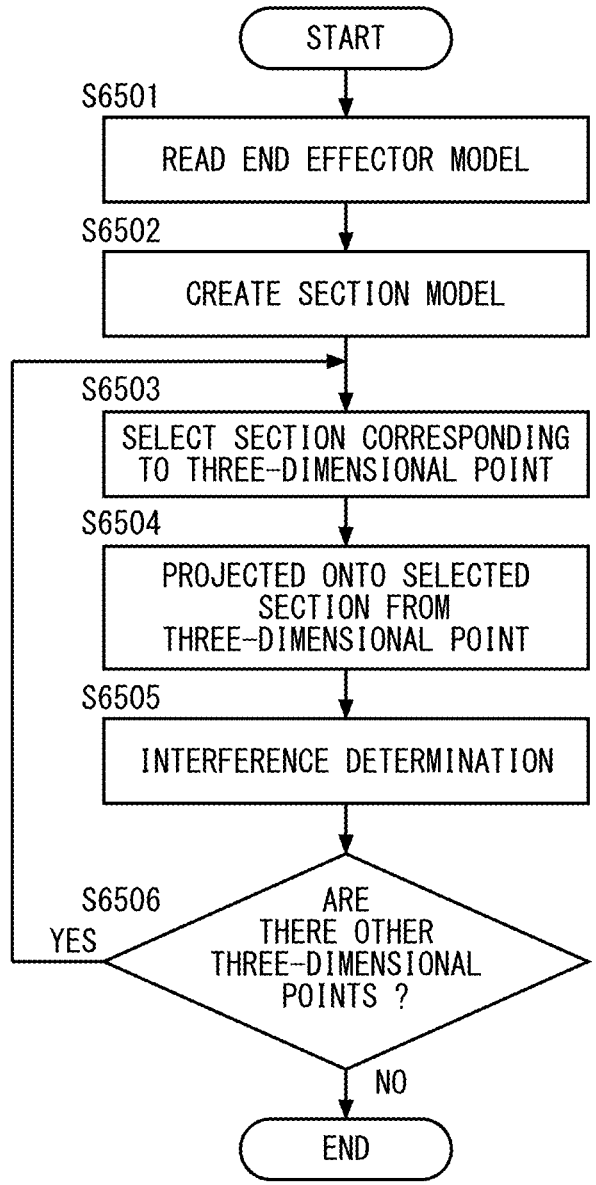
FIG. 65 is a flowchart illustrating procedures for interference determination using a section model.

Therefore, in each embodiment of the present invention, a section model is created on the basis of polygon data of an end effector model, each point of three-dimensional point group data is projected onto the section model, and it is determined whether the point is located inside or outside the section model such that interference therebetween is determined. Such interference determination is performed by the interference determination portion 8m in FIG. 31. Here, a description will be made of procedures of performing interference determination with reference to a flowchart of FIG. 65.

Figure 66:
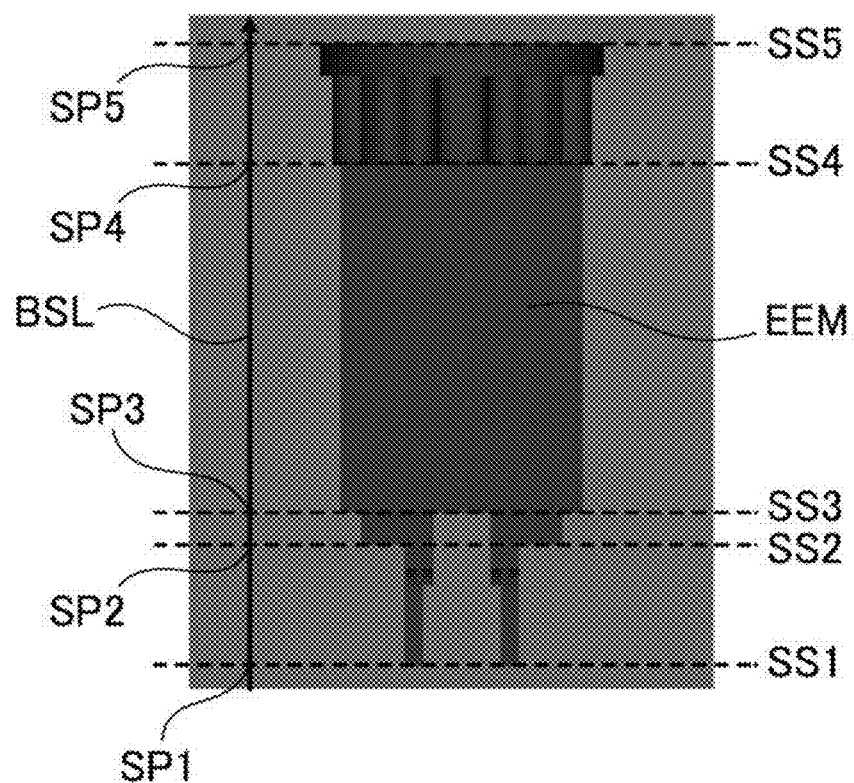
FIG. 66 is an image diagram illustrating an end effector model, and fundamental axes and section positions thereof.
Figure 67A:
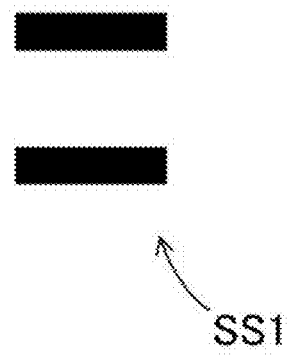
FIGS. 67A to 67E are image diagrams illustrating sections in FIG. 66.
Figure 67D:
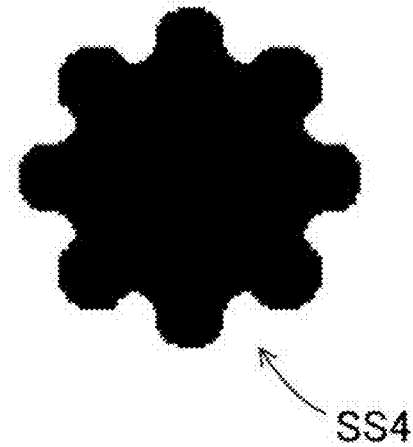
Figure 67B:
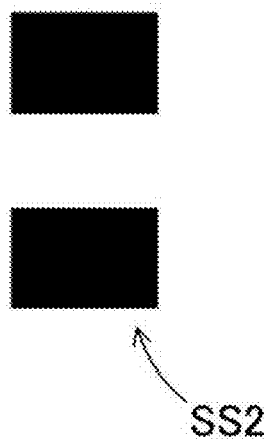
Figure 67E:
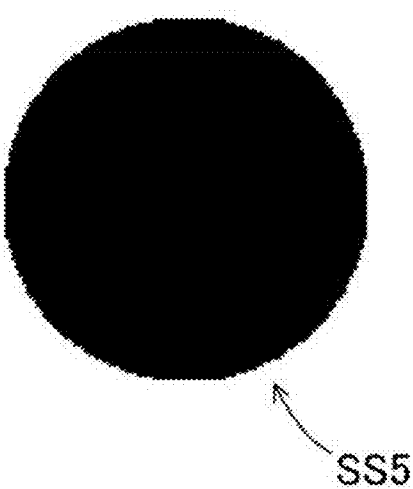
Figure 67C:
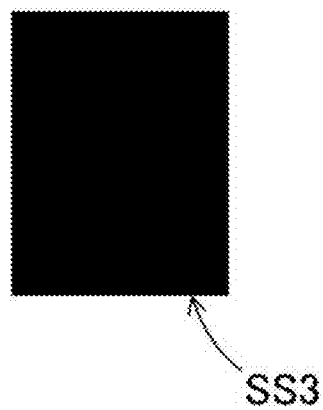

First, in step S6501, polygon data of an end effector is read. Next, in step S6502, a section model is created on the basis of the polygon data of the end effector. The section model is generating by the section model generation portion 8s in FIG. 26. Here, a description will be made of a method of the section model generation portion 8s creating a section model with reference to FIGS. 66 to 67E. First, a fundamental axis BSL is set for polygon data of the end effector model EEM illustrated in FIG. 66. Preferably, the fundamental axis BSL is set along a longitudinal direction of the end effector model EEM. The end effector model is cut in an orthogonal plane orthogonal to the fundamental axis BSL such that a plurality of sections are created. Here, a position of creating a section is, for example, a vertex position of the polygon data. Alternatively, a plurality of sections may be created along the fundamental axis at a predetermined distance interval, and then obtained sections are arranged according to shapes. For example, a section having the same shape is excluded. The fundamental axis BSL is preferably set such that a total number of necessary sections is reduced when the sections are created. For example, the section model generation portion may automatically calculate a direction of the fundamental axis BSL such that the number of sections is small. A section position for acquiring a section at the set fundamental axis BSL may be designated such that, for example, a section having a great change is automatically extracted.

In the above-described way, it is possible to create a section model having a shape of each section along the fundamental axis BSL of the end effector model EEM and a section position on the fundamental axis BSL corresponding to each section. For example, in the example illustrated in FIG. 66, a section SS1 to a section SS5 respectively illustrated in FIGS. 67A to 67E are obtained at five positions such as section positions SP1 to SP5 along the fundamental axis BSL. It is determined whether or not the end effector model EEM interferes with a three-dimensional point group by using the section models obtained in the above-described way.

Figure 68A:
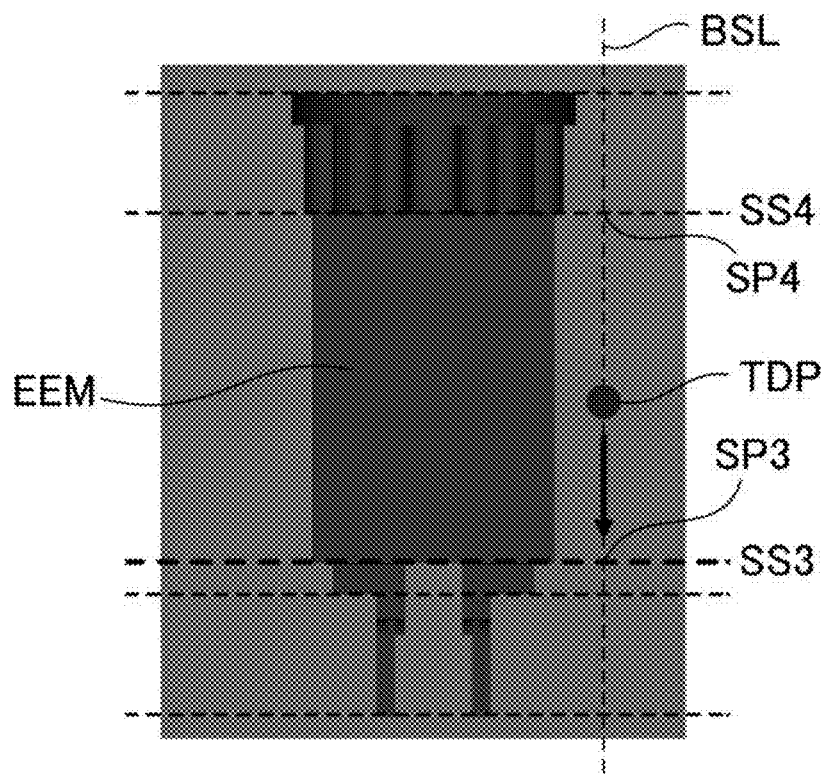
FIG. 68A is an image diagram illustrating a three-dimensional point and the fundamental axes of the end effector model in FIG. 66.

Specifically, in step S6503, a three-dimensional point is selected as an interference determination target from the three-dimensional point group, and a section for interference determination is selected from among a plurality of sections of the section models on the basis of a position of the point in the direction of the fundamental axis BSL. The section position set for each section is used for the selection. For example, a case is assumed in which interference determination with the end effector model EEM is performed on a three-dimensional point TDP illustrated in FIG. 68A among three-dimensional points. The three-dimensional point TDP is located between the section positions SP3 and SP4 in the direction along the fundamental axis BSL. Therefore, interference determination with the three-dimensional point TDP is performed by using the section SS3 indicating the sectional shape between SP3 and SP4.

Figure 68B:
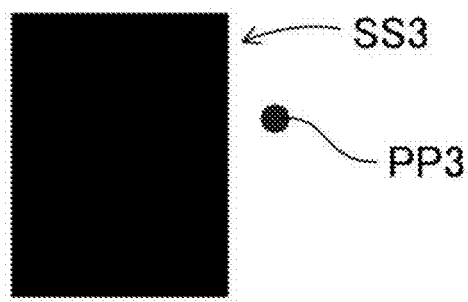
FIG. 68B is an image diagram illustrating a state in which the three-dimensional projection point in FIG. 68A does not interfere with the section.
Figure 68C:
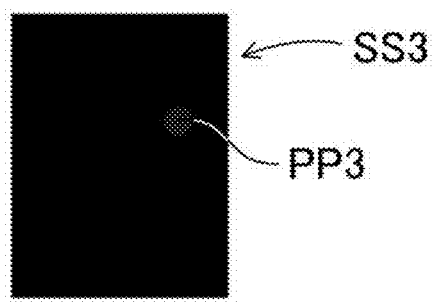
FIG. 68C is an image diagram illustrating a state in which the three-dimensional point in FIG. 68A interferes with the section.

Specifically, in step S6504, a projection point PP3 which is projected onto an orthogonal plane including the section SS3 from the three-dimensional point TDP is calculated. In step S6505, interference determination is performed. Herein, if a position of the projection point PP3 of the three-dimensional point is located outside the section SS3 as illustrated in FIG. 68B, it is determined that the three-dimensional point does not interfere. On the other hand, if a position of the projection point PP3 of the three-dimensional point is located inside the section SS3 as illustrated in FIG. 68C, it is determined that the three-dimensional point interferes. Finally, in step S6506, it is determined whether or not there is a remaining three-dimensional point, and, in a case where there is an unprocessed three-dimensional point, the flow returns to step S6503, and the above processes are repeatedly performed. If interference determination on all three-dimensional points is completed, the process is finished.

In the above-described way, it is possible to perform interference determination between a measured three-dimensional point group and an end effector model. The above description relates to interference determination with three-dimensional point group data, but, the present invention is not limited to a three-dimensional point as an interference determination target, and, for example, interference determination may be performed on other objects, for example, a line or a face according to the same procedures.

In the above description, a description has been made of an example in which CAD data of an end effector is polygon data, but interference determination may be similarly performed in other CAD data formats as long as a sectional shape of an end effector can be computed in the formats, without being limited to polygon data. In the above example, a description has been made of a case where a sectional shape is expressed in a two-dimensional plan view, but a method of holding data of a sectional shape is not limited to this form, and, for example, data in a format such as a set of contour lines may be held.

Figure 69:
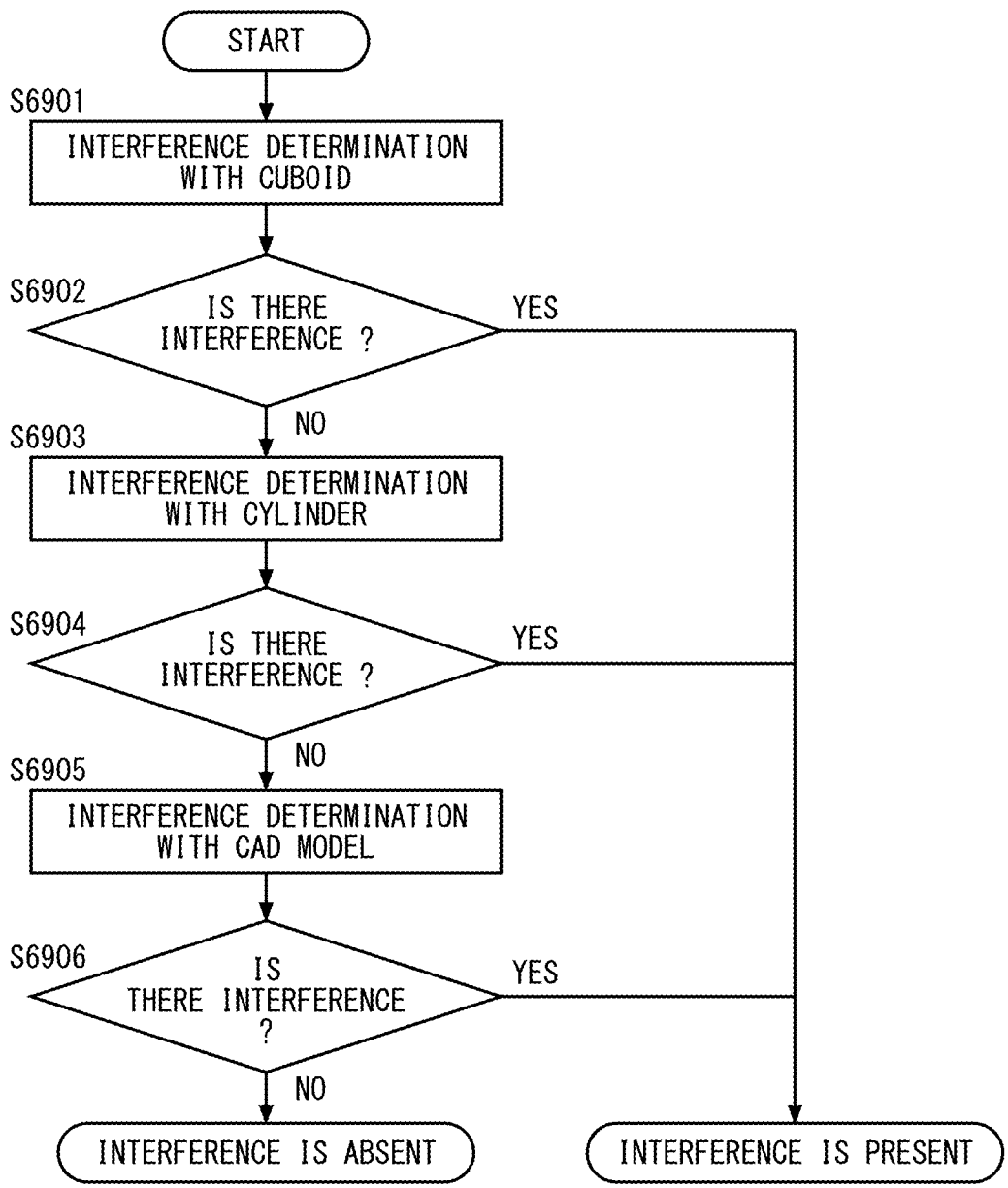
FIG. 69 is a flowchart illustrating procedures for interference determination using an additional model.

Interference Determination in Additional Model to which Additional Region is Added In interference determination on an end effector model, the interference determination may be performed by using an additional model in which an additional region expressed by a solid basic figure is added to the end effector model. A description will be made of procedures of interference determination using such an additional model with reference to a flowchart of FIG. 69. Herein, a description will be made of an example of performing interference determination on an additional model in which an additional region obtained through a combination of a cuboid and a cylinder as basic figures is added to a three-dimensional CAD model.

First, in step S6901, interference determination is performed on a region of the cuboid of the basic figures forming the additional region. In step S6902, in a case where it is determined that there is interference as a determination result, the interference determination process is stopped, the presence of interference is output, and the process is finished.

On the other hand, in a case where it is determined that there is no interference, the flow proceeds to step S6903, and interference determination with the cylinder which is another basic figure of the basic figures forming the additional region is performed. In step S6904, in a case where it is determined that there is interference as a determination result, the interference determination process is stopped, the presence of interference is output, and the process is finished.

On the other hand, in a case where it is determined that there is no interference, the flow proceeds to step S6905, and interference determination with three-dimensional CAD data is performed. In step S6906, in a case where it is determined that there is interference as a determination result, the interference determination process is stopped, the presence of interference is output, and the process is finished.

On the other hand, in a case where it is determined that there is no interference, the absence of interference is regarded, and the process is finished.

As mentioned above, interference determination is sequentially performed for each basic figure or in the three-dimensional CAD data unit, and, if it is determined that there is interference in any step, the interference determination is stopped at this time, and the presence of interference is output. A description has been made of an example in which an additional region is formed of two basic figures such as a cuboid and a cylinder, but, even if the number of basic figures increases, and the same procedures are applied. In other words, interference determination is sequentially performed on each basic figure, and, if it is determined that there is interference every time, the process is stopped.

Embodiment 7

Grip Propriety Determination Verification Function

The above description relates to procedures of determining the presence or absence of a grip solution as a result of interference determination during an actual operation. However, according to the present invention, in addition to determination of the presence or absence of a grip solution, there may be provided a grip propriety determination verification function of verifying if a grip solution cannot be obtained for what reason with respect to a grip position candidate for which the grip solution cannot be obtained. For example, grip solution candidates are displayed in a list form, and, as a result of interference determination, a grip position candidate for which it is determined that there is a grip solution is displayed OK, and a grip position candidate for which it is determined that there is no grip solution is displayed NG. In this state, a grip position determined as being NG is selected, and the absence of a grip solution being determined for what reason is displayed. Therefore, a user refers to this information, and can examine which grip position can be selected as a grip solution, so as to correct a grip position or add a new grip position. Such an example is illustrated in a block diagram of FIG. 70 as a robot system 7000 according to Embodiment 7. The robot system 7000 illustrated in FIG. 70 includes a robot setting apparatus 700, a display unit 3B, an operation unit 4, a sensor unit 2, a robot controller 6, and a robot RBT. The same member as in FIG. 6 is given the same reference numeral, and a detailed description thereof will be omitted as appropriate.

Display Unit 3B

The display unit 3B includes an image display region 3b and a grip solution candidate display region 3c. The grip solution candidate display region 3c includes a workpiece grip propriety display region 3d and a workpiece grip impossibility cause display region 3e.

The image display region 3b is a member for displaying an end effector model virtually expressing a three-dimensional shape of an end effector and formed of three-dimensional CAD data in a three-dimensional manner on a virtual three-dimensional space.

The grip solution candidate display region 3c is a member for displaying all grip positions set for a certain workpiece among one or more workpiece search results searched for by the three-dimensional search portion 8k in a list form.

The workpiece grip propriety display region 3d is a member for displaying a grip propriety determination result at a grip position designated for each workpiece in the three-dimensional pick determination portion 8l.

The workpiece grip impossibility cause display region 3e is a member for displaying a cause of grip impossibility with respect to a grip position for which grip is determined as being impossible at a grip position designated for each workpiece in the three-dimensional pick determination portion 8l.

Robot Setting Apparatus 700

The robot setting apparatus 700 includes an input image acquisition unit 2c, a calculation unit 10, a storage unit 9, an input/output interface 4b, a display interface 3f, and a robot interface 6b. The calculation unit 10 includes an end effector model registration portion 8u, a workpiece model registration portion 8t, a grip position specifying portion 8d, a search model registration portion 8g, a three-dimensional search portion 8k, a three-dimensional pick determination portion 8l, and an inclined angle setting portion 8n.

The grip position specifying portion 8d includes a workpiece side grip location designation portion 8d1 and an end effector side grip setting portion 8d2. The workpiece side grip location designation portion 8d1 is a member for designating a grip position at which a workpiece model virtually expressing a three-dimensional shape of a workpiece and formed of three-dimensional CAD data is gripped by an end effector model in a state in which the end effector model is displayed in the image display region 3b. The end effector side grip setting portion 8d2 is a member for designating a grip position of gripping a workpiece for the end effector model displayed in the image display region 3b.

The search model registration portion 8g is a member for registering a second workpiece model virtually expressing a three-dimensional shape of a workpiece as a search model for a three-dimensional search for specifying an attitude and a position of each workpiece with respect to a plurality of workpiece groups included in an input image. The second workpiece model registered as a search model is preferably a workpiece model for which a grip position is designated by the workpiece side grip location designation portion 8d1. Consequently, a search model for performing a three-dimensional search is commonized to a workpiece model for designating a grip position, and thus a user can achieve labor-saving for setting work. Since a workpiece model for searching for a workpiece which can be gripped matches a workpiece model for performing grip determination during an actual operation, it is examined whether or not grip is possible at a grip position set for the searched workpiece model, and thus it is possible to perform a process with high efficiency.

The inclined angle setting portion 8n is a member for setting an allowable inclined angle range with respect to an attitude of a workpiece.

The three-dimensional pick determination portion 8l is a member for determining whether or not a workpiece can be gripped by an end effector at a grip position designated for the workpiece by the workpiece side grip location designation portion 8d1 on the basis of a search result of each workpiece searched for by the three-dimensional search portion 8k. The three-dimensional pick determination portion 8l includes an interference determination portion 8m and an angle determination portion 8o.

The interference determination portion 8m is a member for determining the presence or absence of interference with an object present around a workpiece at a grip position designated for the workpiece by the workpiece side grip location designation portion 8d1 on the basis of a search result of each workpiece searched for by the three-dimensional search portion 8k. The three-dimensional pick determination portion 8l determines that grip is impossible for a workpiece for which it is determined that there is interference by the interference determination portion 8m. Consequently, a cause of being incapable of gripping a workpiece is displayed, and this contributes to resetting of a grip position, for example, since a user easily examines which grip position is preferably added.

The angle determination portion 8o is a member for determining whether or not an attitude of a search result of a workpiece searched for by the three-dimensional search portion 8k is within an inclined angle range set by the inclined angle setting portion 8n.

In a case where the angle determination portion 8o determines that an attitude of a search result of a workpiece searched for by the three-dimensional search portion 8k is not within an inclined angle range set by the inclined angle setting portion 8n, the three-dimensional pick determination portion 8l determines that the workpiece cannot be gripped. Consequently, in a case where an attitude of a workpiece is too steep, and thus the workpiece cannot be gripped, or the accuracy of three-dimensional measurement cannot be expected, this is excluded such that wrong selection or wrong determination of a grip position can be prevented, and thus it is possible to increase reliability.

Grip Solution Candidate List Display Function

Next, a description will be made of procedures of displaying the reason for a poor grip solution with reference to a flowchart of FIG. 71. Procedures during setting and procedures during an actual operation are fundamentally the same as those in FIGS. 27, 28 and 63 described above, and thus detailed description thereof will be omitted as appropriate.

First, in step S7101, three-dimensional measurement is performed on a target workpiece group. Herein, actually measured data having shape information is acquired by using the sensor unit with respect to a bulk workpiece group, and is used as data of an input image.

Next, in step S7102, a three-dimensional search is performed on the input image, and a position and an attitude of each workpiece in the input image are detected.

In step S7103, a verification target workpiece is selected from among detected workpieces.

In step S7104, a position and an attitude of an end effector model of when the selected workpiece is gripped by an end effector are calculated on the basis of a detection position of the workpiece and a grip attitude registered for the workpiece in advance.

Next, in step S7105, it is determined whether or not an inclined angle at the calculated position and the attitude of the end effector model is not included in a set range. Here, in a case where it is determined that the inclined angle is not included in the set range, the flow proceeds to step S7106 in which it is determined that grip is poor, the cause of the poor grip is set as "inclined angle", and then the flow jumps to step S7111.

On the other hand, in a case where it is determined that the inclined angle of the end effector model is included in the set range in step S7105, the flow proceeds to step S7107 in which it is determined whether or not interference determination between the end effector model and a peripheral object at the calculated position is performed. Here, the peripheral object is a storage container or another workpiece present around the end effector model. A peripheral object is modeled with three-dimensional CAD data or the like in advance, and it is determined whether or not the peripheral object interferes with the end effector model through calculation in a case where the end effector model is moved to a position and an attitude of gripping a workpiece model.

In step S7108, in a case where it is determined that the end effector model interferes with the peripheral object as a result of interference determination, poor grip is determined in step S7109, and a cause of the poor grip is set as "point group interference", and then the flow jumps to step S7111.

On the other hand, in step S7108, in a case where it is determined that the end effector model does not interfere with the peripheral object as a result of interference determination, good grip is determined in step S7110, and then the flow proceeds to step S7111.

In step S7111, it is determined whether or not other grip attitudes are set for the selected workpiece, and, in a case where there are other grip attitudes, the flow returns to step S7104, and the above-described processes are repeatedly performed. On the other hand, in a case where it is determined that there is no grip attitude, in step S7112, a determination result of good grip and poor grip and a cause of the poor grip are displayed in the workpiece grip impossibility cause display region 3e with respect to all of the grip solution candidates.

In the above-described way, it is verified whether or not a given workpiece group can be gripped, and causes of grip impossibility can be listed.

Grip Simulation

Figure 72:
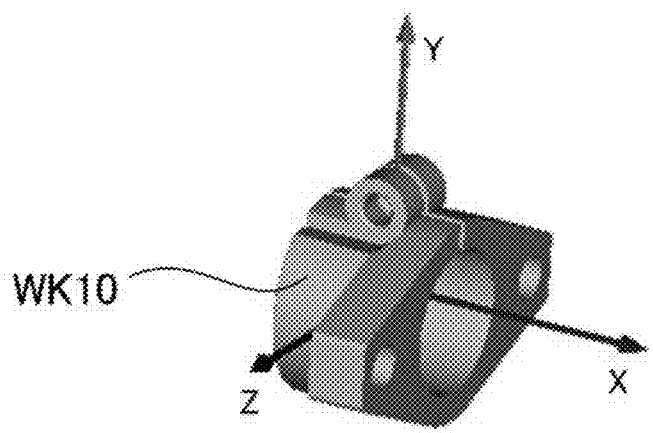
FIG. 72 is a perspective view illustrating an example of a workpiece.
Figure 73C:
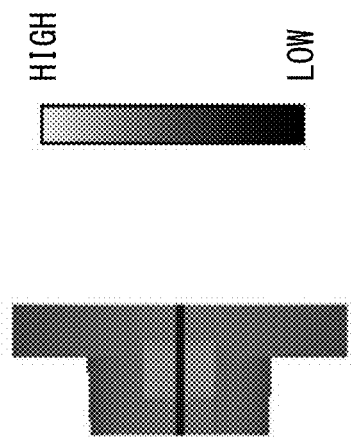
FIG. 73C is a height image in which the workpiece in FIG. 72 is viewed from a positive direction side of an X axis.
Figure 73A:
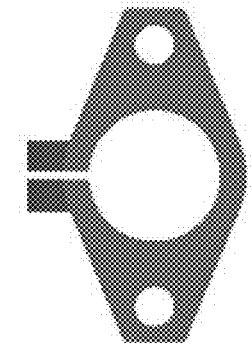
FIG. 73A is a height image in which the workpiece in FIG. 72 is viewed from a positive direction side of a Z axis.
Figure 73D:
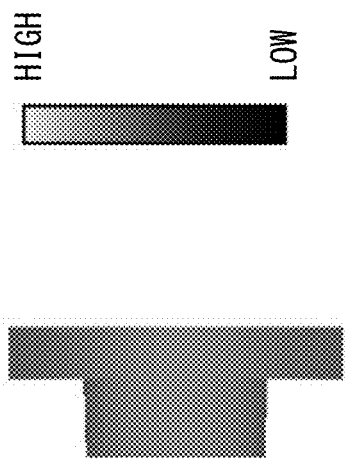
FIG. 73D is a height image in which the workpiece in FIG. 72 is viewed from a negative direction side of the X axis.
Figure 73F:
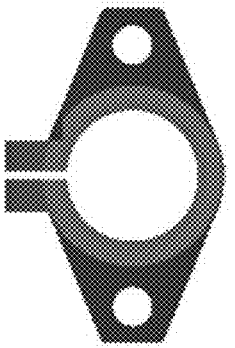
FIG. 73F is a height image in which the workpiece in FIG. 72 is viewed from a negative direction side of the Y axis.
Figure 73B:
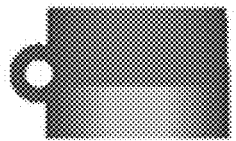
FIG. 73B is a height image in which the workpiece in FIG. 72 is viewed from a negative direction side of the Z axis.

Next, a description will be made of details of grip simulation of performing specific grip determination. Herein, a description will be made of an example of performing determination of whether or not grip is possible in a case where bin picking is performed by using a workpiece WK10 as illustrated in FIG. 72. The fundamental direction image generation portion 8e' generates fundamental direction images corresponding to six drawings of the workpiece WK10, and the search model registration portion 8g registers each fundamental direction image as a search model. FIGS. 73A to 73E illustrate examples of the fundamental direction images. In these figures, FIG. 73A is a height image A in which the workpiece in FIG. 72 is viewed from a positive direction side of a Z axis; FIG. 73B is a height image B in which the workpiece in FIG. 72 is viewed from a negative direction side of the Z axis; FIG. 73C is a height image C in which the workpiece in FIG. 72 is viewed from a positive direction side of an X axis; FIG. 73D is a height image D in which the workpiece in FIG. 72 is viewed from a negative direction side of the X axis; FIG. 73E is a height image E in which the workpiece in FIG. 72 is viewed from a positive direction side of a Y axis; and FIG. 73F is a height image F in which the workpiece in FIG. 72 is viewed from a negative direction side of the Y axis.

Workpiece Selection Screen 210

Figure 71:
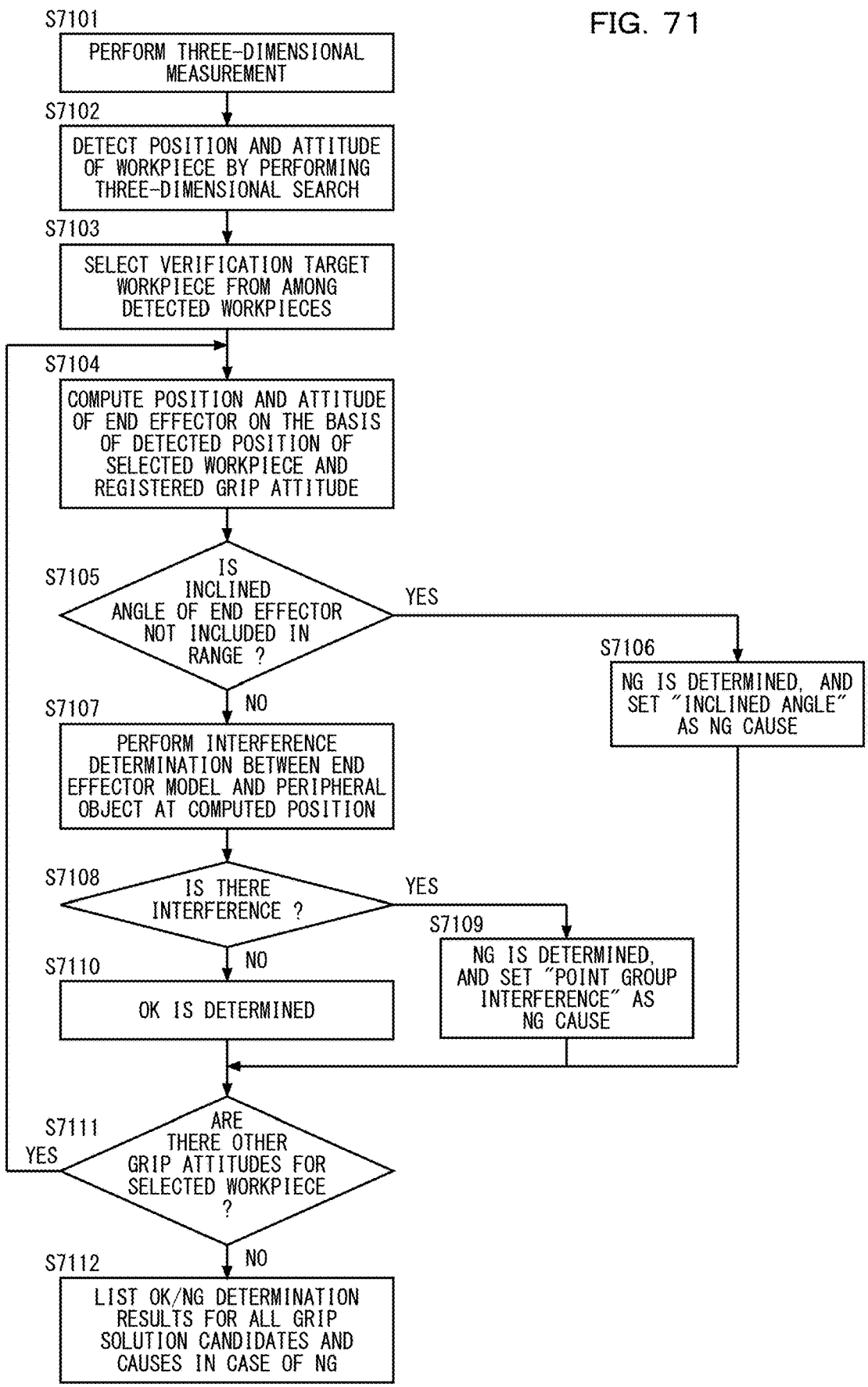
FIG. 71 is a flowchart illustrating procedures of determining the presence or absence of a grip solution for each workpiece during an actual operation according to Embodiment 7.

In order to determine whether or not a workpiece can be gripped by an end effector, a three-dimensional search is performed on an input image including a bulk workpiece group, and a target workpiece is selected in a state in which workpieces are detected (step S7103 in FIG. 71). Selection of a workpiece is performed on, for example, a workpiece selection screen 210 illustrated in FIG. 74. The workpiece selection screen 210 illustrated in FIG. 74 includes an image display field 141 and an operation field 142. An input image which is actually measured data obtained by imaging the bulk workpiece group is displayed in the image display field 141. A search result is displayed to overlap the input image as a point group at a position where a workpiece is detected. The screen of the image display field 141 is dragged, and thus a viewpoint can be changed.

Label Number and Model Number

Figure 74:
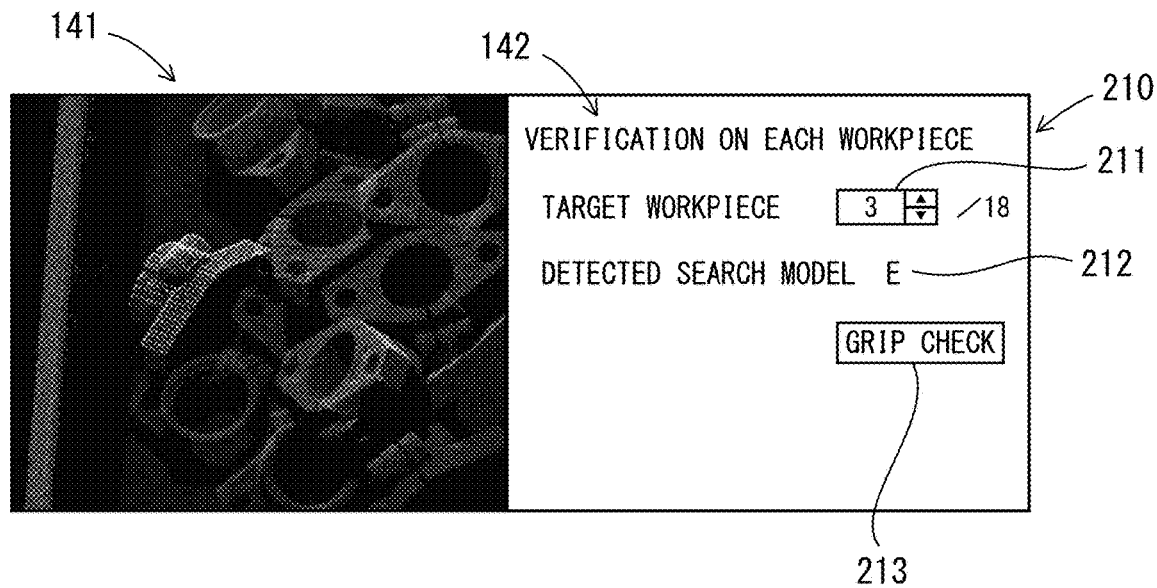
FIG. 74 is an image diagram illustrating a workpiece selection screen.

The operation field 142 includes a target workpiece selection field 211 for selecting a target workpiece, a detection search model display field 212 indicating a search model used for three-dimensionally searching for the target workpiece, and a "grip check" button 213 for displaying all grip position candidates for the selected workpiece in a list form. The example illustrated in FIG. 74 shows a state in which 18 workpieces are present as a result of three-dimensionally searching the input image, and a third workpiece is selected from among the workpieces. Here, identification information is set for a search result in order to differentiate a detected search result. Herein, a serial label number is set as the identification information. "3" is displayed as a label number of the selected target workpiece in the target workpiece selection field 211 in FIG. 74. A search result of the selected target workpiece is displayed in the image display field 141. Specifically, as a scene of a search result, feature points of a corresponding search model are displayed to be superimposed on the point group of the input image. If a label number of the target workpiece is changed in this state, the workpiece selected in the image display field 141 is also changed according thereto. A search model E (the height image in FIG. 73E) is displayed as a search model used to three-dimensionally search for the target workpiece in the detection search model display field 212. Individual identification information is also given to a search model, and is referred to as a model number herein. In FIG. 74, "E" of a workpiece model having the serial label number "3" is displayed as a model number in the detection search model display field 212.

Grip Solution Candidate Display Screen 220

Figure 75:
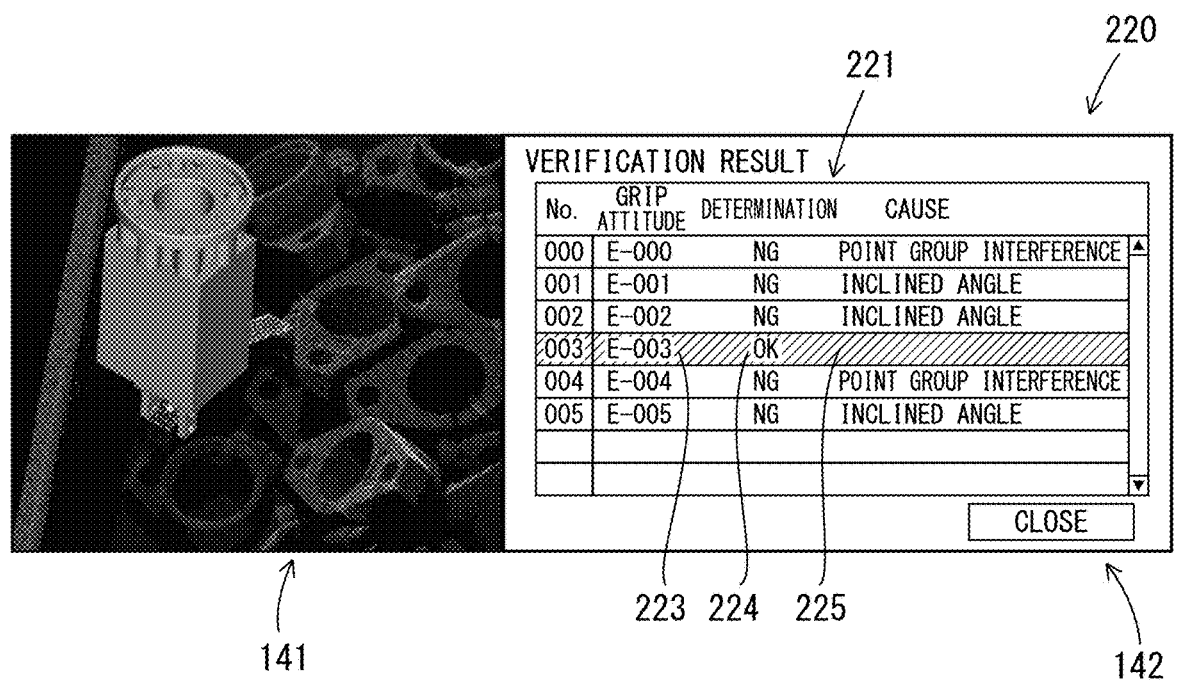
FIG. 75 is an image diagram illustrating a grip solution candidate display screen in which good grip is selected.

Grip positions set for each workpiece, that is, grip solution candidates may be displayed in the grip solution candidate display region 3c in a list form. In the example of the workpiece selection screen 210 in FIG. 74, if the "grip check" button 213 is pressed, a grip solution candidate display screen 220 in FIG. 75 is displayed in the display unit. On the grip solution candidate display screen 220 which is a form of the grip solution candidate display region 3c, all grip positions set for a target workpiece selected in the target workpiece selection field 211 in FIG. 74 are listed in a grip solution candidate display field 221 as grip solution candidates. The grip solution candidate display field 221 includes a workpiece grip position display field 223 displaying a label number of a grip position, a workpiece grip propriety display field 224 displaying a workpiece grip propriety determination result, and a workpiece grip impossibility cause display field 225 displaying a cause of grip impossibility for each grip solution. In the example illustrated in FIG. 75, all of five grip candidates are listed with respect to the third search result target workpiece selected in the target workpiece selection field 211, and determination results of good grip (OK) and poor grip (NG) and causes of the poor grip are displayed. The workpiece selected in the image display field 141 and an end effector model gripping the workpiece are displayed at a grip attitude at the grip position, so as to correspond to the grip position of the workpiece selected in the grip solution candidate display field 221. If selection of the grip position is changed in the grip solution candidate display field 221, the workpiece in the image display field 141 is also changed according thereto, and an attitude of the end effector model gripping the workpiece is also updated.

Figure 76:
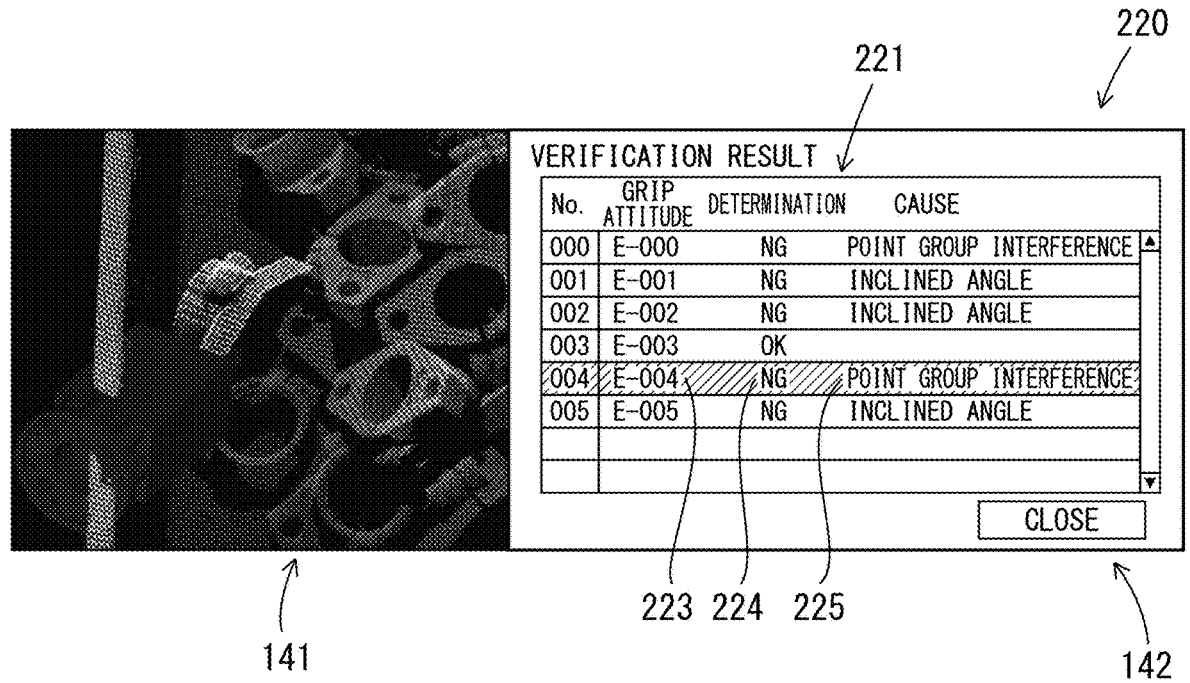
FIG. 76 is an image diagram illustrating a grip solution candidate display screen in which poor grip is selected.

The example illustrated in FIG. 75 shows a state in which the workpiece in FIG. 73E is gripped at the grip position candidate having the label number "3". Herein, since a determination result is good grip, nothing is displayed in the workpiece grip impossibility cause display field 225. On the other hand, if a grip position candidate having the label number "4" is selected in the workpiece grip impossibility cause display field 225, the display in the image display field 141 is also changed as illustrated in FIG. 76. Since the grip position candidate having the label number "4" has a determination result of poor grip, a cause to be determined as being grip impossibility is displayed in the workpiece grip impossibility cause display field 225. An end effector model corresponding thereto is displayed in the image display field 141, and thus it is possible to visually check an actual state of a grip attitude. Herein, "point group interference" is displayed, and it can be seen that an end effector interferes with a flat surface of a storage container. As a result, a user can examine adding of a grip position at a position or an attitude not causing interference with respect to the workpiece having such an attitude.

Figure 77:
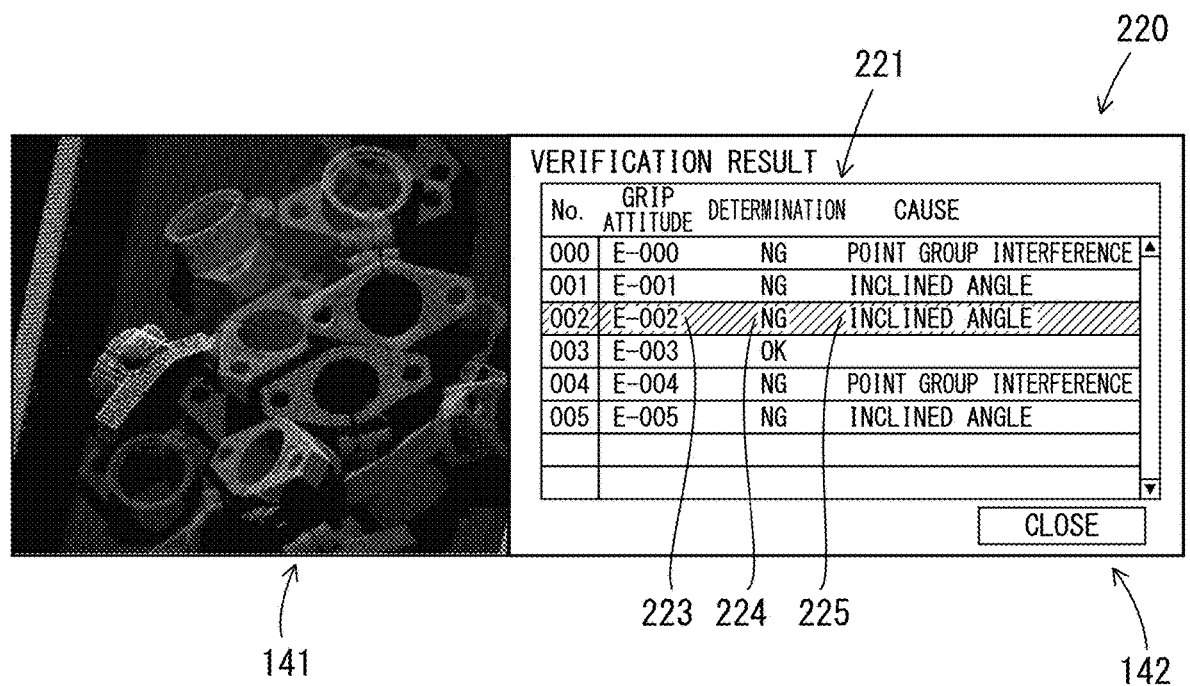
FIG. 77 is an image diagram illustrating another example of a grip solution candidate display screen in which poor grip is selected.

Similarly, if a grip position candidate having the label number "2" is selected in the workpiece grip impossibility cause display field 225, the grip solution candidate display screen 220 illustrated in FIG. 77 is displayed, and an "inclined angle" is displayed in the workpiece grip impossibility cause display field 225 as a cause of the grip position candidate having the label number "2" being determined as being poor grip. An end effector model corresponding thereto is displayed in the image display field 141, an end effector is in a state of trying to grip a workpiece at a steep inclined angle, and thus it can be seen that the end effector model is excluded from an interference determination target in the first place.

A display aspect of an end effector displayed in the image display field 141 may be changed according to a determination result. In the example illustrated in FIG. 75, the end effector model is displayed white in a case of good grip, and, in the example illustrated in FIG. 76 or 77, the end effector model is displayed red in a case of poor grip. Consequently, a user can easily visually differentiate grip determination results from each other. When a grip position is added, display in the image display field 141 may be updated such that a display aspect is changed at a time point at which interference does not occur by adjusting an attitude of an end effector model. With this configuration, a user can change, for example, an attitude of the end effector model until a color of the end effector model is changed to white from red, and thus it is possible to obtain an advantage that attitude adjustment work can be intelligibly performed.

Figure 78:
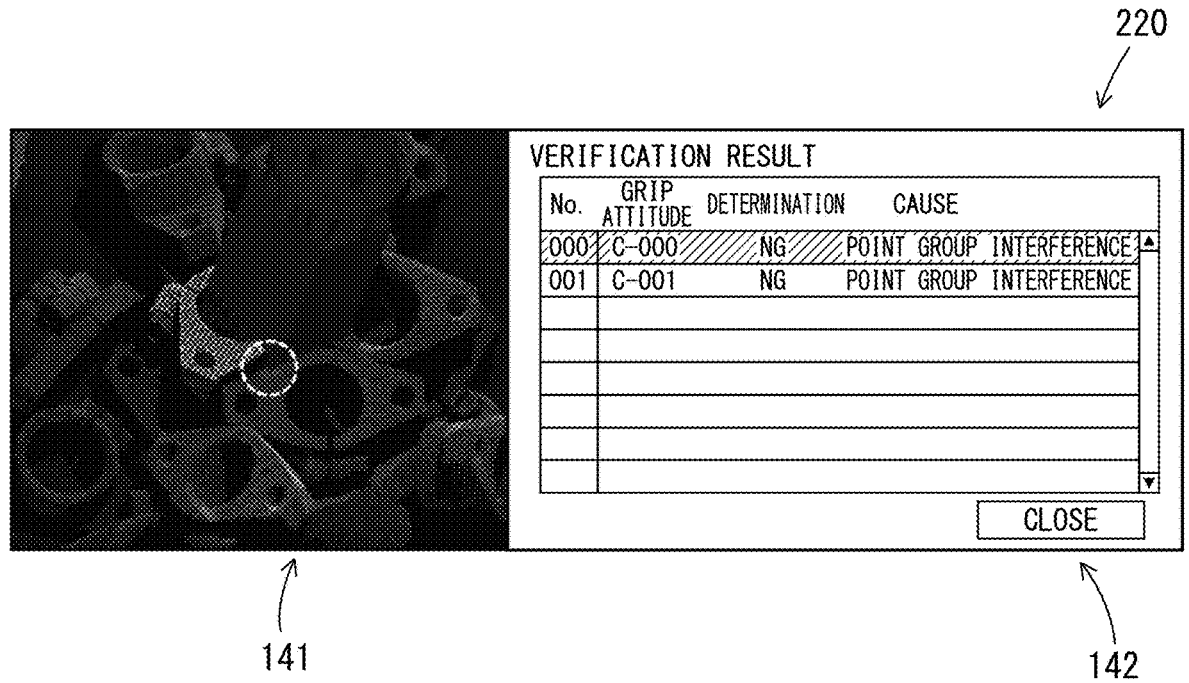
FIG. 78 is an image diagram illustrating an example of a grip solution candidate display screen for a search model.
Figure 79:
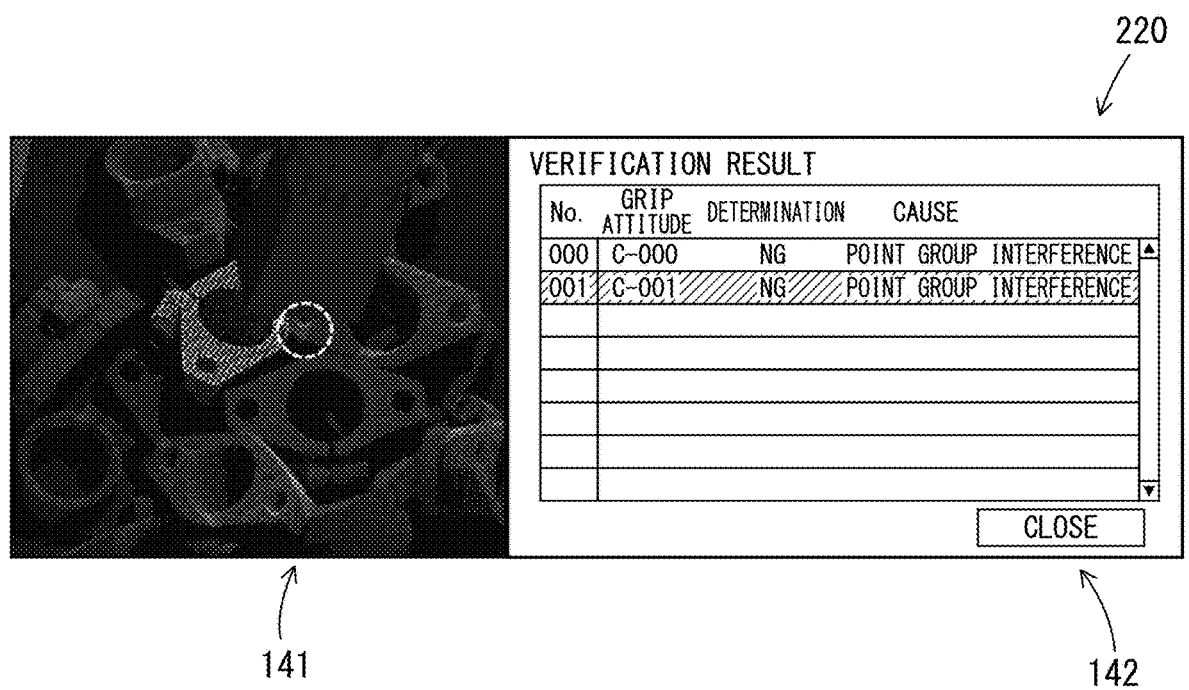
FIG. 79 is an image diagram illustrating an example of a grip solution candidate display screen in which another grip position candidate is selected in FIG. 78.
Figure 80:
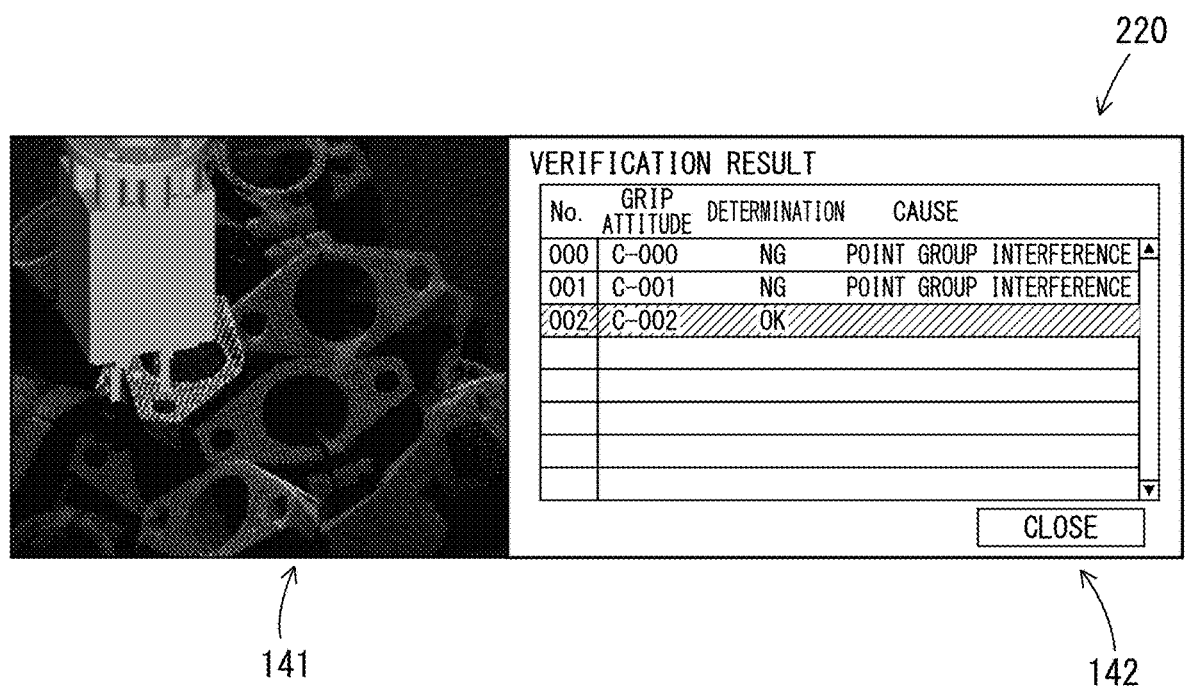
FIG. 80 is an image diagram illustrating an example of a grip solution candidate display screen in which good grip is obtained by adding a grip position.

Since the grip propriety determination verification function is provided as mentioned above, in a case where grip impossibility is determined for a workpiece desired to be gripped, the function is a guideline for examining work such as adding a new grip position or changing setting of an existing grip position. For example, in the examples illustrated in FIGS. 78 and 79, two grip position candidates are present for the workpiece of the search model C (FIG. 73C), but neither thereof are gripped due to point group interference. In both cases, it can be seen that this is because the tip of the claw of the end effector model interferes with another workpiece as indicated by a dashed circle in the image display field 141. Thus, if a new grip position is added such that a location on an opposite side to the current grip position is gripped, it can be seen that a good grip solution is obtained. Therefore, if setting is performed with the grip position specifying portion 8d such that a new grip position (grip attitude C-002) is added such that a location on an opposite side to the current grip position is gripped, a determination result of good grip is obtained as illustrated in FIG. 80. In the above-described way, when a user performs adjustment work of a grip position or a grip attitude, an environment in which a countermeasure is easily examined is provided, and thus a robot system in which setting is easily performed is realized.

A threshold value of an inclined angle of an end effector may be changed through setting performed by a user. For example, in a case where a box having a deep bottom is used a storage container for workpieces, if an inclination of an end effector increases, not only the end effector but also the arm portion of the robot easily collides with a wall of the storage container, and thus an angle range is set to be narrow. Conversely, in a case where a box having a shallow bottom is used as a storage container, if an end effector does not interfere, the arm portion of the robot scarcely collides with a wall of the storage container, and thus an angle range is set to be wide. As mentioned above, if setting of an angle range is adjusted, it is possible to flexibly adjust grip propriety determination according to an actual situation.

In the above-described way, in a case where all grip solutions for a selected workpiece are displayed in a list form and are determination as being poor grip, causes of the poor grip are also displayed. Therefore, in a case where there is a workpiece which seems to be gripped but is not a grip solution candidate for a long period of time, it becomes easier to specify a cause thereof. Since the cause can be specified, it becomes easier to understand what kind of new grip attitude is preferably added.

Embodiment 8

In the above-described example, a description has been made of the example in which a search result is individually acquired for each search model during a three-dimensional search. In other words, a three-dimensional search is performed on a plurality of fundamental direction images indicating different faces of the same workpiece, and obtained results are recognized as different workpieces. In other words, as a result of the different faces of the same workpiece being individually searched, the workpiece may be detected as different workpieces. On the other hand, in a three-dimensional search of the related art, a three-dimensional shape indicating a single workpiece model is searched, and thus such a case does not occur, and different faces of the same workpiece are caused to be detected as a single workpiece. However, in a workpiece having many faces, a search is complicated, and thus a probability of wrong detection increases. In contrast, in the method according to the above-described embodiment, since a simple face is searched, it is possible to simplify a search process, and the method is advantageous in terms of achievement of low load, high speed, and the like. On the contrary, as a result of each face being searched, as described above, obtained search results may be recognized as separate workpieces, and thus there is a problem in that different faces of even the same workpiece are individually detected.

Figure 70:
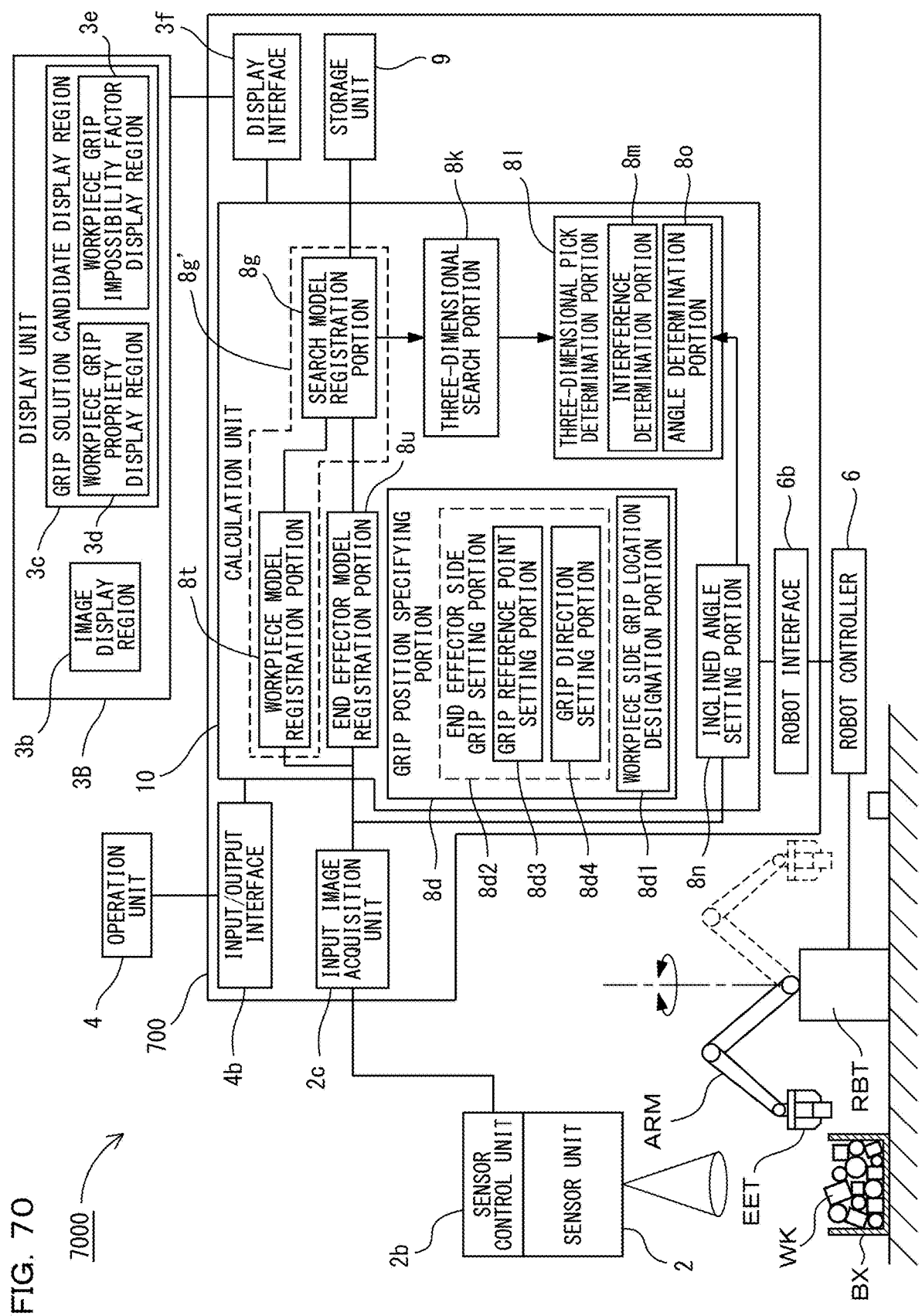
FIG. 70 is a block diagram illustrating a robot system according to Embodiment 7.
Figure 81:
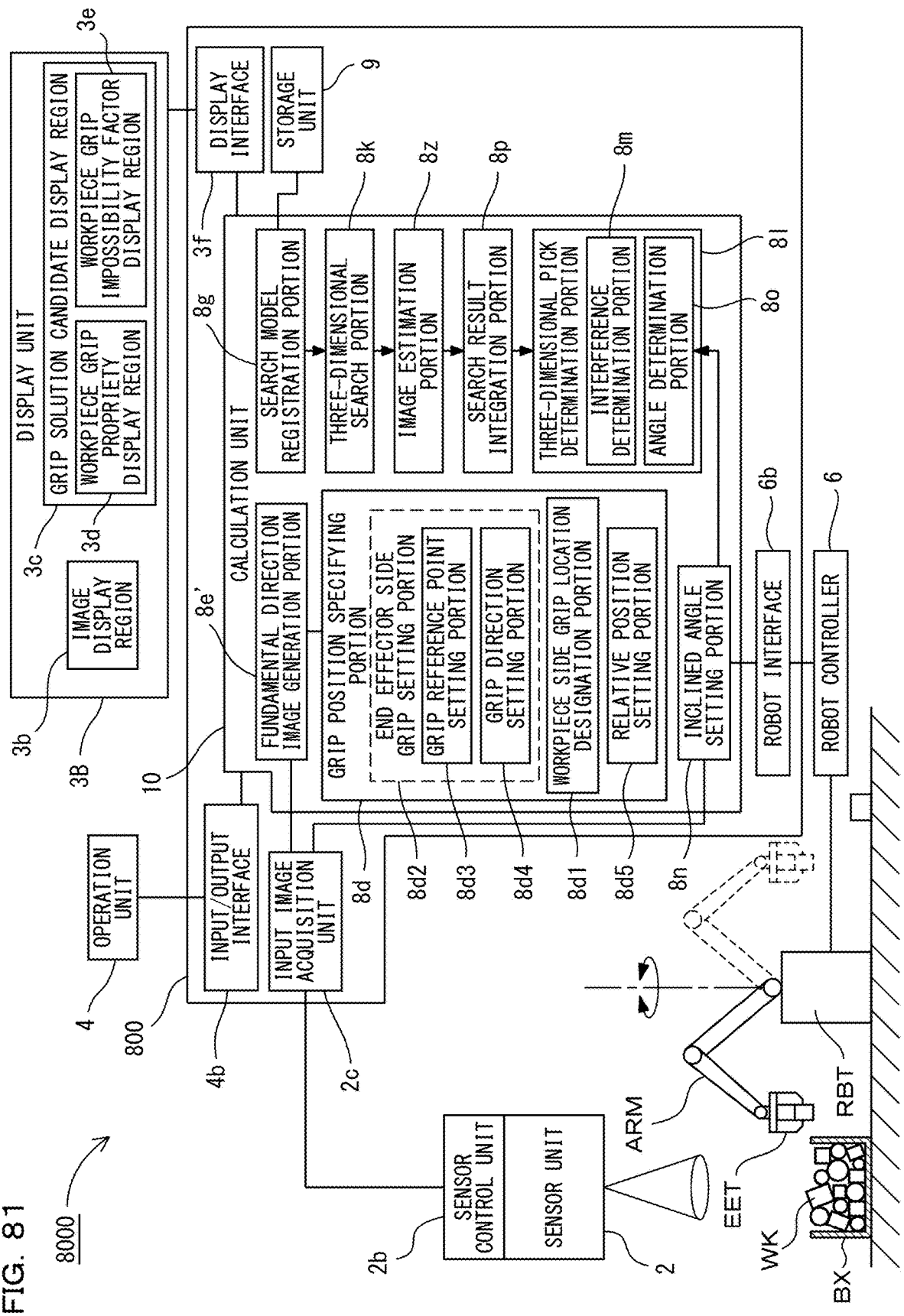
FIG. 81 is a block diagram illustrating a robot system according to Embodiment 8.

Therefore, obtained search results are integrated with each other so as to be aggregated for each workpiece, or a search result of another face is estimated from a search result of a certain face. Consequently, a face which cannot be detected in a three-dimensional search or a face having low detection accuracy can be used as a grip solution candidate. Such an example is illustrated in a block diagram of FIG. 81 as a robot system according to Embodiment 8. The robot system 8000 illustrated in FIG. 81 includes a robot setting apparatus 800, a display unit 3B, an operation unit 4, a sensor unit 2, and a robot RBT. The same member as in FIG. 6 and FIG. 70 is given the same reference numeral, and a detailed description thereof will be omitted as appropriate.

Robot Setting Apparatus 800

The robot setting apparatus 800 includes an input image acquisition unit 2c, a calculation unit 10, a storage unit 9, an input/output interface 4b, a display interface 3f, and a robot interface 6b. The calculation unit 10 includes a fundamental direction image generation portion 8e', a grip position specifying portion 8d, a search model registration portion 8g, a three-dimensional search portion 8k, an image estimation portion 8z, a search result integration portion 8p, a three-dimensional pick determination portion 8l, and an inclined angle setting portion 8n.

The fundamental direction image generation portion 8e' is a member for generating a plurality of height images in which a workpiece model is viewed from respective axis directions of three axes orthogonal to each other on a virtual three-dimensional space as fundamental direction images.

The grip position specifying portion 8d is a member for specifying a plurality of grip positions at which a workpiece model indicated by one of the fundamental direction images generated by the fundamental direction image generation portion 8e' is gripped by an end effector. The grip position specifying portion 8d includes a workpiece side grip location designation portion 8d1 and an end effector side grip setting portion 8d2.

The workpiece side grip location designation portion 8d1 is a member for designating a grip position at which a workpiece model virtually expressing a three-dimensional shape of a workpiece and formed of three-dimensional CAD data is gripped by an end effector model in a state in which the end effector model is displayed in the image display region 3b.

The end effector side grip setting portion 8d2 is a member for designating a grip position of gripping a workpiece for the end effector model displayed in the image display region 3b.

The search model registration portion 8g is a member for registering a search model used to perform a three-dimensional search for specifying an attitude and a position of each workpiece from a plurality of fundamental direction images generated by the fundamental direction image generation portion 8e' with respect to a plurality of workpiece groups included in an input image acquired by the input image acquisition unit 2c. The search model registration portion 8g may register a relative position between a plurality of registered search models as relationship information (details thereof will be described later).

The image estimation portion 8z is a member for estimating, by using an estimation image, a position and an attitude of a non-searched fundamental direction image not included in a search result in the three-dimensional search portion for a workpiece model indicated by the search result, on the basis of a relative positional relationship with a fundamental direction image of another search model registered for the workpiece model, each search model used for a search being a fundamental direction image in which an original workpiece model is viewed from a certain direction, with respect to each search result which is searched for by the three-dimensional search portion 8k and is extracted from an input image in the search model unit. For example, in a case where it is determined by the angle determination portion 8o which will be described later that an attitude of a workpiece search result searched for by the three-dimensional search portion 8k is included in an inclined angle range set by the inclined angle setting portion 8n, the image estimation portion 8z may estimate an estimation image having a relative positional relationship with the search result.

The search result integration portion 8p is a member for integrating adjacent search results among a plurality of search results as an integration result regarding a common workpiece, on the basis of a relative positional relationship of each search model used for a search being a fundamental direction image in which an original workpiece model is viewed from a certain direction, with respect to each search result which is searched for by the three-dimensional search portion 8k and is extracted from an input image in the search model unit.

The three-dimensional pick determination portion 8l is a member for determining whether or not a workpiece model can be gripped by an end effector at a grip position designated for the workpiece model in the grip position specifying portion 8d, on the basis of an integration result obtained through integration in the search result integration portion 8p, and each search result not integrated, searched in the three-dimensional search portion 8k. The three-dimensional pick determination portion 8l includes an interference determination portion 8m and an angle determination portion 8o.

Consequently, since a position and an attitude of a workpiece can be more accurately estimated by using relationship information between faces without individually performing grip determination on a search result obtained through a three-dimensional search, a face not searched for or a face having low accuracy of a search result can be detected, even a face which is normally difficult to search for can be examined as a grip position candidate, and thus it is possible to increase a possibility that a grip solution can be obtained.

Figure 27:
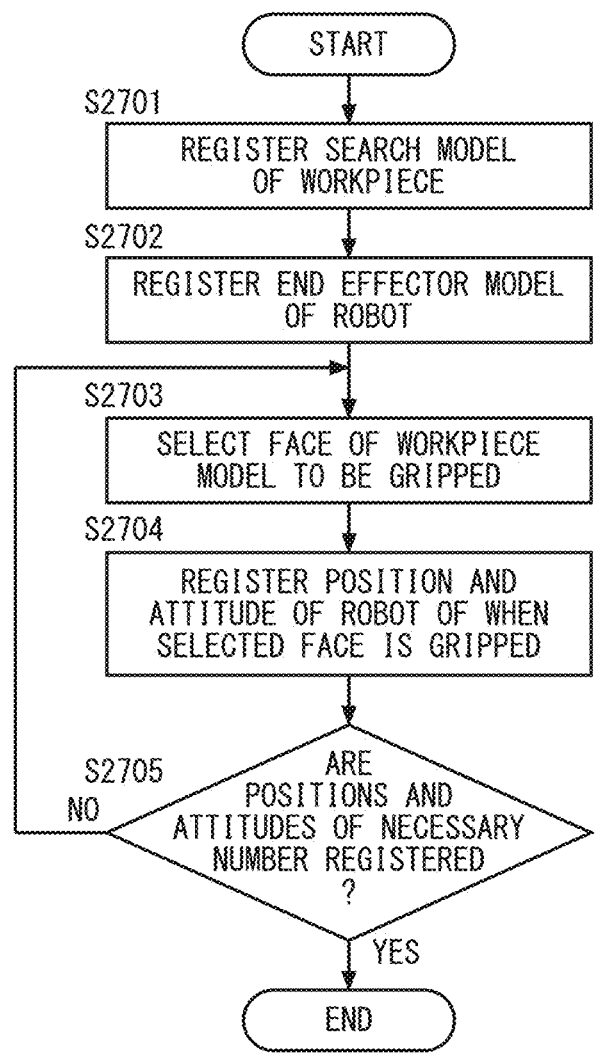
FIG. 27 is a flowchart illustrating procedures of teaching work performed before an actual operation.

Procedures of Registering Search Model Including Relationship Information Between Faces Procedures of performing setting such as registration of a workpiece model or an end effector model or registration of a grip position on the robot setting apparatus may use, for example, the procedures shown in the flowchart of FIG. 27. Here, with reference to a flowchart of FIG. 82, a description will be made of procedures of registering a search model including relationship information between faces of a workpiece by using three-dimensional CAD data as a search model in step S2701 in FIG. 27.

First, in step S8201, a three-dimensional CAD data model of the workpiece is read.

Next, in step S8202, the center of a circumscribing cuboid of the three-dimensional CAD data model is corrected to the origin of the three-dimensional CAD data.

In step S8203, height images viewed from respective directions of "top", "bottom", "left", "right", "front", and "rear" are generated as fundamental direction images. The fundamental direction images are generated by the fundamental direction image generation portion 8e' in FIG. 81. Here, in a case where a height image is generated on the basis of the three-dimensional CAD data, the height image is generated such that the origin of CAD is the center of the height image.

Next, in step S8204, a height image having the same viewing way is deleted from the generated height images.

In step S8205, a relative position among a plurality of registered search models is registered as relationship information. Herein, the search model registration portion 8g stores relationship information of the remaining height images and the respective faces such as top, bottom, left, right, front and rear faces.

Finally, in step S8205, a search model is registered by using the generated height images. In the above-described way, the search model including the relationship information among the faces of the workpiece is registered.

Relationship Information of Faces

Here, a description will be made of relationship information indicating a relative positional relationship between faces in which a workpiece is viewed from specific directions. For example, in a case of the workpiece as illustrated in FIG. 7, faces having different viewing ways are four faces illustrated in FIGS. 9A to 9D. In these figures, the image of the model A illustrated in FIG. 9A is a height image viewed from the positive direction of the X axis. However, the image is the same as an image viewed from the negative direction of the X axis. The image of the model B illustrated in FIG. 9B is a height image viewed from the positive direction of the Y axis, and is also the same as an image viewed from the negative direction of the Y axis. On the other hand, the image of the model C illustrated in FIG. 9C is the same as only an image viewed from the positive direction of the Z axis. The image of the model D illustrated in FIG. 9D is the same as only an image viewed from the negative direction of the Z axis.

Here, information indicating that each of the images of the models A, B, C and D as height images generated in advance is the same as an image in which a three-dimensional CAD data model of the workpiece illustrated in FIG. 7 is viewed from a predetermined coordinate axis direction at a predetermined rotation state is assumed to be information indicating relationship information of faces. If there is relationship information of the faces, an attitude of original three-dimensional CAD data is obtained on the basis of a search result of each model. For example, the model B in FIG. 9B is present to be adjacent to each of the left and right faces of the model A in FIG. 9A. The model C in FIG. 9C is present to be adjacent to the top face of the model A, and the model D in FIG. 9D is present to be adjacent to the bottom face thereof. As a result, in a case where detection results of the model A and the model B are adjacent to each other in searched images obtained as a result of a three-dimensional search, it can be seen that the results are obtained by searching the same workpiece. Therefore, the search results can be integrated into a single search result. Here, a set of integrated search results is referred to as an integration result.

An evaluation index may be updated by integrating search results with each other. In other words, in a case where even a search result having low accuracy may be obtained as a search result having high accuracy in an integration result, an evaluation index of the integration result may be heightened, and thus the search result may be prioritized as an accurate grip solution when a grip position is selected.

Non-Searched Fundamental Direction Image

Even if there is a face not searched as in a case where a three-dimensional search fails or a search is not performed, estimation using an integration result can be performed. In other words, when an integration result of a workpiece is obtained by integrating a plurality of search results with each other, even in a case where there is a face not detected through a three-dimensional search among faces forming the workpiece, if search results can be obtained from other faces, an attitude or a position of the workpiece can be calculated. As a result, in a case where a workpiece model in which a grip position is registered for a workpiece in advance or a search model for a three-dimensional search has been registered, information regarding a face which is not searched for can be estimated on the basis of an attitude of the workpiece. Therefore, a face (also referred to as a non-searched fundamental direction image) which is not obtained as a result of the search and is obtained through estimation is also used as a grip position candidate, and thus a grip position of the face which is not actually searched for can be examined as a grip solution candidate, so that it is possible to obtain an advantage that an appropriate grip solution can be easily obtained. For example, in a case where the model B illustrated in FIG. 9B is obtained as a result of a three-dimensional search, it can be estimated that the face of the model A illustrated in FIG. 9A is present on the side thereof. Consequently, even if the model A is not actually detected as a search result, the face of the model A can be estimated on the basis of the search result of the model B, a grip attitude registered for the face of the model A can be used as a grip solution candidate, and thus the number of grip solution candidates is increased, so that picking is easily performed.

Calculation of Grip Solution Using Relationship Information of Faces

Next, a description will be made of an effect of grip solution calculation using relationship information of faces by using the workpiece WK10 illustrated in FIG. 72. The fundamental direction images illustrated in FIGS. 73A to 73F are generated by the fundamental direction image generation portion 8e' on the basis of three-dimensional CAD data of the workpiece WK10, and are registered as search models by the search model registration portion 8g. In these figures, the image illustrated in FIG. 73A is a height image viewed from the positive direction of the Z axis, and is used as an image of the model A. Similarly, the image illustrated in FIG. 73B is a height image viewed from the negative direction of the Z axis, and is used as an image of the model B. The image illustrated in FIG. 73C is a height image viewed from the positive direction of the X axis, and is used as an image of the model C. The image illustrated in FIG. 73D is a height image viewed from the negative direction of the X axis, and is used as an image of the model D, the image illustrated in FIG. 73E is a height image viewed from the positive direction of the Y axis, and is used as an image of the model E, and the image illustrated in FIG. 73F is a height image viewed from the negative direction of the Y axis, and is used as an image of the model F.

Figure 83E:
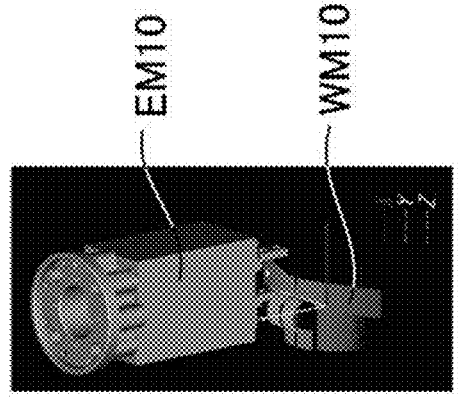
FIG. 83A is an image diagram illustrating a state in which a grip attitude is registered in a fundamental direction image in FIG. 73A.
FIG. 83B is an image diagram illustrating a state in which a grip attitude is registered in a fundamental direction image in FIG. 73B.
Figure 83F:
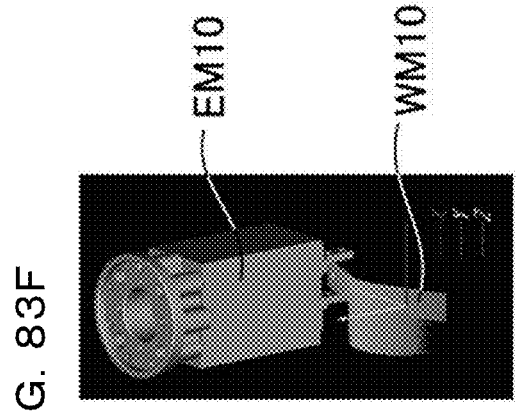
Figure 83C:
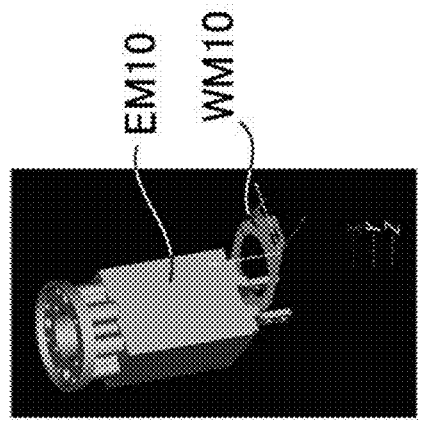
Figure 83D:
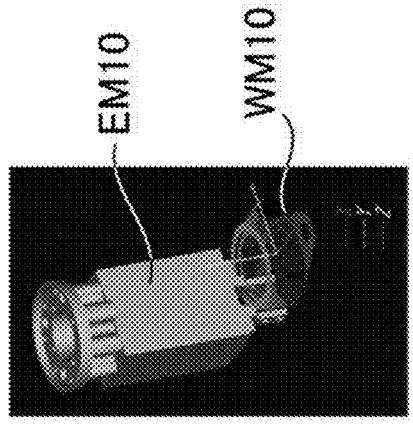
Figure 83A:
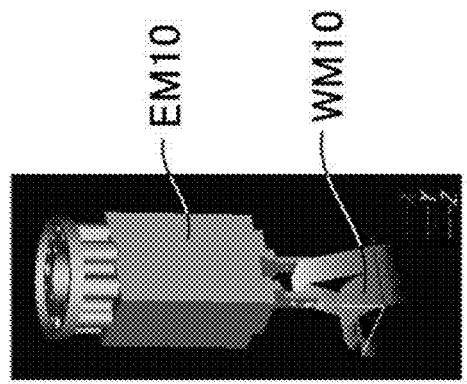
Figure 83B:
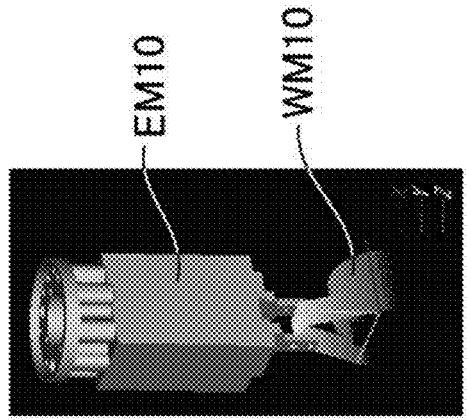

Here, it is assumed that grip attitudes at which the workpiece model WM10 is gripped by an end effector model EM10 are respectively registered for the fundamental direction images by the grip position specifying portion 8d as illustrated in FIGS. 83A to 83F. Here, FIG. 83A illustrates a state in which a grip attitude A-000 is registered for the fundamental direction image in FIG. 73A. FIG. 83B illustrates a state in which a grip attitude B-000 is registered for the fundamental direction image in FIG. 73B. FIG. 83C illustrates a state in which a grip attitude C-000 is registered for the fundamental direction image in FIG. 73C, FIG. 83D illustrates a state in which a grip attitude D-000 is registered for the fundamental direction image in FIG. 73D, FIG. 83E illustrates a state in which a grip attitude E-000 is registered for the fundamental direction image in FIG. 73E, and FIG. 83F illustrates a state in which a grip attitude F-000 is registered for the fundamental direction image in FIG. 73F. In this case, a description will be made of calculation of a grip solution using relationship information of faces with reference to FIGS. 84, 85 and 86.

Figure 84:
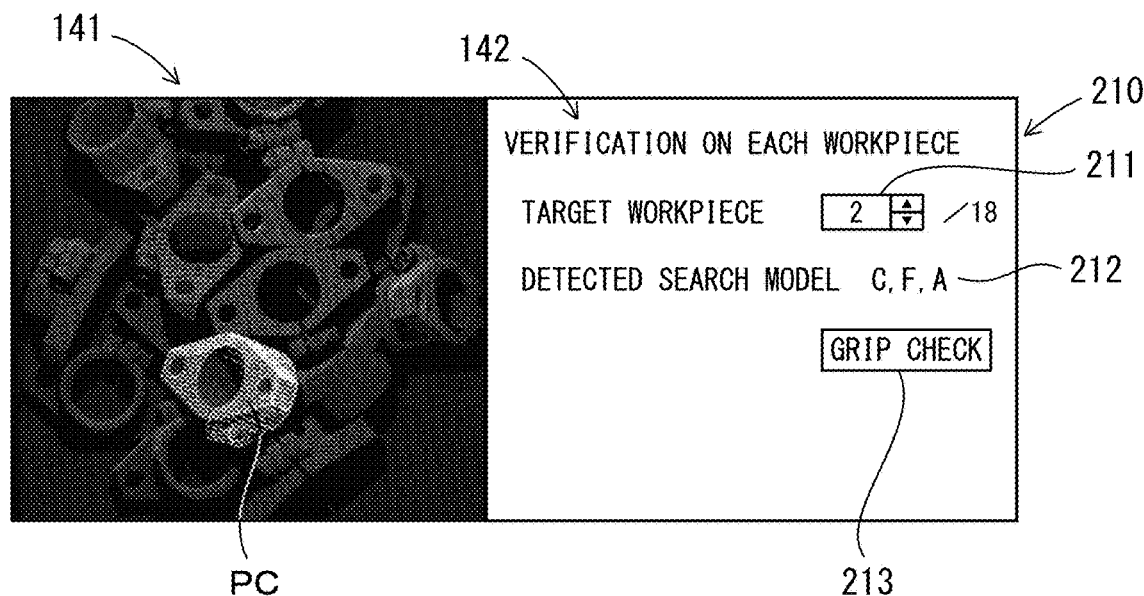

The workpiece selection screen 210 in FIG. 84 displays a state in which twelve workpieces are detected as a result of performing a three-dimensional search on an input image obtained by imaging a bulk workpiece group. The input image is displayed in the image display field 141. The operation field 142 includes the target workpiece selection field 211 for selecting a target workpiece, the detection search model display field 212, and the "grip check" button 213 for displaying grip position candidates for the selected workpiece in a list form. In the example illustrated in FIG. 84, among the twelve workpieces obtained through the three-dimensional search, the second workpiece is selected in the target workpiece selection field 211, and a search result of the selected second target workpiece is displayed in the image display field 141. Specifically, as a scene of the search result, feature points of the corresponding search model are displayed to overlap a point group of the input image. The search models C, F and A are displayed as search models used to detect the second target workpiece in the detection search model display field 212. In this state, the three search models C, F and A (FIGS. 73C, 73F and 73A) are integrated with each other.

Here, if the relationship information of faces of a workpiece is not used, the model F or the model A may be hardly detected as a search result since only a part of the side face is viewed on the input image as displayed in the image display field 141. Even if the model is detected, an evaluation index may be low, and, as a result, the priority is low. In contrast, by using the relationship information, as in FIG. 84, not only the search model C but also the search model F or the search model A can be detected or estimated, and can thus be used as a grip position candidate.

Figure 85:
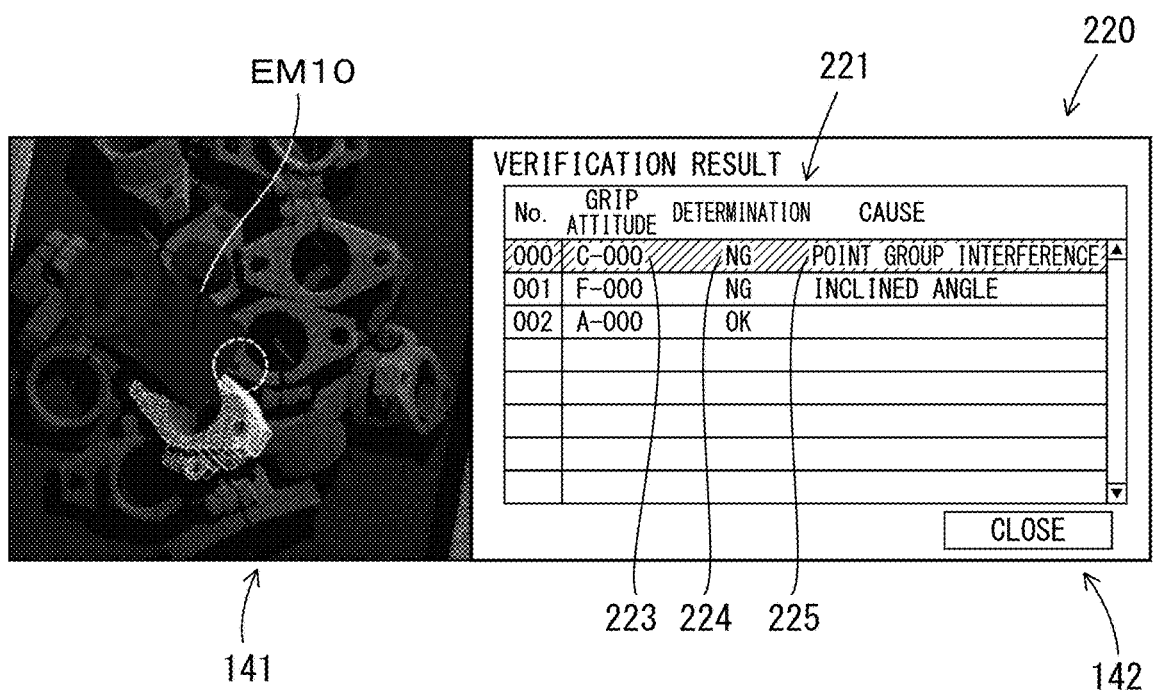

If the "grip check" button 213 is pressed on the workpiece selection screen 210 in FIG. 84, the grip solution candidate display screen 220 in FIG. 85 is displayed. On the grip solution candidate display screen 220, grip positions set for the second target workpiece selected in the target workpiece selection field 211 in FIG. 84 are listed in the grip solution candidate display field 221 as grip solution candidates. In the grip solution candidate display field 221, workpiece grip propriety determination results for grip positions (FIGS. 83C, 83F and 83A) respectively set for the search models C, F and A displayed in the detection search model display field 212 are displayed in the workpiece grip propriety display field 224, and causes of grip impossibility are displayed in the workpiece grip impossibility cause display field 225. First, for the search model C, it is displayed that a determination result is poor grip, and a cause thereof is interference with point group data. The image display region displays a state in which the end effector model EM10 trying to grip the workpiece at an attitude corresponding to the grip position C-000 is displayed red, and cannot grip the workpiece due to interference. Here, if the relationship information of faces is not used, only the search model C is three-dimensionally searched for, and, as a result, a grip solution candidate is only C-000 of the search model C, and thus a grip solution cannot be obtained.

Figure 86:
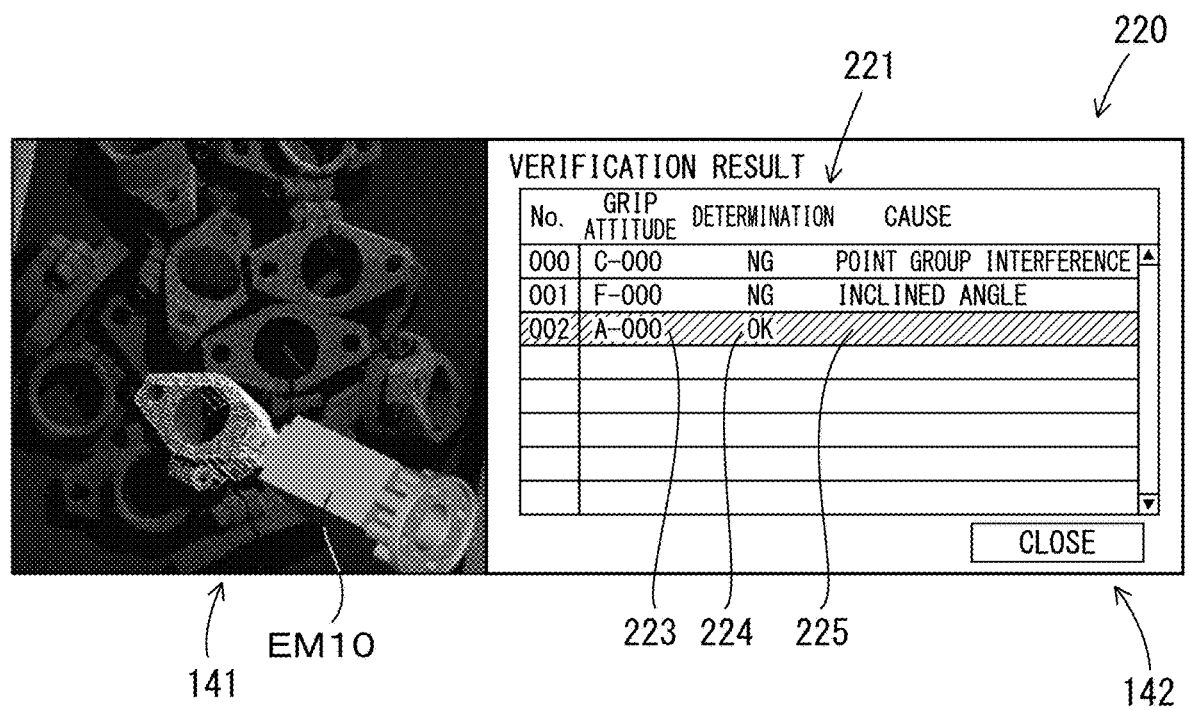

In contrast, by using the relationship information, as illustrated in FIGS. 85 and 86, it can be seen that the search models F and A are also targets in addition to the search model C, and F-000 and A-000 are added as grip position candidates. Of the added grip position candidates, a determination result of poor grip is obtained in the grip position candidate F-000 of the search model F, but a determination result of good grip is obtained in the grip position candidate A-000 of the search model A. As illustrated in FIG. 86, the end effector is displayed white, and a grip solution is obtained with safety without interference with the point group data. As a result, even in a case where a grip solution is not obtained unless the relationship information is used, a grip solution can be obtained by using the relationship information. In other words, it is possible to increase a possibility that a grip solution can be obtained without changing setting of a three-dimensional search, for example, without adjusting arrangement of a light or a camera or changing an algorithm or the like of a search, under the same search condition, in other words, without changing the accuracy of a three-dimensional search. As mentioned above, by using the relationship information of faces, the number of grip solution candidates can be increased, and thus a result which is easy to pick can be obtained.

Third Procedures During Actual Operation

Figure 82:
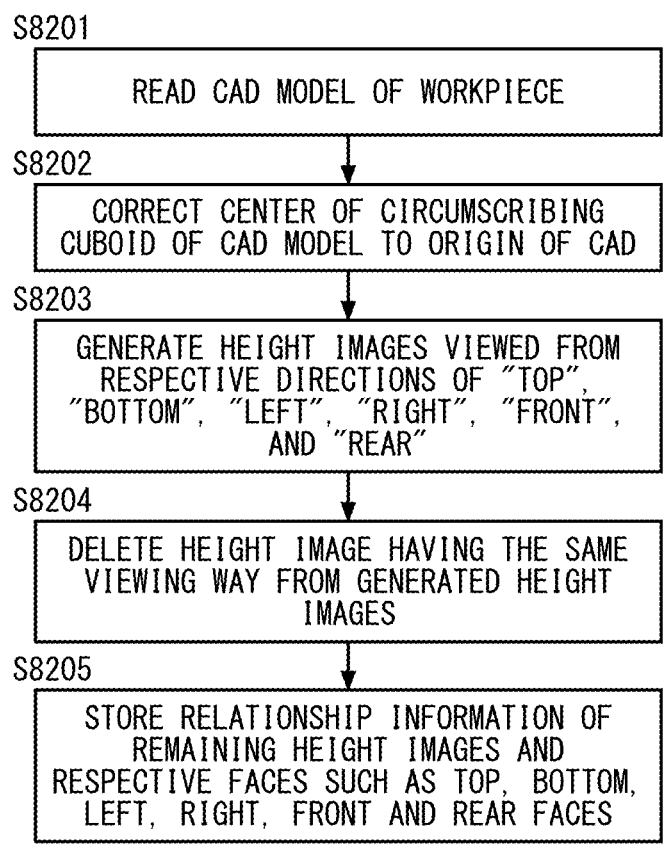
FIG. 82 is a flowchart illustrating procedures of registering a search model according to Embodiment 8.
Figure 87:
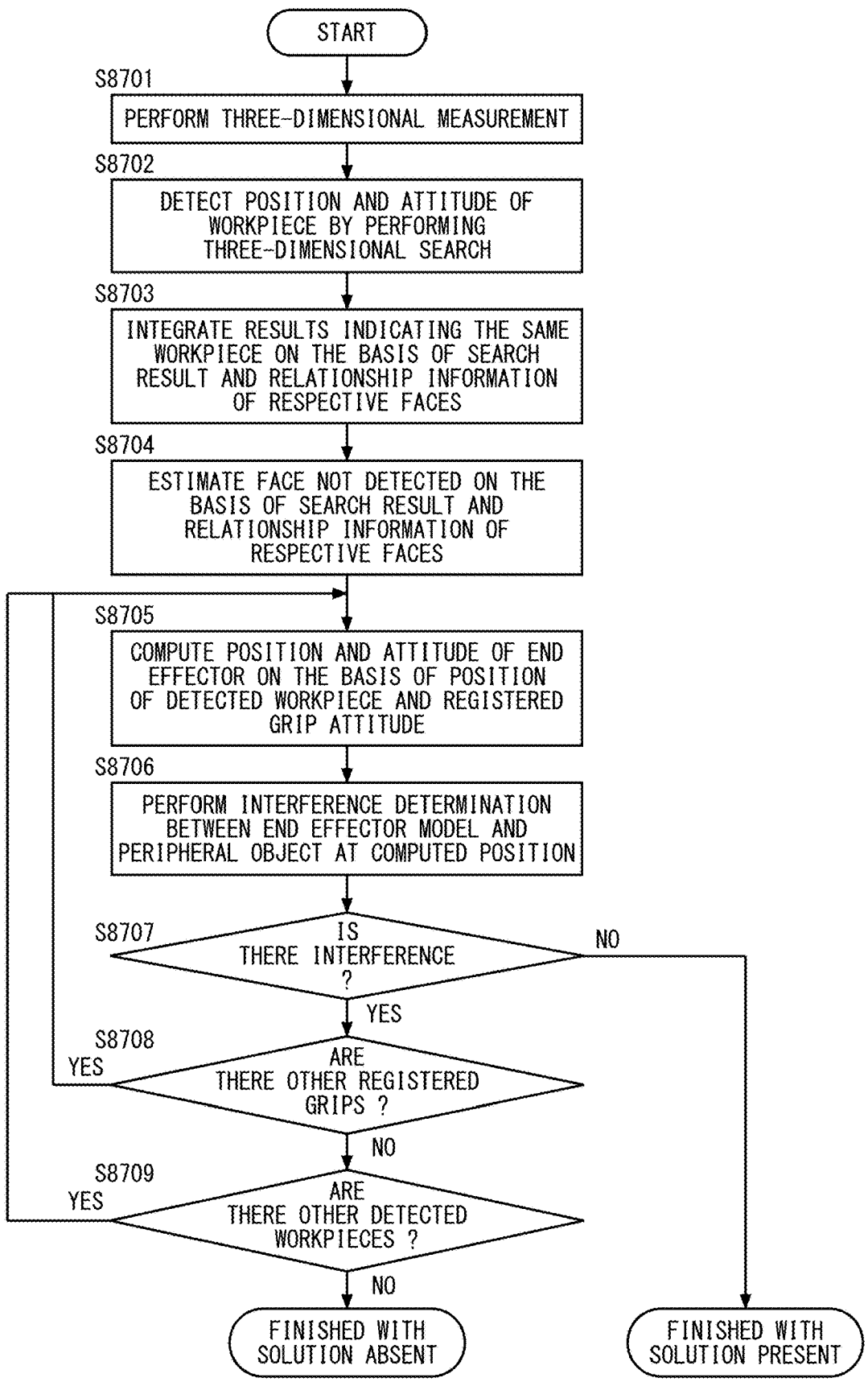

Here, a description will be made of procedures of performing a three-dimensional search and grip propriety determination during an actual operation with reference to a flowchart of FIG. 87 in a state in which the search model is registered according to the procedures in FIG. 82.

First, in step S8701, three-dimensional measurement starts to be performed on bulk workpieces. Herein, the three-dimensional measurement is performed by imaging a bulk workpiece group in the sensor unit 2 illustrated in FIG. 81, and thus an input image including a three-dimensional shape having height information is acquired by the input image acquisition unit 2c.

Next, in step S8702, a three-dimensional search is performed on the obtained three-dimensional shape of the workpiece group by using a workpiece model, and a position and an attitude of each workpiece are detected. The three-dimensional search is performed by the three-dimensional search portion 8k in FIG. 81.

Generation of Integration Result

In step S8703, results indicating the same workpiece are integrated with each other on the basis of search results of the three-dimensional search and the relationship information of faces. Herein, the search result integration portion 8p correlates search results obtained by imaging the same workpiece with each other by using relationship information registered for a search model used for a search. In other words, the search result integration portion 8p integrates adjacent search results with each other among the plurality of search results on the basis of a relative positional relationship related to a fundamental direction image in which a common workpiece model providing search results is viewed from a predetermined direction. The integration result obtained in the above-described way indicates the same workpiece and is handled in common.

Generation of Non-Searched Fundamental Direction Image

In step S8704, a face which is not detected is estimated on the basis of the three-dimensional search results and the relationship information of faces. Herein, a position and an attitude of a non-searched fundamental direction image not included in a three-dimensional search result regarding a workpiece are estimated on the basis of an attitude and a position of the workpiece indicated by the integration result. Grip propriety determination is performed on a grip position which is set for the non-searched fundamental direction image by the grip position specifying portion 8d. Consequently, a face of the workpiece which is not initially searched for as a three-dimensional search result is estimated on the basis of an attitude and a position of the workpiece indicated by an integrated search result, and can thus be set as a grip propriety determination target, and thus it is possible to further increase a possibility that a grip solution can be obtained.

Next, in step S8705, with respect to a single detected workpiece, a position and an attitude at which an end effector is to be disposed are computed on the basis of a position of the workpiece and a grip attitude of the workpiece registered during setting.

Next, in step S8706, interference determination of whether or not the end effector interferes with a peripheral object at the computed position is performed by using an end effector model.

In step S8707, it is determined whether or not the end effector interferes, and, in a case where the end effector does not interfere, it is determined that there is a grip solution for this workpiece, and the process is finished.

On the other hand, in a case where it is determined that the end effector interferes, the flow proceeds to step S8708, and it is determined whether or not there are other grip positions registered for this workpiece. In a case where other grip positions are registered, the flow returns to step S8705, and the processes are repeatedly performed on the grip positions.

On the other hand, in a case where other grip positions are not registered, the flow proceeds to step S8709, and it is determined whether or not there are other detected workpieces. In a case where there are other workpieces, the flow returns to step S8705, and the processes are repeatedly performed on other workpieces instead of the workpiece. In a case where there are no other workpieces, it is determined that there is no grip solution, and the process is finished.

In the above-described way, the presence or absence of a grip solution in which a workpiece can be gripped is determination by using an integration result or a non-searched fundamental direction image. In a case where a grip solution is obtained, an instruction is given to the robot controller 6 such that the workpiece is gripped by an end effector at a determined grip position.

An image in the present specification is not limited to strictly consecutive data, and indicates a set of discrete data such as a set of point group data.

Embodiment 9

Integration of Evaluation Index

Figure 88:
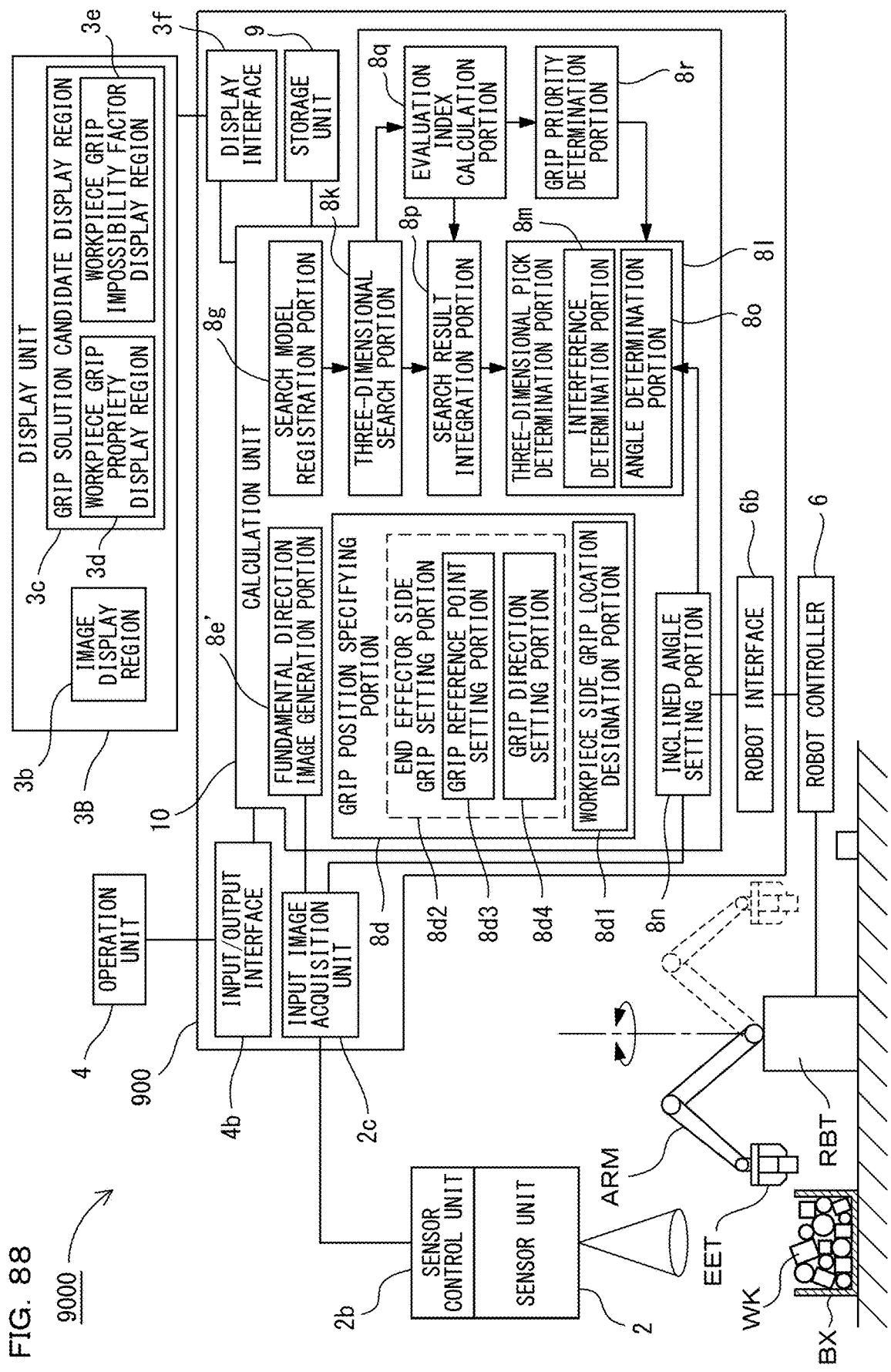

In addition to the procedures, an evaluation index for defining priority may be integrated with an integration result. Such an example is illustrated in FIG. 88 as a robot system 9000 according to Embodiment 9. The robot setting apparatus 900 illustrated in FIG. 88 includes an evaluation index calculation portion 8q and a grip priority determination portion 8r. The same members as the members illustrated in FIG. 81 or the like are given the same reference numerals, and detailed description thereof will be omitted.

The evaluation index calculation portion 8q is a member for calculating an evaluation index for each of grip position candidates regarding grip positions at which it is determined that a workpiece can be gripped by the three-dimensional pick determination portion 8l.

The grip priority determination portion 8r is a member for determining priority in which a workpiece is gripped by an end effector on the basis of the evaluation index calculated by the evaluation index calculation portion 8q.

The robot setting apparatus calculates an evaluation index for each search result by using the evaluation index calculation portion 8q. As the evaluation index, as described above, a proportion of the number of feature points corresponding to an error of a predetermined distance or less, included in a search result, may be used.

Here, the search result integration portion 8p adds the highest evaluation index among evaluation indexes calculated for the respective search results forming the integration result by the evaluation index calculation portion 8q, to the integration result. Generally, an evaluation index of a three-dimensional search depends on a search condition or an attitude of a workpiece (for example, a case where an inclined angle of the workpiece is large, and sufficient reflected light cannot be obtained, or, conversely, a case where reflected light is strong due to a glossy workpiece). Thus, an evaluation index for a search result may be evaluated to be low such that low priority is obtained, or a workpiece may be excluded from a three-dimensional search target for the reason why reflected light cannot be inherently obtained. In this case, a grip position is a grip position candidate with low priority or does not become a grip position candidate, but there is a case where such a workpiece is not disposed at an attitude appropriate for a three-dimensional search but is disposed at an attitude appropriate for gripping. Even in this case, in the related art, since the workpiece is excluded in the stage of a three-dimensional search, or has low priority, a grip position has a low probability of being selected as a grip solution, and cannot be sufficiently used. In contrast, according to the present embodiment, in a case where an evaluation index for a grip position is low as a three-dimensional search result, but a high evaluation value is obtained as another search result adjacent thereto, the grip position can be used as a grip position candidate with high priority by using this fact. Consequently, even a grip position candidate which is not used in the related art can be used, and thus it is possible to increase a possibility that a grip solution can be obtained. In other words, an appropriate workpiece can be gripped regardless of the accuracy of a three-dimensional search.

In the above-described method, a description has been made of an aspect in which the entire integration result is evaluated by using the highest evaluation index among evaluation indexes for respective search results forming an integration result, or an evaluation index for each search result is rewritten from an original evaluation value to a higher evaluation value. This is based on the fact that the reliability of a three-dimensional search result is high for a search result for which a high evaluation index is obtained. However, the present invention is not limited to this aspect, and may be applied to another aspect, for example, evaluation indexes for respective search results forming an integration result may be averaged, and the average search result may be handled as an evaluation index for the integration result. In any case, according to the present embodiment, a search result having an initially low evaluation index is evaluated with an evaluation index higher than the initial evaluation index, so as to become a candidate of a grip position or the like.

GUI of Robot Setting Program

Figure 89:
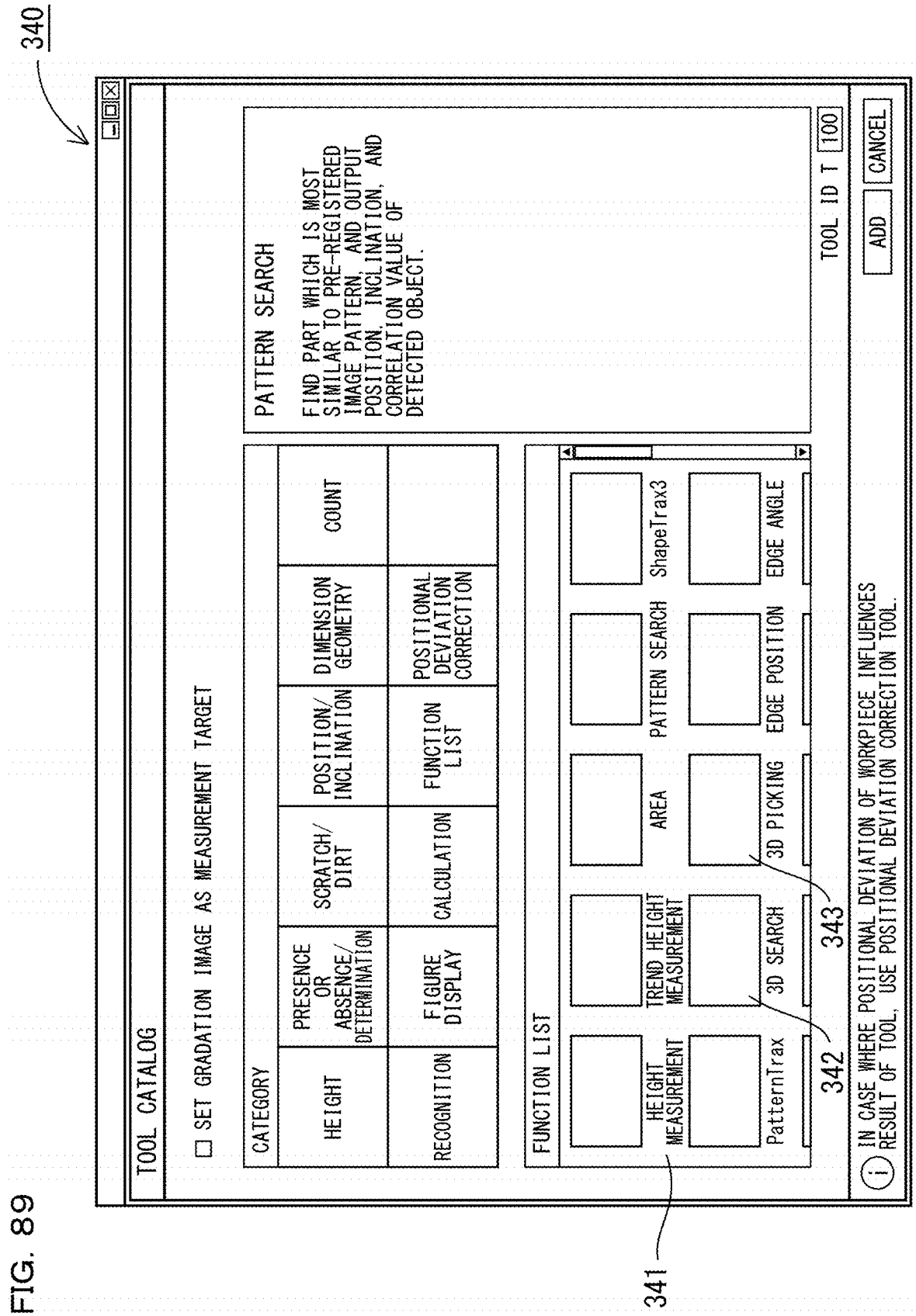

Here, a description will be made of examples of GUIs of a robot setting program with reference to FIGS. 89 to 149. FIG. 89 illustrates a function selection screen 340 for selecting various functions, and available functions are listed and displayed in a button form in a function list display field 341. If a "3D search" button 342 is pressed in this state, a three-dimensional search function is executed.

Three-Dimensional Search Screen

Necessary setting is required to be performed by executing the three-dimensional search function. Specifically, such setting may include registration of a search model, a registration of a floor surface or a storage container on or in which a workpiece is placed, setting of a three-dimensional search condition, and the like. Regarding such setting, all items may be arbitrarily set by a user, and each item may be set while a necessary procedure is presented to the user. A guidance function of such setting will be described with reference to three-dimensional search screens in FIGS. 90 to 101.

In each of the three-dimensional search screens, a flow display portion 351 in which a flow of procedures to be set is displayed is provided on an upper part of the image display field 141 located on the lower left side in the screen. In the flow display portion 351, a summary of each procedure is indicated in text or a picture, and a procedure which is currently set is highlighted. In an example illustrated in FIG. 90, a "model registration" icon 352 is displayed in a bright color, and a remaining icon such as a "floor/box setting" icon 353 or a "search setting" icon 354 is displayed in a dark color, and thus a user can be notified of a target which is currently set. Explanation of an item which is currently set is displayed in text or the like in the operation field 142 provided on the right side in the three-dimensional search screen, and setting to be performed can be explained to a user in text. Explanation may be performed not only by using text information but also through a combination with a picture or a moving image as appropriate as necessary. A setting field or the like for a parameter to be set is also provided.

Registration of Search Model Based on Actually Measured Data

The three-dimensional search screens in FIGS. 90 to 101 show an example in which actually measured data obtained by imaging a real workpiece in the sensor unit is registered as a search model. Such registration may be performed according to the procedures described in the flowchart of FIG. 27. On the three-dimensional search screens in FIGS. 90 to 101, the "model registration" icon 352 is highlighted in the flow display portion 351 as described above as a first procedure.

Figure 90:
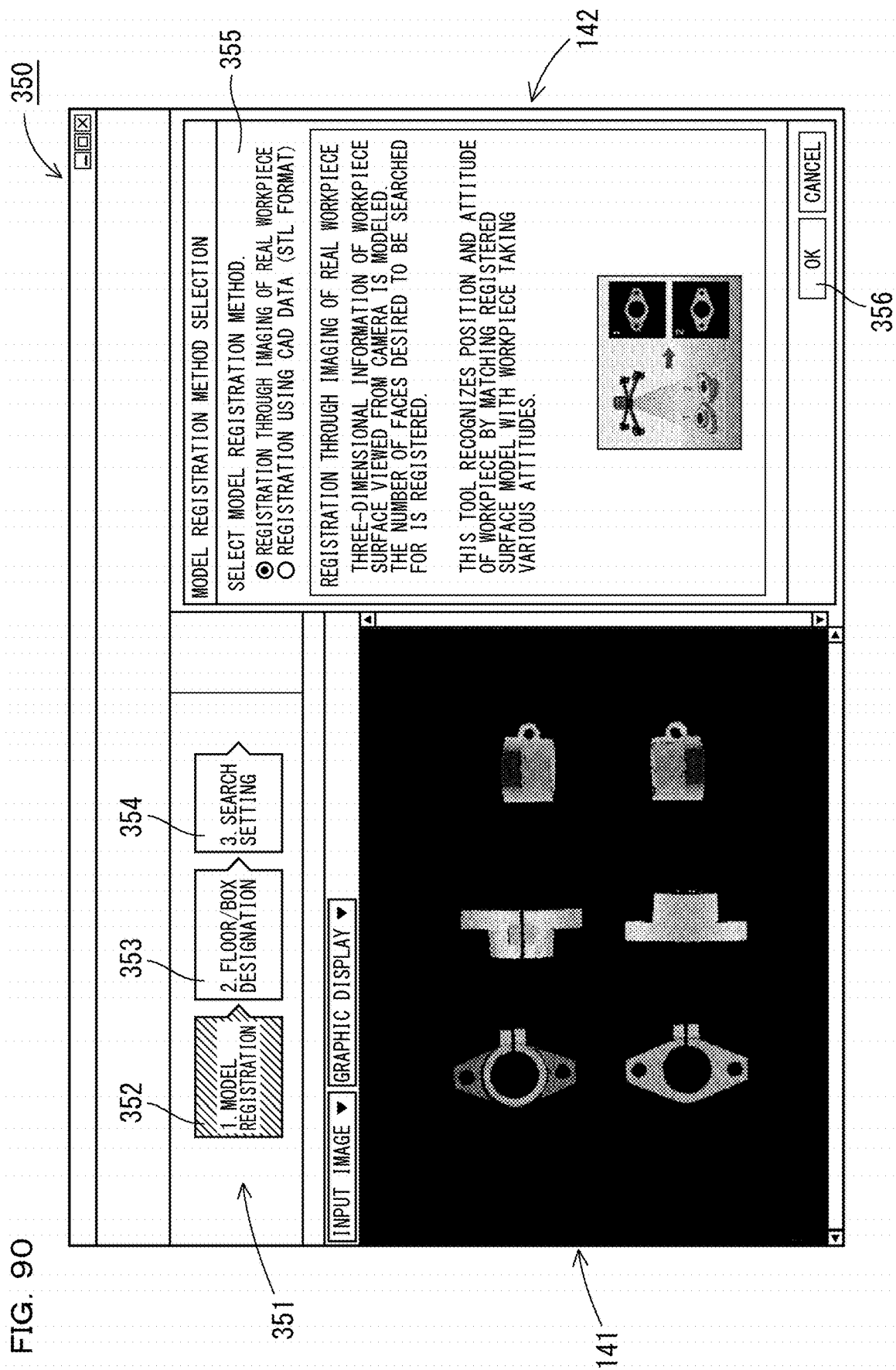

FIG. 90 illustrates a search model registration method selection screen 350 for selecting a method of registering a search model. A model registration method selection field 355 for selecting a method of registering a model is provided in the operation field 142 of the search model registration method selection screen 350. In the model registration method selection field 355, as a model registration method, whether a model obtained by imaging a real workpiece is registered or is registered from CAD data may be selected with a radio button. In the example of the search model registration method selection screen 350 in FIG. 90, the method of registering a model obtained by imaging a real workpiece is selected, and, according thereto, an explanation of procedures of registering a model obtained by imaging a real workpiece is displayed in text and pictures in the operation field 142. In this example, work to be performed is presented to a user by using text information that "three-dimensional information of a workpiece surface viewed from the camera is modeled; the number of faces desired to be searched for is registered; and this tool recognizes a position and an attitude of a workpiece by matching the registered surface model with the workpiece taking various attitudes", and pictures. Consequently, the user can easily recognize the work to be performed on this screen. If registration of a real workpiece is selected on the search model registration method selection screen 350 in FIG. 90, and then an "OK" button 356 is pressed, imaging of the workpiece is performed.

Actually Measured Data Imaging Unit

Figure 91:
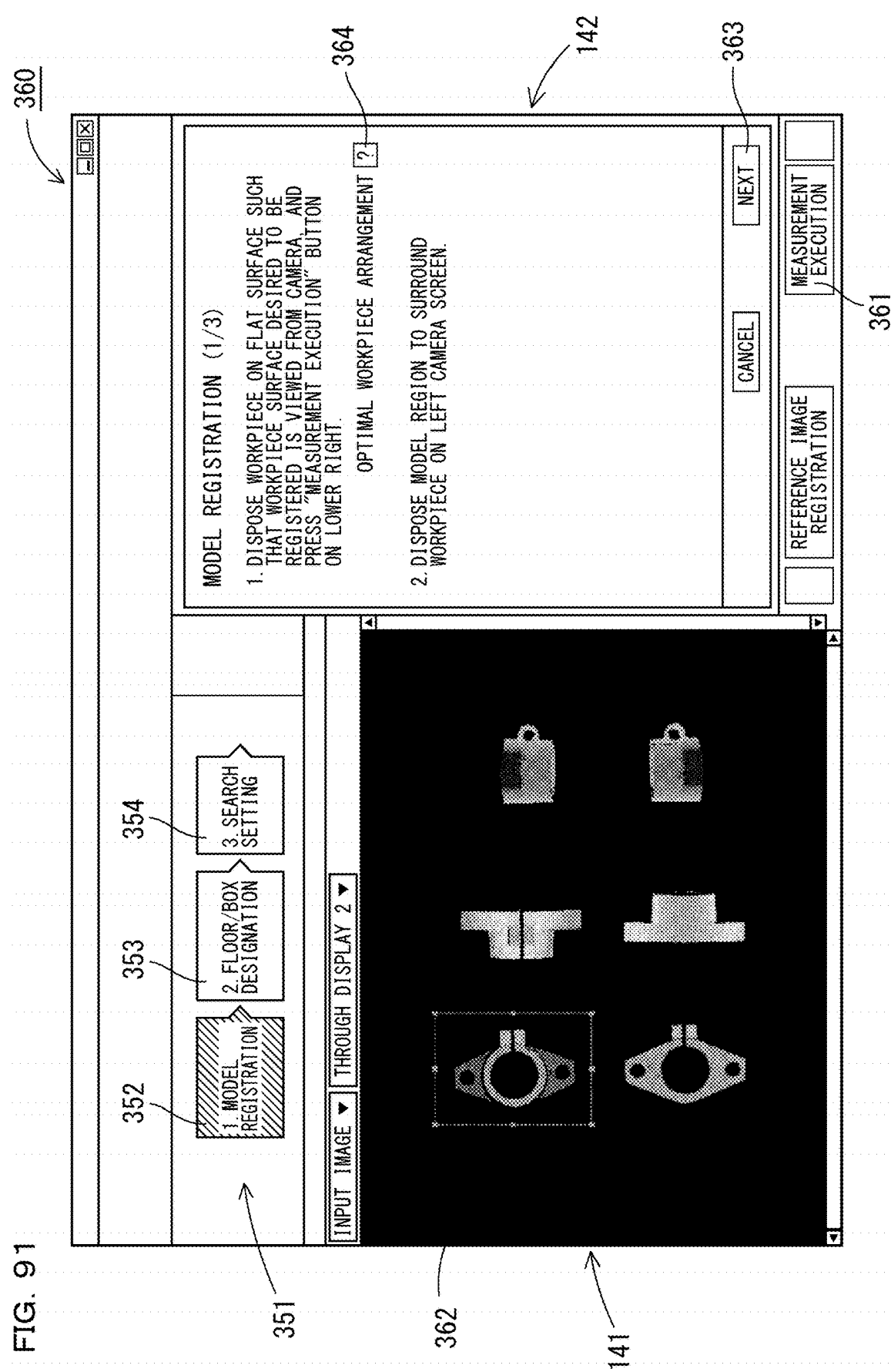

Procedures of actually registering a model by using a real workpiece are as in FIGS. 91 to 93. In this example, the model registration work is divided into three screens, and is sequentially explained to the user. First, the workpiece is imaged as first work of model registration on an actually measured data imaging screen 360 in FIG. 91. In this example, the explanation that "1. dispose the workpiece on the flat surface such that a workpiece surface desired to be registered is viewed from the camera, and press the "measurement execution" button on the lower right; and 2. dispose the model region to surround the workpiece on the left camera screen" is displayed in the operation field 142 as work to be performed by the user. A detailed explanation of optimal arrangement of a workpiece may be displayed on a separate screen by pressing a "?" button 364. Consequently, it is possible to avoid a situation in which a screen is hard to view or a user is confused by displaying a lot of information on the screen. In the above-described way, the user disposes the workpiece at a position where the workpiece can be imaged by the sensor unit, and performs positioning while checking a scene of the workpiece in the image display field 141. If the "measurement execution" button 361 is pressed, the imaged workpiece is displayed as illustrated in FIG. 91. Herein, images having different colors depending on obtained heights of the workpiece are displayed as three-dimensional images. A height image is not limited to color display, and may express a height with a luminance value of a pixel. In the example illustrated in FIG. 91, six workpieces having the same shape are arranged, and are displayed at different attitudes. In this state, the user sets a model region 362 to surround an image of the workpiece desired to be registered as a search model. If the model region 362 is set, a "next" button 363 is pressed. Consequently, the screen is changed to a search model exclusion region setting screen 370 illustrated in FIG. 92.

Background Removal Setting Unit

An exclusion region which is excluded when a search model is registered is set as second work of the model registration on the search model exclusion region setting screen 370 in FIG. 92. As an example of a function using a search model exclusion region, there may be a function of removing a background such as a floor surface on which a workpiece is placed when a real workpiece is registered. On the search model exclusion region setting screen 370 in FIG. 92, the explanation that "1. set background removal such that only the workpiece surface desired to be registered remains" is displayed in the operation field 142 as the second work of model registration. A detailed explanation of a background removal setting method may be displayed on a separate screen by pressing a "?" button 371. A background removal setting field 372 is provided on an intermediate part of the operation field 142, and a height of the background to be removed is designated in a numerical value. In this example, 1.5 mm is designated, and a range of the height of 0 to 1.5 mm in the range designated for the model region 362 is excluded from a search model registration target. The model region 362 displayed in the image display field 141 is updated according to the setting in the background removal setting field 372, and the region excluded from the search model registration target is displayed black. The user can judge whether or not setting of the exclusion region is proper while checking this scene, and may perform resetting as necessary.

Mask Region Setting Unit

In addition to a height direction, a range desired to be excluded from the search model registration target in a plane direction may be designated as a mask region. The explanation that "2. dispose a mask region in a case where there are things other than the workpiece surface desired to be registered" is displayed on the lower part in the background removal setting field 372 of the search model exclusion region setting screen 370 in FIG. 92. Similarly, a detailed explanation of a mask region setting method may be displayed on a separate screen by pressing a "?" button 373. If a "mask region" button 374 is pressed, a mask region can be set as a region excluded from the search model registration target within the range set for the model region 362. The mask region may be set to a predefined shape such as a rectangular shape or a circular shape, and may also be set through automatic detection of a free curve or a boundary portion. The model region 362 displayed in the image display field 141 is updated as described above according to setting of the mask region.

In the example illustrated in FIG. 92, background removal is set, and then a mask region is set, but orders thereof may be replaced with each other. If the region desired to be excluded from the search model registration target is set in the above-described way, a "next" button 375 is pressed. Consequently, the screen is changed to a rotation symmetry setting screen 380 illustrated in FIG. 93.

Rotation Symmetry Setting Unit

Rotation symmetry is set as third work of the model registration on the rotation symmetry setting screen 380 in FIG. 93. In this example, the explanation that "1. in a case where workpiece surfaces to be registered have rotation symmetry, designate a corresponding workpiece surface" is displayed in the operation field 142. Similarly, a detailed explanation of a rotation symmetry setting method may be displayed on a separate screen by pressing a "?" button 381. A rotation symmetry setting field 382 is provided on an intermediate part of the operation field 142, and a rotation symmetry candidate may be selected from options such as circle symmetry, N-fold symmetry, and none. In a case where the N-fold symmetry is selected, a numerical value input box for the symmetry number is displayed, and the rotation symmetry number corresponding to a shape of the workpiece surface is set. For example, in a case where the workpiece surface is rectangular, and viewing ways in which the workpiece surface is rotated by 180 degrees with respect to an axis viewed directly from the top are the same as each other, the rotation symmetry number is 2 as an appropriate value. Alternatively, in a case where the workpiece surface has a square shape, and viewing ways in which the workpiece surface is rotated by 90 degrees with respect to an axis viewed directly from the top are the same as each other, the rotation symmetry number is 4 as an appropriate value. Still alternatively, in a case where the workpiece surface has a hexagonal shape, and viewing ways in which the workpiece surface is rotated by 30 degrees with respect to an axis viewed directly from the top are the same as each other, the rotation symmetry number is 6 as an appropriate value. On the other hand, the circle symmetry is recommended to be set in a case where rotated viewing ways are all the same as each other for any rotation angle, for example, in a case where a workpiece surface looks circular when a sphere or a columnar workpiece is viewed directly from the top. If the rotation symmetry is set, in a case where workpieces take an attitude for which the rotation symmetry is designated, the workpieces are recognized as the same workpiece when a search model is registered. For example, in a case of a two-fold symmetry workpiece in which the rotation symmetry number is set to 2, an attitude rotated by 180 degrees is the same as an attitude before being rotated, and thus the same workpiece is recognized.

If the rotation symmetry is set in the above-described way, a "registration" button 383 is pressed. Consequently, the search model is registered according to the set conditions. Among the three works required for model registration, the second work and the third work may be replaced with each other.

Registration of Plural Search Models

If the search model is registered, a search model registration screen 390 illustrated in FIG. 94 is displayed. A model list display field 391 in which a list of registered search models is displayed is provided in the operation field 142 of the search model registration screen 390. Herein, a search model having the model number "0" is displayed as a registered search model along with a reduced image. A state in which setting of rotation symmetry is "no" is also displayed for the search model.

If an additional search model is to be registered, an "add" button 392 is pressed. Consequently, a search model may be registered according to the above-described procedures. In a model registration method designation field 393, as a search model registration method, whether a model obtained by imaging a real workpiece is registered or is registered from three-dimensional CAD data may be selected. Herein, "registration using a real workpiece" is selected in the model registration method designation field 393, and a search model is additionally registered.

A search model registration screen 410 on which a search model is added in the above-described way is illustrated in FIG. 95. On the search model registration screen 410 illustrated in FIG. 95, among the six workpieces arranged in the image display field 141, the workpiece disposed on the lower left side is additionally registered as a new search model. The additionally registered search model is added as a model number "1" in the model list display field 391.

Display of Simple Three-Dimensional Search Result

A result of performing a simple three-dimensional search by using a registered search model may be displayed on the search model registration screens in FIGS. 94 and 95. For example, in the example illustrated in FIG. 94, the workpiece on the upper left side used for registration is searched for as a result of performing a three-dimensional search on the six workpieces displayed in the image display field 141 by using the search model having the model number "0". A point group matching the search model is displayed on the workpiece searched for. In this example, in a surface shape of the search model, a point group on the face is displayed white, and a point group representing a contour is displayed violet. A score calculated as an evaluation index for the simple three-dimensional search result may be displayed in a numerical value. In the example illustrated in FIG. 94, 96.4 is displayed as a score value. The reason why a score is not the maximum value (99.9 in this example) for the original workpiece registered as a search model is that there is a variation between an imaging state during model registration and an input image during execution of a three-dimensional search, and thus a score is slightly reduced. It can be recognized that a state matches substantially 96% or more of a state during model registration from the result of the score value.

Search Region Setting Unit

If the search model is registered in the above-described way, a search region is then set in order to execute a three-dimensional search function. Specifically, if a necessary search model is registered, and then a "completion" button 411 on the lower right side is pressed on the search model registration screen 410 in FIG. 95, a search region setting screen 420 in FIG. 96 is displayed. A search region on which a three-dimensional search is performed is designated on the search region setting screen 420. Highlight display transitions from the "model registration" icon 352 to the "floor/box setting" icon 353 in the flow display portion 351 on the upper side in the screen, and thus a stage in which the model registration is finished, and registration of a floor surface or a storage container on or in which the workpiece is placed is currently performed is displayed to the user.

A search region setting field 421 is provided in the operation field 142 of the search region setting screen 420. The search region setting field 421 is provided with a "designation method selection navigation" button 422 for explaining a method of designating a search region on which a three-dimensional search is performed to the user, and a designation method selection field 423 for selecting a method of designating a search region. If the "designation method selection navigation" button 422 is pressed, a navigation screen for showing a method of designating search region on which a three-dimensional search is performed to the user is displayed. On the other hand, in the designation method selection field 423, one of floor designation, box designation, a box search, and no designation may be selected as an option from a dropbox. Among the options, if the floor designation is selected, a search region setting screen 430 in FIG. 97 is displayed, a floor surface designation dialog 431 is displayed, and the explanation that "click three points for calculating a floor surface" is displayed to the user. Consequently, if the user designates any point indicating the floor surface with a pointing device such as a mouse on the image display field 141, a space coordinate (X,Y,Z) of the designated point is displayed. A gauge is displayed as an extraction region. The extraction region indicates a range referred to centering on the clicked position when a Z coordinate value at the clicked point is calculated. Data of each point which is three-dimensionally measured also includes an error, and thus it is preferable to use a value obtained by using an average value or a median of data within a predetermined range in order to suppress the influence of an error. In this case, a Z coordinate value is obtained by using an average value in a range designated by the extraction region. If the floor surface is designated in the above-described way, information regarding the floor surface is calculated, and the calculated information regarding the floor surface is displayed in a floor surface information display field 441 of the search region setting field 421 as in a search region setting screen 440 in FIG. 98. Here, in the floor surface information display field 441, an X inclination, a Y inclination, and a Z intercept of the floor surface are displayed in numerical values as the floor surface information. An offset amount may be set as necessary. For example, a region corresponding to a predetermined height from the floor surface is removed from the search region by taking into consideration a variation or the like in a thickness of the floor surface of a storage container. In the example illustrated in FIG. 98, a noise removal field 442 is provided to remove noise from the floor surface. Herein, a range from the designated height of the floor surface to a height of 1.5 mm designated in the noise removal field 442 is removed from a three-dimensional search target region. If setting of the floor surface is completed in the above-described way, a "completion" button 443 is pressed. Consequently, the screen is changed to a search parameter setting screen 450 in FIG. 99.

Search Parameter Setting Unit

A search parameter is set as a condition for performing a three-dimensional search on the search parameter setting screen 450 in FIG. 99. Highlight display transitions from the "floor/box setting" icon 353 to the "search setting" icon 354 in the flow display portion 351 on the upper side in the screen, and thus a stage in which the search region setting is finished, and a search condition is currently set is displayed to the user. The operation field 142 of the search parameter setting screen 450 is provided with fields for setting respective search parameters required to perform a three-dimensional search. Specifically, there are provided a detection condition setting field 451, a feature extraction condition setting field 452, and a determination condition setting field 453. Among the fields, in the feature extraction condition setting field 452, an edge extraction threshold value which is a threshold value for extracting an edge when a workpiece is detected from an input image is set. In the determination condition setting field 453, an upper limit or a lower limit is set for a score measured value, or an upper limit or a lower limit is set for an X coordinate measured value of a position, and a determination condition regarding whether or not the value is to be selected as a search result is set.

In the detection condition setting field 451, a condition for detecting a workpiece is set. In this example, there are provided a detection number designation field 454 for designating an upper limit of the number of workpieces to be detected, an inclined angle upper limit designation field 455 for designating an upper limit of an inclined angle of a detected workpiece, and a score lower limit designation field 456 for designating a lower limit of a score which is an evaluation index. The designation may be performed by using a numerical value, and consecutive adjustment may be performed by using a slider or the like. If a detail setting button 457 is pressed, the screen is changed to a search parameter setting screen 460 in FIG. 100, and a detection detail condition setting dialog 461 for setting more detailed detection conditions is displayed.

The detection detail condition setting dialog 461 is provided with a basic setting field 462, a detection condition detail setting field 463, and an option setting field 464. The basic setting field 462 is provided not only with the detection number designation field 454 but also with a search sensitivity setting field 465 for setting the sensitivity of a three-dimensional search, and a search accuracy setting field 466 for setting the accuracy of a three-dimensional search. The detection condition detail setting field 463 is provided not only with the inclined angle upper limit designation field 455 and the score lower limit designation field 456 but also with a reference angle setting field 163a for setting a reference angle and a range setting field 163b for setting an angle range as the rotation angle range setting field 163.

A detection condition may be set to be common to search models, and may be separately set for each search model. In the example illustrated in FIG. 100, a search model separate designation field 467 is provided, and a detection condition in a three-dimensional search can be separately set for each search model by checking a checkbox. Such an example is illustrated in a search parameter setting screen 470 in FIG. 101. Herein, a checkbox of the search model separate designation field 467 is checked, a search model selection field 467b is displayed, and thus a search model for which a detection condition is set can be selected. This example shows a state in which the search model A is selected, and detection conditions regarding the search model A shown in model list display field 391 in FIG. 94 or the like can be separately designated in the inclined angle upper limit designation field 455, the reference angle setting field 163a, the range setting field 163b, and the score lower limit designation field 456.

On the other hand, the option setting field 464 illustrated in FIG. 100 or the like is provided with a label order designation field 468 for defining an order of a label for a label number allocated as a serial number for identifying a search result, and a determination label designation field 469 for designating a determination label. A descending order or an ascending order of a correlation value, or a descending order or an ascending order of a Z direction height may be selected in the label order designation field 468. The correlation value mentioned here is the same as the above-described "score". A target for determination of whether or not the target is located at a position or an attitude which is different from an expected position or attitude in a specific search result may be designated in the determination label designation field 469. Herein, the target is designated by using a serial number for identifying a search result. For example, setting is performed in a case where it is necessary to determine whether or not data without reliability is obtained as a search result, such as a case where a search result shows an unexpected position, rotation angle, or inclined angle.

If three-dimensional search setting is sequentially completed in the above-described way, an "OK" button 471 provided on the lower right side of the operation field 142 is pressed, and setting of three-dimensional search conditions is finished.

Registration of Search Model Based on Three-Dimensional CAD Data

Figure 62:
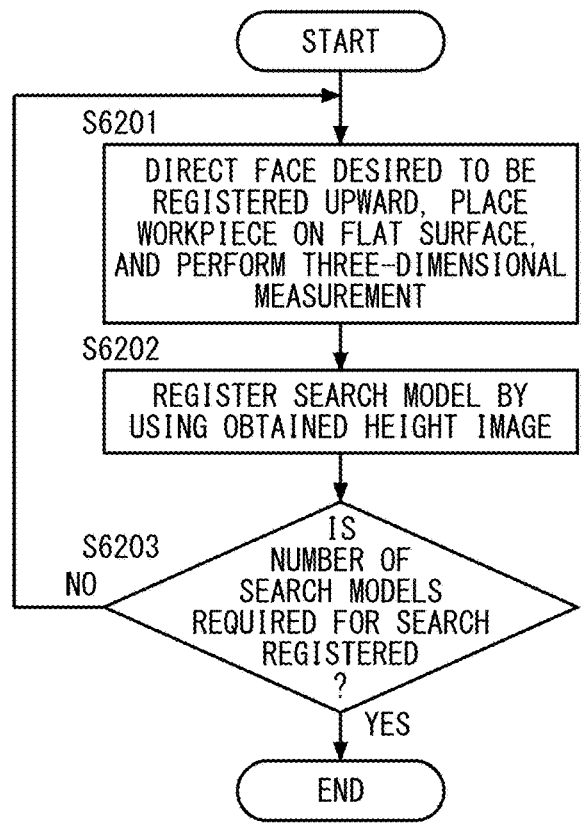
FIG. 62 is a flowchart illustrating procedures of registering actually measured data as a search model.

In the above-described example, a description has been made of the procedures of registering a model obtained by imaging a real workpiece as a search model (corresponding to FIG. 62 or the like). However, as described in FIG. 28 or the like, three-dimensional CAD data indicating a shape of a workpiece, created in advance, may be registered as a search model. Hereinafter, procedures of registering three-dimensional CAD data as a workpiece model will be described with reference to FIGS. 102 to 106.

First, "register from CAD data (STL format)" is selected with a radio button from the model registration method selection field 355 on a search model registration method selection screen 480 in FIG. 102. Thus, an explanation of procedures of registering three-dimensional CAD data as a search model is displayed in text and pictures in the operation field 142. In this example, work to be performed is presented to a user by using text information that "three-dimensional information of a workpiece surface viewed from positive and negative directions (a total of six directions) of XYZ axes of three-dimensional CAD data is modeled; only a face desired to be searched for from a generated model is selected; and this tool recognizes a position and an attitude of a workpiece by matching the registered surface model with the workpiece taking various attitudes", and pictures. If registration from CAD data is selected on the search model registration method selection screen 480 in FIG. 102, and then an "OK" button 481 is pressed, the screen transitions to a CAD data reading screen in FIG. 103. Specifically, the screen transitions to a search model registration screen 490, and a CAD data reading dialog 491 is displayed.

CAD Data Reading Unit

In the CAD data reading dialog 491 illustrated in FIG. 103, a storage destination of read CAD data is designated, and CAD data is further selected. As a reading destination, a reading medium such as a semiconductor memory may be selected in addition to the storage unit 9. If a file is selected from a file list display field 492, and an "execution" button 493 is pressed, three-dimensional CAD data is read.

Registration Model Selection Unit

If the three-dimensional CAD data is read, a face registered as a search model is selected. Here, a search model registration screen 510 illustrated in FIG. 104 is displayed, and six drawings corresponding to fundamental direction images of a workpiece model are automatically displayed on a registration model selection screen 511. A user may select a face desired to be registered in this state. Herein, a checkbox is checked by default, and the checkbox is not checked for a face which is not required to be registered as a search model, and thus the face can be excluded from a search model. If a registration target is selected in the above-described way, a "next" button 512 is pressed, and the screen is changed to a search model registration screen 520 in FIG. 105.

Rotation Symmetry Designation Unit

On the search model registration screen 520 in FIG. 105, a rotation symmetry designation dialog 521 is displayed, and the user may set a face having a symmetric shape even if the face is rotated upward, downward, frontward, rearward, leftward, or rightward with respect to a fundamental direction image having rotation symmetry among fundamental direction images selected as registration targets. If setting of rotation symmetry is completed in the above-described way, a "registration" button is pressed, and a search model is registered.

If the search model is registered, registered search models are displayed in a list form in the model list display field 391 as in the search model registration screen 530 in FIG. 106. A plurality of search models may be registered for a single workpiece as described above. For example, in the example illustrated in FIG. 106, six search models A, B, C, D, E and F illustrated in FIG. 105 or the like are registered for a three-dimensional CAD workpiece model having the model number "0". Therefore, the search models A to F for the model number "0" are displayed in a list form in the model list display field 391. Search models which cannot be displayed on one screen in the model list display field 391 may be displayed to be scrolled for switching display.

Search Model Editing Unit

A registered search model may be edited. In the example illustrated in FIG. 106, if an "edit" button 531 of the operation field 142 is pressed, a model editing screen 620 illustrated in FIG. 114 is displayed. On the model editing screen 620, a registered search model is displayed in the image display field 141, and set items are displayed in the operation field 142. Herein, a model region setting field 621, a background removal setting field 327 and a rotation symmetry setting field 382 as a feature setting field 622, and a model number display field as a model registration field 623 are provided. The user may select an item desired to be changed, and change the item as appropriate.

Model Region Detail Setting Unit

If a detail setting button 624 provided in the model region setting field 621 is pressed, a model region detail setting screen 630 illustrated in FIG. 115 is displayed. On the model region detail setting screen 630, a mask region can be set as a region desired to be excluded from a search model registration target in a range of the model region 362 displayed in the image display field 141. The operation field 142 is provided with the model region designation field 621, a mask region designation field 631, and a weight region designation field 632. A plurality of mask regions may be set in the mask region designation field 631. The mask region may be set to a predefined shape such as a rectangular shape or a circular shape, and may also be set through automatic detection of a free curve or a boundary portion. A weight may be set in the weight region designation field 632 separately from each mask region.

When a search result is scored, if there is a location of a feature point desired to be focused more than other feature points included in a search model, a score result may be adjusted by surrounding the location with a weight region. For example, in a case where there is a shape causing a search model to be specified or causing an attitude in a rotation direction to be defined depending on the presence or absence of a feature of a part of the entire shape, a weight region is set for the important feature, and thus it is possible to improve detection performance in a search. A weight extent for other feature points may be designated by a ratio. For example, in a case where a weight extent is set to "3", adjustment may be performed such that a score value is calculated with the influence of three times the influence of other feature points.

Feature Detail Setting Unit

If a detail setting button 625 provided in the feature setting field 622 is pressed, a feature detail setting screen 640 illustrated in FIG. 116 is displayed. On the feature detail setting screen 640, a feature or the presence or absence of rotation symmetry is set for the model region 362 displayed in the image display field 141. The operation field 142 is provided with a feature detail setting field 641 and a rotation target setting field 382. The feature detail setting field 641 is provided with a feature extraction interval designation field 642 for designating a feature extraction interval, a background removal setting field 327, and an edge extraction threshold value setting field 643. A feature extraction interval is a parameter influencing an extraction interval of a feature point when a search model is generated, and any one of "accuracy priority", "standard", and "speed priority" may be selected. In a case where the "accuracy priority" is selected, an extraction interval of feature points in a search model is narrow, a finer feature can be recognized, and thus detection accuracy is increased, but a process time is increased due to an increase in a data amount. On the other hand, in a case where the "speed priority" is selected, an extraction interval of feature points in a search model is wide, a finer feature is omitted, and thus detection accuracy is lowered, but a process time is reduced due to a decrease in a data amount. The feature extraction interval may be adjusted depending on a shape or a size of a workpiece to be used, or allowable process time or detection accuracy.

In the above-described way, the user can adjust a necessary item such that a more appropriate search result is obtained while referring to a simple three-dimensional search result, an obtained score, or the like. If the search model is registered in the above-described way, following procedures subsequent thereto are the same as the procedures (search region setting and search parameter setting) of registering a search model by imaging a real workpiece described in FIGS. 96 to 101, and thus description thereof will be omitted.

The search model is registered in advance in the above-described way, and then a three-dimensional search is performed. The three-dimensional search is used for an actual operation, that is, used to perform bin picking of imaging a bulk workpiece group in the sensor unit and specifying a grip position of a workpiece which can be gripped, and is also used in a case where simulation of three-dimensional picking is performed in advance. The simulation of three-dimensional picking is an operation of determining whether or not a workpiece can be gripped by an end effector at a grip position designated for a workpiece model in advance by the grip position specifying portion 8*d* on the basis of each search result obtained through a search in the three-dimensional search portion 8*k*.

Search Result Display Unit

Next, a description will be made of an example of performing a three-dimensional search on workpieces loaded in bulk with reference to FIGS. 107 to 113. FIG. 107 illustrates an example of a search result display screen 540 showing a result of performing a three-dimensional search on a bulk workpiece group. The search result display screen 540 is provided with an image display field 141 and an operation field 142, and a list of search models used for the three-dimensional search is displayed in a vertical direction in the model list display field 391 of the operation field 142. On the other hand, in the image display field 141, workpieces obtained as a search result are displayed to overlap the workpieces in bulk included in an input image, and a point group which is a search result and a score which is an evaluation index therefor are displayed.

Search Result List Unit

A search result list display field 541 is provided on an upper part of the image display field 141, and a list of search models used and scores is displayed for search results obtained through the search. Herein, the number of workpieces searched for, the presence or absence of a workpiece, a total volume/a volume of a workpiece, a model number or a score of a search result having a specific label number, and a position (X,Y,Z) are displayed. The total volume/a volume of a workpiece indicates a value obtained by dividing a total volume of a point group located at a higher position than a floor surface or a bottom of a returnable box by an average volume expected from a registered search model, and is a data indicating the number of workpieces present in an input image. In a case where a numerical value thereof is greater than a predetermined numerical value, a result of the presence or absence of a workpiece is determined as being presence (1). By checking whether a result of the presence or absence of a workpiece is presence or absence in a case where the number of workpieces searched for is 0, and thus a grip solution is not obtained, it is possible to check whether picking is finished in a state there is no workpiece or in a state in which a workpiece remains.

Display items in the search result list display field 541 may switch. For example, a switching button 542 for switching the display content is provided on the lower right side in the search result list display field 541 of the search result display screen 540 illustrated in FIG. 107. The switching button 542 is formed of left and right arrows, and the number of screens 543 is displayed on the upper part thereof. In this example, as the number of screens 543, "1/11" indicating the first screen of eleven screens is displayed, an upper limit is imposed on a number by pressing the switching button 542, and thus the display content of the search result list display field 541 can switch. For example, if the number of screens 543 is changed to "2/11" by operating the switching button 542, the screen is changed to a search result display screen 550 illustrated in FIG. 108, and a summary of a three-dimensional search result is displayed in the search result list display field 541. Herein, an inclined angle, a rotation angle, an attitude ($R_X, R_Y, R_Z$), and the like are displayed in addition to the number of workpieces searched for, the presence or absence of a workpiece, and the total volume/a volume of a workpiece. If the number of screens 543 is changed to "3/11", the screen is changed to a search result display screen 560 illustrated in FIG. 109, and inclinations of XYZ or the like are displayed as information regarding a floor surface in addition to the number of workpieces searched for, the presence or absence of a workpiece, and the total volume/a volume of a workpiece as the summary of a three-dimensional search result in the search result list display field 541.

If the number of screens 543 is changed to "4/11", the screen is changed to a search result display screen 570 illustrated in FIG. 110, and model numbers of search models used for detection of search results and scores are horizontally displayed for each label number for identifying a search result as a summary of a three-dimensional search result in the search result list display field 541. If the number of screens 543 is changed to "5/11", the screen is changed to a search result display screen 580 illustrated in FIG. 111, and a position (X,Y,Z) is displayed for each label number for identifying a search result as a summary of a three-dimensional search result in the search result list display field 541. If the number of screens 543 is changed to "6/11", the screen is changed to a search result display screen 590 illustrated in FIG. 112, and an inclined angle and a rotation angle are displayed for each label number for identifying a search result as a summary of a three-dimensional search result in the search result list display field 541. If the number of screens 543 is changed to "7/11", the screen is changed to a search result display screen 610 illustrated in FIG. 113, and an attitude ($R_X, R_Y, R_Z$) is displayed for each label number for identifying a search result as a summary of a three-dimensional search result in the search result list display field 541.

Three-Dimensional Picking

Next, with reference to FIGS. 117 to 149, a description will be made of procedures of performing simulation of three-dimensional picking for determining whether or not a workpiece can be gripped by an end effector on the basis of each search result obtained through a three-dimensional search. If the "3D pick" button 343 is pressed on the function selection screen 340 in FIG. 89, a three-dimensional picking initial setting screen 650 in FIG. 117 is displayed, and a guidance function is executed such that a user sequentially performs setting required to perform three-dimensional picking. Herein, a 3D picking guidance field 655 is displayed on the upper side in the operation field 142, and work sequentially performed is displayed as an icon. In this example, four processes such as "initial setting", "grip registration", "condition/verification", and "place setting" are displayed.

Three-Dimensional Picking Initial Setting Screen

First, initial setting for performing three-dimensional picking is performed on the three-dimensional picking initial setting screen 650 in FIG. 117. An "initial setting" icon is highlighted in the 3D picking guidance field 655 on the upper side in the operation field 142, and work to be performed in this stage is displayed to the user. The operation field 142 is provided with a calibration data selection field 651, a detection tool setting field 652, and a hand registration field 653. In the calibration data selection field 651, calibration data calculated in advance for converting a coordinate system displayed by the robot setting apparatus into a coordinate system in which the robot controller operates an end effector is called and registered. In the detection tool setting field 652, means for detecting a workpiece is designated. In this example, a workpiece detection three-dimensional search set to a tool number "100" is selected. The above-described setting of the search model registered through the setting of the three-dimensional search is read. In a case where a search model of a differing workpiece has been set to a separate tool number, selection of the detection tool may be changed such that a setting target of three-dimensional picking is changed.

End Effector Model Setting Unit

An end effector model is registered in the hand registration field 653. Here, if a "hand model creation" button 654 is pressed, an end effector model setting screen 660 illustrated in FIG. 118 is displayed. On the end effector model setting screen 660, a list of registered end effector models is displayed in a hand model list display field 661. In the example illustrated in FIG. 118, an end effector model is not registered, and thus an end effector model is not displayed in the image display field 141 and the end effector model list display field 661 of the operation field 142. Therefore, an "add" button 662 is pressed, and an end effector model is added. The flange surface FLS is displayed as a reference plane of the arm portion tip of the robot at which an end effector model is disposed in the image display field 141 of the end effector model setting screen 660. Tool coordinate axes TAX indicating coordinate axes of the end effector model EEM side are also displayed (details thereof will be described later).

End Effector Model Editing Unit

In FIG. 118, if an "add" button 662 is pressed, an end effector model editing screen 670 illustrated in FIG. 119 is displayed. Parts forming the end effector model are set on the end effector model editing screen 670. Herein, registered parts are displayed in a parts list display field 671. In the example illustrated in FIG. 119, parts are not registered yet, and thus nothing is displayed in the parts list display field 671. If an "add" button 672 is pressed in this state, a parts adding dialog illustrated in FIG. 120 is displayed, and whether parts to be added are registered by reading CAD data or are newly created by using a cuboid model or a cylindrical model is selected with a radio button. Additional parts are an aspect of the above-described additional region, are not limited to a cuboid or a cylinder, and may use any shape such as a prismatic shape, a triangular shape, or a spherical shape. In the example illustrated in FIG. 120, CAD data is selected. If created three-dimensional CAD data is selected by pressing an "add" button 681, a CAD position/attitude setting screen 690 illustrated in FIG. 121 is displayed, three-dimensional CAD data is read such that a CAD model CDM created with CAD is displayed in the image display field 141, and a position/attitude field 691 for designating a position and an attitude of the CAD model CDM is displayed in the operation field 142. A position and an attitude of the CAD model CDM are designated with the flange surface FLS as a reference. The user designates an attachment position or angle of the end effector model from the position/attitude field 691. For example, if 20° is designated as the rotation angle $R_X$ in the state illustrated in FIG. 121, the CAD model CDM displayed in the image display field 141 is displayed at an attitude rotated by 20° centering on the X axis as illustrated in FIG. 122. Alternatively, if 50 mm is designated in the Z direction in the state illustrated in FIG. 121, the CAD model CDM is displayed to be offset by 50 mm in the Z direction as illustrated in FIG. 123. If the position and an attitude of the CAD model CDM are adjusted in the above-described way, and then an "OK" button 692 in FIG. 121 is pressed, the CAD data is registered, and is displayed in the parts list display field 671.

A plurality of parts may be added. For example, if an "add" button 682 is pressed on the end effector model editing screen in FIG. 124, a cylindrical model is selected in the part adding dialog 680 in FIG. 120, and an "add" button 681 is pressed, an additional region position/attitude setting screen illustrated in FIG. 125 is displayed, and a cylindrical model is displayed as a new additional region ADA in the image display field 141. A part which is being edited is highlighted. In the example illustrated in FIG. 125, the additional region ADA is displayed red, and the CAD model CDM is displayed gray or with a wire frame. Consequently, the user can easily visually recognize a part which is currently edited. Similarly, a position and an attitude of the additional region ADA to be added are designated from the position/attitude field 691. In this example, a Z position is designated to be −50 mm in the position/attitude field 691, and thus the additional region ADA is disposed in an opposite direction to the CAD model CDM from the flange surface FLS. A radius or a height of the cylindrical model as a size of the additional region ADA may be designated in a size designation field 693. If the conditions for the additional region ADA are set in the above-described way, and then an "OK" button 692 is pressed, the additional region ADA is registered, and the cylinder is added and displayed in the parts list display field 671 of the end effector model editing screen as illustrated in FIG. 126.

Tool Coordinate Designation Unit

A position and an attitude of a registered part may be adjusted. For example, if a part to be selected is changed from the additional region ADA to the CAD model CDM in the image display field 141 or the parts list display field 671 on the end effector model editing screen in FIG. 126, a screen illustrated in FIG. 127 is displayed, and the user may adjust a position (X,Y,Z) and an attitude ($R_X$,$R_Y$,$R_Z$) in a tool coordinate designation field 673 in this state. For example, as illustrated in FIG. 128, if a Z position is set to 145 mm, the tool coordinate axes TAX are moved in the Z direction from the flange surface FLS by the designated distance, and are displayed in the image display field 141. If the rotation angle $R_X$ is set to 20° in this state as illustrated in FIG. 129, the tool coordinate axes TAX are rotated clockwise by 20° centering on the X axis, and are display.

A plurality of parts are registered in the above-described way, and the end effector model EEM is built by combining the parts with each other. In a case where setting of each part is completed, if an "OK" button 674 is pressed on the end effector model editing screen in FIG. 128 or the like, the plurality of parts are combined to be registered as the end effector model EEM, and the end effector model EEM is displayed as "hand 0" in the hand model list display field 661 as illustrated in the end effector model setting screen 660 in FIG. 130. The parts displayed in pieces are displayed as the integrated end effector model EEM in the image display field 141.

In this example, a description has been made of an example of forming the end effector model by combining parts with each other, but a part is not limited to an end effector model or a part thereof, and, for example, a cable or the like may be expressed as a part. As mentioned above, a part is an aspect of an additional model expressing a part of an end effector model, an object added to a surface thereof, or a peripheral member.

Grip Reference Point HBP

The grip reference point HBP of the end effector model EEM is further displayed in the image display field 141. The grip reference point HBP indicates a position at which the end effector model EEM grips a workpiece. For example, the grip reference point HBP is set to the center between claws of the end effector model EEM gripping a workpiece. The grip reference point HBP may be calculated on the robot setting apparatus side so as to be determined according to a predetermined rule, and may be designated to any position by a user.

The tool coordinate axes defining a position and an attitude of the end effector model EEM are preferably further displayed in the image display field 141 in an overlapping manner. The tool coordinate axes are preferably rotation-completed coordinate axes RAX which are changed according to rotation of the end effector model EEM. The origin of the rotation-completed coordinate axes RAX more preferably matches the grip reference point HBP. Consequently, a user can easily visually recognize a state of the end effector model EEM when a grip position is set.

Grip Registration Unit

If the end effector model EEM is registered as initial setting in the above-described way, a grip position is then registered. On a grip registration screen 710 in FIG. 131, highlight display in the 3D picking guidance field 655 transitions from the "initial setting" icon to the "grip registration" icon. The operation field 142 is provided with a search model switching field 711 for selecting a registered search model, and a grip registration list display field 712 displaying a list of grip positions registered for a search model selected in the search model switching field 711. As described above, in this example, a workpiece model for which a grip position is registered is the same as a search model used for a three-dimensional search. Herein, it is assumed that the six search models A to F for the model number "0" registered in FIG. 104 are registered as registered search models in the search model switching field 711. In the example illustrated in FIG. 131, since a grip position is not registered yet, nothing is displayed in the grip registration list display field 712. The search model A is selected in the search model switching field 711, and thus a search model SMA corresponding to the search model A is displayed in the image display field 141. The reference coordinate axes BAX which are coordinate axes indicating a position and an attitude of the search model SMA are displayed in an overlapping manner. In this state, a user registers a grip position for the search model A. Specifically, if an "add" button 713 is pressed, the screen is changed to a grip registration screen in 132, and a grip setting dialog 720 is displayed.

Grip Setting Unit

The grip setting dialog 720 of the operation field 142 is provided with a basic setting field 721, a grip position coordinate designation field 724, and a movement amount setting field 727. The basic setting field 721 includes a grip label setting field 722 and a hand selection field 723. In the grip label setting field 722, a grip label which is identification information for specifying a grip position is set. Herein, "A" indicating a search model and a serial number "000" of a grip position are set as a grip label. In the hand selection field 723, the end effector model EEM gripping a workpiece at the grip position set in the grip label setting field 722 is selected. In this example, the "hand 0" is selected in the hand selection field 723, and thus the end effector model EEM is displayed in the image display field 141. As mentioned above, the grip position is set in correlation with the end effector model EEM.

The grip position coordinate designation field 724 is provided with a coordinate attitude designation field 725 in which a user can directly designate a coordinate position (X,Y,Z) and an attitude ($R_X, R_Y, R_Z$) indicating a grip position in numerical values, and a "simple setting navigation" button 726 for executing a guidance function for showing setting of a grip position to the user.

In the movement amount setting field 727, a direction in which the end effector model EEM is moved is defined. Herein, an approach movement amount in which the end effector model EEM comes close to the search model SMA in order for the end effector model EEM to grip the search model SMA is defined as distances in the X direction, the Y direction, and the Z direction. In the example illustrated in FIG. 132, an example in which the end effector model EEM is moved by 100 mm in the Z direction is illustrated.

Grip Position Setting Guidance Function

If the "simple setting navigation" button 726 is pressed on the screen in FIG. 132, a grip position setting guidance function is executed. Specifically, as illustrated in FIG. 133, a setting method selection dialog 730 is displayed, and a user selects whether a grip position is set by using a three-dimensional viewer or a robot with a radio button. In this example, the user selects setting on the three-dimensional viewer. If an "OK" button 731 is pressed in this state, a registration guidance function on the three-dimensional viewer is executed.

Registration Guidance Function on Three-Dimensional Viewer

In the registration guidance function on the three-dimensional viewer, a grip position is registered through four processes. Herein, the user designates a grip position on three-dimensional viewer registration screens illustrated in FIGS. 134 to 141. Specifically, if the "OK" button 731 is pressed in FIG. 133, the screen is changed to an X-Y designation screen 740 in FIG. 134.

First Process: X-Y Designation

In FIG. 134, the X-Y designation screen 740 is displayed as an aspect of the X-Y designation unit. Herein, in the first process for registering a grip position, the search model SMA is displayed in a plan view, and, in this state, a grip position is designated on the plan view. Specifically, the search model SMA is two-dimensionally displayed in an XY plane in the image display field 141, and X and Y coordinates regarding a grip position are designated on the search model SMA. Work to be performed is explained to the user in text or the like as STEP1 in the operation field 142. Herein, the content that "select XY positions regarding a grip position on a camera image" is displayed. In the example illustrated in FIG. 134, a height image (search model SMA) of the search model A is enlarged and displayed in the image display field 141, and, in this state, the user selects a grip designation position P1 by using a pointing device such as a mouse. XY coordinates are input to an XY-coordinate designation field 741 according to the grip designation position P1. An X coordinate and a Y coordinate in the XY-coordinate designation field 741 are adjusted, and thus the grip designation position P1 in the image display field 141 is also updated. On the X-Y designation screen 740, only an X coordinate and a Y coordinate of position parameters can be designated, in other words, other position parameters cannot be designated. As mentioned above, guidance is given such that a situation in which the user is confused due to a plurality of position parameters being able to be simultaneously set as in the related art is prevented, and the user accurately understands a position parameter which can be set by restricting the position parameter which can be set, and sequentially sets position parameters. If designation of the XY coordinates is completed in the above-described way, a "next" button 742 is pressed. Consequently, a second process is performed, and the screen is changed to a Z-$R_Z$ designation screen 750 in FIG. 135.

Second Process: Z-$R_Z$ Designation

The Z-$R_Z$ designation screen 750 in FIG. 135 is an aspect of the Z-$R_Z$ designation unit, and a screen allowing a user to designate a Z coordinate and an attitude angle $R_Z$. Work to be performed by the user in a second process is displayed in text in the operation field 142 and is explained. Herein, the content that "STEP2 designate a Z position regarding a grip position, and an attitude angle $R_Z$ of the hand" is displayed. A Z designation field 752 for designating a Z position and an $R_Z$ designation field 753 for designating an $R_Z$ attitude are provided as a Z-$R_Z$ designation field 751 in the operation field 142. The end effector model EEM and the search model SMA are three-dimensionally displayed in the image display field 141. In other words, the image display field 141 functions as a three-dimensional viewer which three-dimensionally displays an end effector model or a search model. A numerical value in the Z designation field 752 or the $R_Z$ designation field 753 is changed, and thus the three-dimensional display content of the end effector model EEM or the search model SMA in the image display field 141 is updated. A viewpoint of the three-dimensional viewer can be changed by the user dragging the image display field 141, and thus a grip setting state can be checked in detail.

Only the Z axis is displayed as a coordinate axis regarding a position parameter which is currently set among the coordinate axes in the image display field 141 which is a three-dimensional viewer. The Z axis is the correction rotational Z axis AXZ after being corrected, displayed with the above-described Z-Y-X system Euler's angle. As mentioned above, since only a coordinate axis regarding a position parameter which can be currently adjusted is displayed, and other position parameters cannot be adjusted on this screen, appropriate guidance given to the user is realized such that only an appropriate position parameter is sequentially set according to a predetermined order without causing wasteful confusion in the user.

In the example illustrated in FIG. 135 or the like, an axis (the correction rotational Z axis AXZ) in a grip direction is displayed to extend through the grip reference point HBP, and thus the user can easily understand a movement direction for making the end effector model EEM come close to a workpiece model. A movement direction of the end effector model may be indicated by an arrow. In this case, a movement direction of the end effector model may be displayed to overlap the axis in the grip direction, and may be displayed at a separate position.

The "fit" button 154 is provided as an aspect of the relative position setting unit on the Z-$R_Z$ designation screen 750. As described above, a fitting function of automatically moving an end effector model to a grip position of a workpiece model is realized by pressing the "fit" button 154. If the "fit" button 154 is pressed, as illustrated in FIG. 136, the end effector model EEM is moved to be brought into contact with the search model SMA. In other words, the grip reference point HBP of the end effector model EEM is moved toward the grip designation position P1 of the search model SMA. An initial position of the end effector model EEM when displayed is preferably adjusted in the state illustrated in FIG. 135 such that the movement direction matches the Z axis. Consequently, since the end effector model EEM is moved only in the Z direction so as to be brought into contact with the search model SMA, intuitively easily understandable display can be performed, and thus a user can easily perform work of moving the end effector model EEM.

A Z position in the Z designation field 752 of the operation field 142 is also changed due to movement of the end effector model EEM in the image display field 141. In this example, in FIG. 135, 200 mm is changed to 50 mm. Herein, when the end effector model EEM is moved toward the grip designation position P1 designated in FIG. 134 in the height direction, that is, the Z axis direction due to the fitting function, the end effector model EEM is moved to a position returned by a predetermined offset amount from a position brought into contact with the search model SMA with the contact position as a reference. Among the coordinate axes with the grip designation position P1 as a reference, only the Z axis which is currently set is displayed in the image display field 141.

In this state, the user designates the attitude angle $R_Z$ in the $R_Z$ designation field 753. At the attitude of the end effector model EEM illustrated in FIG. 136, a side surface of the search model SMA inclined in a C shape is gripped, and thus adjustment is performed such that a parallel surface is gripped by rotating the end effector model EEM in the Z axis direction. In this case, the user may directly input a rotation angle to the $R_Z$ designation field 753, and may more easily designate rotation of the end effector model EEM by providing an angle selection button 754 for inputting a predetermined angle. In this example, four angle buttons of 0°, 90°, 180°, and −90° are disposed as the angle selection button 754. If the user presses the 90° button, 90° is input to the $R_Z$ designation field 753, and thus the end effector model EEM is rotated by 90° in the Z axis direction as illustrated in FIG. 137 and is corrected to be able to accurately grip the search model SMA.

Third Process: $R_Y$ Designation

If the Z-$R_Z$ designation is completed in the second process in the above-described way, a "next" button 755 is pressed, and thus $R_Y$ designation in the third process is performed. Specifically, if the "next" button 755 is pressed, an $R_Y$ designation screen 760 in FIG. 138 is displayed. The $R_Y$ designation screen 760 is an aspect of the $R_Y$ designation unit, and is used to designate an attitude angle $R_Y$. An $R_Y$ designation field 761 is displayed in the operation field 142 of the $R_Y$ designation screen 760, and the content that "STEP3 designate the attitude angle $R_Y$ of the hand" is displayed to the user as work to be performed in the third process. Among the coordinate axes, only the correction rotational Y axis AXY which is currently set is set in the image display field 141. In this state, the user designates the attitude angle $R_Y$ on the $R_Y$ designation screen 760 according to an attitude of the end effector model EEM gripping the search model SMA. Alternatively, the end effector model EEM is rotated through dragging on the image display field 141 which is a three-dimensional viewer. For example, if 90° is designated as the attitude angle $R_Y$ on the $R_Y$ designation screen 760 in the state illustrated in FIG. 138, the screen is changed to an $R_Y$ designation screen in FIG. 139, and the end effector model EEM is displayed at an attitude rotated by 90° centering on the Y axis. If the $R_Y$ designation is completed in the third process in the above-described way, a "next" button 762 is pressed, and thus $R_X$ designation in the fourth process is performed.

Fourth Process: $R_X$ Designation

FIG. 140 illustrates an $R_X$ designation screen 770 in the fourth process. The $R_X$ designation screen 770 is an aspect of the $R_X$ designation unit, and is provided with an $R_X$ designation field 771 for designating an attitude angle $R_X$. In the image display field 141, the end effector model EEM and the search model SMA are displayed to overlap each other, and, among the coordinate axes, the correction rotational X axis AXX which is the X axis regarding a position parameter $R_X$ which can be set on the $R_X$ designation screen 770 is displayed. In this state, the user designates the attitude angle $R_X$ in the $R_X$ designation field 771. Alternatively, the end effector model EEM is rotated through dragging on the image display field 141. For example, in the example illustrated in FIG. 140, 180° is input to the $R_X$ designation field 771 as the attitude angle $R_X$, so as to correspond to the current grip position, and, if 150° is designated, attitudes of the end effector model EEM and the search model SMA are changed in the image display field 141 which is a three-dimensional viewer according to the designated attitude angle $R_X$ as illustrated in FIG. 141.

If the attitude angle $R_X$ is designated in the above-described way, a "completion" button 772 is pressed, and registration of the grip position is finished. If the grip position is registered, as illustrated in FIG. 142, grip registration A-000 is added to the grip registration list display field 712. The search model A corresponding to the grip registration A-000 is highlighted in the search model switching field 711. A scene in which the search model SMA is gripped at the position and the attitude of the end effector model EEM for which the grip registration has been performed is three-dimensionally displayed in the image display field 141. The reference coordinate axes BAX of the search model SMA side are displayed as coordinate axes in an overlapping manner.

In the above-described way, other grip positions are registered for the search model A, or grip positions are added to the other search models B to F. A grip position may be added by pressing the "add" button 713 provided in the grip registration list display field 712 as described above. In an example illustrated in FIG. 143, an example in which grip registration B-000 is registered for the search model B is illustrated.

Copy Function

A copy function of copying a registered grip position may be used to additionally register a grip position. If a "copy" button 714 provided in the grip registration list display field 712 on the screen in FIG. 142 or the like is pressed, a registered grip position can be copied. Correction is performed on the basis of the copied grip position, and thus registration work for a grip position can be efficiently performed. If an "edit" button 715 is pressed in the state illustrated in FIG. 142 or the like, a grip setting dialog is displayed, and thus a grip position can be set as described above. Here, as described above, the "simple setting navigation" button 726 may be pressed such that the grip position setting guidance function is executed, and a necessary location may be corrected.

Condition Verification Screen 780

If grip positions are registered for the search models A to F in the above-described way, a "completion" button 716 is pressed on the screen in FIG. 143 or the like such that the grip registration process is finished, and a condition verification process is performed. In the condition verification process, a three-dimensional search is performed on a bulk workpiece group such that a workpiece is detected, and it is verified whether or not the workpiece can be gripped by an end effector at a designated grip position. Herein, simulation is performed by using the end effector model EEM and a search model. FIG. 144 illustrates an example of a condition verification screen 780. On the condition verification screen 780, highlight display in the 3D picking guidance field 655 transitions from the "grip registration" icon to the "condition/verification" icon. The operation field 142 is provided with a detection condition setting field 781 for setting a condition for detecting a grip position on the basis of a three-dimensional search result, and a verification field 785 for verifying grip propriety of a detected workpiece. The detection condition setting field 781 includes a detection number designation field 782 for designating an upper limit of the number of grip solutions to be detected, a hand inclined angle upper limit designation field 783 for designating an upper limit of an inclined angle of an end effector model, and a margin setting field 784 for setting a margin from a wall surface of a storage container in order to expand an interference range of an end effector model. If the end effector model EEM enters a range of a distance (5 mm in FIG. 144) designated in the margin setting field 784, interference is determined.

On the other hand, the verification field 785 is provided with a detection number display field 786 indicating the number of search results which are actually detected as a result of simulation of a three-dimensional search, a display label designation field 787 for designating a label number of a search model desired to be verified among detected search results, and a "verification for each workpiece" button 788 for performing verification on each workpiece. A search result having a label number designated in the display label designation field 787 is displayed in the image display field 141.

Verification on Each Workpiece

If the "verification for each workpiece" button 788 is pressed, a verification dialog 790 illustrated in FIG. 145 is displayed. The verification dialog 790 is an aspect of the workpiece selection screen 210 described in FIG. 74. In the verification dialog 790 in FIG. 145, it is verified whether or not each detected workpiece can be gripped. In this example, the verification dialog 790 includes a target workpiece selection field 791, a detection search model display field 792, and a "grip check" button 793. If the "grip check" button 793 is pressed, a detection result display dialog 810 illustrated in FIG. 146 is displayed. The detection result display dialog 810 is an aspect of the grip solution candidate display screen 220 described in FIG. 75 or the like. Herein, determination results of grip propriety at a set grip position for each face (a search image and an estimation image) detected for a workpiece (the second workpiece in FIG. 145) selected in the target workpiece selection field 791 are displayed in a list form in a grip solution candidate display field 811. In the example illustrated in FIG. 146, since a grip label C-000 is selected, the end effector model EEM is disposed and displayed at a corresponding grip position in the image display field 141, and the end effector model EEM is colored and displayed according to a determination result. In this example, a determination result is poor grip, and thus the end effector model EEM is displayed red. A point group interference error is displayed as a cause of grip impossibility in the grip solution candidate display field 811. Consequently, the user is provided with a guideline for necessary measures, for example, correction or addition of a grip position.

If the grip label A-000 for which a determination result is good grip is selected in a detection result display dialog in FIG. 147, the end effector model EEM gripping a workpiece at a corresponding grip position is thus displayed white in the image display field 141. In the above-described way, it is possible to determine grip propriety, and also to examine an appropriate measure as necessary.

If a detection condition detail setting button 789 provided in the detection condition setting field 781 is pressed on the condition verification screen 780 in FIG. 144, the screen is changed to a detection condition detail setting screen 820 in FIG. 148. The detection condition detail setting screen 820 is provided with a grip position detection condition setting field 821, an interference determination setting field 822 for determining interference between an end effector and a box or a floor, and an interference determination setting field 823 for determining interference between an end effector and a three-dimensional point group.

If the condition verification process is completed in the above-described way, a place setting process of defining a placement position of a workpiece is finally performed. FIG. 149 illustrates an example of a place setting screen 830. In the 3D picking guidance field 655 of the place setting screen 830, highlight display transitions from the "condition/verification" icon to the "place setting" icon. The operation field 142 includes a tool coordinate setting field 831 and a place position registration field 832. The user performs setting regarding a place of a workpiece on this screen.

The robot setting apparatus, the robot setting method, the robot setting program, the computer readable recording medium, and the apparatus storing the program according to the present invention can be appropriately used to verify a bin picking operation of a robot.

What is claimed is:

1. A robot setting apparatus setting an operation of a robot performing a bin picking operation of sequentially taking out a plurality of workpieces stacked in a work space with an end effector provided at a tip of an arm portion of the robot, the robot setting apparatus comprising:
    a workpiece model registration unit that registers a workpiece model indicating a three-dimensional shape of a workpiece;
    a display unit that displays a workpiece model registered by the workpiece model registration unit;
    a positioning unit that locates a position and an attitude of the workpiece model on a virtual three-dimensional space displayed on the display unit;
    a search model registration unit that registers at least three fundamental direction images as search models which are height images of the workpiece model viewed from respective axis directions of three axes orthogonal to each other on the virtual three-dimensional space;
    a grip position specifying unit that specifies, on each respective fundamental direction image displayed on the display unit, a candidate grip position at which an end effector can grip a workpiece model indicated by the at least three of the fundamental direction images and specifies a grip attitude of the end effector to grip the workpiece at the grip position for each respective one of the at least three fundamental direction images and the grip attitude corresponding to each grip position;
    a three-dimensional search unit that performs a three-dimensional search for specifying an attitude and a position of each workpiece from an input image by using the search models registered by the search model registration unit; and
    a calculation unit that determines a workpiece to be gripped by the end effector, a grip position to be gripped by the end effector, and a grip attitude corresponding to the grip position based on the result of the three-dimensional search,
    wherein the grip position to be gripped is selected among each of a candidate grip position specified on each of the at least three fundamental direction images corresponding to a search model that is based on any one of the fundamental direction images and used to determine the workpiece to be gripped.

2. The robot setting apparatus according to claim 1, wherein the display unit includes a six-drawing display region in which a fundamental direction image of a workpiece model is displayed as six drawings of the workpiece model.

3. The robot setting apparatus according to claim 1, wherein the workpiece model is three-dimensional CAD data.

4. The robot setting apparatus according to claim 1, further comprising:
    a fundamental direction image selection unit that selects any of a plurality of fundamental direction images having a viewing way which is different from a viewing way of other fundamental direction images with respect to at least three fundamental direction images displayed on the display unit.

5. The robot setting apparatus according to claim 4, wherein the fundamental direction image selection unit allows a user to manually select a fundamental direction image in a state in which at least three fundamental direction images are displayed on the display unit.

6. The robot setting apparatus according to claim 5, wherein, in a case where there are fundamental direction images having the same viewing way, the fundamental direction image selection unit deletes any of the fundamental direction images.

7. The robot setting apparatus according to claim 1, wherein the grip position specifying unit displays, as an initial value, a state in which an end effector model is disposed to be directed downward, and a workpiece model is disposed under the end effector model, in a state in which the end effector model virtually expressing a three-dimensional shape of an end effector and formed of three-dimensional CAD data is three-dimensionally displayed on a virtual three-dimensional space in the display unit.

8. The robot setting apparatus according to claim 1, wherein the workpiece model is actually measured data acquired by imaging a workpiece in a sensor unit which is disposed over the work space so as to measure a three-dimensional shape of the workpiece.

9. The robot setting apparatus according to claim 8, further comprising:
    a search model registration unit that registers any one of the fundamental direction images as a search model for performing a three-dimensional search for specifying a position and an attitude of each workpiece on a plurality of workpiece groups loaded in bulk.

10. The robot setting apparatus according to claim 9, wherein the grip position specifying unit specifies a grip position at which a workpiece model is gripped by an end effector for a fundamental direction image registered as a search model by the search model registration unit.

11. A robot setting method of setting an operation of a robot performing a bin picking operation of sequentially taking out a plurality of workpieces stacked in a work space with an end effector provided at a tip of an arm portion of the robot, the robot setting method comprising:
    inputting a workpiece model indicating a three-dimensional shape of a workpiece;
    displaying the input workpiece model on a display unit, and locating a position and an attitude of the workpiece model on a virtual three-dimensional space displayed on the display unit;
    registering at least three fundamental direction images as search models which are height images of the workpiece model viewed from respective axis directions of three axes orthogonal to each other on the virtual three-dimensional space;
    specifying on each respective fundamental direction image displayed on the display unit, a candidate grip position at which an end effector can grip a workpiece model indicated by the at least three of the fundamental direction images and specifies a grip attitude of the end effector to grip the workpiece at the grip position for each respective one of the at least three fundamental direction images and the grip attitude corresponding to each grip position;

performing a three-dimensional search for specifying an attitude and a position of each workpiece from an input image by using the search models registered by the search model registration unit; and determining a workpiece to be gripped by the end effector, a grip position to be gripped by the end effector, and a grip attitude corresponding to the grip position based on the result of the three-dimensional search, and wherein the grip position to be gripped is selected among each of a candidate grip position specified on each of the at least three fundamental direction images corresponding to a search model that is based on any one of the fundamental direction images and used to determine the workpiece to be gripped.

12. A computer having a robot setting program loaded on the computer, wherein the robot setting program is for setting an operation of a robot performing a bin picking operation of sequentially taking out a plurality of workpieces stacked in a work space with an end effector provided at a tip of an arm portion of the robot, the robot setting program causing the computer to execute:

a function of inputting a workpiece model indicating a three-dimensional shape of a workpiece;

a function of displaying the input workpiece on a display unit, and locating a position and an attitude of the workpiece model on a virtual three-dimensional space displayed on the display unit; and a function of registering at least three fundamental direction images as search models which are height images of the workpiece model viewed from respective axis directions of three axes orthogonal to each other on the virtual three-dimensional space;

a function of specifying on each respective fundamental direction image displayed on the display unit, a candidate grip position at which an end effector can grip a workpiece model indicated by the at least three of the fundamental direction images and specifies a grip attitude of the end effector to grip the workpiece at the grip position for each respective one of the at least three fundamental direction images and the grip attitude corresponding to each grip position;

a function of performing a three-dimensional search for specifying an attitude and a position of each workpiece from an input image by using the search models registered by the search model registration unit; and a function of determining a workpiece to be gripped by the end effector, a grip position to be gripped by the end effector, and a grip attitude corresponding to the grip position based on the result of the three-dimensional search, wherein the grip position to be gripped is selected among each of a candidate grip position specified on each of the at least three fundamental direction images corresponding to a search model that is based on any one of the fundamental direction images and used to determine the workpiece to be gripped.

13. A non-transitory computer readable recording medium recording the robot setting program according to claim 12 or an apparatus storing the program.

* * * * *